US009695260B2

(12) United States Patent
Ishiwata et al.

(10) Patent No.: US 9,695,260 B2
(45) Date of Patent: Jul. 4, 2017

(54) METHOD FOR PRODUCING OLEFIN BLOCK POLYMER USING PLURALITY OF TYPES OF TRANSITION METAL CATALYSTS

(71) Applicant: Sumitomo Chemical Company, Limited, Tokyo (JP)

(72) Inventors: Koji Ishiwata, Chiba (JP); Kazuo Takaoki, Chiba (JP); Kazuyuki Ito, Ibaraki (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/291,303

(22) Filed: May 30, 2014

(65) Prior Publication Data

US 2014/0275429 A1    Sep. 18, 2014

Related U.S. Application Data

(63) Continuation-in-part of application No. PCT/JP2012/081003, filed on Nov. 29, 2012.

(30) Foreign Application Priority Data

Dec. 2, 2011 (JP) ................................. 2011-264366

(51) Int. Cl.
*C08F 210/06* (2006.01)
*C08F 293/00* (2006.01)
(Continued)

(52) U.S. Cl.
CPC .......... *C08F 210/06* (2013.01); *C08F 293/00* (2013.01); *C08F 297/083* (2013.01); *C08L 23/08* (2013.01); *C08F 2410/04* (2013.01)

(58) Field of Classification Search
None
See application file for complete search history.

(56) References Cited

U.S. PATENT DOCUMENTS 6,288,192 B1    9/2001    Fujita et al.
6,818,703 B2   11/2004    Ebara et al.
(Continued)

FOREIGN PATENT DOCUMENTS

CN    1229093 A    9/1999
CN    1422286 A    6/2003
(Continued)

OTHER PUBLICATIONS

Office Action issued Jun. 10, 2015 in CN 201280059214.5.
(Continued)

*Primary Examiner* — Catherine S Branch
(74) *Attorney, Agent, or Firm* — Panitch Schwarze Belisario & Nadel LLP

(57) ABSTRACT

A method for producing an olefin block polymer, the method includes: polymerizing olefin using a polymerization catalyst (X), a polymerization catalyst (Y), and an organometallic compound (C) having an atom of any of Groups 2, 12, and 13 of the periodic table of the elements, the organometallic compound (C) excluding an activating co-catalyst agent (B), wherein: the polymerization catalyst (X) is formed by bringing a transition metal compound (A-X) represented by a general formula (1-X) into contact with an activating co-catalyst agent (B); and the polymerization catalyst (Y) is formed by bringing a transition metal com-
(Continued)

TREF FRACTIONATION TEMPERATURE AND COMPOSITION

[Graph showing ethylene content $C_2'$ (mol%) vs. fractionation temperature (°C), with data series S131 and FS150]

* THE MEASUREMENT WAS CARRIED OUT UNDER THE TREF FRACTIONATION CONDITION (2) DESCRIBED IN THE FOLLOWING EXAMPLE.

pound (A-Y) represented by a general formula (1-Y) into contact with the activating co-catalyst agent (B).

[Chem. 1]

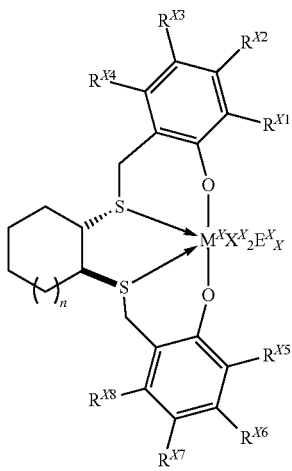

(1-X)

[Chem. 2]

$$(ML_aX_bE_c)_n \qquad (1\text{-}Y)$$

3 Claims, 2 Drawing Sheets

(51) Int. Cl.
  *C08F 297/08* (2006.01)
  *C08L 23/08* (2006.01)

(56) References Cited

U.S. PATENT DOCUMENTS

| | | | |
|---|---|---|---|
| 7,022,782 B2 | 4/2006 | Ogane | |
| 7,189,788 B2 | 3/2007 | Machida et al. | |
| 7,947,793 B2 | 5/2011 | Marchand et al. | |
| 8,053,529 B2 | 11/2011 | Carnahan et al. | |
| 8,071,701 B2 | 12/2011 | Klosin et al. | |
| 8,116,139 B2 | 1/2012 | Marchand et al. | |
| 8,124,709 B2 | 2/2012 | Marchand et al. | |
| 8,273,838 B2 | 9/2012 | Shan et al. | |
| 8,476,393 B2 | 7/2013 | Shan et al. | |
| 8,492,322 B2 | 7/2013 | Li Pi Shan et al. | |
| 8,569,422 B2 | 10/2013 | Shan et al. | |
| 2002/0002254 A1 | 1/2002 | Fujita et al. | |
| 2002/0143124 A1 | 10/2002 | Ogane | |
| 2003/0069127 A1 | 4/2003 | Takaoki et al. | |
| 2003/0220452 A1 | 11/2003 | Ebara et al. | |
| 2004/0072957 A1 | 4/2004 | Terano et al. | |
| 2006/0198983 A1 | 9/2006 | Patel | |
| 2006/0199006 A1 | 9/2006 | Poon et al. | |
| 2006/0199030 A1 | 9/2006 | Liang et al. | |
| 2006/0199744 A1 | 9/2006 | Walton et al. | |
| 2006/0199872 A1 | 9/2006 | Prieto et al. | |
| 2006/0199884 A1 | 9/2006 | Hoenig et al. | |
| 2006/0199887 A1 | 9/2006 | Liang et al. | |
| 2006/0199896 A1 | 9/2006 | Walton et al. | |
| 2006/0199897 A1 | 9/2006 | Karjala et al. | |
| 2006/0199905 A1 | 9/2006 | Hughes et al. | |
| 2006/0199906 A1 | 9/2006 | Walton et al. | |
| 2006/0199907 A1 | 9/2006 | Chang et al. | |
| 2006/0199908 A1 | 9/2006 | Cheung et al. | |
| 2006/0199910 A1 | 9/2006 | Walton et al. | |
| 2006/0199911 A1 | 9/2006 | Markovich et al. | |
| 2006/0199912 A1 | 9/2006 | Fuchs et al. | |
| 2006/0199914 A1 | 9/2006 | Harris et al. | |
| 2006/0199930 A1 | 9/2006 | Li Pi Shan et al. | |
| 2006/0199931 A1 | 9/2006 | Poon et al. | |
| 2006/0205833 A1 | 9/2006 | Martinez et al. | |
| 2006/0211819 A1 | 9/2006 | Hoenig et al. | |
| 2007/0010616 A1 | 1/2007 | Kapur et al. | |
| 2007/0066756 A1 | 3/2007 | Poon et al. | |
| 2007/0078222 A1 | 4/2007 | Chang et al. | |
| 2007/0112127 A1 | 5/2007 | Soediono et al. | |
| 2007/0155900 A1 | 7/2007 | Chang et al. | |
| 2007/0167315 A1 | 7/2007 | Arriola et al. | |
| 2007/0167578 A1 | 7/2007 | Arriola et al. | |
| 2007/0202330 A1 | 8/2007 | Peng et al. | |
| 2007/0219334 A1 | 9/2007 | Li Pi Shan et al. | |
| 2008/0177242 A1 | 7/2008 | Chang et al. | |
| 2008/0234435 A1 | 9/2008 | Chang et al. | |
| 2008/0269388 A1 | 10/2008 | Markovich et al. | |
| 2008/0280517 A1 | 11/2008 | Chang et al. | |
| 2008/0281037 A1 | 11/2008 | Karjala et al. | |
| 2008/0311812 A1 | 12/2008 | Arriola et al. | |
| 2009/0042472 A1 | 2/2009 | Poon et al. | |
| 2009/0105417 A1 | 4/2009 | Walton et al. | |
| 2009/0111944 A1 | 4/2009 | Kuhlman et al. | |
| 2009/0247033 A1 | 10/2009 | Peng et al. | |
| 2009/0324914 A1 | 12/2009 | Liang et al. | |
| 2010/0069574 A1 | 3/2010 | Shan et al. | |
| 2010/0240818 A1 | 9/2010 | Walton et al. | |
| 2010/0279571 A1 | 11/2010 | Poon et al. | |
| 2010/0280197 A1 | 11/2010 | Takaoki et al. | |
| 2011/0003929 A1 | 1/2011 | Soediono et al. | |
| 2011/0032621 A1 | 2/2011 | Marchand et al. | |
| 2011/0118416 A1 | 5/2011 | Arriola et al. | |
| 2011/0124818 A1 | 5/2011 | Arriola et al. | |
| 2011/0144240 A1 | 6/2011 | Harris et al. | |
| 2011/0152437 A1 | 6/2011 | Harris et al. | |
| 2011/0230108 A1 | 9/2011 | Arriola et al. | |
| 2013/0018150 A1 | 1/2013 | Walton et al. | |
| 2013/0030092 A1 | 1/2013 | Arriola et al. | |
| 2013/0035462 A1* | 2/2013 | Ishi | C07C 323/16 526/170 |
| 2013/0048204 A1 | 2/2013 | Chang et al. | |
| 2013/0085234 A1 | 4/2013 | Harris et al. | |
| 2014/0141228 A1 | 5/2014 | Fuchs et al. | |
| 2014/0163173 A1 | 6/2014 | Ishiwata et al. | |

FOREIGN PATENT DOCUMENTS

| | | | |
|---|---|---|---|
| CN | 1448432 A | 10/2003 | |
| CN | 101983213 A | 3/2011 | |
| EP | 1727840 B1 | 10/2012 | |
| JP | 2007-529616 A | 10/2007 | |
| JP | 2010-126557 A | 6/2010 | |
| JP | WO 2011099584 A1 * | 8/2011 | ........... C07C 323/16 |
| JP | 2012-236994 A | 12/2012 | |
| JP | 2013-166898 A | 8/2013 | |
| WO | 9421700 A1 | 9/1994 | |
| WO | 2007035485 A1 | 3/2007 | |
| WO | 2009027516 A1 | 3/2009 | |
| WO | 2013022102 A1 | 2/2013 | |

OTHER PUBLICATIONS

Int'l Search Report issued Feb. 26, 2013 in Int'l Application No. PCT/JP2012/081003.
Int'l Preliminary Report on Patentability issued Jun. 12, 2014 in Int'l Application No. PCT/JP2012/081003.
Hustad et al, "Continuous Production of Ethylene-Based Diblock Copolymers Using Coordinative Chain Transfer Polymerization," Macromolecules, vol. 40, No. 20, pp. 7061-7064 (Oct. 2, 2007).
Office Action issued on May 24, 2016 in JP Application No. 2013-547222.
Meppelder et al., "Enantiomerically Pure Titanium Complexes Containing an [OSSO]-Type Bis[phenolate] Ligand: Synthesis, Structure, amd Formation of Optically Active Oligostyrenes", Chem. Asian J., vol. 3, pp. 1312-1323 (2008).

(56) References Cited

OTHER PUBLICATIONS

Carpentier, "When Single-Site Polymerization Catalysis Meets Chirality: Optical Activity of Stereoregular Polyolefins", Angew Chem., vol. 46, pp. 6404-6406 (2007).

Beckerle et al., "Stereospecific Styrene Enchainment at a Titanium Site within a Helical Ligand Framework: Evidence for the Formation of Homochiral Polystyrene", Angew. Chem., vol. 46, pp. 4790-4793 (2007).

\* cited by examiner

F I G. 1
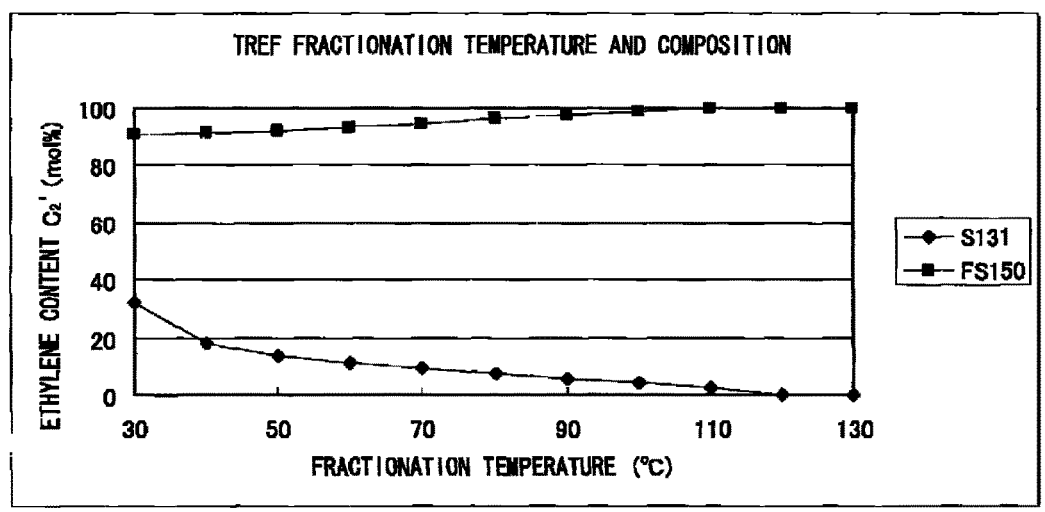
* THE MEASUREMENT WAS CARRIED OUT UNDER THE TREF FRACTIONATION CONDITION (2) DESCRIBED IN THE FOLLOWING EXAMPLE.
F I G. 2
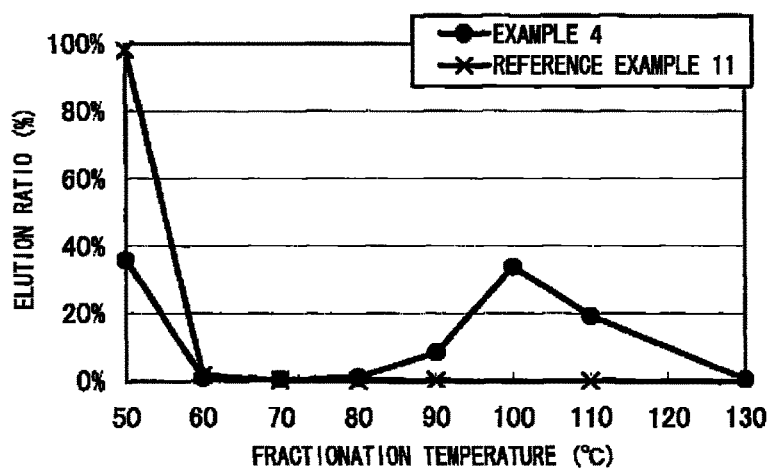
* THE MEASUREMENT WAS CARRIED OUT UNDER THE ABOVE TREF FRACTIONATION CONDITION (1).

F I G. 3
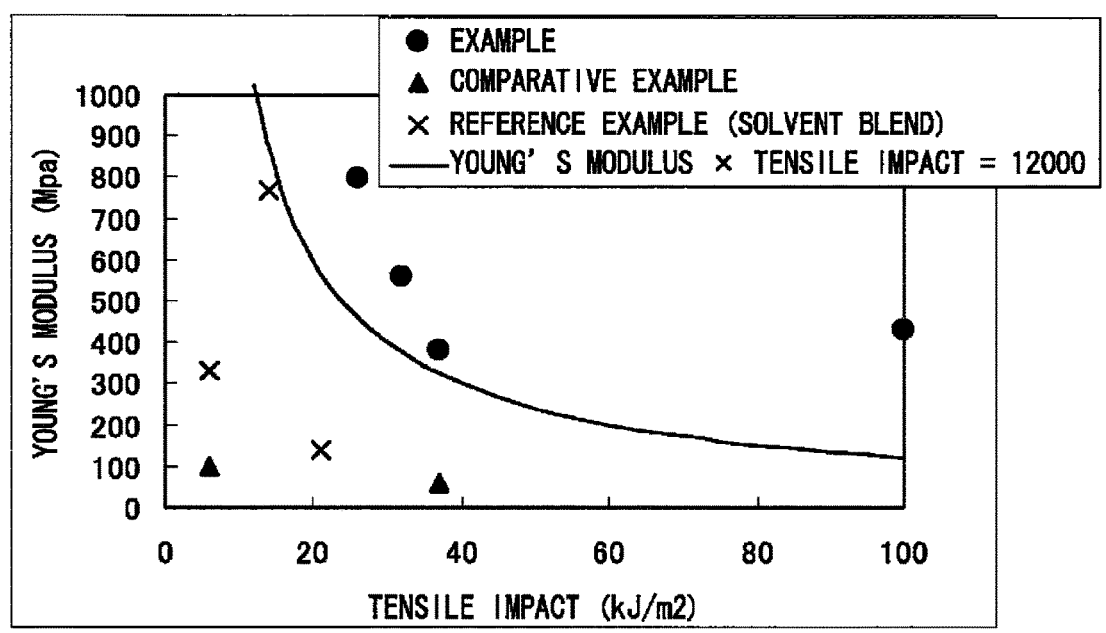

METHOD FOR PRODUCING OLEFIN BLOCK POLYMER USING PLURALITY OF TYPES OF TRANSITION METAL CATALYSTS

CROSS REFERENCE TO RELATED APPLICATION

This application is a Continuation-in-part of International Application No. PCT/JP2012/081003 filed in Japan on Nov. 29, 2012, which was published in the Japanese language on Jun. 6, 2013, under International Publication No. WO 2013/081080 A1, and the disclosure of which is incorporated herein by reference.

TECHNICAL FIELD

The present invention relates to a method for producing an olefin block polymer with use of a plural kinds of transition metal catalysts.

BACKGROUND ART

A block polymer, in which two or more kinds of segments which differ in property are chemically linked, has been known to exhibit excellent physical properties. For example, in a case where a specific block polymer having segments compatible with respective phases of a mixture of incompatible resins is added to the mixture, the block polymer serves both as a compatibilizer which controls a morphology of a dispersed phase by acting on an interface between the phases of the mixture and as a modifier which improves physical properties, such as impact resistance, of the mixture.

It has been known that, in a case where olefin are polymerized under a proper condition with use of (i) a polymerization catalyst containing a specific transition metal compound and (ii) a specific organometallic compound (organoaluminum compound, organozinc compound, organogallium compound, or the like), reversible chain transfer polymerization proceeds, that is to say that a growing polymer chain reversibly transfers, between the transition metal compound, which is catalytic active species, and the organometallic compound. By making use of the reversible chain transfer polymerization, it is possible to synthesize an olefin block polymer.

For example, Non-patent Literature 1 and Patent Literature 1 disclose methods for obtaining an olefin block polymer by solution polymerization performed with a transition metal compound and an organoaluminum compound or an organozinc compound by use of polymerization tanks containing respective olefins differing in composition and are connected in series. Patent Literature 2 discloses a method for obtaining an olefin block polymer by sequentially adding, under equivalent polymerization conditions, two kinds of transition metal compounds which differ in copolymerizability.

CITATION LIST

Patent Literatures

Patent Literature 1
International publication No. WO 2007/035485 (Publication Date: Mar. 29, 2007)
Patent Literature 2
Japanese Patent Application Publication, Tokukai, No. 2010-126557 A (Publication Date: Jun. 10, 2010)

Nonpatent Literature

Nonpatent literature 1
Hustad, P. D.; Kuhlman, R. L.; Arriola, D. J.; Carnahan, E. M.; Wenzel, T. T. Macromolecules 2007, 40, 7061-7064

SUMMARY OF INVENTION

Technical Problem

Conventional synthesis of an olefin block polymer by reversible chain transfer polymerization produces a polymer which contains, as a by-product, a polymer that does not form any block. The conventional synthesis of an olefin block polymer by reversible chain transfer polymerization was therefore not necessarily satisfactory in terms of efficiency in producing the olefin block polymer. In view of this, an object of the present invention is to provide a method for producing an olefin block polymer by reversible chain transfer polymerization, in which method less by-products are produced and the olefin block polymer is produced with high efficiency.

Solution to Problem

The present invention is to provide a method for producing an olefin block polymer, the method comprising:
polymerizing olefin using a polymerization catalyst (X), a polymerization catalyst (Y), and an organometallic compound (C) having an atom of any of Groups 2, 12, and 13 of the periodic table of the elements, the organometallic compound (C) excluding an activating co-catalyst agent (B), wherein:
the polymerization catalyst (X) is formed by bringing a transition metal compound (A-X) represented by the following general formula (1-X) into contact with an activating co-catalyst agent (B) selected from among an organoaluminumoxy compound (B-1), an organoboron compound (B-2), a zinc co-catalyst component (B-3), and ion-exchange layered silicate (B-4); and
the polymerization catalyst (Y) is formed by bringing a transition metal compound (A-Y) represented by the following general formula (1-Y) (excluding the transition metal compound represented by the following general formula (1-X)) into contact with the activating co-catalyst agent (B) selected from among the organoaluminumoxy compound (B-1), the organoboron compound (B-2), the zinc co-catalyst component (B-3), and the ion-exchange layered silicate (B-4).

[Chem. 1]

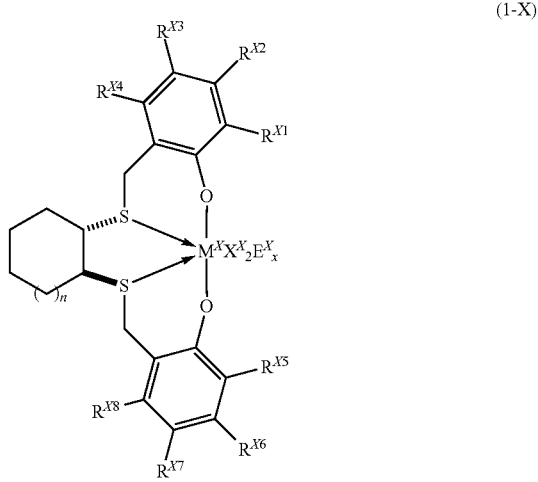

(1-X)

(where:

n is 1, 2, or 3;

$M^X$ represents a titanium atom, a zirconium atom, or a hafnium atom;

$R^{X1}$ to $R^{X8}$ are independently:

a hydrogen atom, a halogen atom, an alkyl group having 1 to 20 carbon atoms, a cycloalkyl group having 3 to 10 ring carbon atoms, an alkenyl group having 2 to 20 carbon atoms, an alkynyl group having 2 to 20 carbon atoms, an aralkyl group having 7 to 30 carbon atoms, an aryl group having 6 to 30 carbon atoms, an alkoxy group having 1 to 20 carbon atoms, an aralkyloxy group having 7 to 30 carbon atoms, an aryloxy group having 6 to 30 carbon atoms, a substituted silyl group, or a heterocyclic compound residue having 3 to 20 ring carbon atoms;

the alkyl groups, the cycloalkyl groups, the alkenyl groups, the alkynyl groups, the aralkyl groups, the aryl groups, the alkoxy groups, the aralkyloxy groups, the aryloxy groups, and the heterocyclic compound residues represented by $R^{X1}$ to $R^{X8}$ each optionally have a substituent;

notwithstanding the above definitions of $R^{X1}$ to $R^{X8}$, each of the following pairs, $R^{X1}$ and $R^{X2}$, $R^{X2}$ and $R^{X3}$, $R^{X3}$ and $R^{X4}$, $R^{X5}$ and $R^{X6}$, $R^{X6}$ and $R^{X7}$, and $R^{X7}$ and $R^{X8}$, are optionally linked to each other to form a ring optionally having a substituent;

each $X^X$ is independently:

a hydrogen atom, a halogen atom, an alkyl group having 1 to 20 carbon atoms, a cycloalkyl group having 3 to 10 ring carbon atoms, an alkenyl group having 2 to 20 carbon atoms, an aralkyl group having 7 to 30 carbon atoms, an aryl group having 6 to 30 carbon atoms, an alkoxy group having 1 to 20 carbon atoms, an aralkyloxy group having 7 to 30 carbon atoms, an aryloxy group having 6 to 30 carbon atoms, a substituted silyl group having 1 to 20 carbon atoms, a substituted amino group having 1 to 20 carbon atoms, a substituted thiolate group having 1 to 20 carbon atoms, or a carboxylate group having 1 to 20 carbon atoms;

the alkyl group, the cycloalkyl group, the alkenyl group, the aralkyl group, the aryl group, the alkoxy group, the aralkyloxy group, the aryloxy group, and the carboxylate group represented by $X^X$ optionally have a substituent;

$X^X$ groups are optionally linked to each other to form a ring;

$E^X$ is independently a neutral Lewis base, and the subscript x representing the number of $E^X$ groups is 0, 1, or 2; when the subscript x is 2, the $E^X$ groups are the same or different.)

[Chem. 2]

$$(ML_aX_bE_c)_n \quad (1\text{-}Y)$$

(where:

M denotes a transition metal atom of any one of Groups 4 to 11 of the periodic table of the elements, and, in a case where n is 2 or more, M atoms may be the same as or different from each other;

L denotes a π-electron conjugated anionic group which contains 70 or less atoms in addition to hydrogen atoms and is attached to the M atoms via a conjugated n electron, and, in a case where a is 2 or more, the L groups may be the same as or different from each other;

X denotes a nonconjugated anionic group containing 70 or less atoms in addition to hydrogen atoms, and, in a case where b is 2 or more, the X groups may be the same as or different from each other;

E denotes a neutral Lewis basic ligand which contains 70 or less atoms in addition to hydrogen atoms and is attached to the M group via one or more unshared electron pairs, and, in a case where c is 2 or more, the E groups may be the same as or different from each other;

a denotes an integer of any of 0 to 6, b denotes an integer of any of 0 to 8, c denotes an integer of any of 0 to 9, and n denotes an integer of any of 1 to 4;

in a case where atomicities of the M, L, and X groups are $m^e$, $l^e$, and $x^e$, respectively, a relationship of $m^e = l^e \times a + x^e \times b$ is satisfied;

two or more of the L, X, and E groups are optionally linked to each other to form a ring;

in a case where a is 2 or more, the L groups are optionally linked to each other to form a ring;

in a case where b is 2 or more, the X groups are optionally linked to each other to form a ring;

in a case where c is 2 or more, the E groups are optionally linked to each other to form a ring; and in a case where n is 2 or more, the L groups, the X groups, or the E groups are optionally linked to each other to form a ring.).

Advantageous Effects of Invention

The method of the present invention makes it possible to obtain, via synthesis of an olefin block polymer by reversible chain transfer polymerization, an olefin block polymer which is produced with high efficiency. Furthermore, in a case, for example, where the olefin block polymer produced with high efficiency is mixed with a polypropylene resin composition, the olefin block polymer enables improvements in rigidity and impact resistance.

BRIEF DESCRIPTION OF DRAWINGS

FIG. 1 is a graph showing relationships between fractionation temperature and composition of two kinds of ethylene/α-olefin copolymers as a result of implementation of TREF fractionation.

FIG. 2 is a graph showing results of TREF fractionation of ethylene/propylene block copolymer composition in Example 4 and in Reference Example 11.

FIG. 3 is a graph showing relationships between tensile impact and Young's modulus in Examples 9, 10, 11, 15, in Comparative Examples 3-4, and in Reference Examples 14-16.

DESCRIPTION OF EMBODIMENTS

The following description will discuss a specific method of the present invention for producing an olefin block polymer.

Transition Metal Compound (A-X)

A transition metal compound (A-X) used in the present invention is represented by the following general formula (1-X). The following description will discuss the transition metal compound (A-X) represented by the formula (1-X).

[Chem. 3]

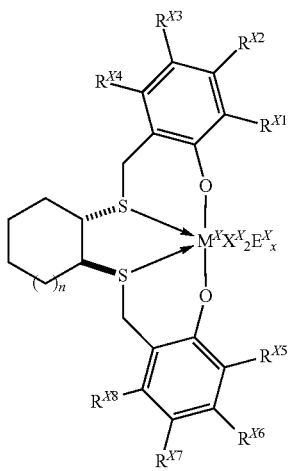

(1-X)

where n is 1, 2, or 3,
$M^X$ represents a titanium atom, a zirconium atom, or a hafnium atom.
$R^{X1}$ to $R^{X8}$ are independently
a hydrogen atom,
a halogen atom,
an alkyl group having 1 to 20 carbon atoms,
a cycloalkyl group having 3 to 10 ring carbon atoms,
an alkenyl group having 2 to 20 carbon atoms,
an alkynyl group having 2 to 20 carbon atoms,
an aralkyl group having 7 to 30 carbon atoms,
an aryl group having 6 to 30 carbon atoms,
an alkoxy group having 1 to 20 carbon atoms,
an aralkyloxy group having 7 to 30 carbon atoms,
an aryloxy group having 6 to 30 carbon atoms,
a substituted silyl group, or
a heterocyclic compound residue having 3 to 20 ring carbon atoms.

The alkyl groups, the cycloalkyl groups, the alkenyl groups, the alkynyl groups, the aralkyl groups, the aryl groups, the alkoxy groups, the aralkyloxy groups, the aryloxy groups, and the heterocyclic compound residues represented by $R^{X1}$ to $R^{X8}$ each optionally have a substituent.

Notwithstanding the above definitions of $R^{X1}$ to $R^{X8}$, each of the following pairs, $R^{X1}$ and $R^{X2}$, $R^{X2}$ and $R^{X3}$, $R^{X3}$ and $R^{X4}$, $R^{X5}$ and $R^{X6}$, $R^{X6}$ and $R^{X7}$, and $R^{X7}$ and $R^{X8}$, are optionally linked to each other to form a ring optionally having a substituent.

Each $X^X$ is independently
a hydrogen atom,
a halogen atom,
an alkyl group having 1 to 20 carbon atoms,
a cycloalkyl group having 3 to 10 ring carbon atoms,
an alkenyl group having 2 to 20 carbon atoms,
an aralkyl group having 7 to 30 carbon atoms,
an aryl group having 6 to 30 carbon atoms,
an alkoxy group having 1 to 20 carbon atoms,
an aralkyloxy group having 7 to 30 carbon atoms,
an aryloxy group having 6 to 30 carbon atoms,
a substituted silyl group having 1 to 20 carbon atoms,
a substituted amino group having 1 to 20 carbon atoms,
a substituted thiolate group having 1 to 20 carbon atoms, or
a carboxylate group having 1 to 20 carbon atoms.

The alkyl group, the cycloalkyl group, the alkenyl group, the aralkyl group, the aryl group, the alkoxy group, the aralkyloxy group, the aryloxy group, and the carboxylate group represented by $X^X$ optionally have a substituent.

$X^X$ groups are optionally linked to each other to form a ring.

$E^X$ is independently a neutral Lewis base. When the subscript x is 2, the $E^X$ groups are the same or different. The subscript x representing the number of $E^X$ groups is 0, 1, or 2.

$M^X$ represents a titanium atom, a zirconium atom, or a hafnium atom, and preferably a hafnium atom.

n is 1, 2, or 3, preferably 2 or 3, and more preferably 3.

It is preferable that $R^{X1}$ and $R^{X5}$ be independently
a hydrogen atom,
a halogen atom,
an alkyl group having 1 to 20 carbon atoms,
a cycloalkyl group having 3 to 10 ring carbon atoms,
an aralkyl group having 7 to 30 carbon atoms,
an aryl group having 6 to 30 carbon atoms,
an alkoxy group having 1 to 20 carbon atoms,
an aralkyloxy group having 7 to 30 carbon atoms,
an aryloxy group having 6 to 30 carbon atoms,
a substituted silyl group, or
a heterocyclic compound residue having 3 to 20 ring carbon atoms.

It is more preferable that $R^{X1}$ and $R^{X5}$ be independently a halogen atom,
an alkyl group having 1 to 20 carbon atoms,
a cycloalkyl group having 3 to 10 ring carbon atoms,
an aralkyl group having 7 to 30 carbon atoms, or
an aryl group having 6 to 30 carbon atoms,
a substituted silyl group, or
a heterocyclic compound residue having 3 to 20 ring carbon atoms.

It is still more preferable that $R^{X1}$ and $R^{X5}$ be the same and be
an alkyl group having 1 to 20 carbon atoms,
a cycloalkyl group having 3 to 10 ring carbon atoms,
an aralkyl group having 7 to 30 carbon atoms, or
a substituted silyl group.

It is preferable that $R^{X2}$ to $R^{X4}$ and $R^{X6}$ to $R^{X8}$ be independently
a hydrogen atom,
a halogen atom,
an alkyl group having 1 to 20 carbon atoms,
a cycloalkyl group having 3 to 10 ring carbon atoms,
an aralkyl group having 7 to 30 carbon atoms,
an aryl group having 6 to 30 carbon atoms,
an alkoxy group having 1 to 20 carbon atoms,
an aralkyloxy group having 7 to 30 carbon atoms,
an aryloxy group having 6 to 30 carbon atoms,
a substituted silyl group, or
a heterocyclic compound residue having 3 to 20 ring carbon atoms.

It is more preferable that $R^{X2}$ to $R^{X4}$ and $R^{X6}$ to $R^{X8}$ be independently
a hydrogen atom,
a halogen atom,
an alkyl group having 1 to 20 carbon atoms,
a cycloalkyl group having 3 to 10 ring carbon atoms,
an aralkyl group having 7 to 30 carbon atoms,
an aryl group having 6 to 30 carbon atoms, or
a substituted silyl group.

It is more preferable that $R^{X2}$, $R^{X4}$, $R^{X6}$, and $R^{X8}$ be a hydrogen atom.

It is more preferable that $R^3$ and $R^7$ be independently a halogen atom,
an alkyl group having 1 to 20 carbon atoms,
a cycloalkyl group having 3 to 10 ring carbon atoms,
an aralkyl group having 7 to 30 carbon atoms,
an aryl group having 6 to 30 carbon atoms, or
a substituted silyl group.

It is still more preferable that $R^{X3}$ and $R^{X7}$ be the same and be
an alkyl group having 1 to 20 carbon atoms,
a cycloalkyl group having 3 to 10 ring carbon atoms,
an aralkyl group having 7 to 30 carbon atoms,
an aryl group having 6 to 30 carbon atoms, or
a substituted silyl group.

It is most preferable that $R^{X3}$ and $R^{X7}$ be the same and be an alkyl group having 1 to 20 carbon atoms.

The alkyl groups, the cycloalkyl groups, the alkenyl groups, the alkynyl groups, the aralkyl groups, the aryl groups, the alkoxy groups, the aralkyloxy groups, the aryloxy groups, and the heterocyclic compound residues represented by $R^{X1}$ to $R^{X8}$ each optionally have a substituent.

Examples of the halogen atom of $R^{X1}$ to $R^{X8}$ include a fluorine atom, a chlorine atom, a bromine atom, and an iodine atom.

Examples of the alkyl group of $R^{X1}$ to $R^{X8}$ which has 1 to 20 carbon atoms and optionally has a substituent include perfluoromethyl group, perfluoroethyl group, perfluoro-n-propyl group, perfluoroisopropyl group, perfluoro-n-butyl group, perfluoro-sec-butyl group, perfluoroisobutyl group, perfluoro-tert-butyl group, perfluoro-n-pentyl group, perfluoroisopentyl group, perfluoro-tert-pentyl group, perfluoro-neopentyl group, perfluoro-n-hexyl group, perfluoro-n-heptyl group, perfluoro-n-octyl group, perfluoro-n-decyl group, perfluoro-n-dodecyl group, perfluoro-n-pentadecyl group, perfluoro-n-eicosyl group, methyl group, ethyl group, n-propyl group, isopropyl group, n-butyl group, sec-butyl group, isobutyl group, tert-butyl group, n-pentyl group, isopentyl group, tert-pentyl group, neopentyl group, n-hexyl group, thexyl group, neohexyl group, n-heptyl group, n-octyl group, n-decyl group, n-dodecyl group, n-pentadecyl group, and n-eicosyl group.

The alkyl group of $R^{X1}$ and $R^{X5}$ which has 1 to 20 carbon atoms and optionally has a substituent is preferably an alkyl group having 4 to 10 carbon atoms such as n-butyl group, sec-butyl group, isobutyl group, tert-butyl group, n-pentyl group, isopentyl group, tert-pentyl group, neopentyl group, n-hexyl group, thexyl group, neohexyl group, n-heptyl group, n-octyl group, or n-decyl group, and more preferably a tertiary alkyl group having 4 to 6 carbon atoms such as tert-butyl group, tert-pentyl group, or thexyl group.

The alkyl group of $R^{X2}$ to $R^{X4}$ and $R^{X6}$ to $R^{X8}$ which has 1 to 20 carbon atoms and optionally has a substituent is preferably an alkyl group having 1 to 10 carbon atoms such as perfluoromethyl group, methyl group, ethyl group, n-propyl group, isopropyl group, n-butyl group, sec-butyl group, isobutyl group, tert-butyl group, n-pentyl group, isopentyl group, tert-pentyl group, neopentyl group, n-hexyl group, thexyl group, neohexyl group, n-heptyl group, n-octyl group, or n-decyl group, more preferably an alkyl group having 1 to 6 carbon atoms such as perfluoromethyl group, methyl group, isopropyl group, isobutyl group, tert-butyl group, isopentyl group, tert-pentyl group, neopentyl group, or thexyl group, and further more preferably an alkyl group having 1 to 4 carbon atoms such as perfluoromethyl group, methyl group, isopropyl group, isobutyl group, or tert-butyl group.

Examples of the cycloalkyl group of $R^{X1}$ to $R^{X8}$ which has 3 to 10 ring carbon atoms and optionally has a substituent include cyclopropyl group, cyclobutyl group, cyclopentyl group, cyclohexyl group, cycloheptyl group, cyclooctyl group, 1-methylcyclopentyl group, 1-methylcyclohexyl group, 1-phenylcyclohexyl group, 1-indanyl group, 2-indanyl group, norbornyl group, bornyl group, menthyl group, 1-adamantyl group, and 2-adamantyl group. The cycloalkyl group $R^{X1}$ to $R^{X8}$ which has 3 to 10 ring carbon atoms and optionally has a substituent is preferably a cycloalkyl group having 5 to 10 ring carbon atoms, such as cyclopentyl group, cyclohexyl group, cycloheptyl group, cyclooctyl group, 1-methylcyclopentyl group, 1-methylcyclohexyl group, 1-indanyl group, 2-indanyl group, norbornyl group, bornyl group, menthyl group, 1-adamantyl group, or 2-adamantyl group, more preferably a cycloalkyl group having 6 to 10 ring carbon atoms, such as cyclohexyl group, 1-methylcyclohexyl group, norbornyl group, bornyl group, 1-adamantyl group, or 2-adamantyl group. Furthermore, these cycloalkyl groups optionally have, as a substituent, a hydrocarbyl group having 1 to 10 carbon atoms. For example, in a case where the group which constitutes a ring is 1-adamantyl group, examples of the cycloalkyl groups having, as a substituent, the hydrocarbyl group include 3,5-dimethyladamantyl group, 3,5,7-trimethyladamantyl group, 3,5-diethyladamantyl group, 3,5,7-triethyladamantyl group, 3,5-diisopropyladamantyl group, 3,5,7-triisopropyladamantyl group, 3,5-diisobutyladamantyl group, 3,5,7-triisobutyladamantyl group, 3,5-diphenyladamantyl group, 3,5,7-triphenyladamantyl group, 3,5-di(3,5-xylyl)adamantyl group, and 3,5,7-tri(3,5-xylyl)adamantyl group, and preferably 3,5-dimethyladamantyl group, 3,5-diethyladamantyl group, 3,5-diisopropyladamantyl group, 3,5-diisobutyladamantyl group, 3,5-diphenyladamantyl group, or 3,5-di(3,5-xylyl) adamantyl group.

Examples of the alkenyl group of $R^{X1}$ to $R^{X8}$ which has 2 to 20 carbon atoms and optionally has a substituent include vinyl group, allyl group, propenyl group, 2-methyl-2-propenyl group, homoallyl group, pentenyl group, hexenyl group, heptenyl group, octenyl group, nonenyl group, and decenyl group, preferably an alkenyl group having 3 to 6 carbon atoms, and more preferably an allyl group or a homoallyl group.

Examples of the alkynyl group of $R^{X1}$ to $R^{X8}$ which has 2 to 20 carbon atoms and optionally has a substituent include ethynyl group, 1-propynyl group, 2-propynyl group, 1-butynyl group, 3-methyl-1-butynyl group, 3,3-dimethyl-1-butynyl group, 2-butynyl group, 3-butynyl group, 1-pentynyl group, 4-methyl-1-pentynyl group, 2-pentynyl group, 3-pentynyl group, 4-pentynyl group, 1-hexynyl group, 1-octynyl group, and phenylethynyl group, preferably an alkynyl group having 3 to 8 carbon atoms, and more preferably 3-methyl-1-butynyl group, 3,3-dimethyl-1-butynyl group, or phenylethynyl group.

Examples of the aralkyl group of $R^{X1}$ to $R^{X8}$ which has 7 to 30 carbon atoms and optionally has a substituent include benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)

methyl group, (isopropylphenyl)methyl group, (n-butylphenyl)methyl group, (sec-butylphenyl)methyl group, (tert-butylphenyl)methyl group, (isobutylphenyl)methyl group, (n-pentylphenyl)methyl group, (neopentylphenyl)methyl group, (n-hexylphenyl)methyl group, (n-octylphenyl)methyl group, (n-decylphenyl)methyl group, naphthylmethyl group, anthracenylmethyl group, dimethyl(phenyl)methyl group, dimethyl(4-methylphenyl)methyl group, dimethyl(1-naphthyl)methyl group, dimethyl(2-naphthyl)methyl group, methyl(diphenyl)methyl group, methylbis(4-methylphenyl) methyl group, and triphenylmethyl group, and preferably a tertiary aralkyl group having 9 to 20 carbon atoms such as dimethyl(phenyl)methyl group, dimethyl(4-methylphenyl)methyl group, dimethyl(1-naphthyl)methyl group, dimethyl(2-naphthyl)methyl group, methyl(diphenyl)methyl group, methylbis(4-methylphenyl)methyl group, or triphenylmethyl group.

Examples of the aryl group of $R^{X1}$ to $R^{X8}$ which has 6 to 30 carbon atoms and optionally has a substituent include phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, isobutylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, 3,5-diisopropylphenyl group, 2,6-diisopropylphenyl group, 3,5-ditert-butylphenyl group, 2-fluorophenyl group, 3-fluorophenyl group, 4-fluorophenyl group, pentafluorophenyl group, 2-trifluoromethylphenyl group, 3-trifluoromethylphenyl group, 4-trifluoromethylphenyl group, 2,3-difluorophenyl group, 2,4-difluorophenyl group, 2,5-difluorophenyl group, 2,6-difluorophenyl group, 2-chlorophenyl group, 2,3-dichlorophenyl group, 2,4-dichlorophenyl group, 2,5-dichlorophenyl group, 2-bromophenyl group, 3-bromophenyl group, 4-bromophenyl group, 2,3-dibromophenyl group, 2,4-dibromophenyl group, and 2,5-dibromophenyl group, and preferably a phenyl group having 6 to 20 carbon atoms such as phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, ethylphenyl group, n-propylphenyl group, isopropylphenyl group, 3,5-diisopropylphenyl group, 2,6-diisopropylphenyl group, or 3,5-ditert-butylphenyl group; a fluorinated phenyl group such as 2-fluorophenyl group, 3-fluorophenyl group, 4-fluorophenyl group, pentafluorophenyl group, 2,3-difluorophenyl group, 2,4-difluorophenyl group, 2,5-difluorophenyl group, or 2,6-difluorophenyl group; or a fluorinated alkylphenyl group such as 2-trifluoromethylphenyl group, 3-trifluoromethylphenyl group, or 4-trifluoromethylphenyl group.

Examples of the substituted silyl group of $R^{X1}$ to $R^{X8}$ include trimethylsilyl group, triethylsilyl group, tri-n-propylsilyl group, triisopropylsilyl group, tri-n-butylsilyl group, triisobutylsilyl group, tert-butyldimethylsilyl group, methyldiphenylsilyl group, dimethyl(phenyl)silyl group, tert-butyldiphenylsilyl group, triphenylsilyl group, methylbis(trimethylsilyl) silyl group, dimethyl(trimethylsilyl)silyl group, and tris(trimethylsilyl)silyl group, and preferably a trialkylsilyl group having 3 to 20 carbon atoms such as trimethylsilyl group, triethylsilyl group, tri-n-propylsilyl group, triisopropylsilyl group, or tert-butyldimethylsilyl group; or silyl group having, as a substituent, a hydrocarbylsilyl group having 3 to 20 carbon atoms such as methylbis(trimethylsilyl)silyl group, dimethyl(trimethylsilyl)silyl group, or tris (trimethylsilyl)silyl group.

Examples of the alkoxy group of $R^{X1}$ to $R^{X8}$ which has 1 to 20 carbon atoms and optionally has a substituent include perfluoromethoxy group, perfluoroethoxy group, perfluoro-n-propoxy group, perfluoroisopropoxy group, perfluoro-n-butoxy group, perfluoro-sec-butoxy group, perfluoroisobutoxy group, perfluoro-n-pentyloxy group, perfluoroneopentyloxy group, perfluoro-n-hexyloxy group, perfluoro-n-heptyloxy group, perfluoro-n-octyloxy group, perfluoro-n-decyloxy group, perfluoro-n-dodecyloxy group, perfluoro-n-pentadecyloxy group, perfluoro-n-eicosyloxy group, methoxy group, ethoxy group, n-propoxy group, isopropoxy group, n-butoxy group, sec-butoxy group, isobutoxy group, n-pentyloxy group, neopentyloxy group, n-hexyloxy group, n-heptyloxy group, n-octyloxy group, n-decyloxy group, n-dodecyloxy group, n-pentadecyloxy group, and n-eicosyloxy group, preferably an alkoxy group having 1 to 4 carbon atoms, and more preferably methoxy group, ethoxy group, n-propoxy group, isopropoxy group, or n-butoxy group.

Examples of the aryloxy group of $R^{X1}$ to $R^{X8}$ which has 6 to 30 carbon atoms and optionally has a substituent include phenoxy group, 2,3,4-trimethylphenoxy group, 2,3,5-trimethylphenoxy group, 2,3,6-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, 2,6-diisopropylphenoxy group, 2-fluorophenoxy group, 3-fluorophenoxy group, 4-fluorophenoxy group, pentafluorophenoxy group, 2-trifluoromethylphenoxy group, 3-trifluoromethylphenoxy group, 4-trifluoromethylphenoxy group, 2,3-difluorophenoxy group, 2,4-difluorophenoxy group, 2,5-difluorophenoxy group, 2-chlorophenoxy group, 2,3-dichlorophenoxy group, 2,4-dichlorophenoxy group, 2,5-dichlorophenoxy group, 2-bromophenoxy group, 3-bromophenoxy group, 4-bromophenoxy group, 2,3-dibromophenoxy group, 2,4-dibromophenoxy group, and 2,5-dibromophenoxy group, preferably an aryloxy group having 6 to 14 carbon atoms, and more preferably 2,4,6-trimethylphenoxy group, 3,4,5-trimethylphenoxy group, 2,6-diisopropylphenoxy group, or a pentafluorophenoxy group.

Examples of the aralkyloxy group of $R^{X1}$ to $R^{X8}$ which has 7 to 30 carbon atoms and optionally has a substituent include benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl) methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl) methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl)methoxy group, (n-hexylphenyl) methoxy group, (n-octylphenyl)methoxy group, (n-decylphenyl)methoxy group, (n-tetradecylphenyl)methoxy group, naphthylmethoxy group, and anthracenylmethoxy group, preferably an aralkyloxy group having 7 to 12 carbon atoms, and more preferably benzyloxy group.

Examples of the heterocyclic compound residue of $R^{X1}$ to $R^{X8}$ which has 3 to 20 ring carbon atoms and optionally has a substituent include thienyl group, furyl group, 1-pyrrolyl group, 1-imidazolyl group, 1-pyrazolyl group, pyridyl group, pyrazinyl group, pyrimidinyl group, pyridazinyl group, 2-isoindolyl group, 1-indolyl group, quinolyl group, dibenzo-1H-pyrrol-1-yl group, and N-carbazolyl group, and preferably thienyl group, furyl group, 1-pyrrolyl group, pyridyl group, pyrimidinyl group, 2-isoindolyl group, 1-indolyl group, quinolyl group, dibenzo-1H-pyrrol-1-yl group, or N-carbazolyl group.

$R^{X1}$ and $R^{X2}$, $R^{X2}$ and $R^{X3}$, $R^{X3}$ and $R^{X4}$, $R^{X5}$ and $R^{X6}$, $R^{X6}$ and $R^{X7}$, $R^{X7}$ and $R^{X8}$ are optionally linked to each other to form a ring which optionally has a substituent, notwithstanding the above definitions of $R^{X1}$ to $R^{X8}$. The ring is preferably a 4- to 10-membered hydrocarbyl ring or heterocyclic ring containing two carbon atoms on a benzene ring represented in the formula (1-X). The 4- to 10-membered ring optionally has a substituent.

Specifically, examples of the ring include a cyclobutene ring, a cyclopentene ring, a cyclopentadiene ring, a cyclohexene ring, a cycloheptene ring, a cyclooctene ring, a benzene ring, a naphthalene ring, a furan ring, a 2,5-dimethylfuran ring, a thiophene ring, a 2,5-dimethylthiophene ring, and a pyridine ring, preferably a cyclopentene ring, a cyclopentadiene ring, a cyclohexene ring, a benzene ring and a naphthalene ring, and more preferably a cyclopentene ring, a cyclohexene ring, a benzene ring, and a naphthalene ring each of which is formed by linkage between $R^{x1}$ and $R^{x2}$ and/or $R^{x5}$ and $R^{x6}$.

The two $X^X$ are independently a hydrogen atom, a halogen atom, an alkyl group having 1 to 20 carbon atoms, a cycloalkyl group having 3 to 10 ring carbon atoms, an alkenyl group having 2 to 20 carbon atoms, an aralkyl group having 7 to 30 carbon atoms, an aryl group having 6 to 30 carbon atoms, an alkoxy group having 1 to 20 carbon atoms, an aralkyloxy group having 7 to 30 carbon atoms, an aryloxy group having 6 to 30 carbon atoms, a substituted silyl group having 1 to 20 carbon atoms, a substituted amino group having 1 to 20 carbon atoms, a substituted thiolate group having 1 to 20 carbon atoms, or a carboxylate group having 1 to 20 carbon atoms.

Examples of the halogen atom, the alkyl group having 1 to 20 carbon atoms, the cycloalkyl group having 3 to 10 ring carbon atoms, the alkenyl group having 2 to 20 carbon atoms, the aralkyl group having 7 to 30 carbon atoms, the aryl group having 6 to 30 carbon atoms, the alkoxy group having 1 to 20 carbon atoms, the aralkyloxy group having 7 to 30 carbon atoms, and the aryloxy group having 6 to 30 carbon atoms of $X^X$ are the same as the examples cited among $R^{X2}$ to $R^{X4}$ and $R^{X6}$ to $R^{X8}$, and examples of the substituted silyl group having 1 to 20 carbon atoms of $X^X$ are the same as the examples cited as the substituted silyl group having 1 to 20 carbon atoms among $R^{X2}$ to $R^{X4}$ and $R^{X6}$ to $R^{X8}$.

Examples of the substituted amino group having 1 to 20 carbon atoms of $X^X$ include a hydrocarbylamino group having 2 to 14 carbon atoms such as dimethylamino group, diethylamino group, di-n-butylamino group, di-n-propylamino group, diisopropylamino group, dibenzylamino group, and diphenylamino group, and preferably dimethylamino group, diethylamino group, di-n-propylamino group, diisopropylamino group, or dibenzylamino group.

Examples of the substituted thiolate group having 1 to 20 carbon atoms of $X^X$ include a hydrocarbyl thiolate group having 6 to 12 carbon atoms such as thiophenoxy group, 2,3,4-trimethylthiophenoxy group, 2,3,5-trimethylthiophenoxy group, 2,3,6-trimethylthiophenoxy group, 2,4,6-trimethylthiophenoxy group, 3,4,5-trimethylthiophenoxy group, 2,3,4,5-tetramethylthiophenoxy group, 2,3,4,6-tetramethylthiophenoxy group, 2,3,5,6-tetramethylthiophenoxy group, pentamethylthiophenoxy group, 2-fluorothiophenoxy group, 3-fluorothiophenoxy group, 4-fluorothiophenoxy group, pentafluorothiophenoxy group, 2-trifluoromethylthiophenoxy group, 3-trifluoromethylthiophenoxy group, 4-trifluoromethylthiophenoxy group, 2,3-difluorothiophenoxy group, 2,4-difluorothiophenoxy group, 2,5-difluorothiophenoxy group, 2-chlorothiophenoxy group, 2,3-dichlorothiophenoxy group, 2,4-dichlorothiophenoxy group, 2,5-dichlorothiophenoxy group, 2-bromothiophenoxy group, 3-bromothiophenoxy group, 4-bromothiophenoxy group, 2,3-dibromothiophenoxy group, 2,4-dibromothiophenoxy group, and 2,5-dibromothiophenoxy group, and preferably thiophenoxy group, 2,4,6-trimethylthiophenoxy group, 3,4,5-trimethylthiophenoxy group, 2,3,4,5-tetramethylthiophenoxy group, 2,3,4,6-tetramethylthiophenoxy group, 2,3,5,6-tetramethylthiophenoxy group, pentamethylthiophenoxy group, or pentafluorothiophenoxy group.

Examples of the carboxylate group having 1 to 20 carbon atoms of $X^X$ include acetate group, propionate group, butyrate group, pentanate group, hexanoate group, 2-ethylhexanoate group, and trifluoroacetate group, preferably a hydrocarbyl carboxylate group having 2 to 10 carbon atoms, and more preferably acetate group, propionate group, 2-ethylhexanoate group, or trifluoroacetate group.

$X^X$ is preferably a fluorine atom, a chlorine atom, a bromine atom, an alkyl group having 1 to 20 carbon atoms, an aralkyl group having 7 to 30 carbon atoms, an alkoxy group having 1 to 20 carbon atoms, an aryloxy group having 6 to 30 carbon atoms, or a hydrocarbylamino group having 1 to 20 carbon atoms, more preferably a chlorine atom, a bromine atom, an alkyl group having 1 to 6 carbon atoms, an aralkyl group having 7 to 10 carbon atoms, an alkoxy group having 1 to 6 carbon atoms, an aryloxy group having 6 to 10 carbon atoms, or a hydrocarbylamino group having 2 to 10 carbon atoms, further more preferably a chlorine atom, methyl group, ethyl group, n-butyl group, tert-butyl group, benzyl group, methoxy group, ethoxy group, isopropoxy group, tert-butoxy group, phenoxy group, dimethylamino group, or diethylamino group, especially preferably a chlorine atom, methyl group, benzyl group, isopropoxy group, phenoxy group, or dimethylamino group, and most preferably a chlorine atom.

The alkyl group, the cycloalkyl group, the alkenyl group, the aralkyl group, the aryl group, the alkoxy group, the aralkyloxy group, the aryloxy group, and the carboxylate group of $X^X$ optionally have a substituent.

$X^X$ groups may be linked to each other to form a ring which may have a substituent.

$R^{x1}$ to $R^{x8}$ and $X^X$ optionally independently have a substituent containing any of a halogen atom, an oxygen atom, a silicon atom, a nitrogen atom, a phosphorus atom, and a sulfur atom.

$E^X$ is independently a neutral Lewis base. Examples of $E^X$ include an ether, an amine, a thioether and the like. Specific examples of $E^X$ include tetrahydrofuran, diethyl ether, 1,4-dioxane, and pyridine. $E^X$ is preferably tetrahydrofuran.

The subscript x indicates the number of $E^X$, which is 0, 1, or 2, preferably 0 or 1, and more preferably 0. When the subscript x is 2, the $E^X$ groups are the same or different.

Examples of (i) the substituent which may be included in the alkyl group, the cycloalkyl group, the alkenyl group, the alkynyl group, the aralkyl group, the aryl group, the alkoxy group, the aralkyloxy group, the aryloxy group, and the heterocyclic compound residue of $R^{X1}$ to $R^{X8}$, (ii) the substituent which may be included in the ring formed by linking $R^{X1}$ and $R^{X2}$, $R^{X2}$ and $R^{X3}$, $R^{X3}$ and $R^{X4}$, $R^{X5}$ and $R^{X6}$, $R^{X6}$ and $R^{X7}$, or $R^{X7}$ and $R^{X8}$, (iii) the substituent which may be included in the alkyl group, the cycloalkyl group, the alkenyl group, the aralkyl group, the aryl group, the alkoxy group, the aralkyloxy group, the aryloxy group, and the carboxylate group of $X^X$, and (iv) the substituent which may be included in the ring formed by linking the $X^X$ groups include a fluorine atom, a chlorine atom, a bromine atom, an iodine atom, an alkoxy group, an aryloxy group, a substituted silyl group, a substituted amino group, a substituted thiolate group, a heterocyclic compound residue, or the like.

Specific examples of the transition metal compound (A-X) represented by the formula (1-X) include the following compounds.

[Chem. 4]

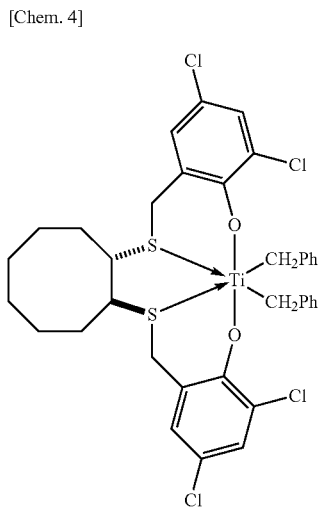

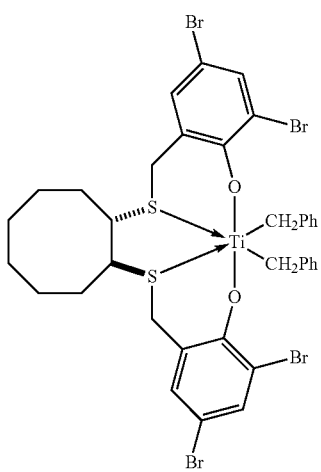

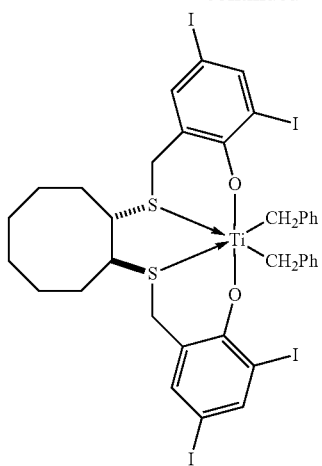

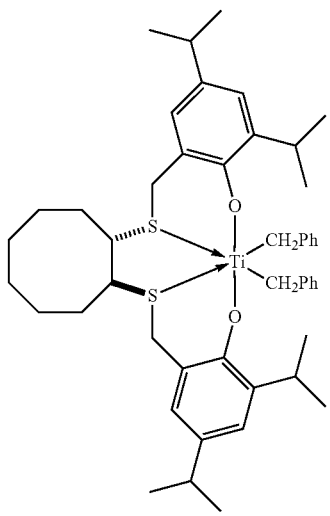

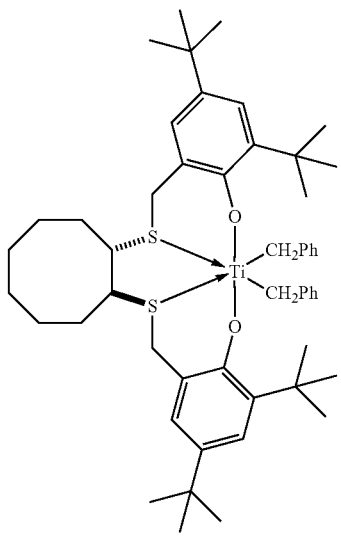

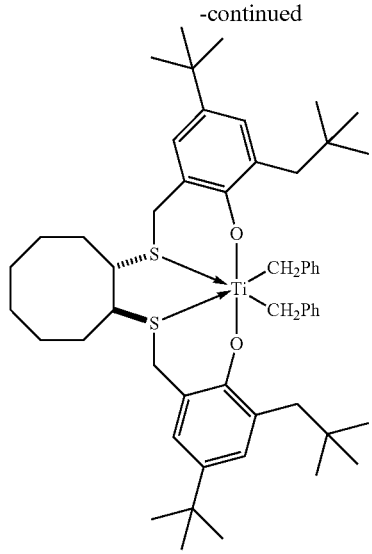
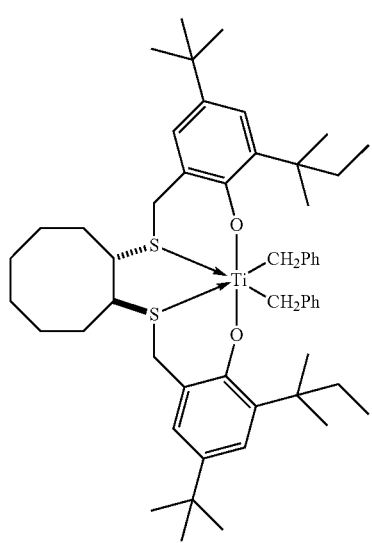
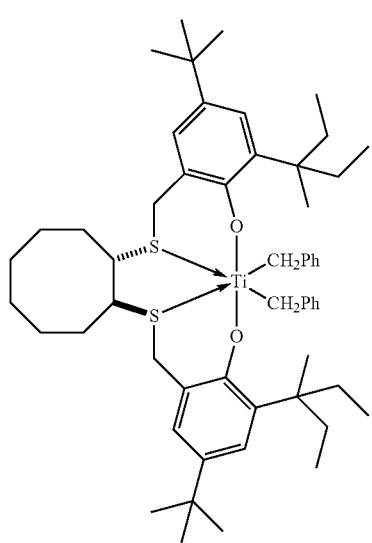
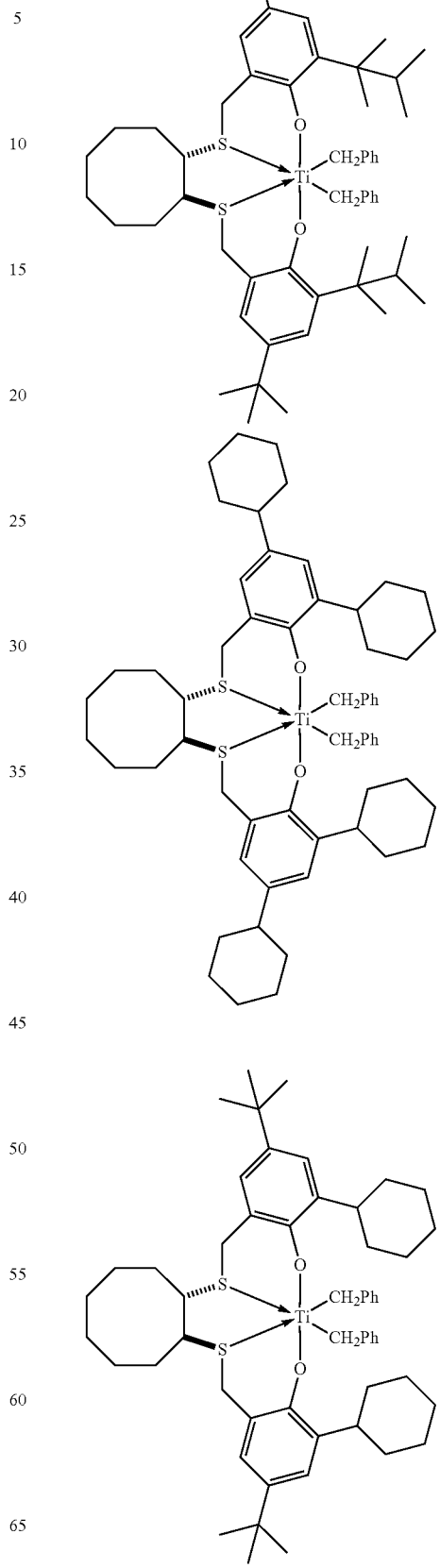
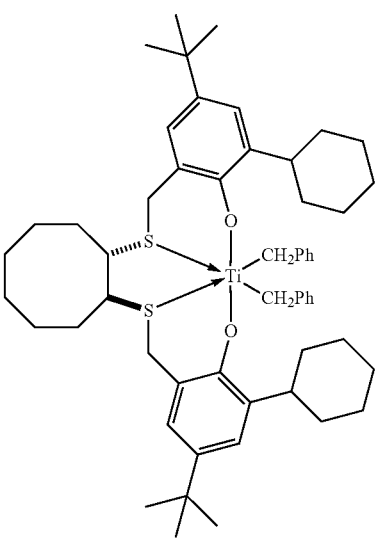

17
-continued
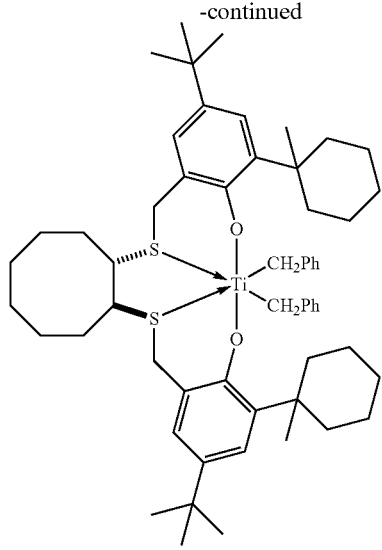
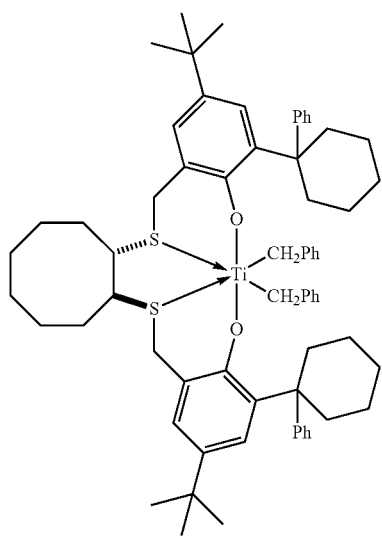
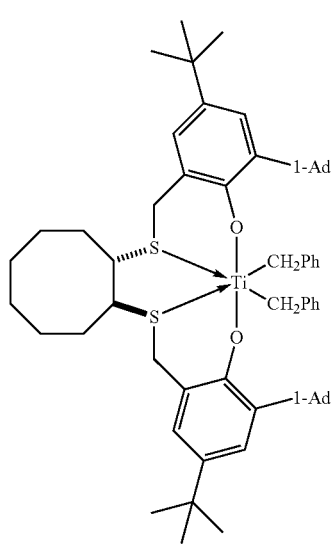
1-Ad = 1-adamantyl
18
-continued
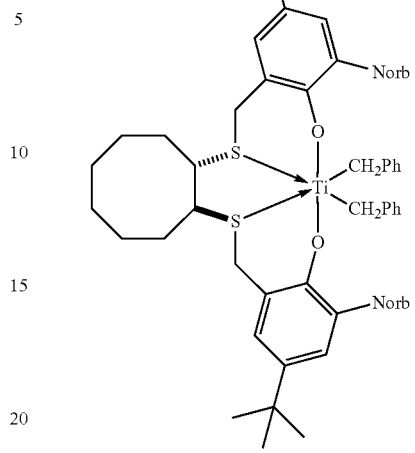
Norb = norbornyl
Born = bornyl

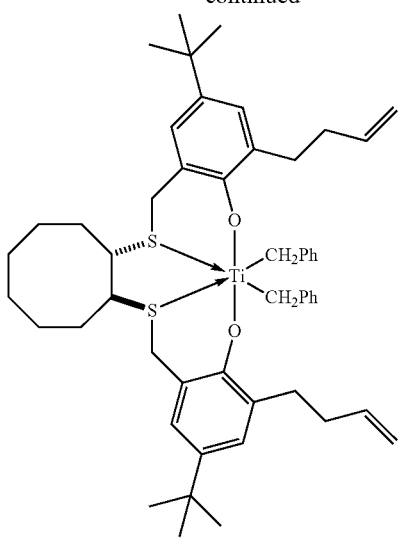
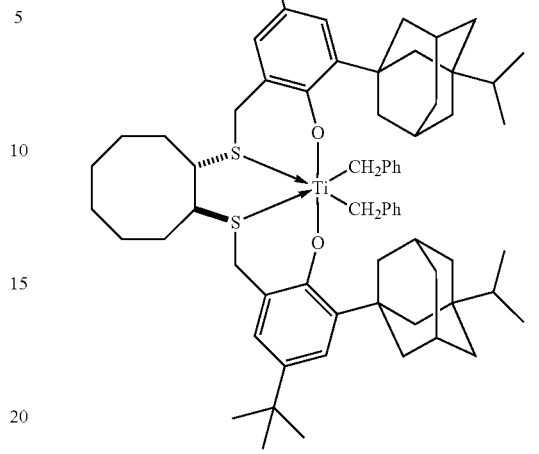
[Chem. 5]
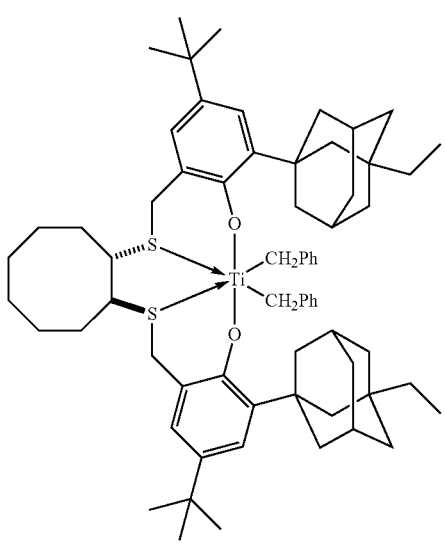
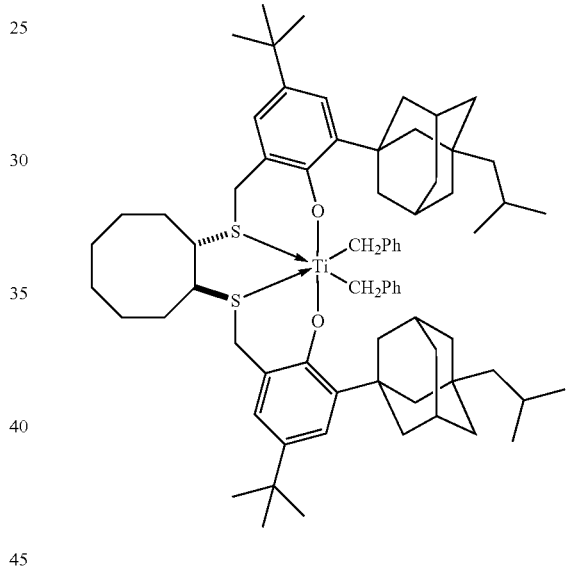
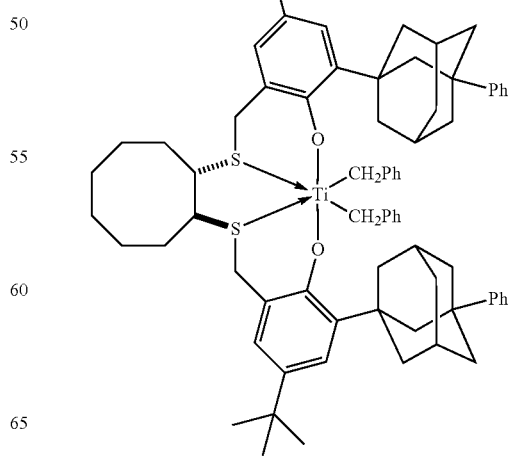

-continued
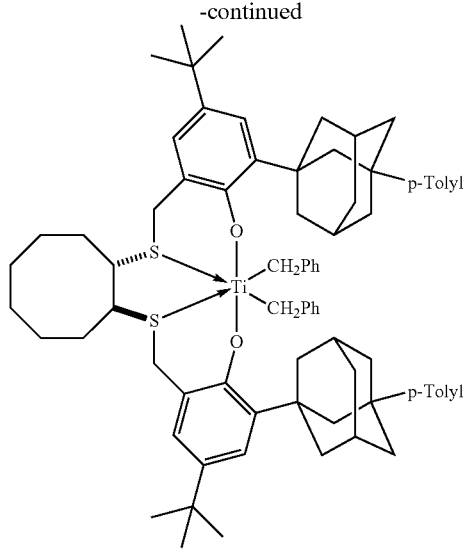
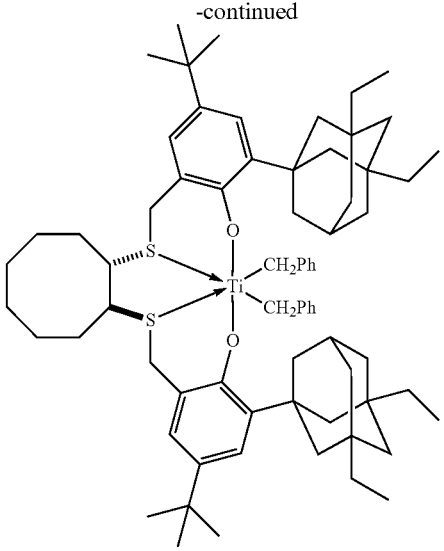
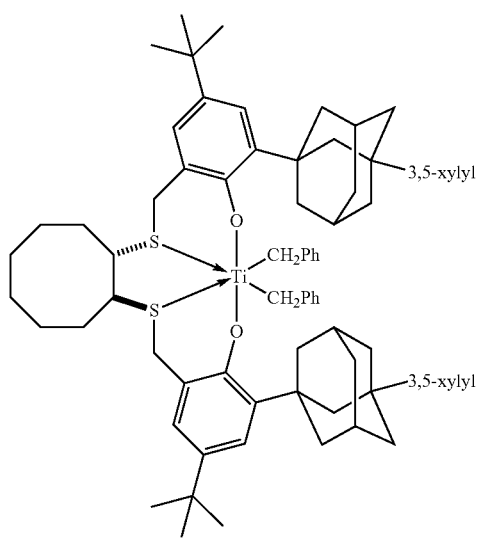
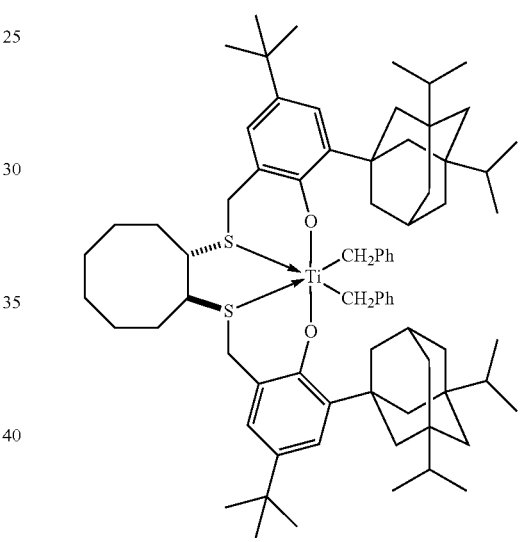
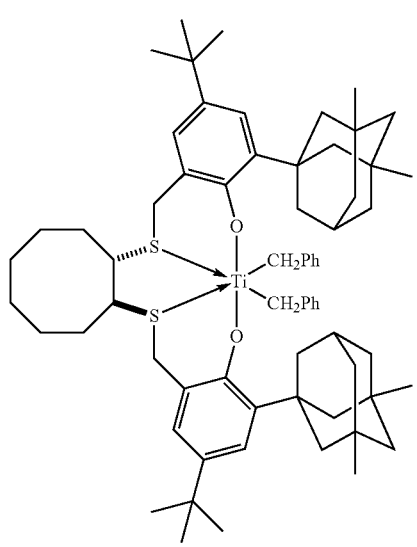
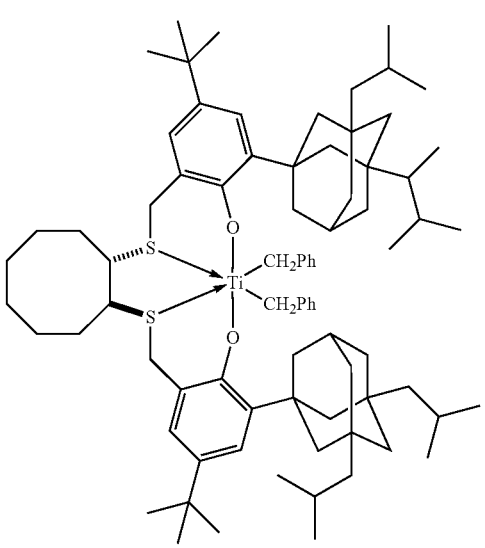

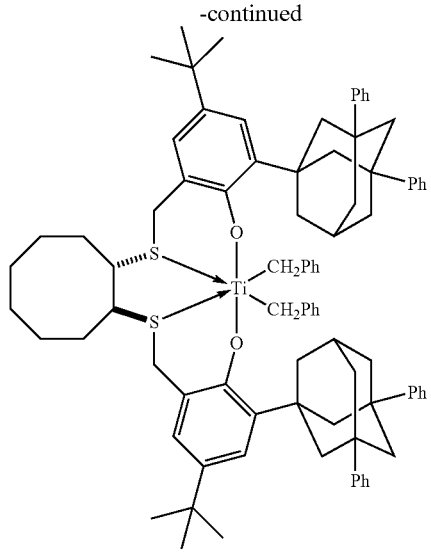
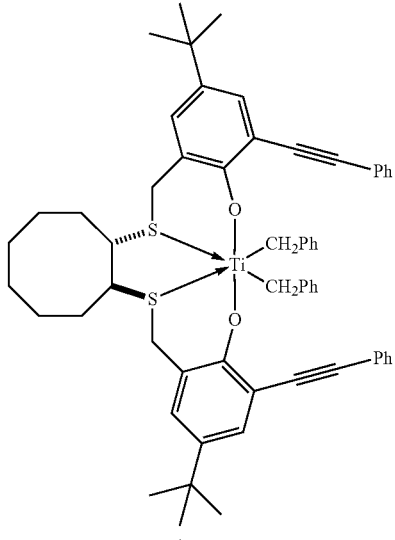
[Chem. 6]
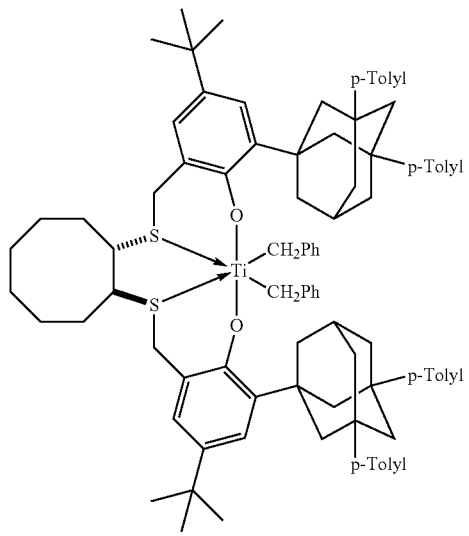
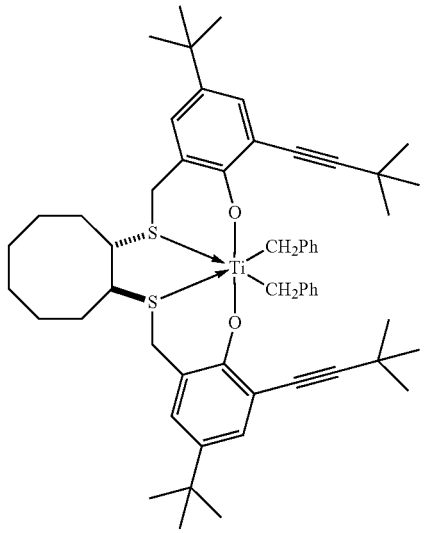
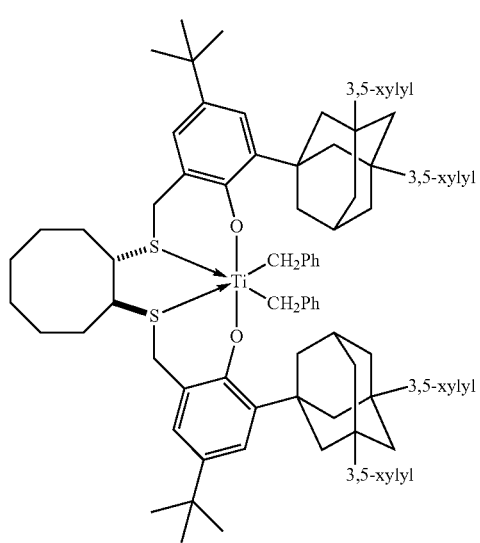
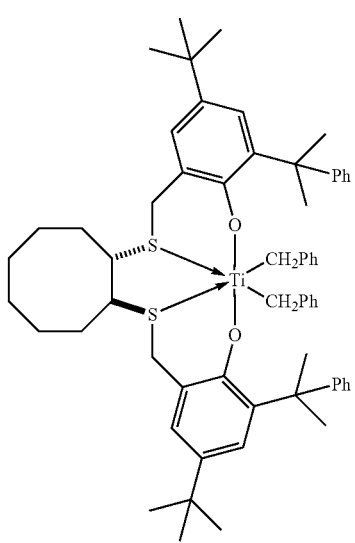

-continued
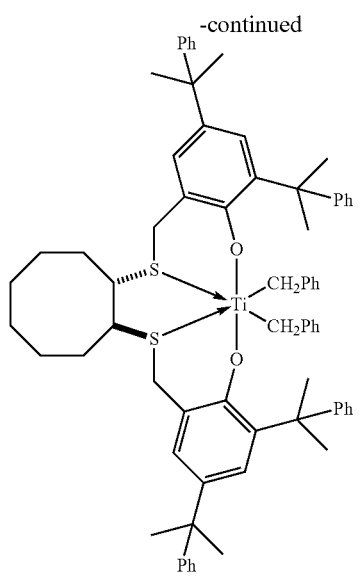
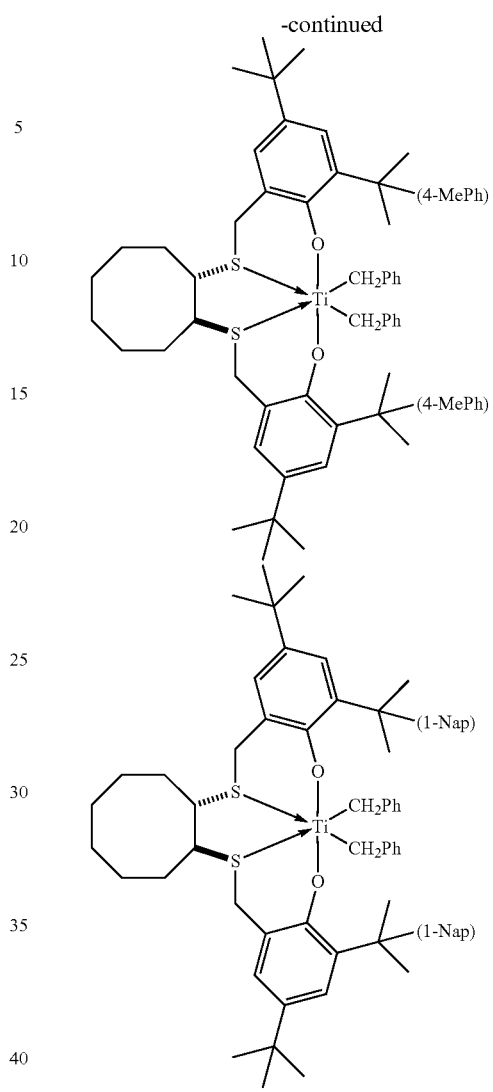
1-Nap = 1-naphthyl
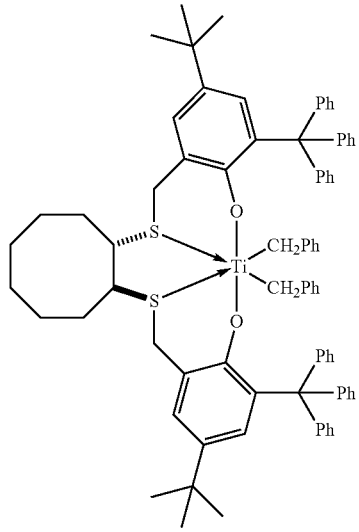
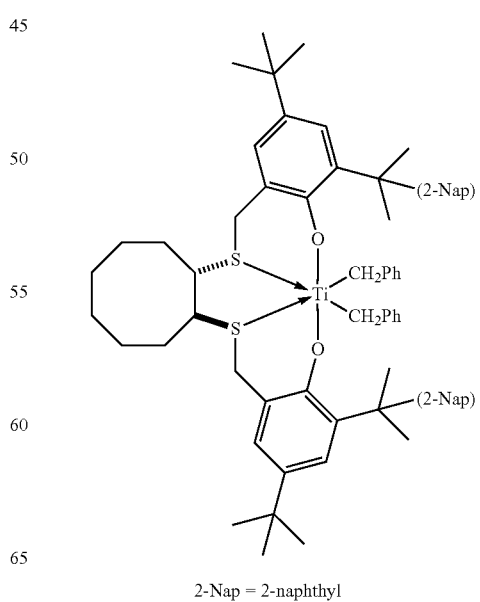
2-Nap = 2-naphthyl

27
-continued
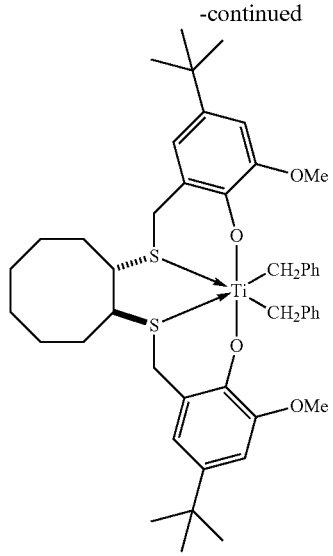
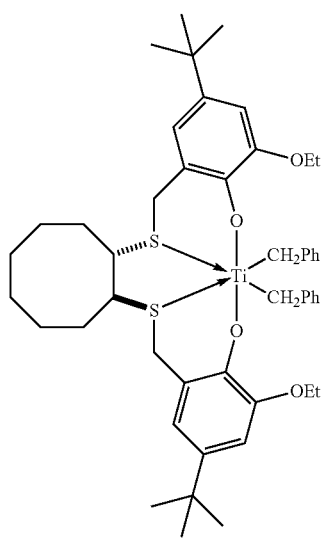
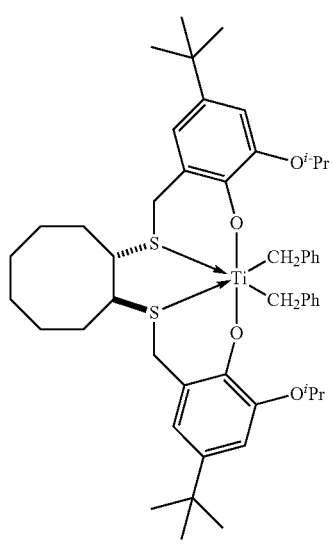
28
-continued
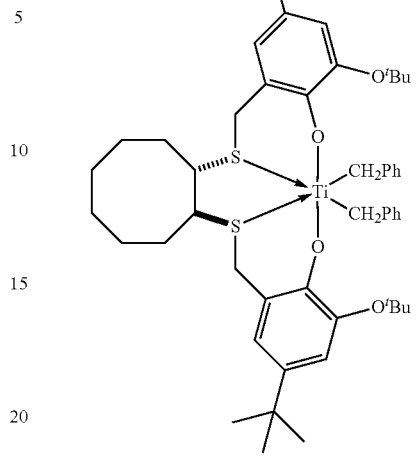
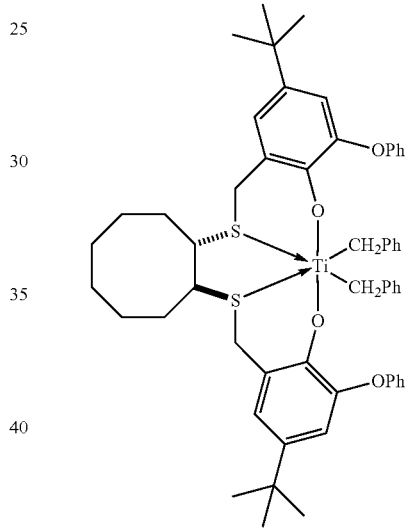
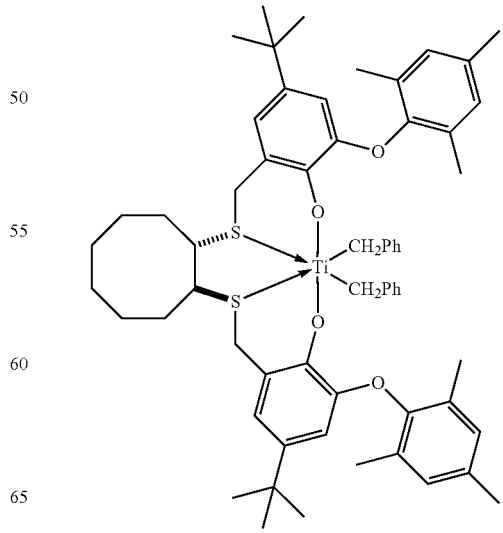

-continued
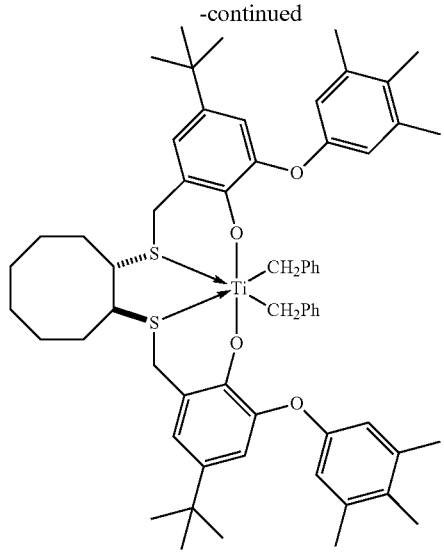
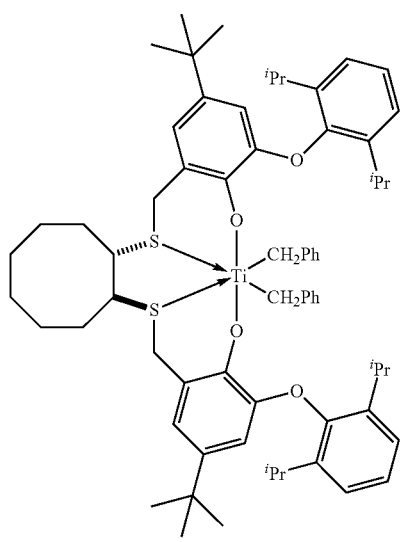
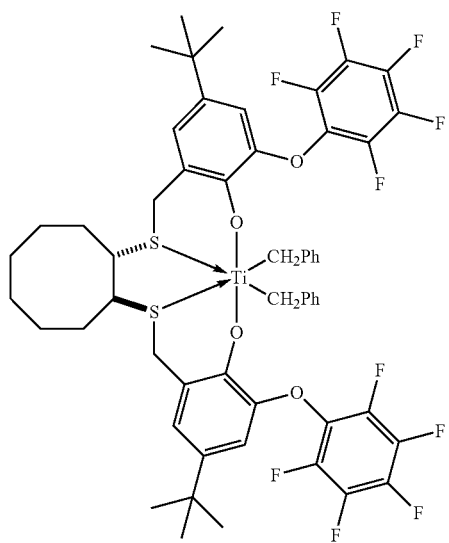
[Chem. 7]
-continued
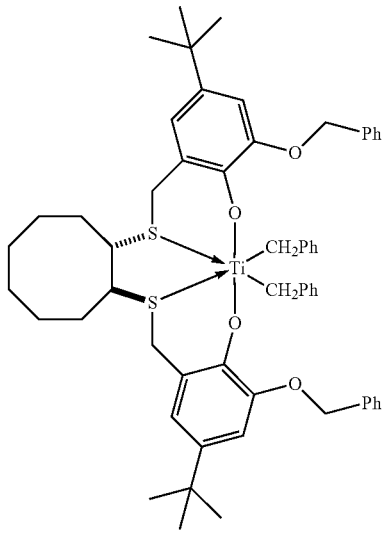
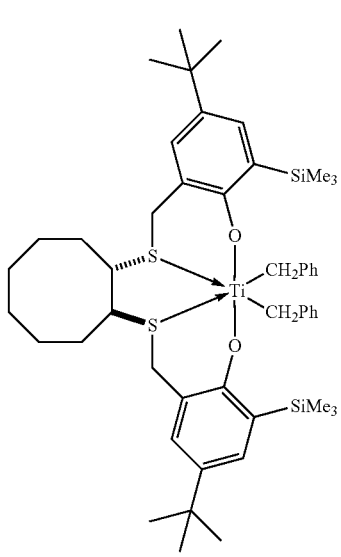
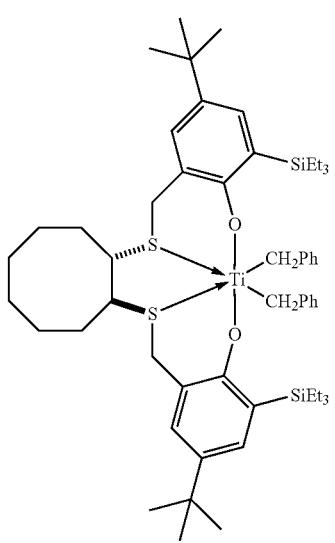

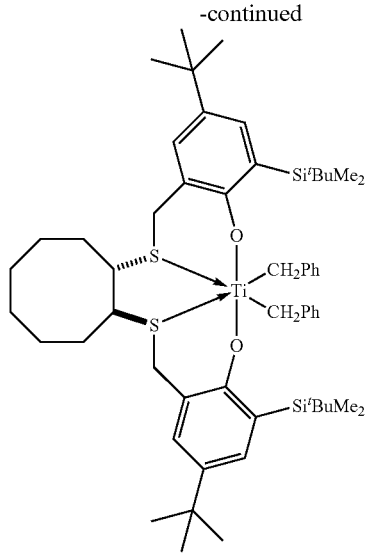
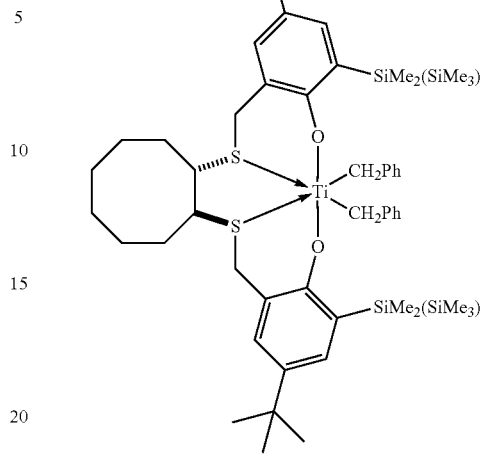
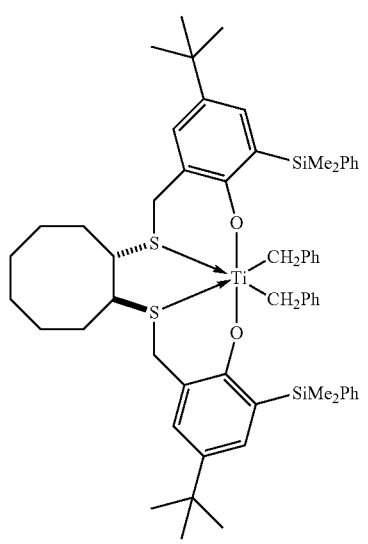
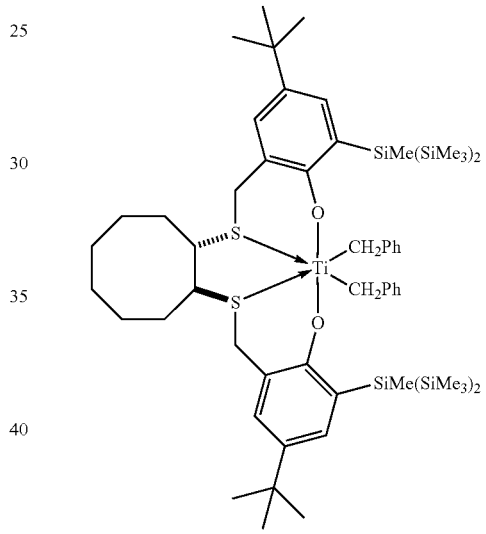
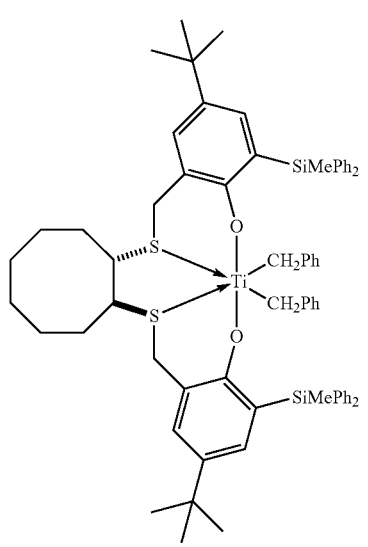
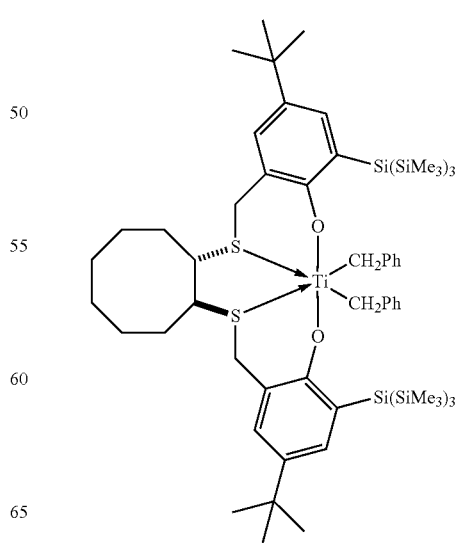

33
-continued
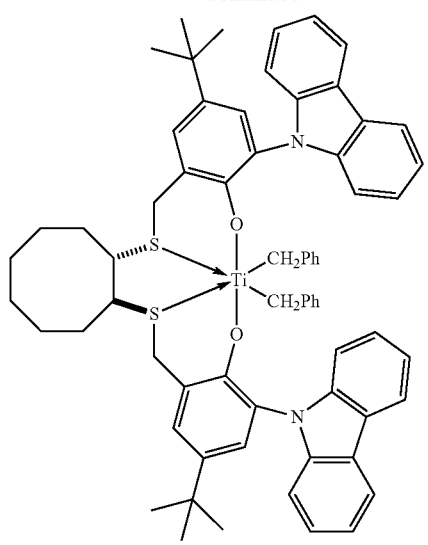
[Chem. 8]
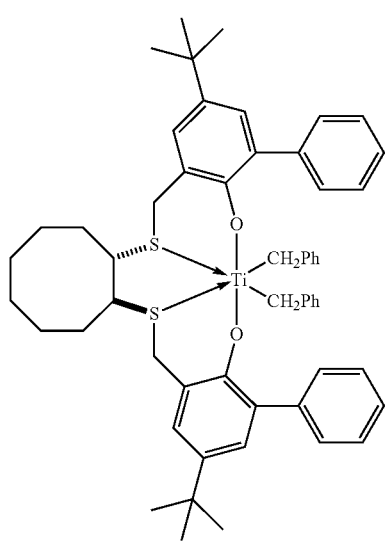
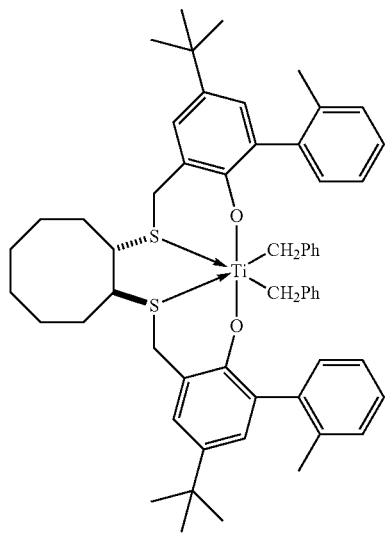
34
-continued
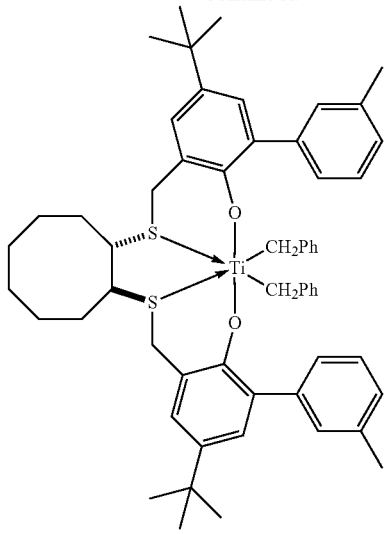
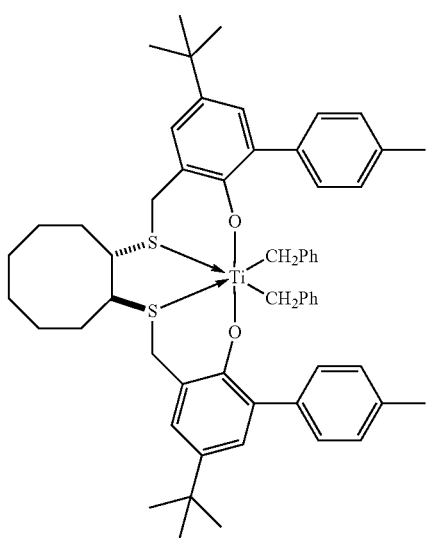
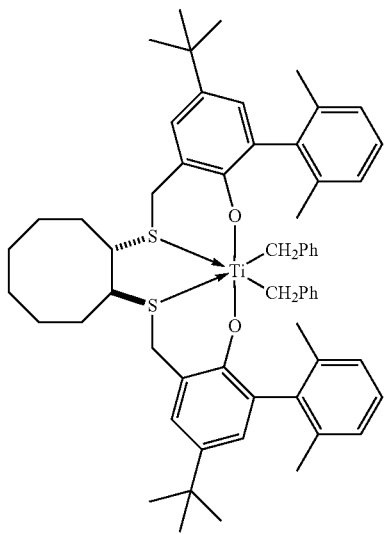

35
-continued
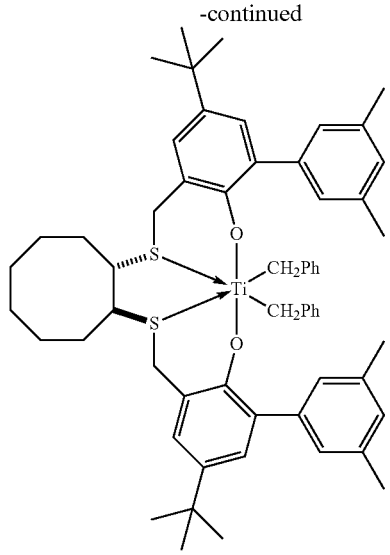
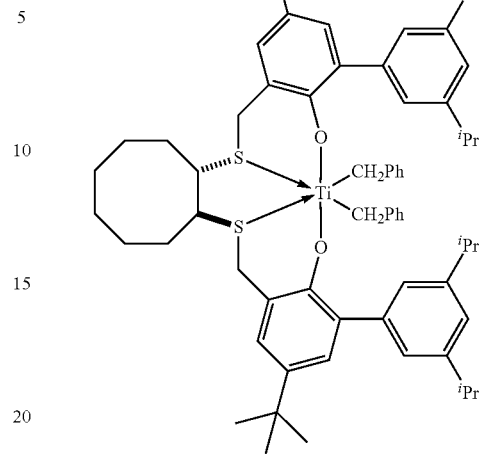
36
-continued
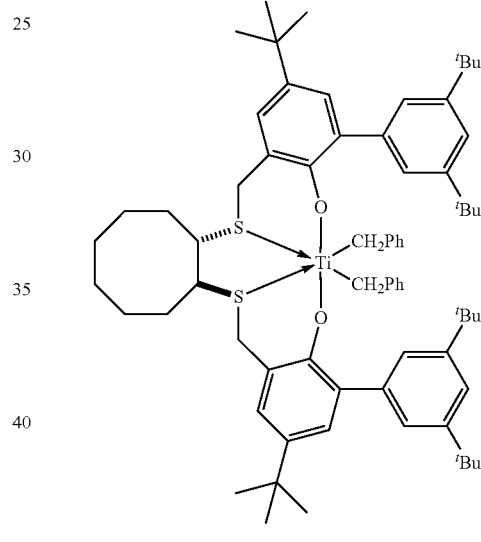
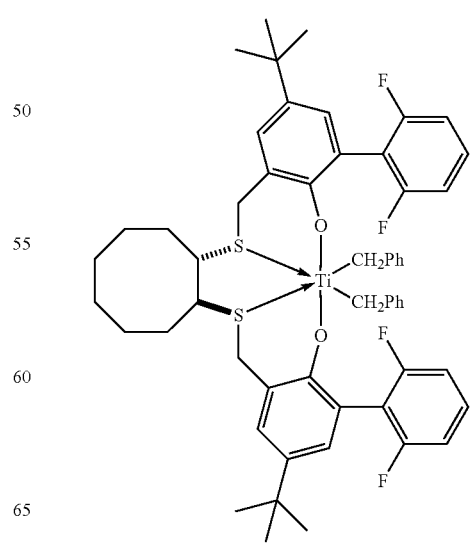

37
-continued
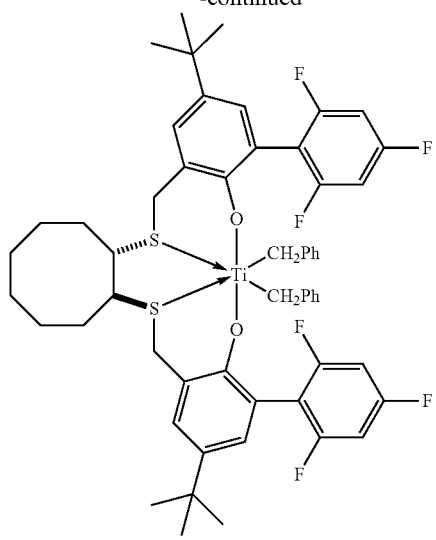
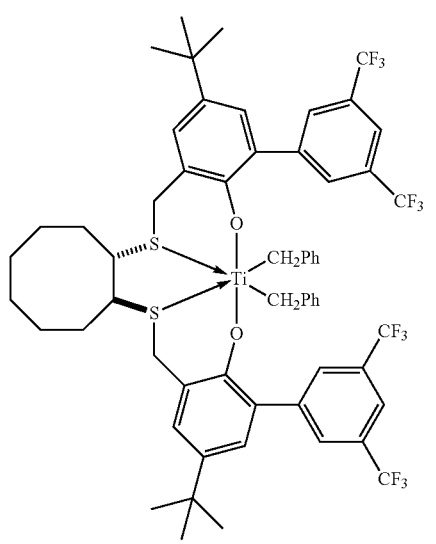
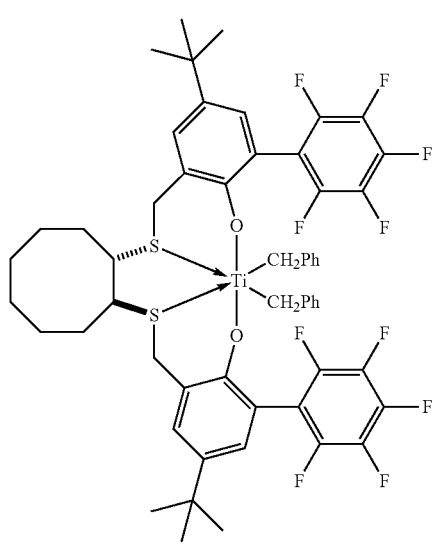
38
-continued
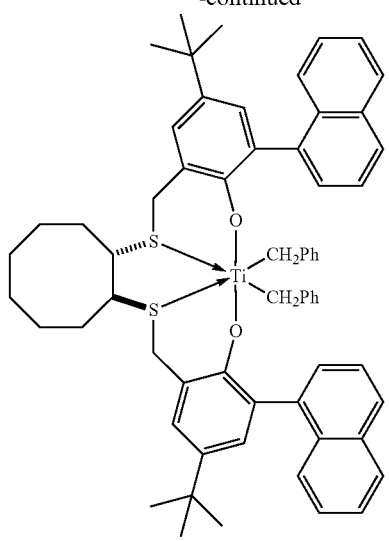
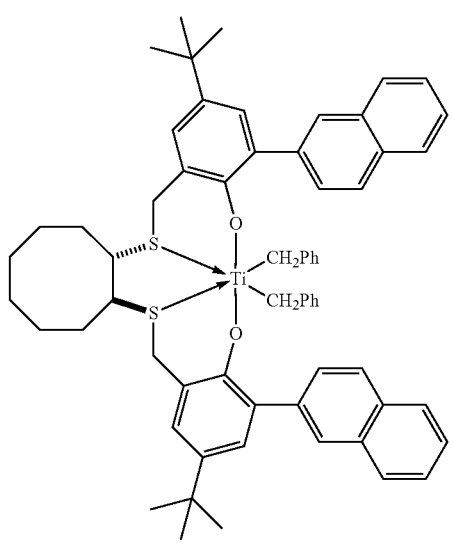
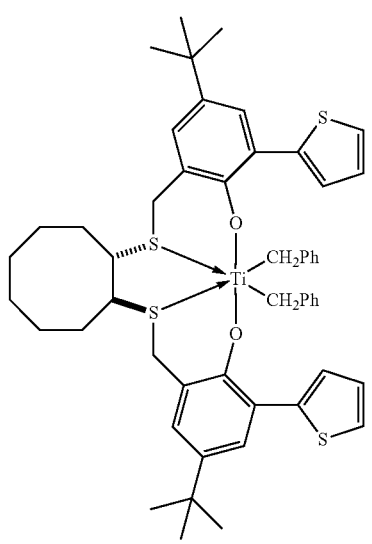

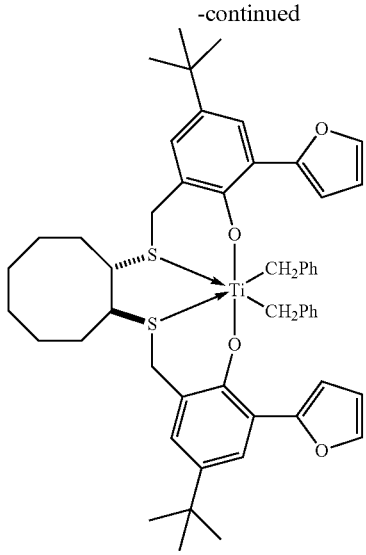
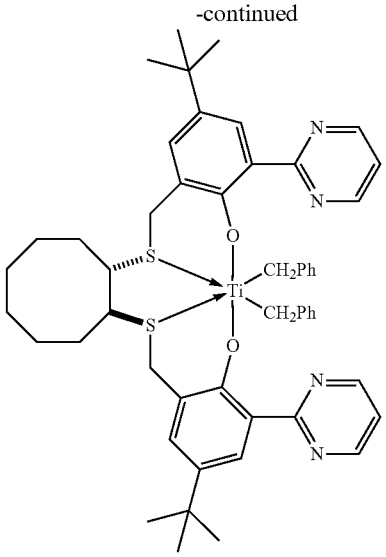
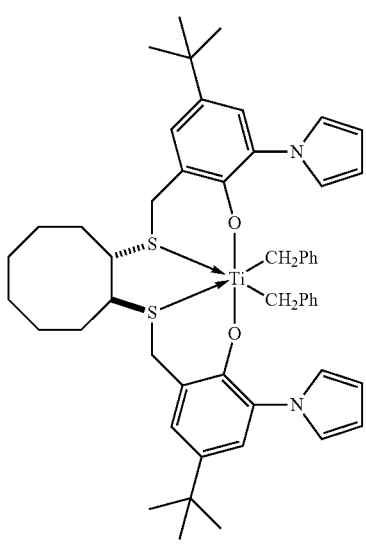
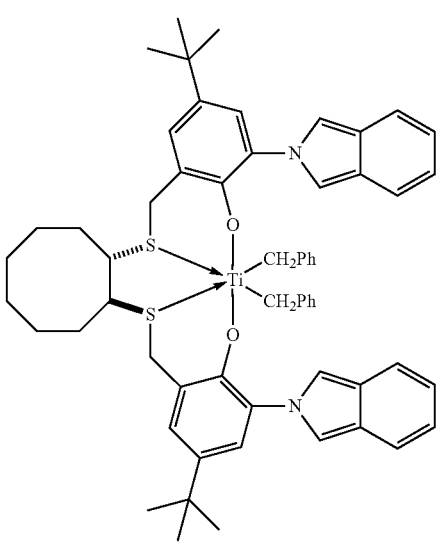
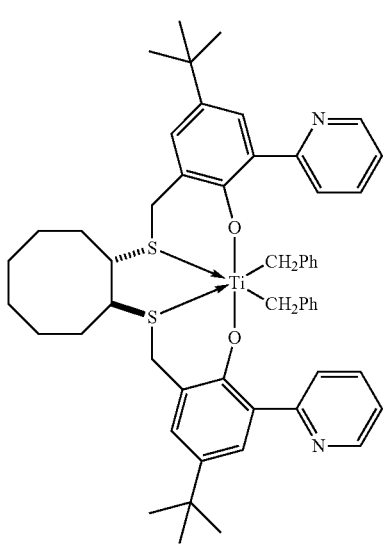
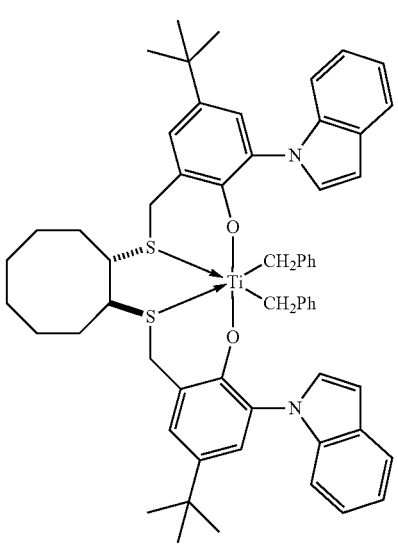

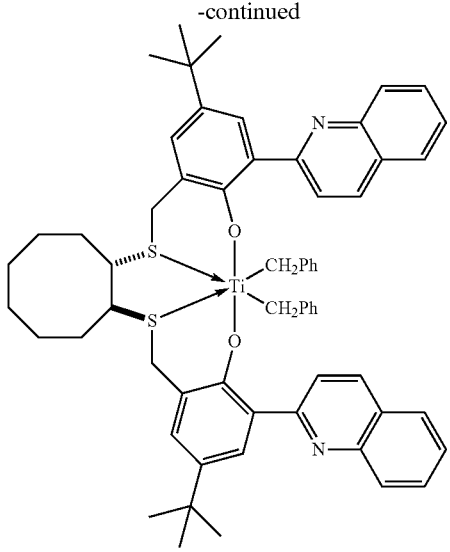

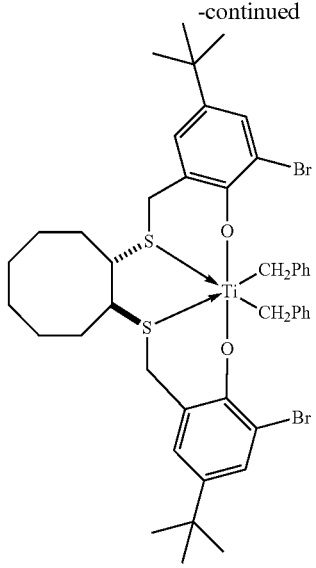

The examples of the transition metal compound (A-X) include, in addition to the compounds as shown above, the above compounds modified such that the two benzyl groups directly bonded to the individual titanium atoms are replaced with chlorine atoms, methyl groups, dimethyl amino groups, isopropoxy groups, tert-butoxy groups, or phenoxy groups.

The examples of the transition metal compound (A-X) further include the above compounds modified such that the titanium atom is replaced with a zirconium atom or a hafnium atom.

The examples of the transition metal compound (A-X) still further include the above compounds modified such that groups respectively corresponding to $R^{X3}$ and $R^{X7}$ in the formula (1-X) above are independently a hydrogen atom, a fluorine atom, a chlorine atom, a bromine atom, an iodine atom, or a methyl group.

The examples of the transition metal compound (A-X) still further include the above compounds modified such that the cyclooctane ring crosslinking the sulfur atoms is replaced with a cycloheptane ring or a cyclohexane ring.

Preferable examples of the transition metal compound (A-X) include the following compounds:

[Chem. 9]

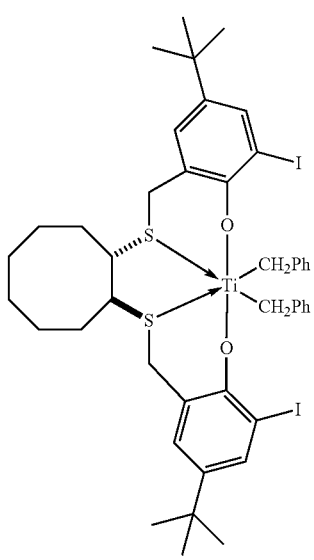

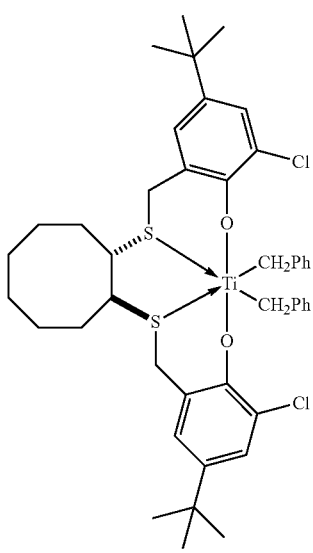

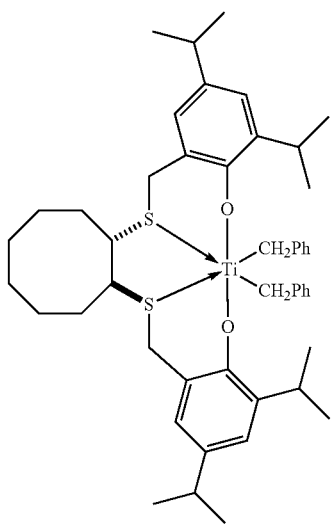

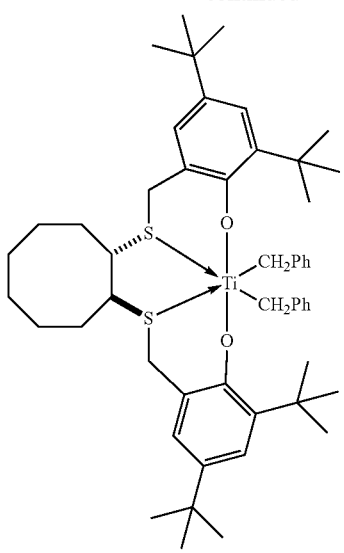
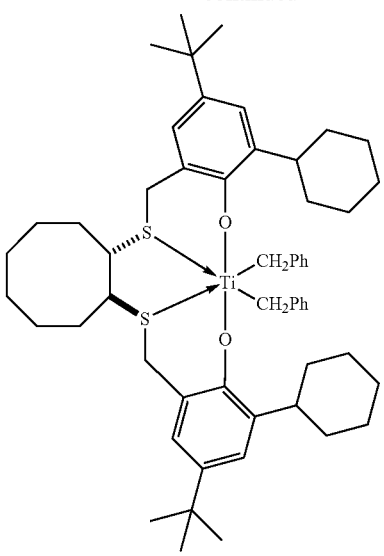
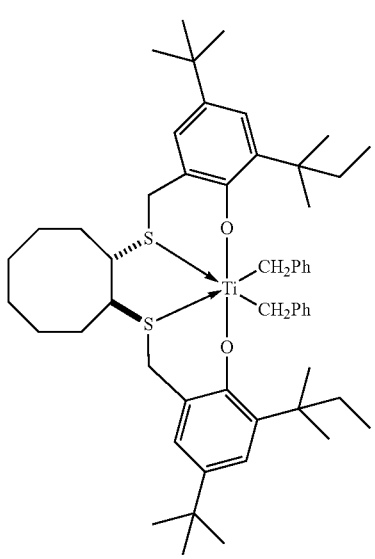
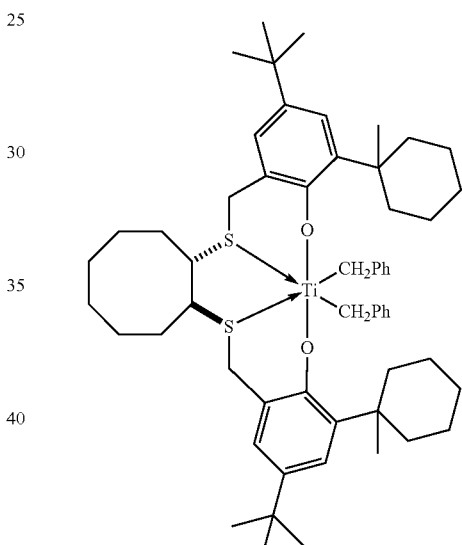
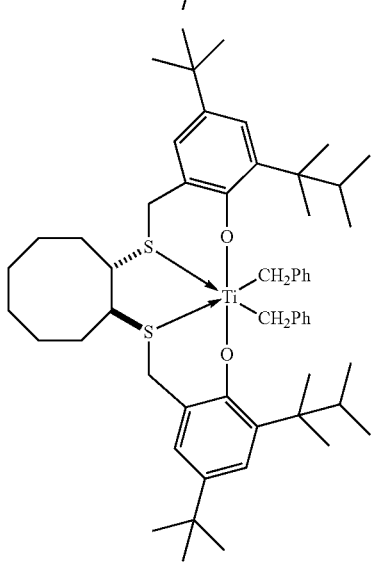
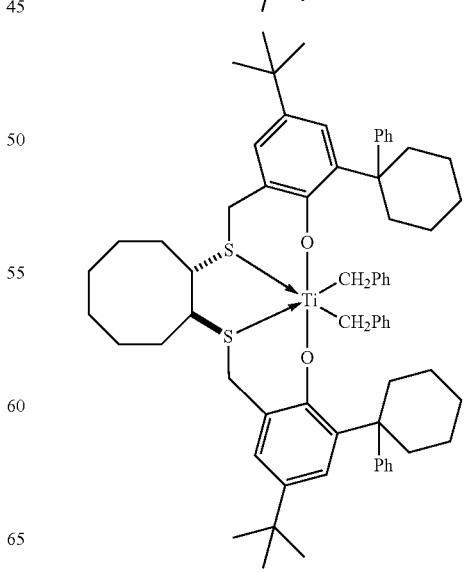

-continued
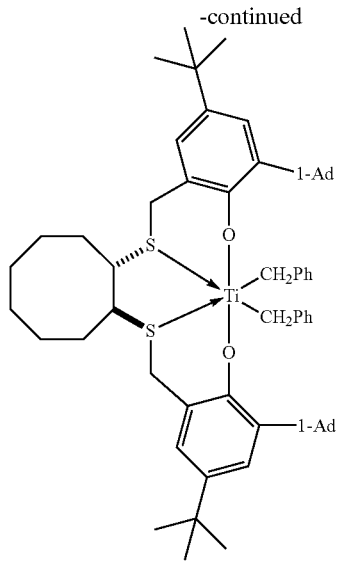
1-Ad = 1-adamantyl
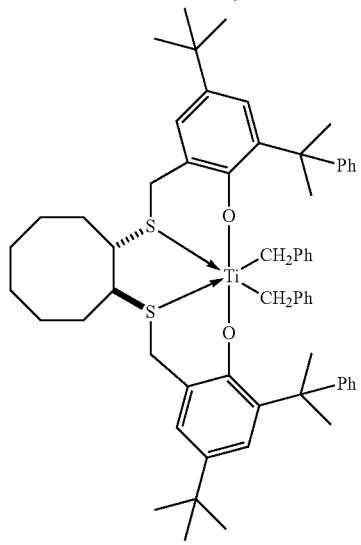
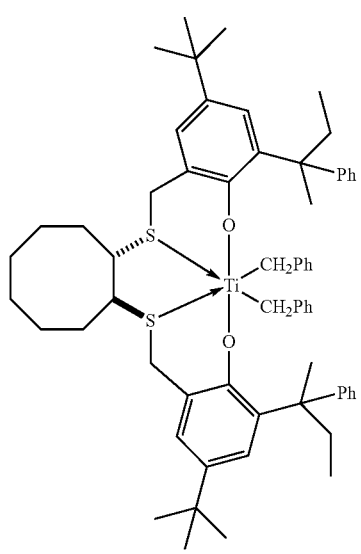
-continued
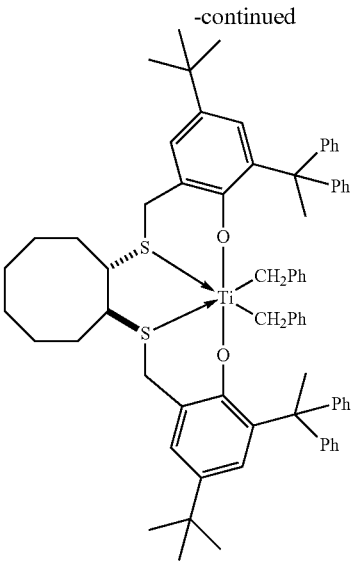
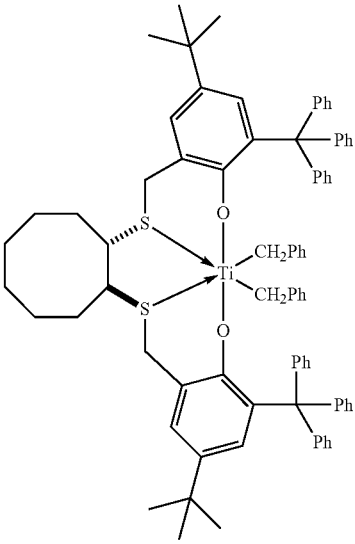
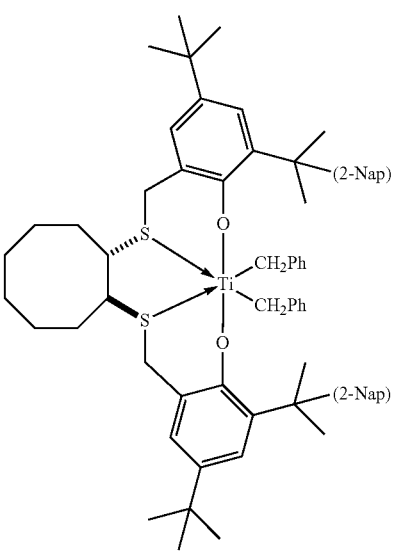
2-Nap = 2-naphthyl -continued
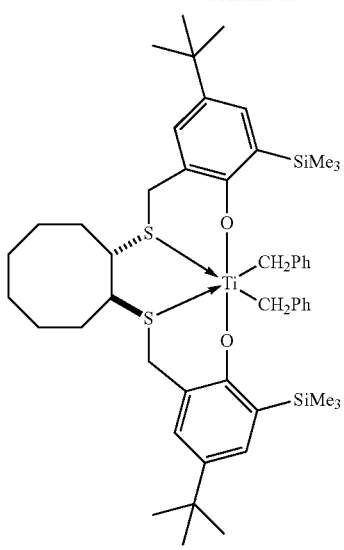
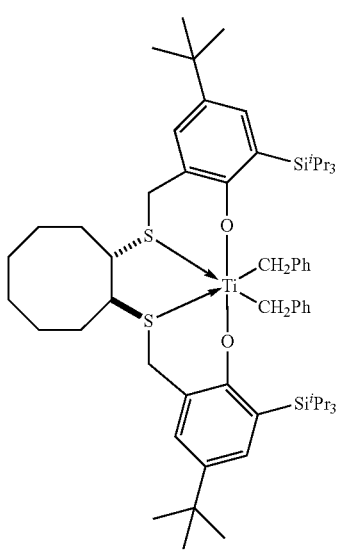
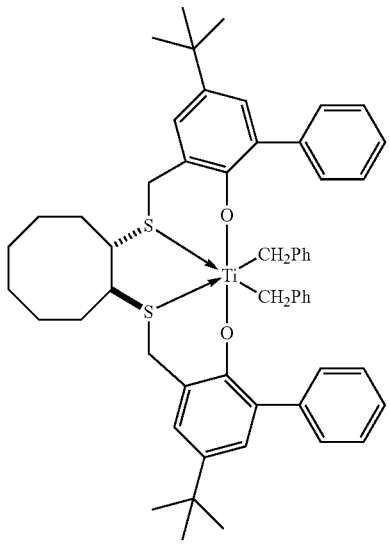
-continued
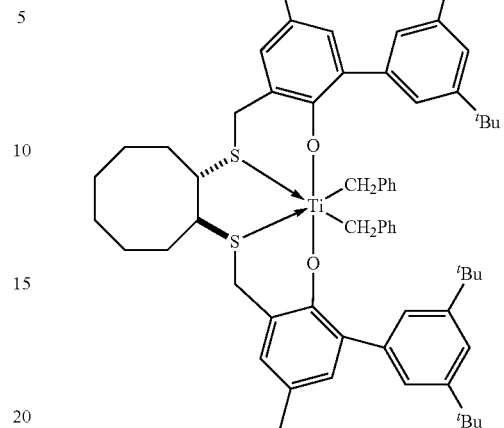
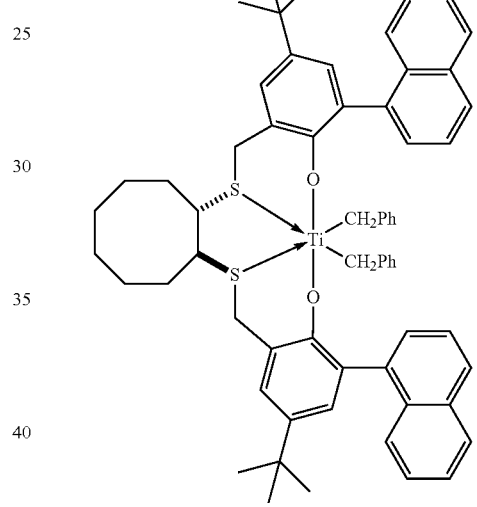
[Chem. 10]
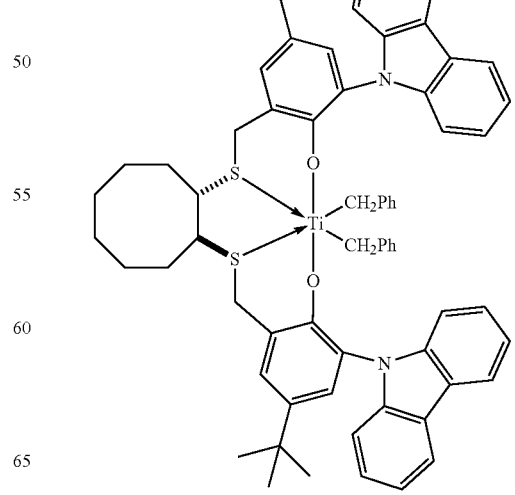

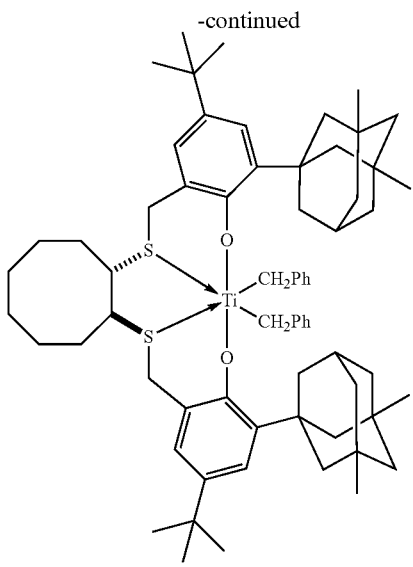

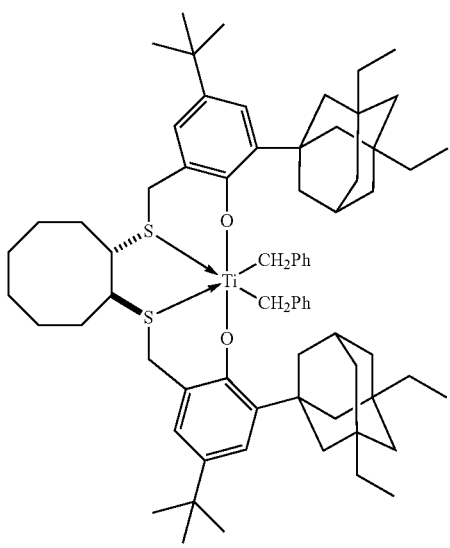

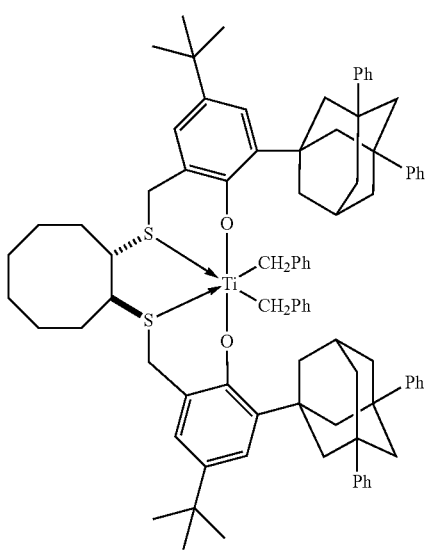

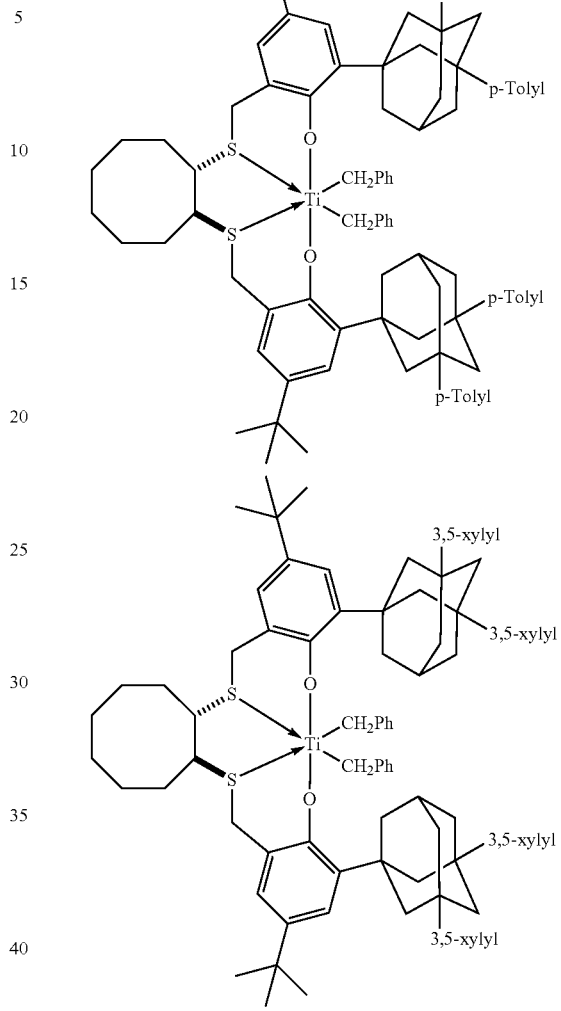

The preferable examples of the transition metal compound (A-X) include, in addition to the compounds as shown above, the above compounds modified such that the two benzyl groups directly bonded to the individual titanium atoms are replaced with chlorine atoms or methyl groups.

The preferable examples of the transition metal compound (A-X) further include the above compounds modified such that the titanium atom is replaced with a zirconium atom or a hafnium atom.

The preferable examples of the transition metal compound (A-X) still further include the above compounds modified such that groups respectively corresponding to $R^{X3}$ and $R^{X7}$ in the general formula (1-X) above are independently a hydrogen atom, a fluorine atom, a chlorine atom, a bromine atom, an iodine atom or a methyl group.

The preferable examples of the transition metal compound (A-X) still further include the above compounds modified such that the cyclooctane ring crosslinking the sulfur atoms is replaced with a cycloheptane ring.

More preferable examples of the transition metal compound (A-X) include the following compounds:

[Chem. 11]
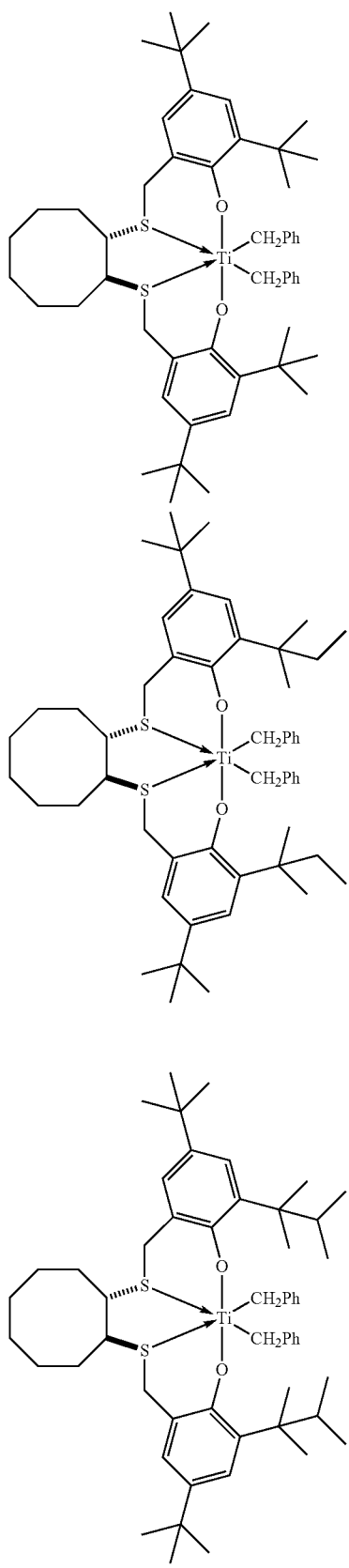
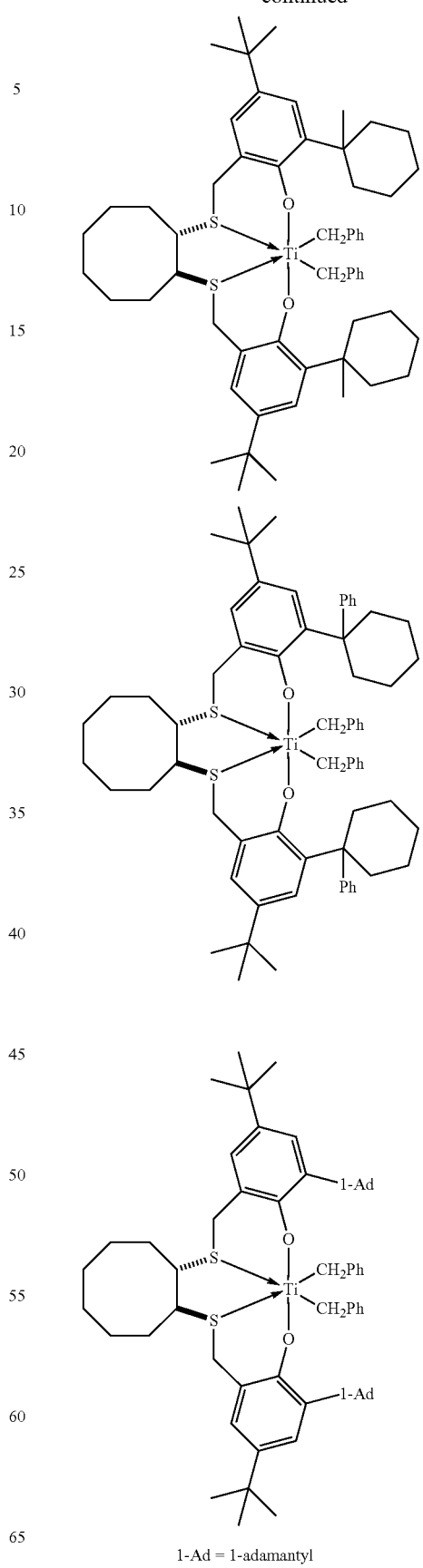
1-Ad = 1-adamantyl

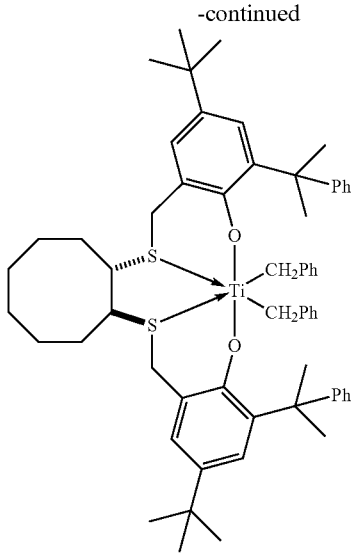
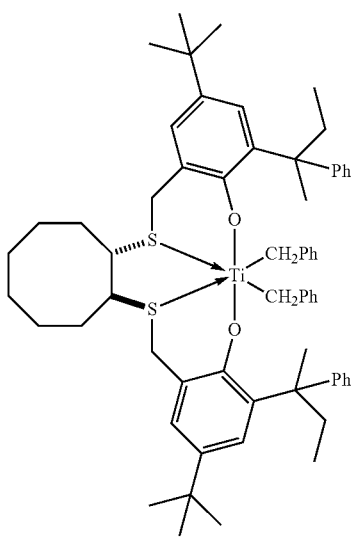
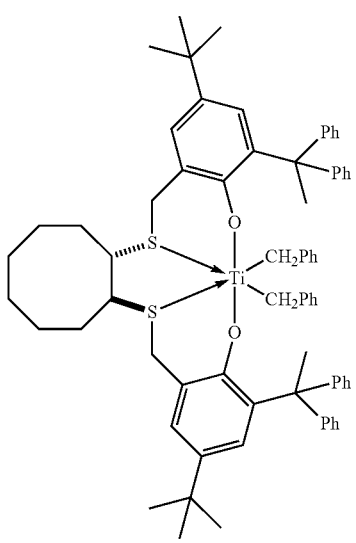
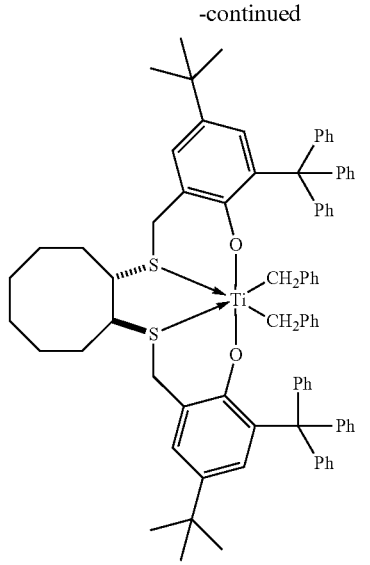
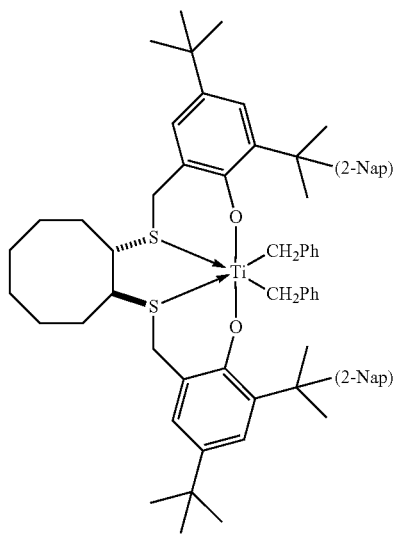
2-Nap = 2-naphthyl
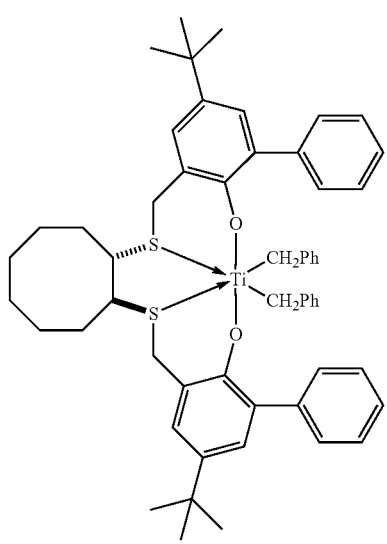

55
-continued
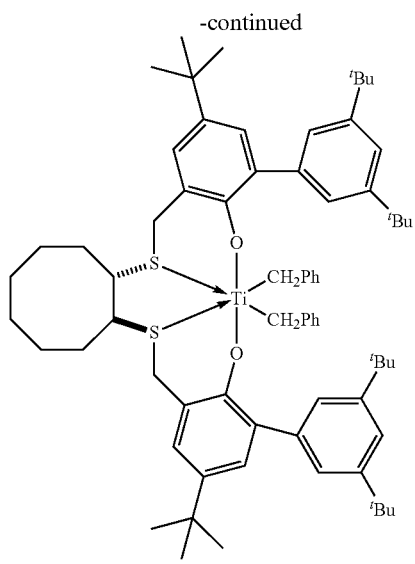
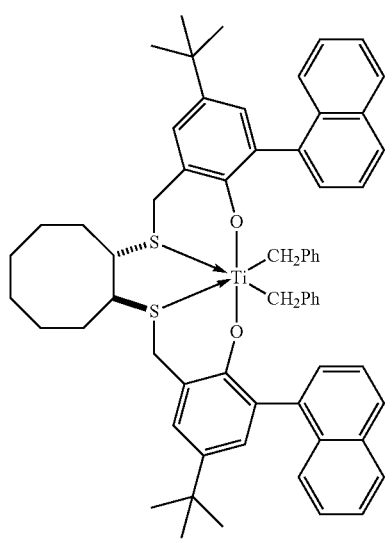
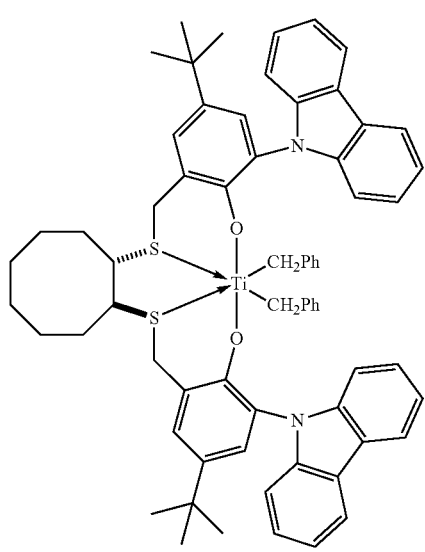
56
-continued
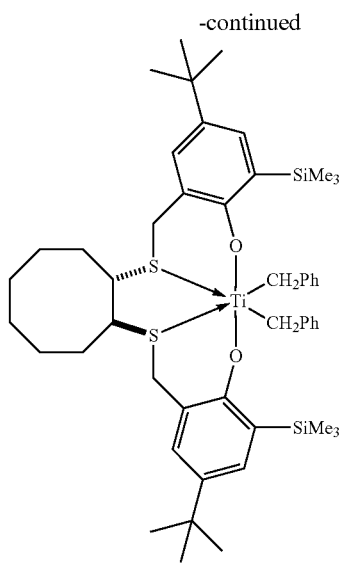
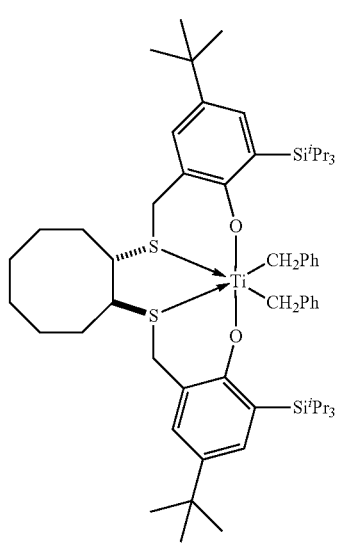
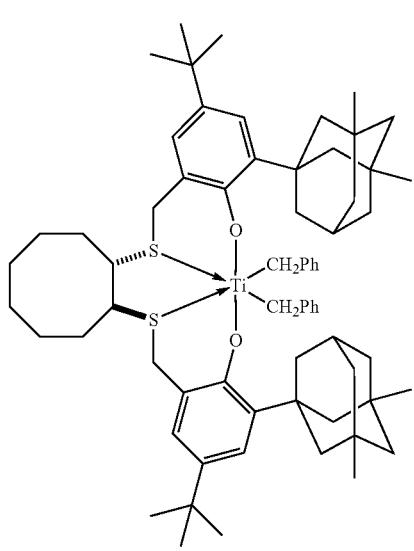

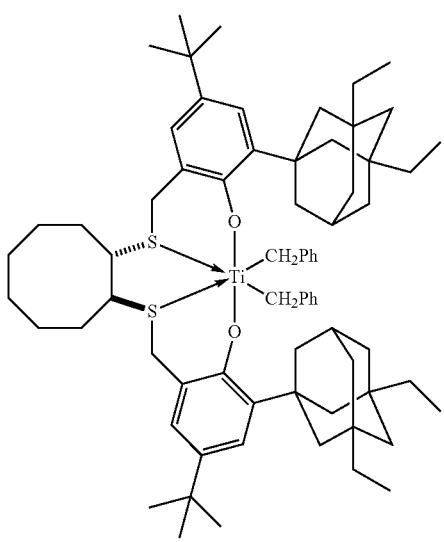

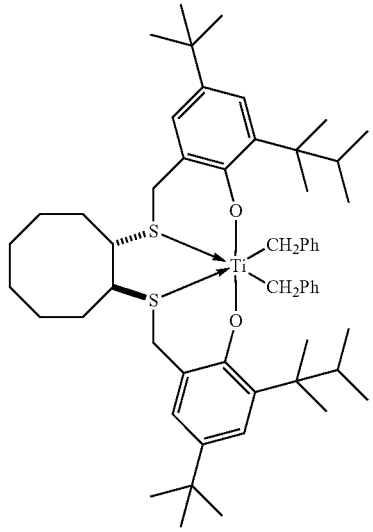

The more preferable examples of the transition metal compound (A-X) include, in addition to the compounds as shown above, the above compounds modified such that, instead of the two benzyl groups directly bonded to the individual titanium atoms, a chlorine atom.

The more preferable examples of the transition metal compound (A-X) further include the above compounds modified such that the titanium atom is replaced with a zirconium atom or a hafnium atom.

The more preferable examples of the transition metal compound (A-X) still further include the above compounds modified such that groups respectively corresponding to $R^{X3}$ and $R^{X7}$ in the general formula (1-X) above are a methyl group.

Particularly preferable examples of the transition metal compound (A-X) include the following compounds:

[Chem. 12]

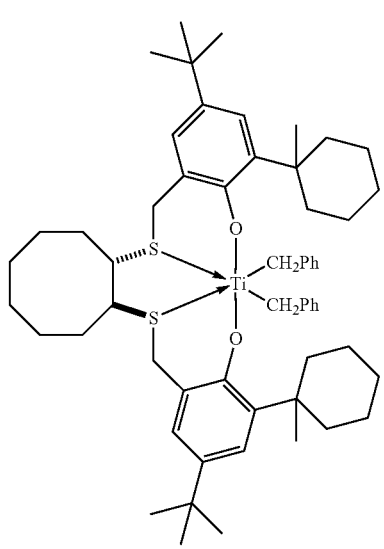

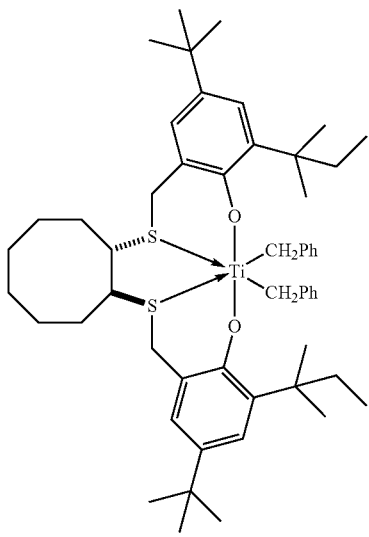

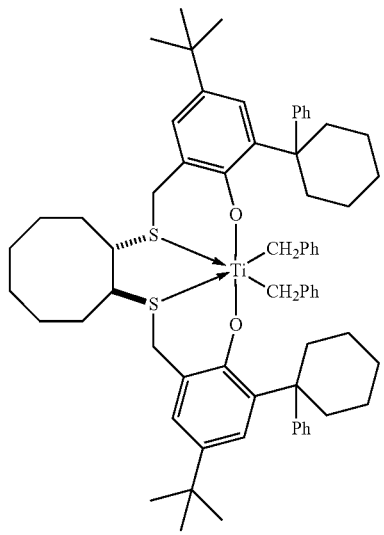

-continued
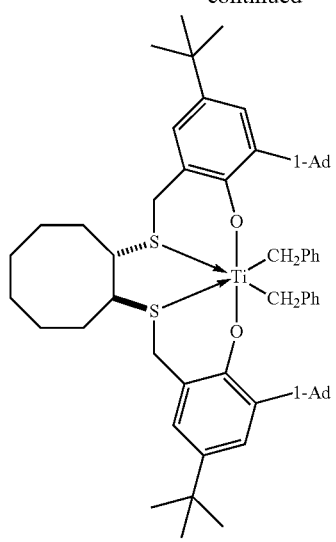
1-Ad = 1-adamantyl
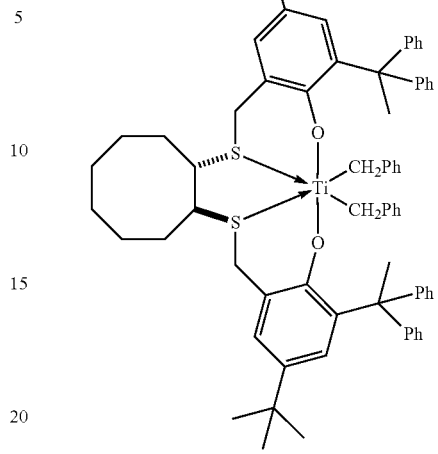
-continued
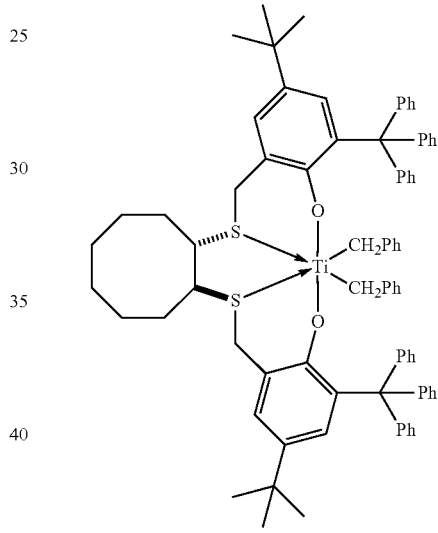
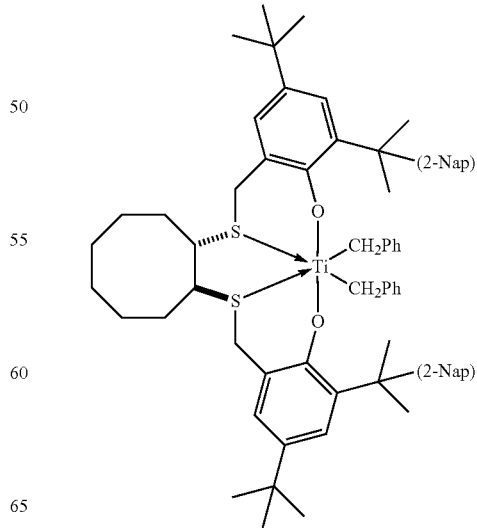
2-Nap = 2-naphthyl

61
-continued
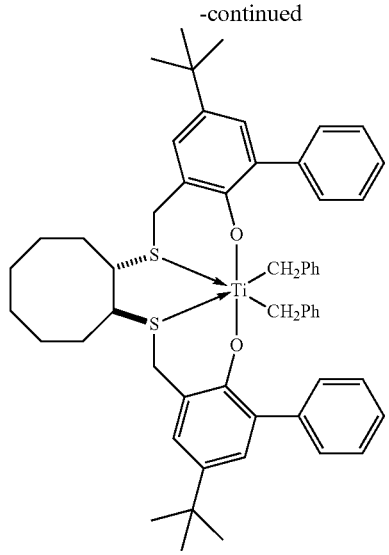
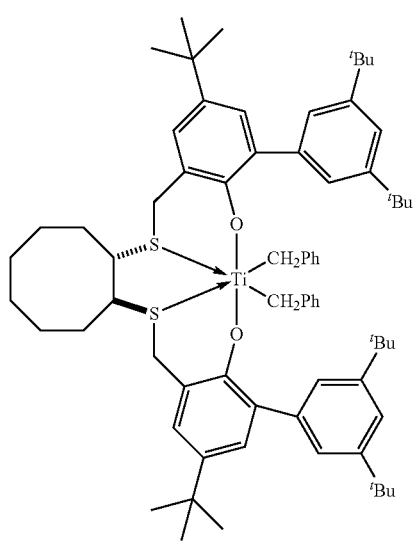
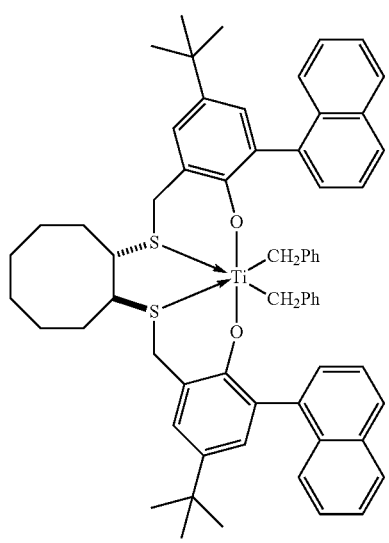
62
-continued
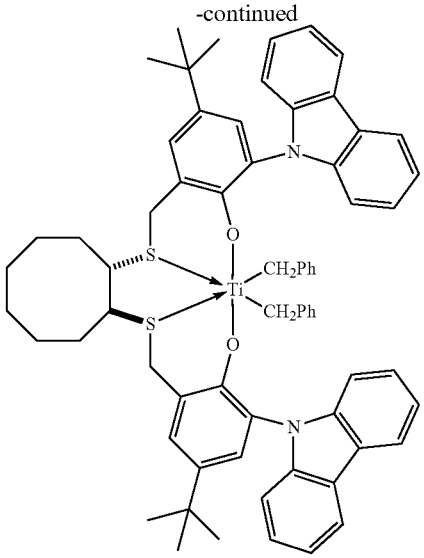
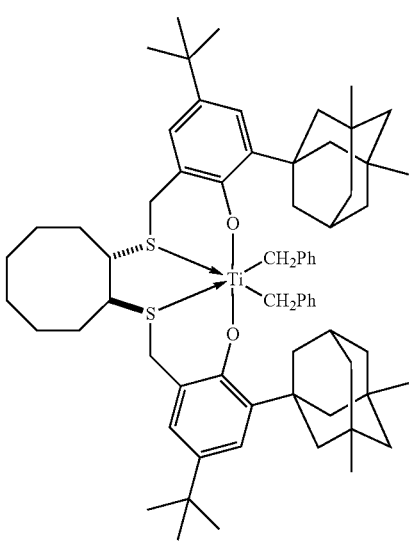
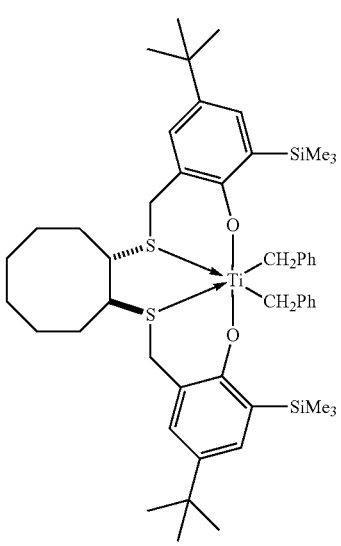

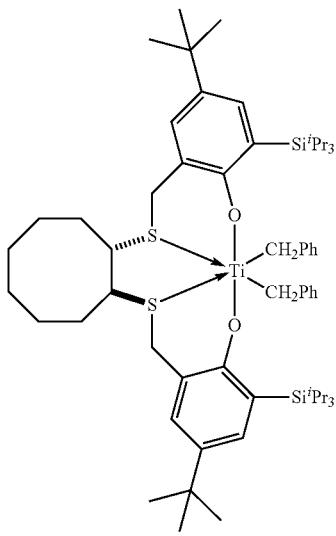

The particularly preferable examples of the transition metal compound (A-X) include, in addition to the compounds as shown above, the above compounds modified such that the two benzyl groups directly bonded to the individual titanium atoms are replaced with chlorine atoms.

The particularly preferable examples of the transition metal compound (A-X) further include the above compounds modified such that the titanium atom is replaced with a zirconium atom or a hafnium atom.

The particularly preferable examples of the transition metal compound (A-X) still further include the above compounds modified such that groups respectively corresponding to $R^{X3}$ and $R^{X7}$ in the general formula (1-X) above are a methyl group.

The transition metal compound (A-X) can be synthesized by, for example, a method described in Journal of American Chemical Society, 2009, Volume 131, 13566-13567. Specifically, the transition metal compound (A-X) represented by general formula (1-X) can be produced under scheme 1 below with use of a compound represented by general formula (2) (hereinafter "compound (2)") and a compound represented by general formula (3) (hereinafter "compound (3)") as starting materials. $R^{X1}$-$R^{X8}$ and n in the general formula (2) are equal to $R^{X1}$-$R^{X8}$ and n in the general formula (1-X). $E^X$ in the scheme 1 is identical with $E^X$ in the general formula (1-X), and $E^X$ may or may not exist in a reaction system. In a case where $E^X$ does not exist in the reaction system, the subscript x representing the number of $E^X$ groups is 0.

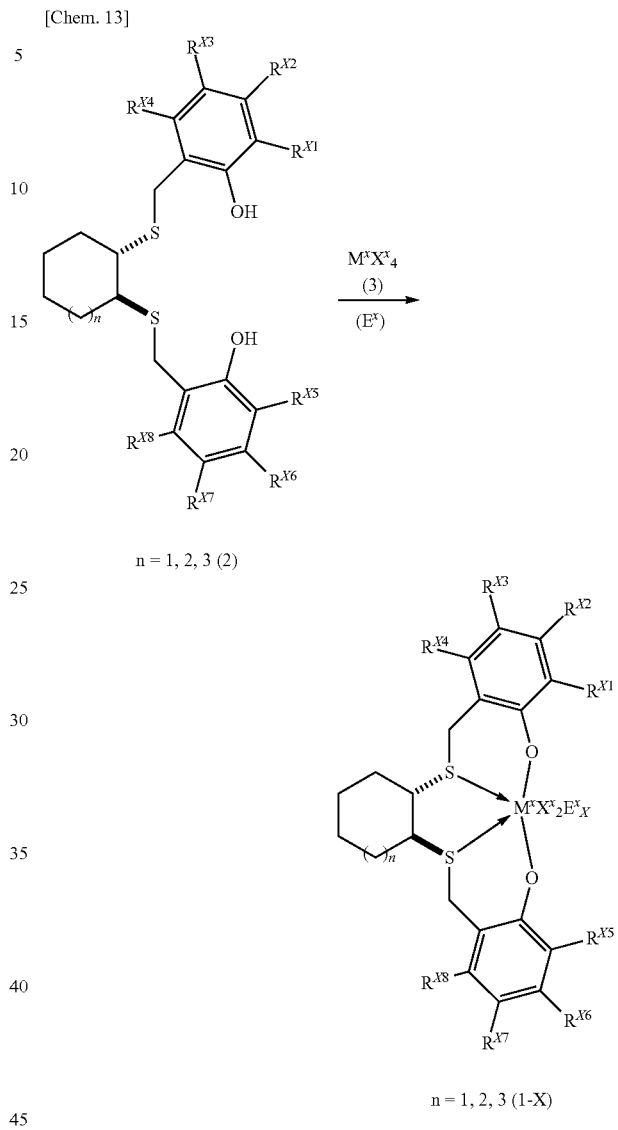

Scheme 1

[Chem. 13]

$M^X$ and $X^X$ in the general formula (3) are the same as $M^X$ and $X^X$ in the general formula (1-X), respectively. Examples of $M^XX^X_4$ include $Ti(CH_2Ph)_4$, $TiCl_2(CH_2Ph)_2$, $Ti(CH_2SiMe_3)_4$, $TiF_4$, $TiCl_4$, $TiBr_4$, $TiI_4$, $Ti(OMe)_4$, $Ti(OEt)_4$, $Ti(O$-$i$-$Pr)_4$, $TiCl_2(O$-$i$-$Pr)_2$, $Ti(O$-$n$-$Bu)_4$, $Ti(O$-$i$-$Bu)_4$, $Ti(O$-$t$-$Bu)_4$, $Ti(OPh)_4$, $Ti(NMe_2)_4$, $TiCl_2(NMe_2)_2$, $Ti(NEt_2)_4$, $Zr(CH_2Ph)_4$, $ZrCl_2(CH_2Ph)_2$, $Zr(CH_2SiMe_3)_4$, $ZrF_4$, $ZrCl_4$, $ZrBr_4$, $ZrI_4$, $Zr(OMe)_4$, $Zr(OEt)_4$, $Zr(O$-$i$-$Pr)_4$, $ZrCl_2(O$-$i$-$Pr)_2$, $Zr(O$-$n$-$Bu)_4$, $Zr(O$-$i$-$Bu)_4$, $Zr(O$-$t$-$Bu)_4$, $Zr(OPh)_4$, $Zr(NMe_2)_4$, $ZrCl_2(NMe_2)_2$, $Zr(NEt_2)_4$, $Hf(CH_2Ph)_4$, $HfCl_2(CH_2Ph)_2$, $Hf(CH_2SiMe_3)_4$, $HfF_4$, $HfCl_4$, $HfBr_4$, $HfI_4$, $Hf(OMe)_4$, $Hf(OEt)_4$, $Hf(O$-$i$-$Pr)_4$, $HfCl_2(O$-$i$-$Pr)_2$, $Hf(O$-$n$-$Bu)_4$, $Hf(O$-$i$-$Bu)_4$, $Hf(O$-$t$-$Bu)_4$, $Hf(OPh)_4$, $Hf(NMe_2)_4$, $HfCl_2(NMe_2)_2$, and $Hf(NEt_2)_4$. $M^XX^X_4$ is preferably $Ti(CH_2Ph)_4$, $TiCl_2(CH_2Ph)_2$, $Ti(CH_2SiMe_3)_4$, $TiCl_4$, $TiBr_4$, $Ti(OMe)_4$, $Ti(OEt)_4$, $Ti(O$-$i$-$Pr)_4$, $Ti(O$-$i$-$Bu)_4$, $Ti(O$-$t$-$Bu)_4$, $Ti(OPh)_4$, $Ti(NMe_2)_4$, $TiCl_2(NMe_2)_2$, $Ti(NEt_2)_4$, $Zr(CH_2Ph)_4$, $ZrCl_2(CH_2Ph)_2$, $Zr(CH_2SiMe_3)_4$, $ZrCl_4$, $ZrBr_4$, $Zr(OMe)_4$, $Zr(OEt)_4$, $Zr(O$-$i$-$Pr)_4$, $Zr(O$-$i$-$Bu)_4$, $Zr(O$-$t$-$Bu)_4$, $Zr(OPh)_4$, $Zr(NMe_2)_4$, $ZrCl_2(NMe_2)_2$, $Zr(NEt_2)_4$, $Hf(CH_2Ph)_4$, $HfCl_2(CH_2Ph)_2$, $Hf(CH_2SiMe_3)_4$, $HfCl_4$, $HfBr_4$, $Hf(OMe)_4$, $Hf(OEt)_4$, $Hf(O$- i-Pr)$_4$, Hf(O-i-Bu)$_4$, Hf(O-t-Bu)$_4$, Hf(OPh)$_4$, Hf(NMe$_2$)$_4$, HfCl$_2$(NMe$_2$)$_2$, or Hf(NEt$_2$)$_4$.

The transition metal compound (A-X) may be produced by (i) directly reacting the compound (2) and the compound (3) or (ii) reacting the compound (2) with a base and then reacting the resultant with the compound (3). These reactions are generally performed in a solvent. The base to be used is, for example, an organolithium reagent, a Grignard reagent, or a metal hydride. Specific examples of the base encompass n-butyllithium, sec-butyllithium, tert-butyllithium, lithium diisopropylamide, lithium hexamethyldisilazane, potassium hexamethyldisilazane, sodium hydride, and potassium hydride. The base is preferably n-butyllithium, lithium diisopropylamide, potassium hexamethyldisilazane, sodium hydride, or potassium hydride.

The compound obtained by the reaction of the compound (2) with the base, the transition metal compound (A-X), and the compound (3) are generally unstable with respect to air and moisture. Therefore, it is preferable that the above reactions be carried out under dehydrated and deoxygenated conditions, and more specifically in an atmosphere of dry nitrogen or dry argon.

The amount of the compound (2) used needs only to be not smaller than 1 molar equivalent relative to the compound (3), preferably in a range from 1.0 to 1.5 molar equivalents. In cases where the reaction lefts over the compound (2), the compound (3) may be further added in the reaction.

The reaction of the compounds (2) and (3) is carried out at a temperature generally in a range from −100° C. to 150° C. and preferably in a range from −80° C. to 50° C.

With regard to a length of time the reaction of the compounds (2) and (3) is carried out, the reaction needs only to be carried out until a yield of product reaches the highest, preferably for 5 minutes to 48 hours, and more preferably for 10 minutes to 24 hours.

The reaction of the compounds (2) and the base is carried out at a temperature generally in a range from −100° C. to 150° C. and preferably in a range from −80° C. to 50° C.

With regard to a length of time the reaction of the compound (2) and the base is carried out, the reaction needs only to be carried out until a yield of product reaches the highest, for 5 minutes to 24 hours, preferably for 10 minutes to 12 hours, and more preferably for 30 minutes to 3 hours.

The reaction of (i) the compound formed by the reaction of the compound (2) and the base and (ii) the compound (3) is carried out at a temperature generally in a range from −100° C. to 150° C. and preferably in a range from −80° C. to 50° C.

With regard to a length of time the reaction of (i) the compound formed by the reaction of the compound (2) and the base and (ii) the compound (3) is carried out, the reaction needs only to be carried out until a yield of product reaches the highest, for 5 minutes to 48 hours and preferably for 10 minutes to 24 hours.

The reactions may be carried out with any solvent generally used for reactions similar to the above-described reactions, and examples of the solvent for use in the reactions include a hydrocarbon solvent or an ethers solvent. The solvent is preferably toluene, benzene, o-xylene, m-xylene, p-xylene, hexane, pentane, heptane, cyclohexane, diethyl ether, or tetrahydrofuran, and more preferably diethyl ether, toluene, tetrahydrofuran, hexane, pentane, heptane, or cyclohexane.

The compound (2) can be synthesized in accordance with a method described in Journal of American Chemical Society, 2009, Volume 131, 13566-13567, for example. More specifically, the compound (2) can be produced by scheme 2 shown below. The following will describe the steps of the scheme 2 in detail. Compounds represented by general formulae (4)-(7) below are hereinafter referred to as "compounds (4)-(7)".

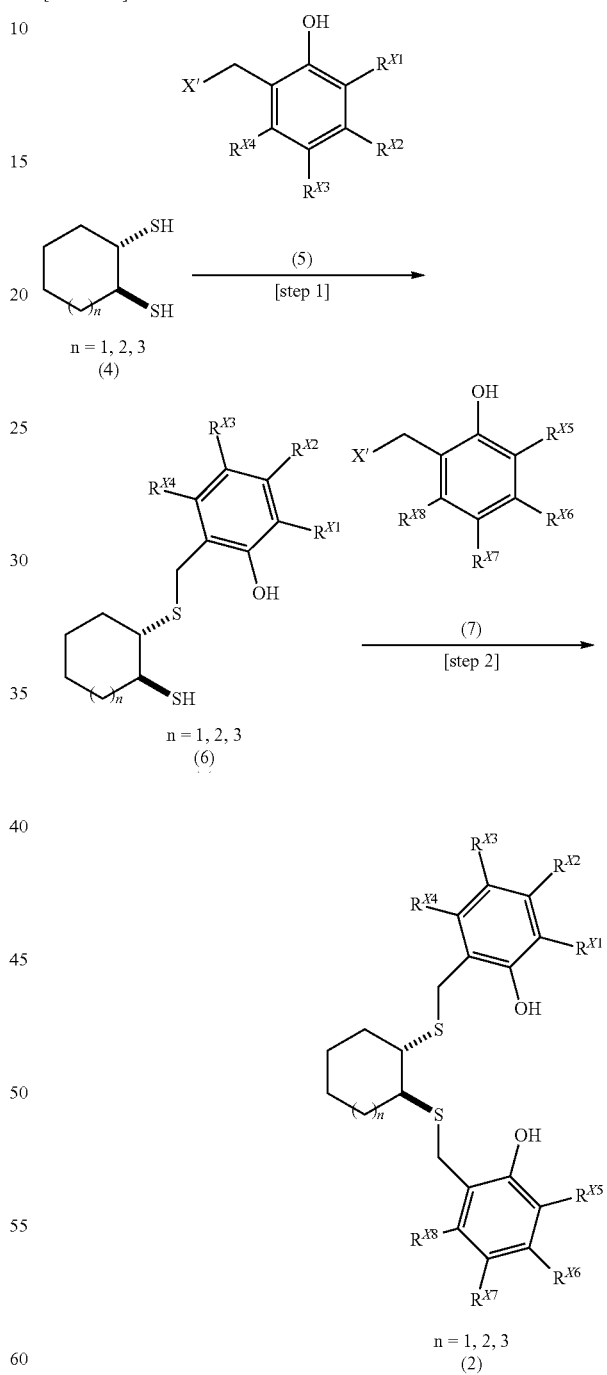

scheme 2

[Chem. 14]

In the scheme 2, $R^{X1}$ to $R^{X8}$ and n in the compounds are the same as $R^{X1}$ to $R^{X8}$ and n in the general formula (1-X).

X' represents an anionic leaving group and is, for example, a halogen atom, an acetate group, a trifluoroacetate group, a benzoate group, a CF$_3$SO$_3$ group, a CH$_3$SO$_3$ group, a 4-MeC$_6$H$_4$SO$_3$ group, a PhSO$_3$ group, or the like, and preferably a chlorine atom, a bromine atom, an iodine atom, a CF$_3$SO$_3$ group, a CH$_3$SO$_3$ group, a 4-MeC$_6$H$_4$SO$_3$ group, or a PhSO$_3$ group.

[Step 1]

A compound (6) can be synthesized by causing a compound (4) to react with a compound (5) of 1.0 to 4.0 equivalents, preferably 1.0 to 1.5 equivalents in the presence of a base.

The base is exemplified by an inorganic base, such as potassium carbonate, calcium carbonate, sodium carbonate, potassium hydrogencarbonate, calcium hydrogencarbonate, and sodium hydrogencarbonate, and an amine base such as triethylamine and triisobutylamine, and preferably an amine base.

The reaction can be carried out in an atmosphere of air, helium, argon, or nitrogen, preferably in an atmosphere of helium, argon, or nitrogen, and more preferably in an atmosphere of nitrogen or argon.

After the completion of the reaction, the compound (6) may be purified. A method for the purification is exemplified by the following method. The reaction solution is mixed with an aqueous solution of ammonium chloride, an aqueous solution of hydrochloric acid, or an aqueous solution of sodium chloride. Subsequently, the mixture solution is mixed with ethyl acetate or diethyl ether and then subjected to an extraction operation so that a surplus base or salt is removed. An additional purification operation such as distillation, recrystallization, or silica gel chromatography allows the compound (6) to have a higher purity.

[Step 2]

The compound (2) can be synthesized by causing the compound (6) to react with a compound (7) of 1.0 to 4.0 equivalents, and preferably 1.0 to 1.5 equivalents, in the presence of the base.

The base is exemplified by an inorganic base, such as potassium carbonate, calcium carbonate, sodium carbonate, potassium hydrogencarbonate, calcium hydrogencarbonate, and sodium hydrogencarbonate, and an amine base such as triethylamine and triisobutylamine, and preferably an amine base.

The reaction in the step 2 can be carried out in an atmosphere of air, helium, argon, or nitrogen, preferably in an atmosphere of helium, argon, or nitrogen, and more preferably in an atmosphere of nitrogen or argon.

After the completion of the reaction, the compound (2) may be purified. A method for the purification is exemplified by the following method. The reaction solution is mixed with an aqueous solution of ammonium chloride, an aqueous solution of hydrochloric acid, or an aqueous solution of sodium chloride. Subsequently, the mixture solution is mixed with ethyl acetate or diethyl ether and then subjected to an extraction operation so that a surplus base or salt is removed. An additional purification operation such as distillation, recrystallization, or silica gel chromatography allows the compound (2) to have a higher purity.

The compound (2) can also be obtained by causing the compound (6), which has been produced in a reactor, and the compound (7) to react with each other in the reactor by controlling the reaction condition in the [step 1].

In a case where $R^{X1}$ is the same as $R^{X5}$, $R^{X2}$ is the same as $R^{X6}$, $R^{X3}$ is the same as $R^{X7}$, and $R^{X4}$ is the same as $R^{X8}$, the compound (2) can be synthesized by mixing the compound (5) and the compound (7) together, and in the presence of a base, reacting the compound (4) with the mixture of 2.0 to 8.0 equivalents, and preferably 2.0 to 4.0 equivalents with respect to the compound (4).

Specific examples of the compound (2) include the following compounds.

[Chem. 15]

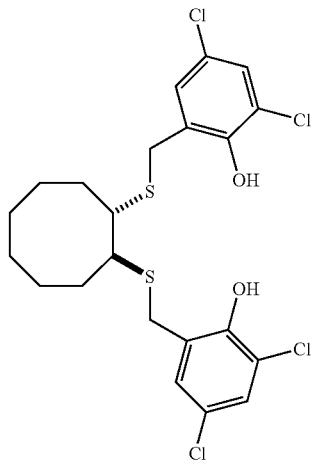

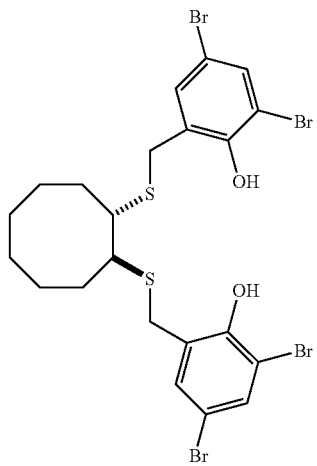

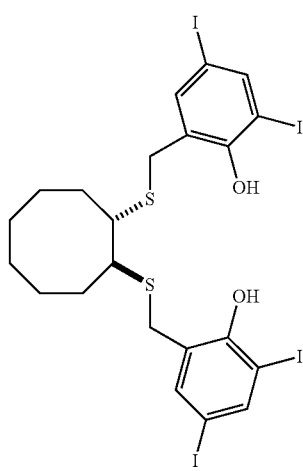

69
-continued
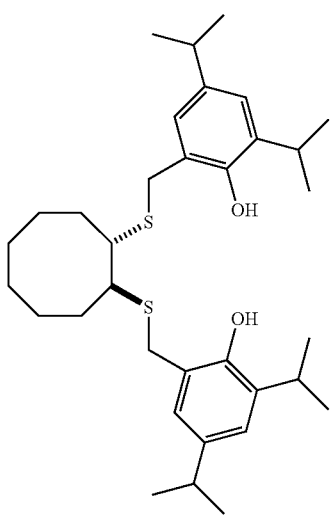
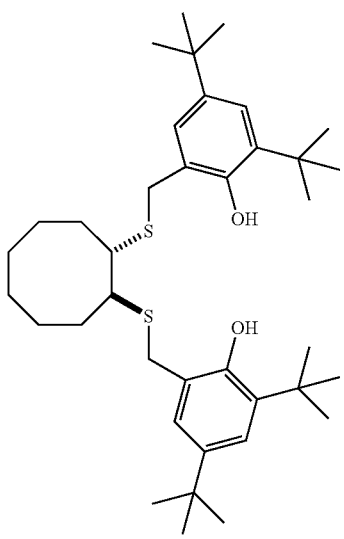
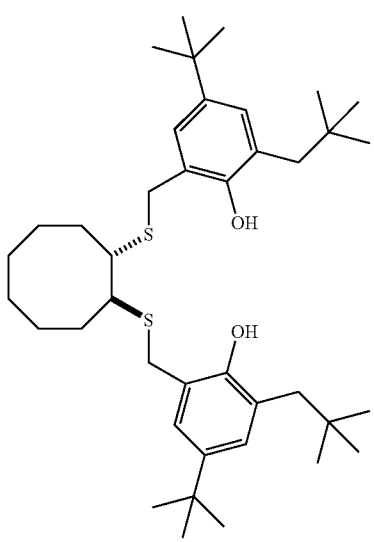
70
-continued
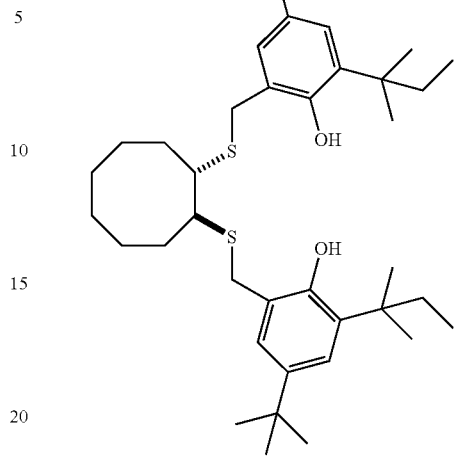
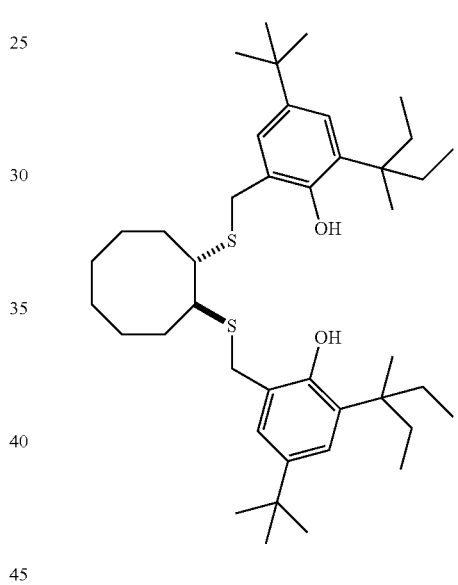
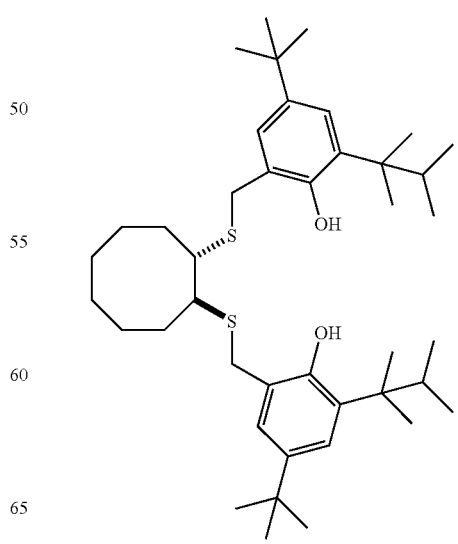

71
-continued
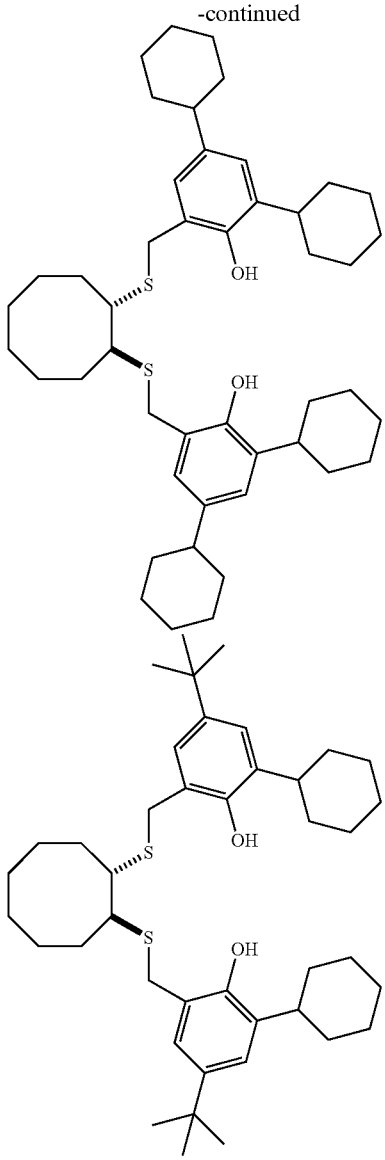
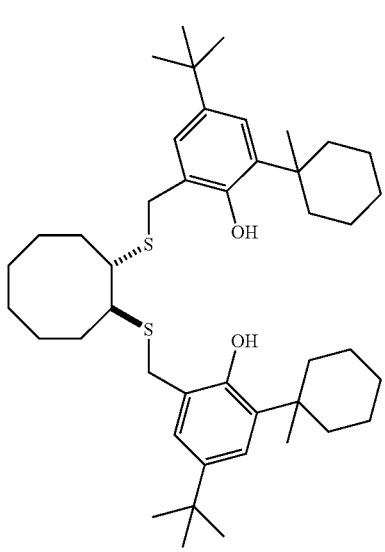
72
-continued
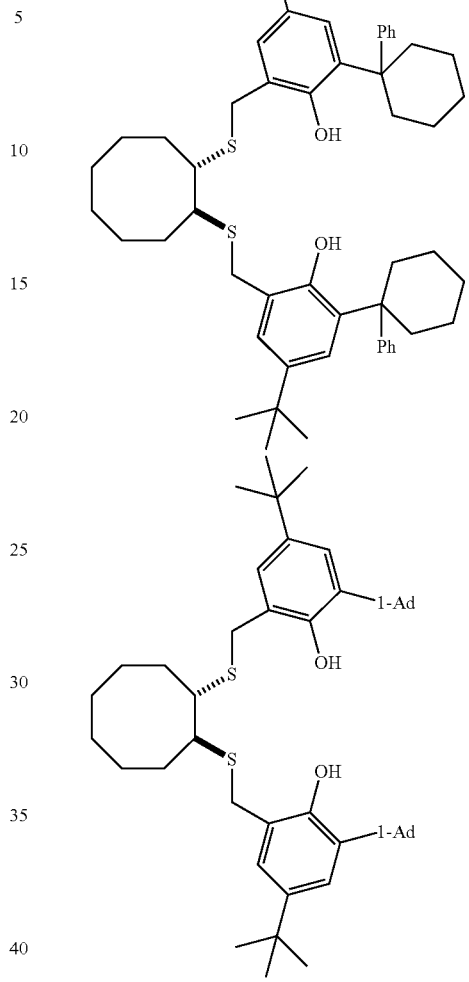
1-Ad = 1-adamantyl
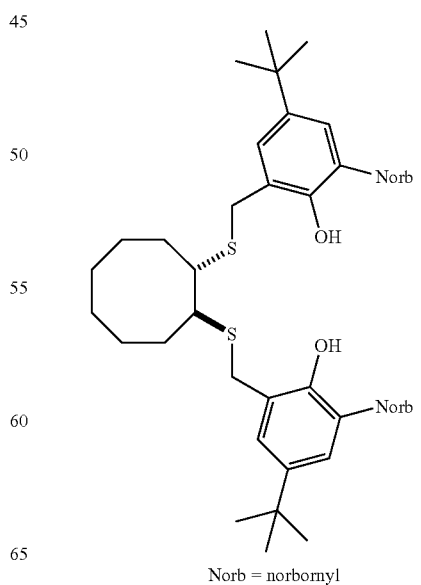
Norb = norbornyl 73
-continued
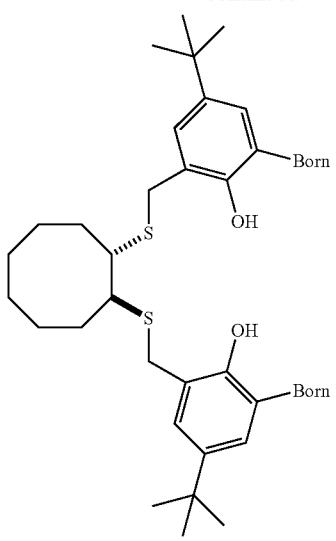
Born = bornyl
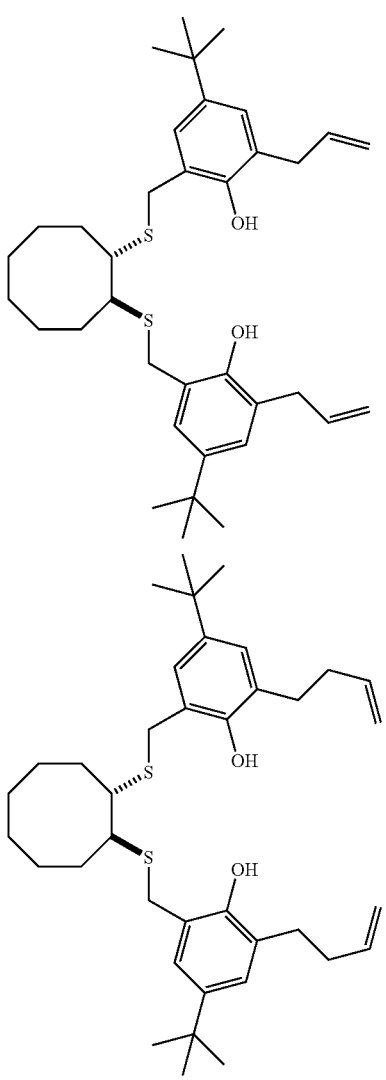
74
-continued
[Chem. 16]
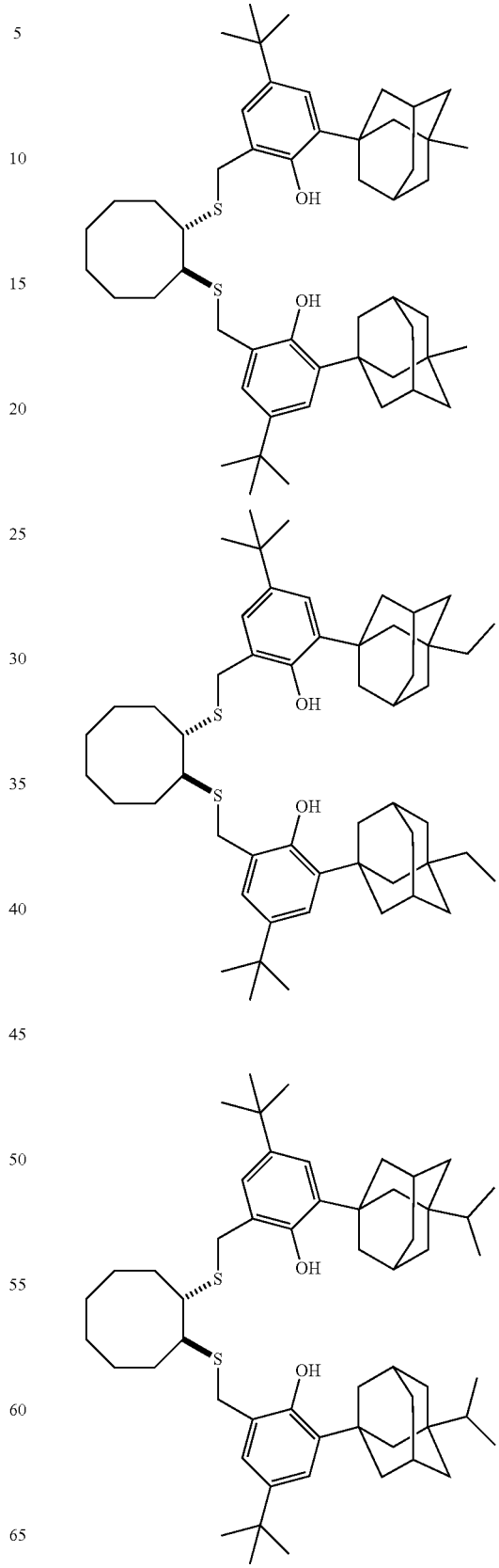

75
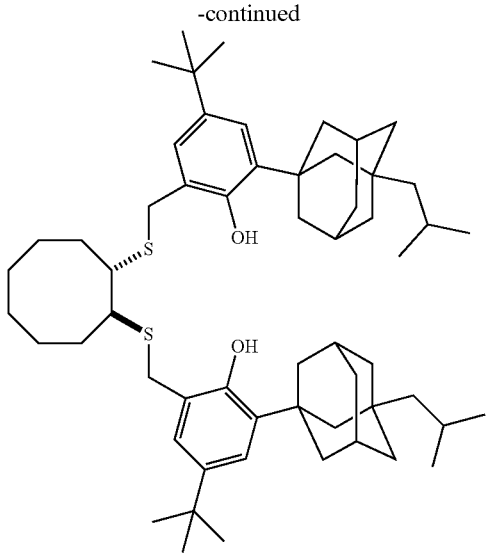
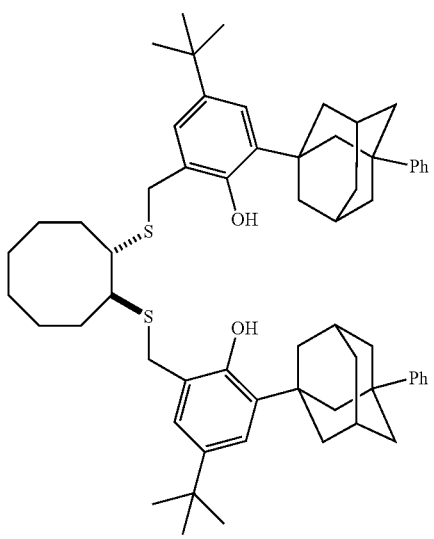
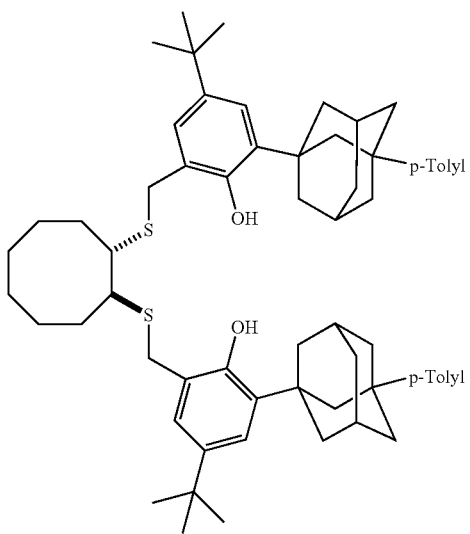
76
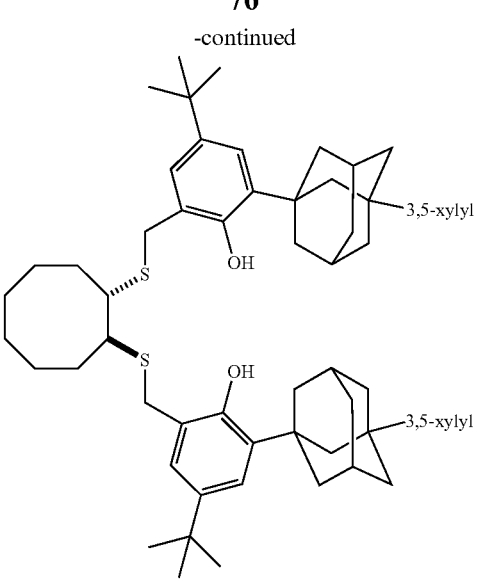
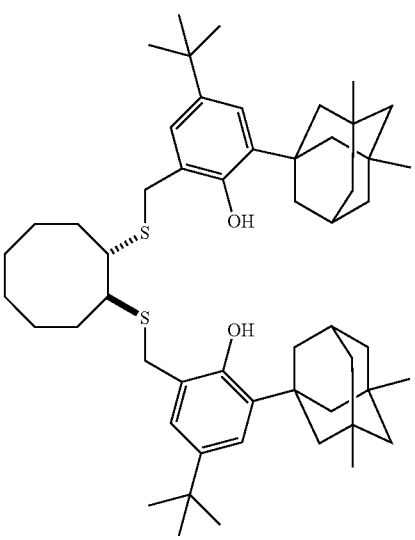
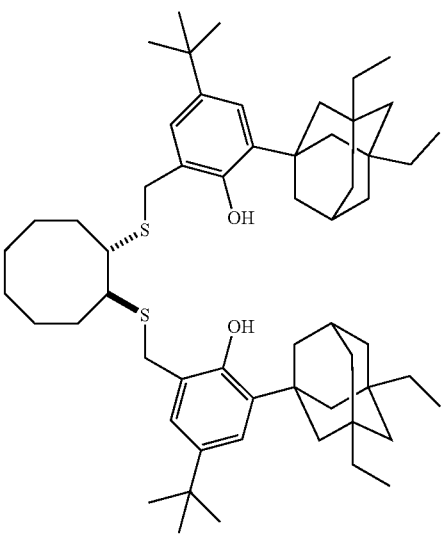

77
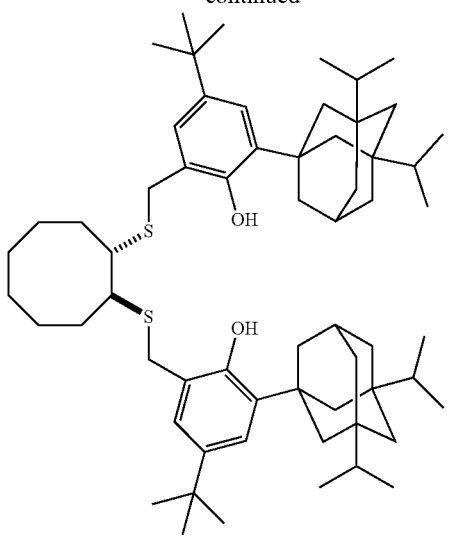
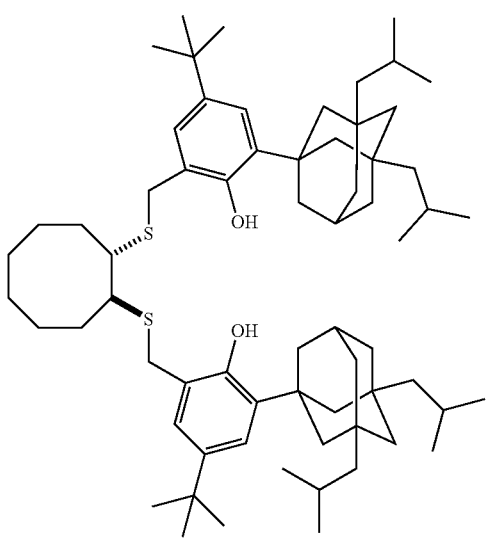
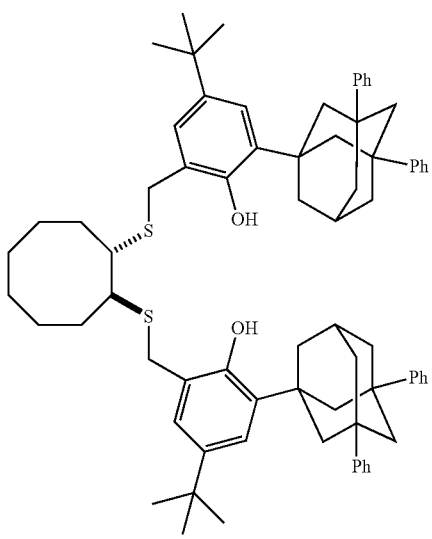
78
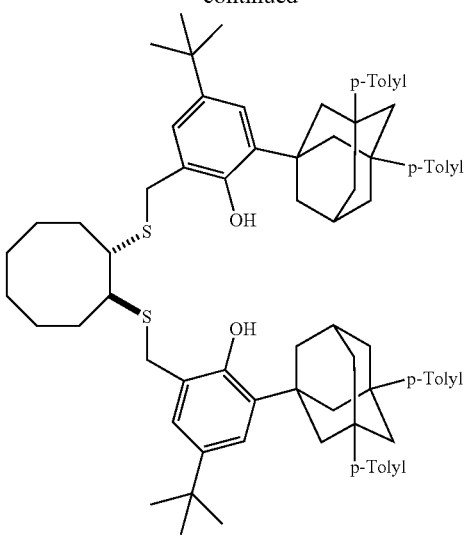
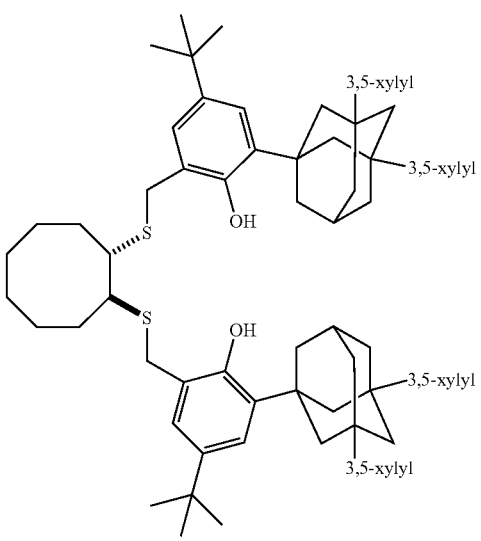
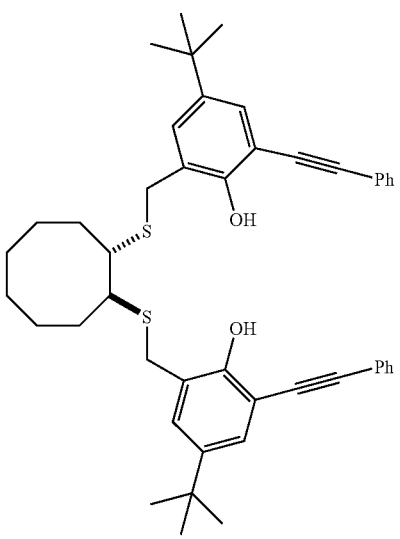

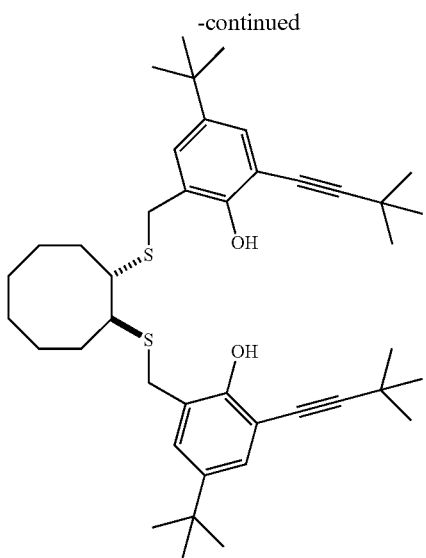
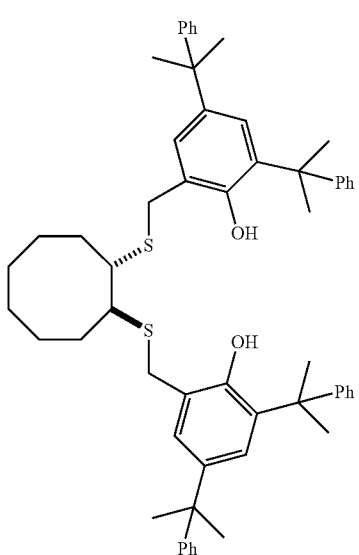
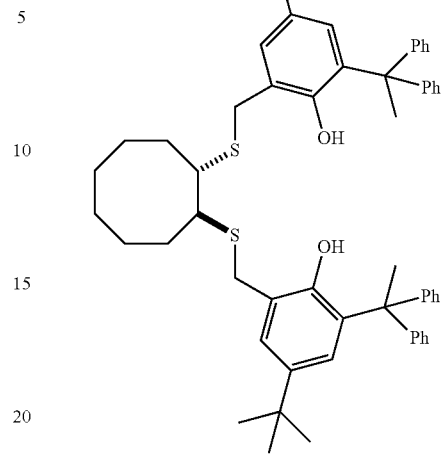
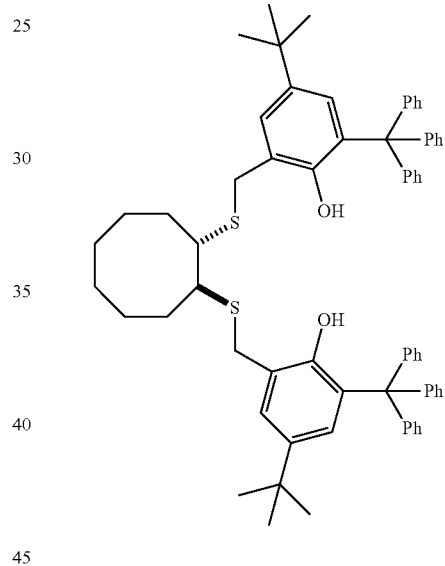
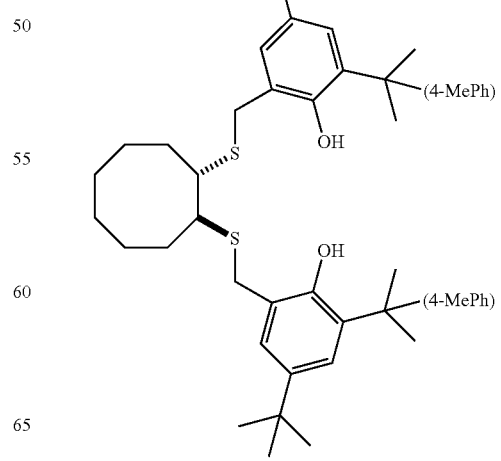

-continued
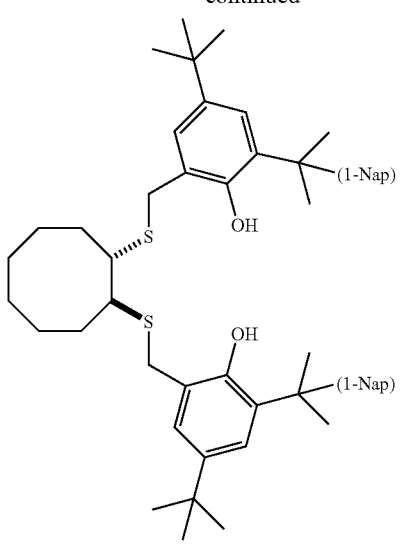
1-Nap = 1-naphthyl
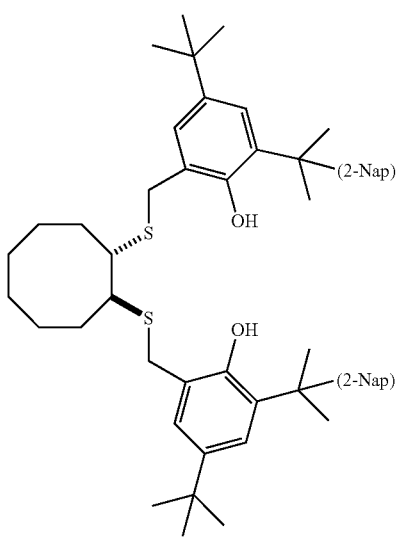
2-Nap = 2-naphthyl
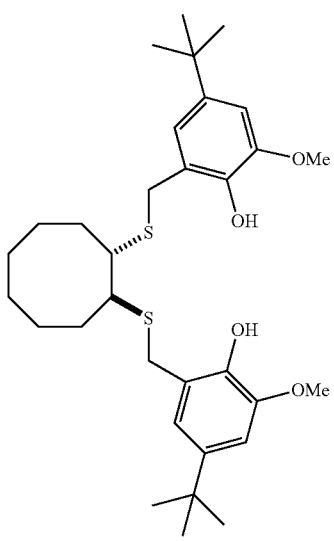
-continued
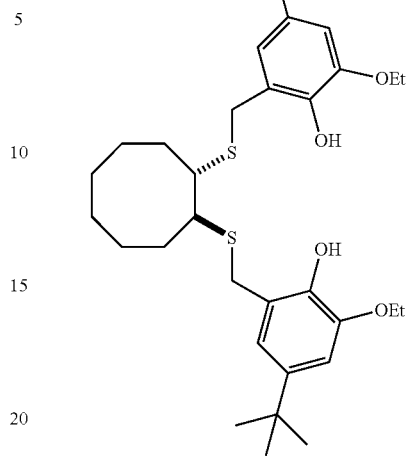
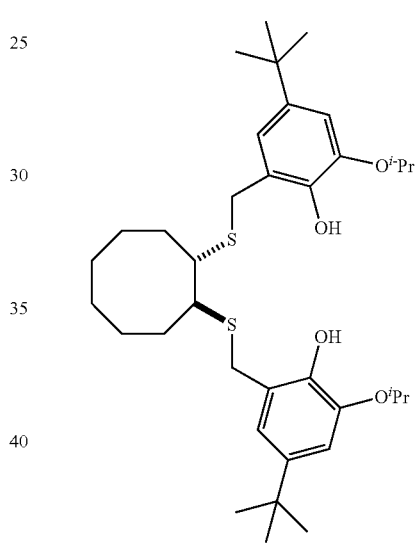
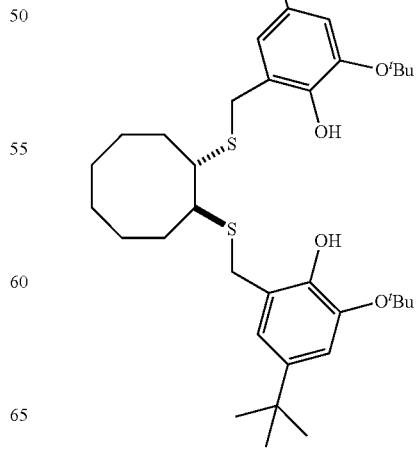

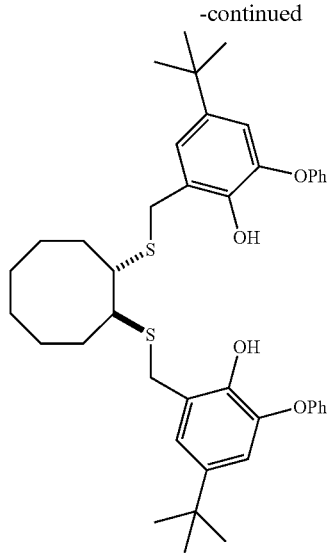
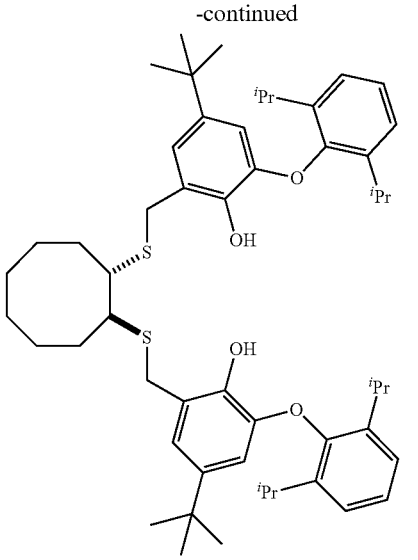
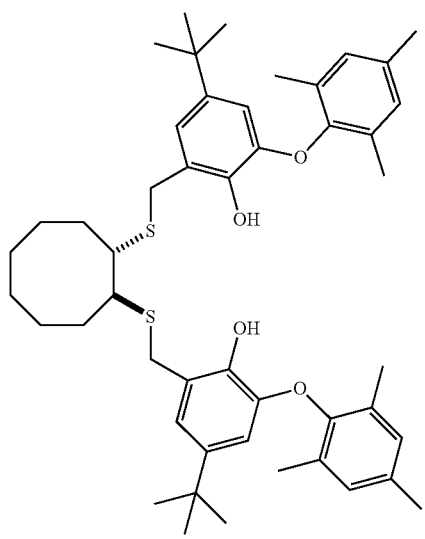
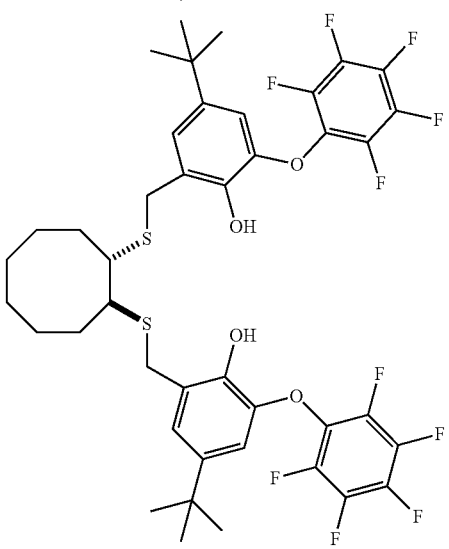
[Chem. 17]
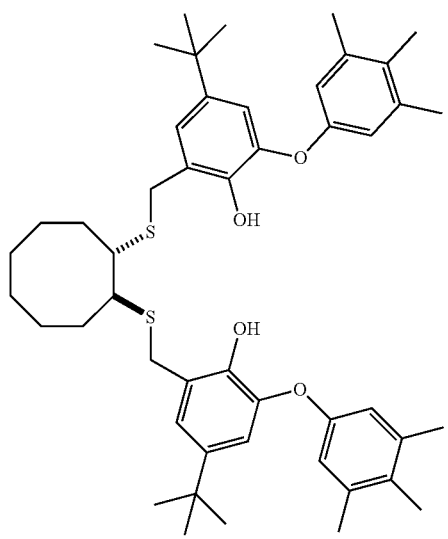
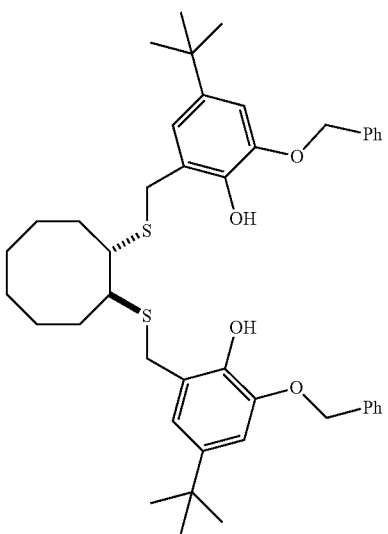

-continued
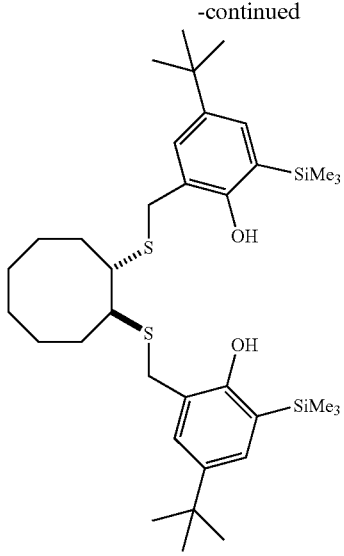
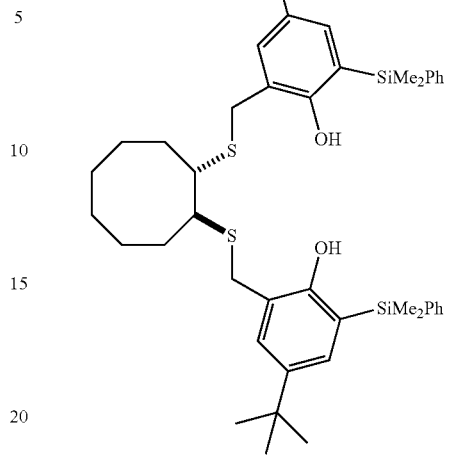
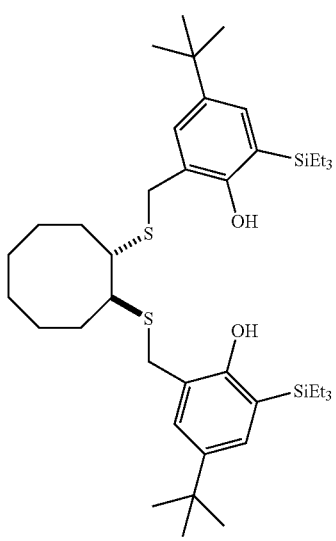
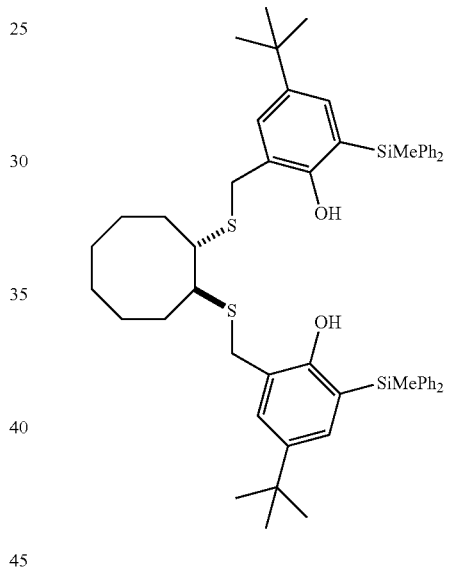
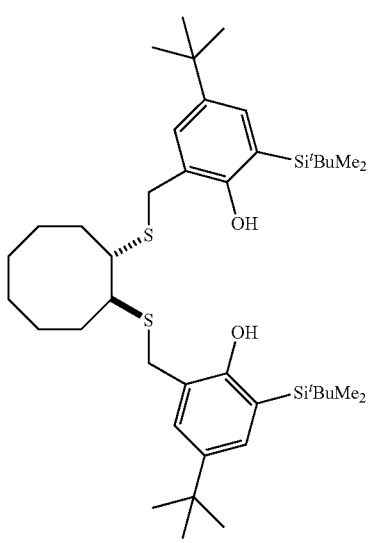
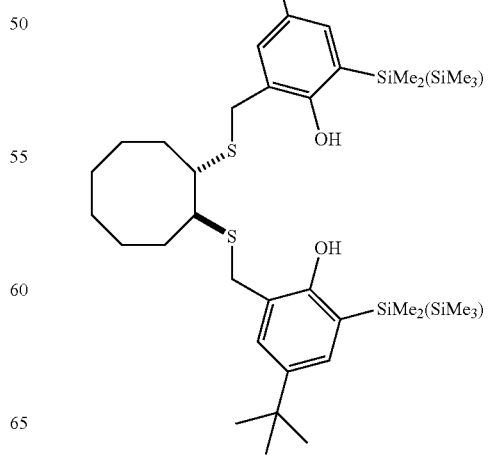

87
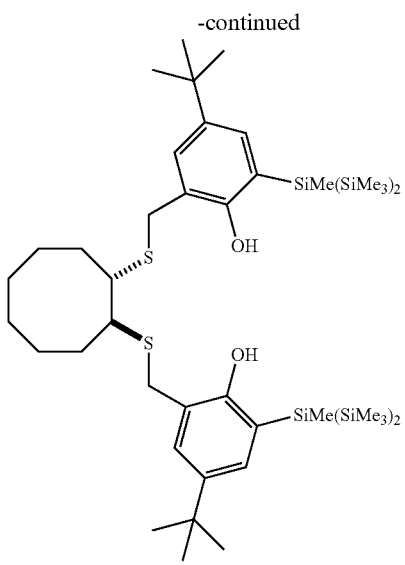
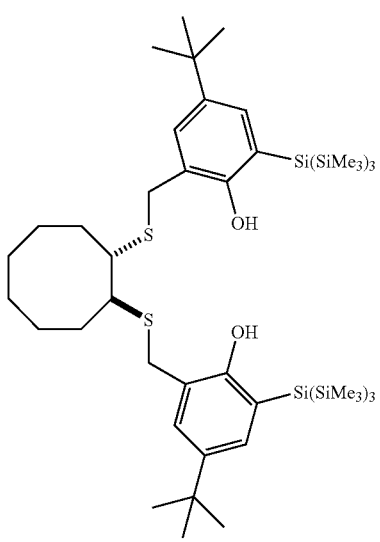
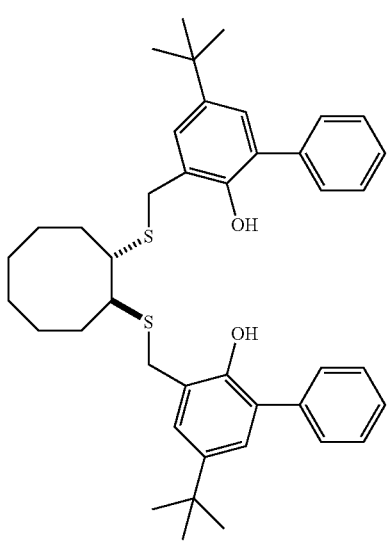
88
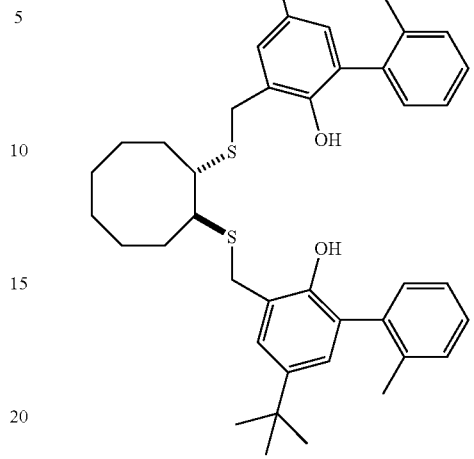
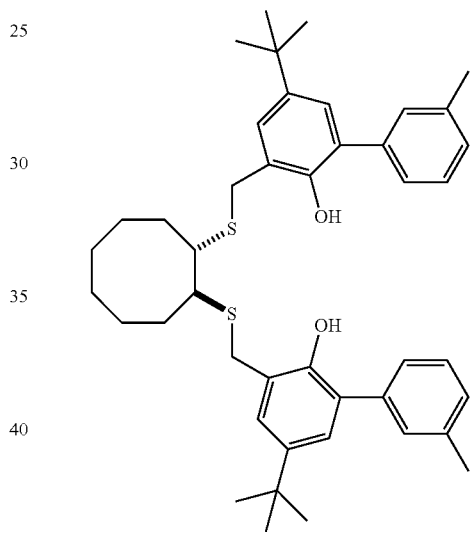
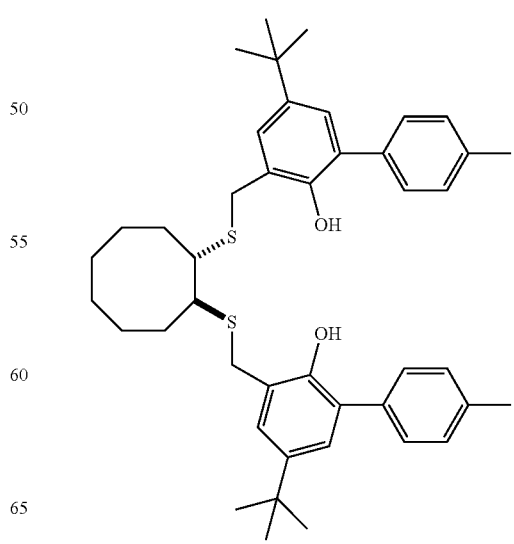

89
-continued
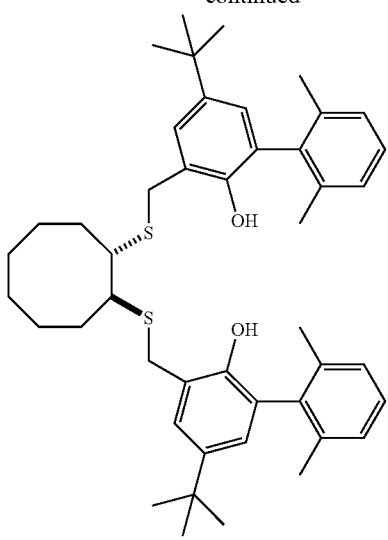
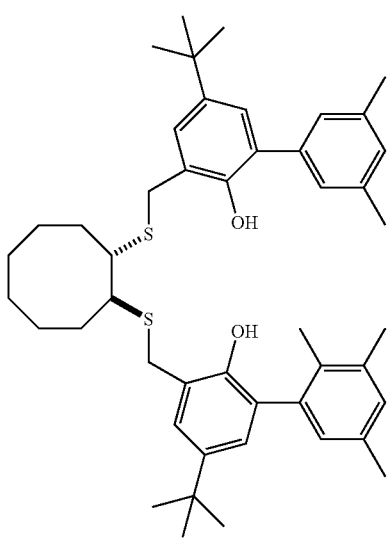
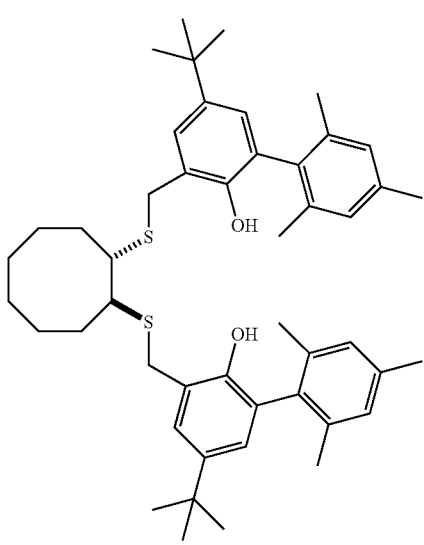
90
-continued
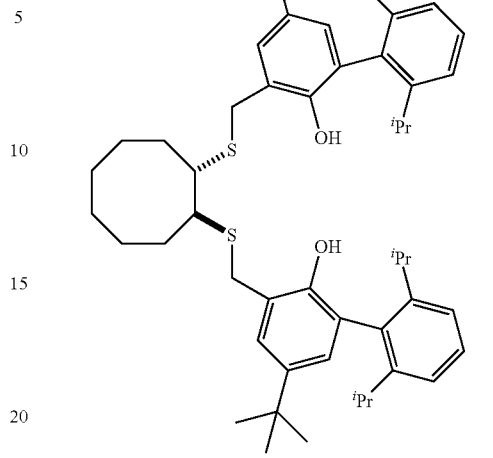
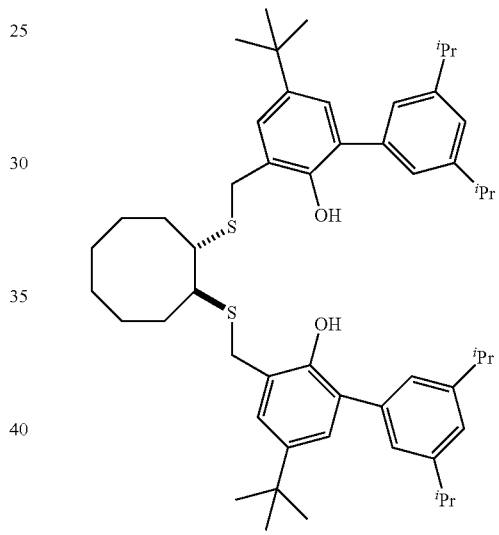
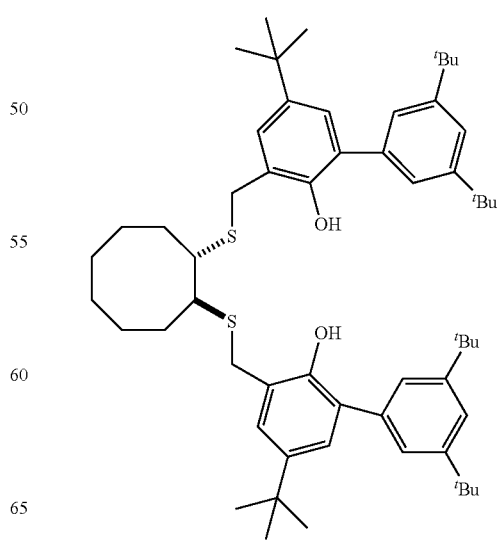

| 91 | 92 |
|---|---|
| -continued | -continued |
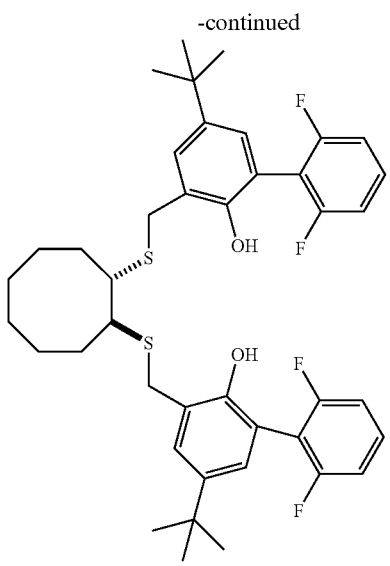
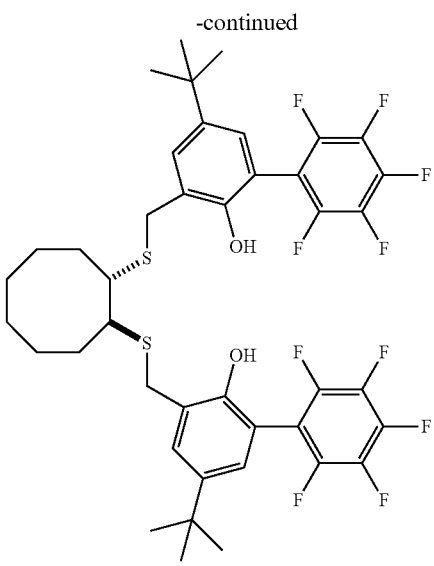
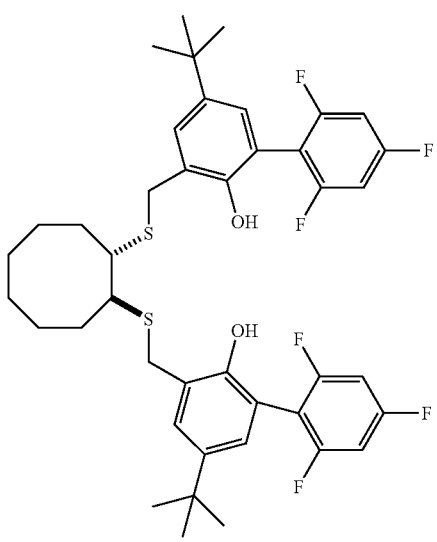
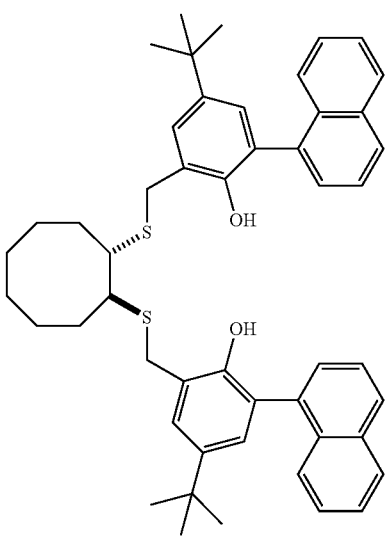
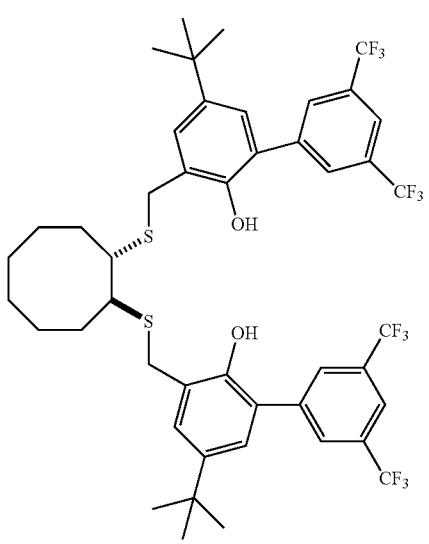
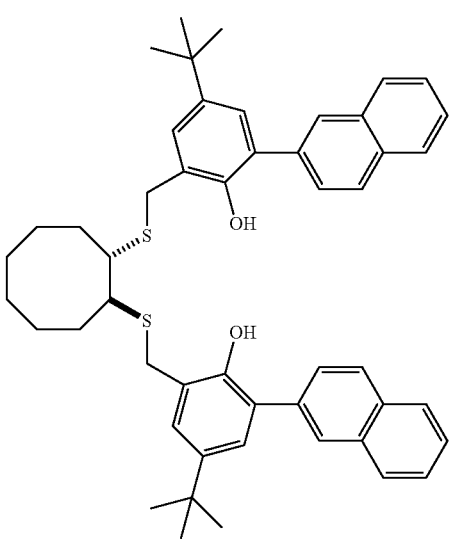

93
-continued
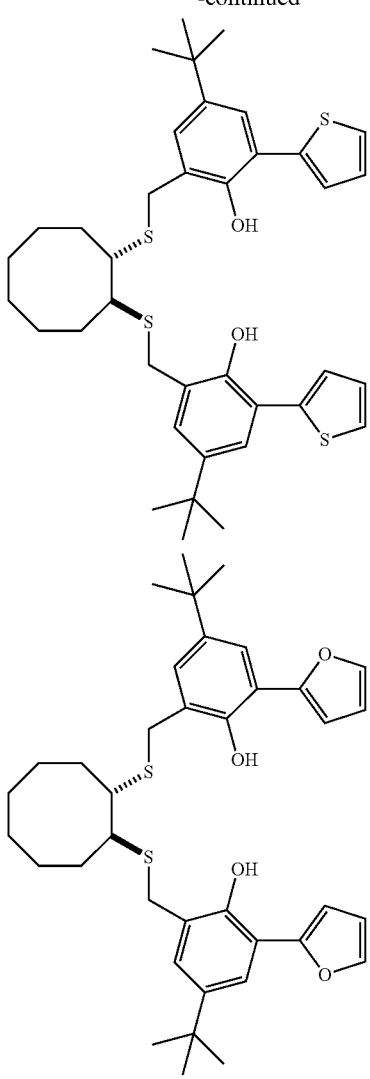
94
-continued
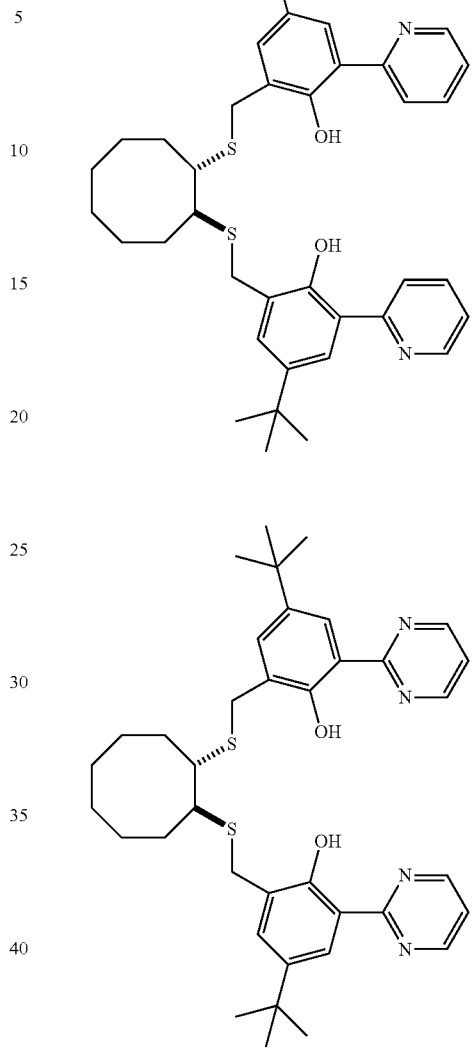
[Chem. 18]
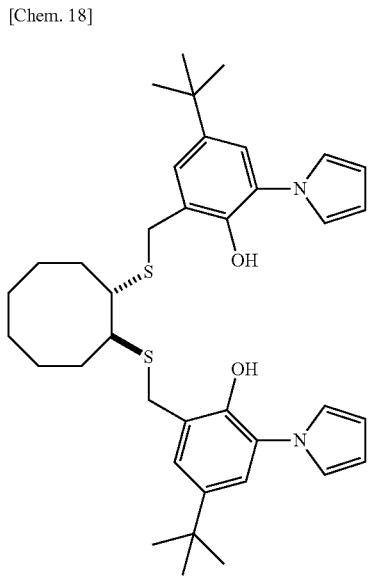
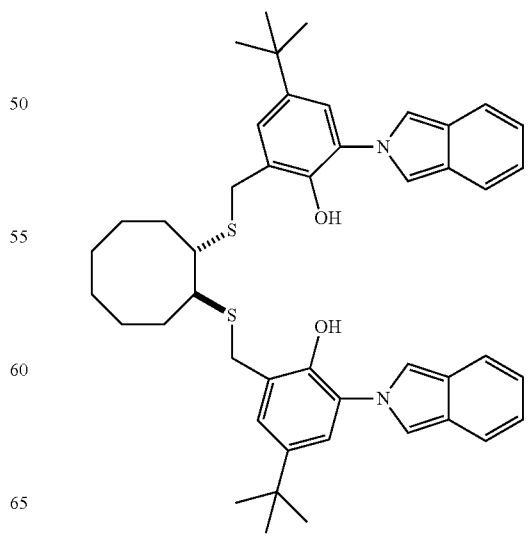

-continued

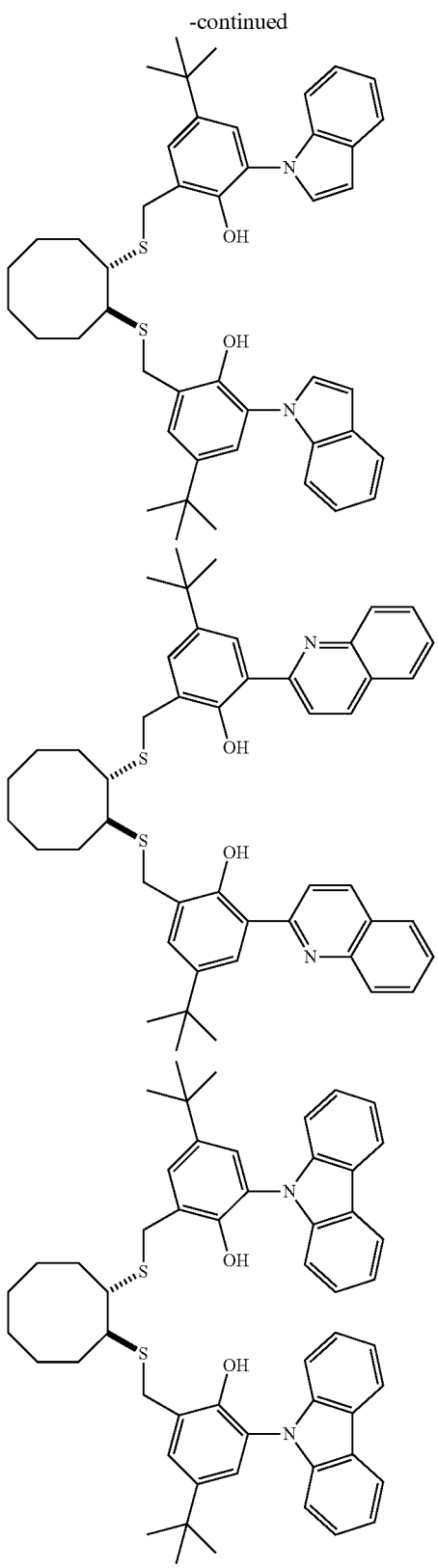

Specific examples of the compound (2) include, in addition to the compounds as shown above, the above compounds modified such that groups respectively corresponding to $R^{X3}$ and $R^{X7}$ in the general formula (2) above are independently a hydrogen atom, a fluorine atom, a chlorine atom, a bromine atom, an iodine atom or a methyl group.

Specific examples of the compound (2) further include the above compounds modified such that the cyclooctane ring crosslinking the sulfur atoms is replaced with a cycloheptane ring or a cyclohexane ring.

Specific examples of the compound (5) and the compound (7) include the following compounds.

[Chem. 19]

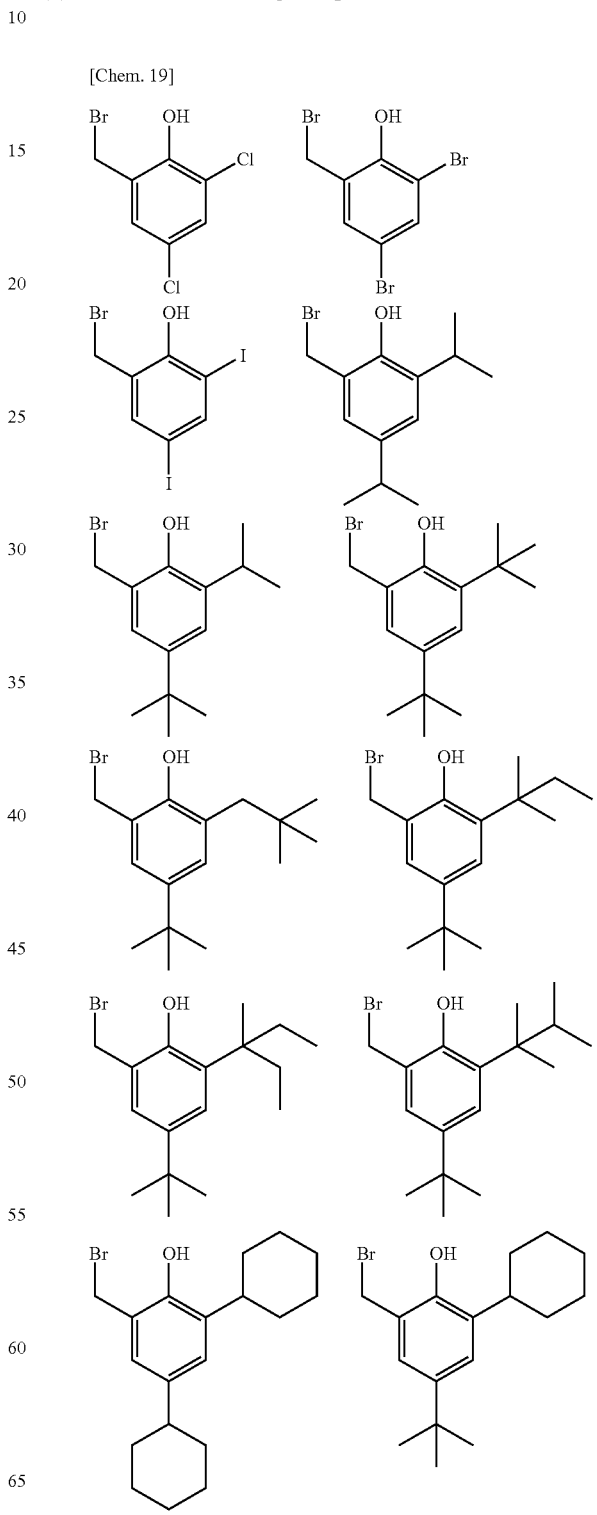

-continued
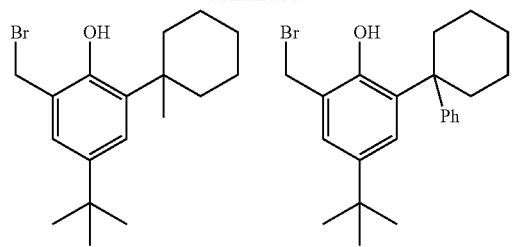
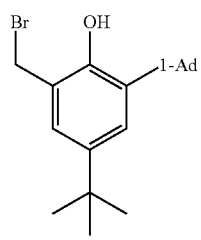
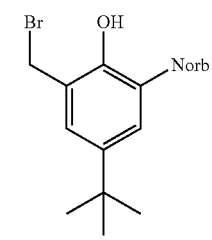
1-Ad = 1-adamantyl    Norb = norbornyl
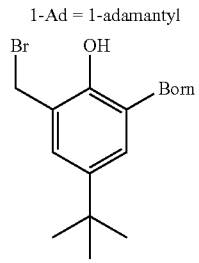
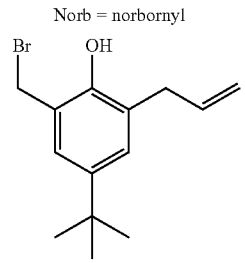
Born = bornyl
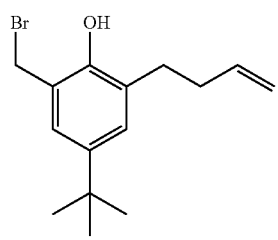
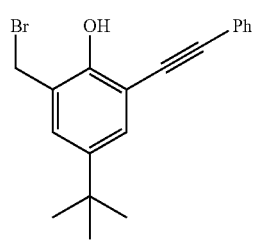
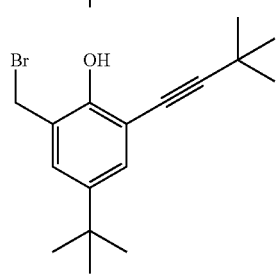
-continued
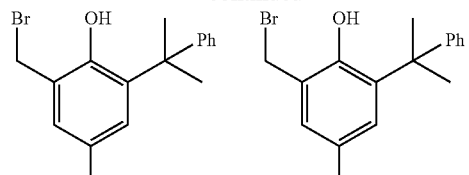
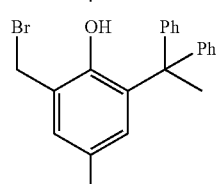
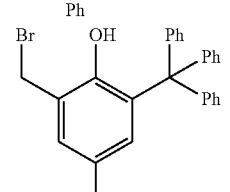
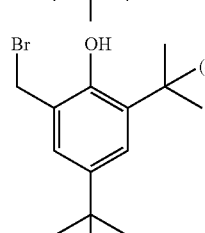
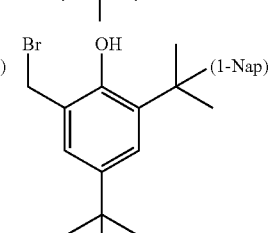
1-Nap = 1-naphthyl
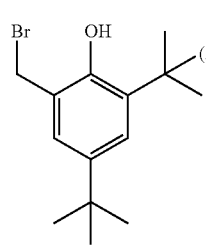
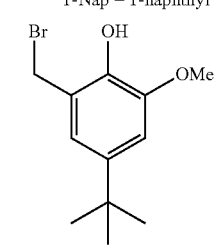
2-Nap = 2-naphthyl
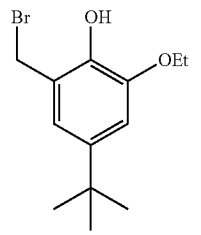
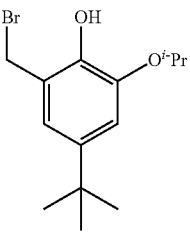
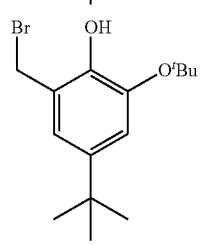
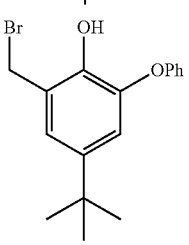

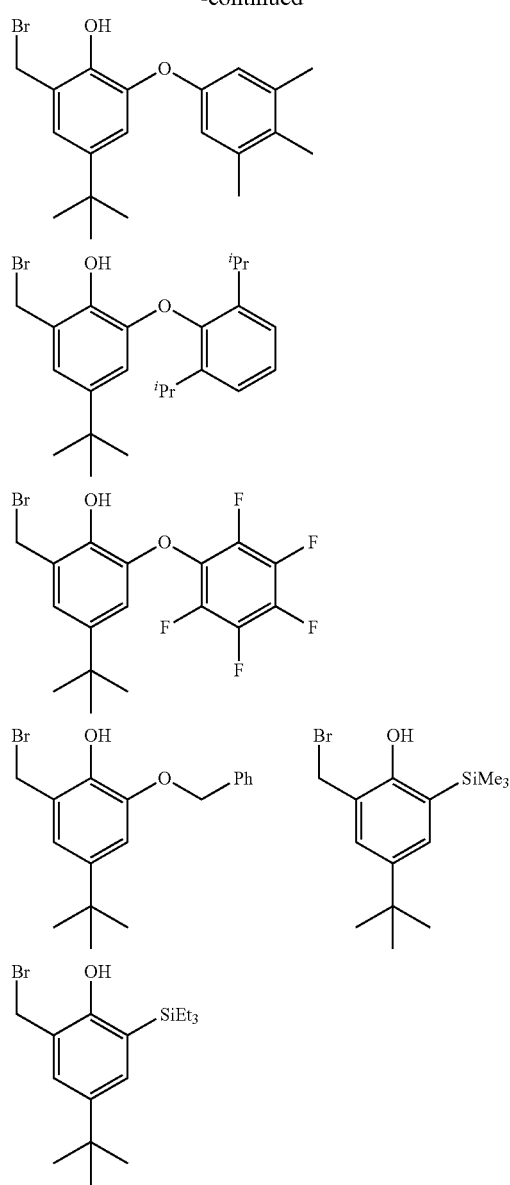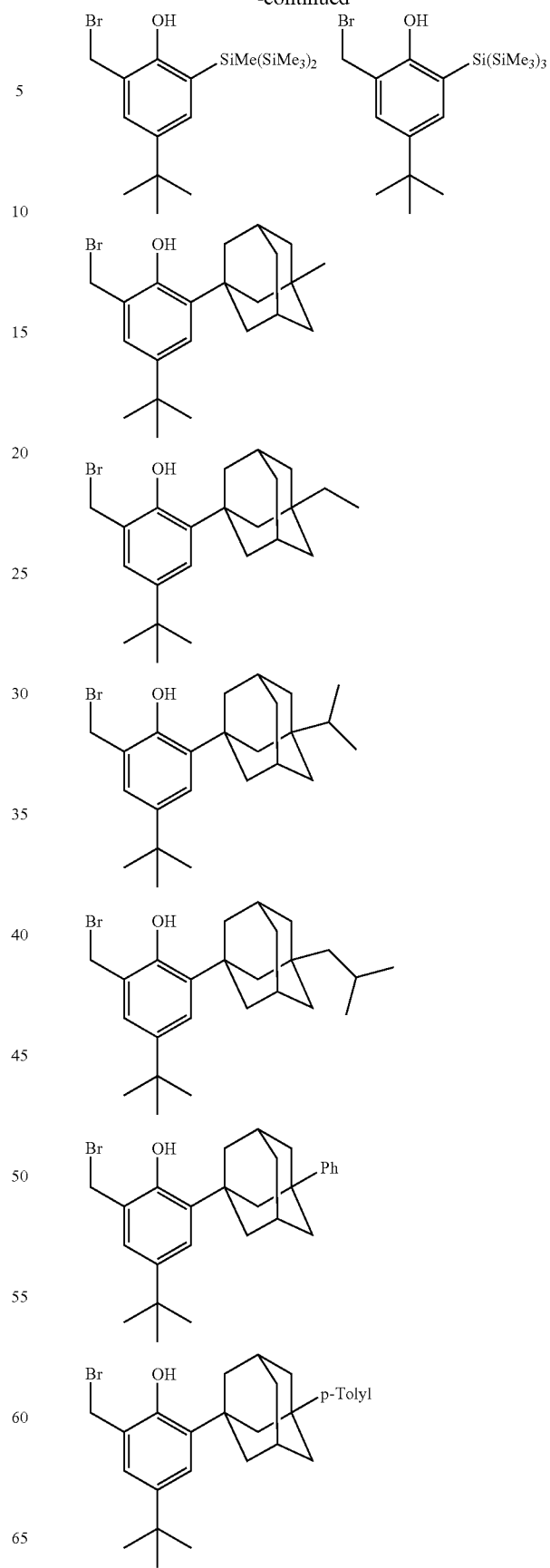

101
-continued
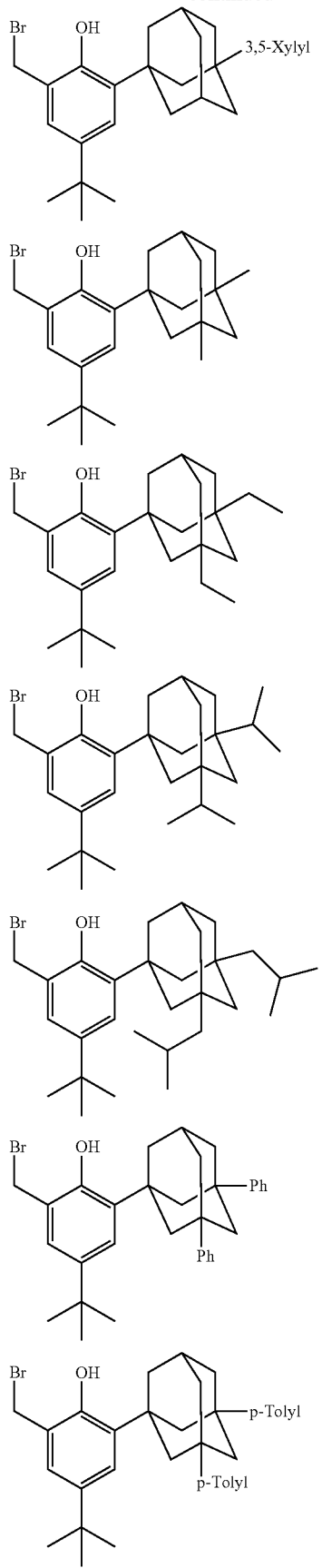
102
-continued
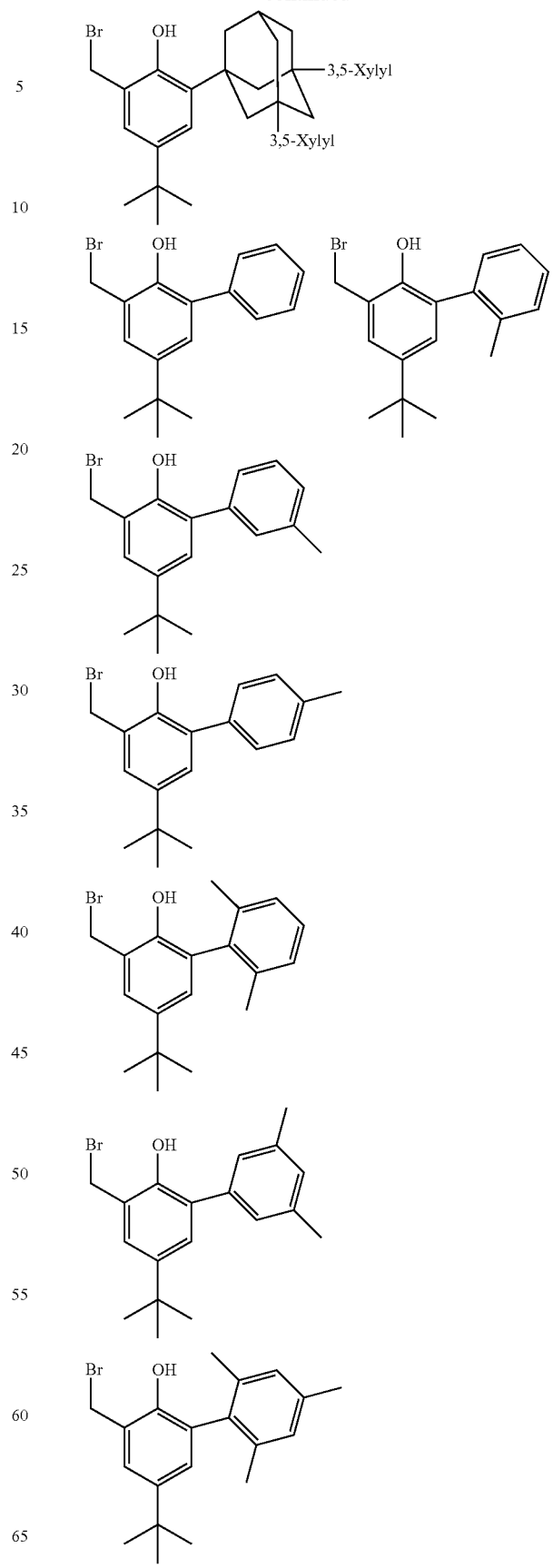

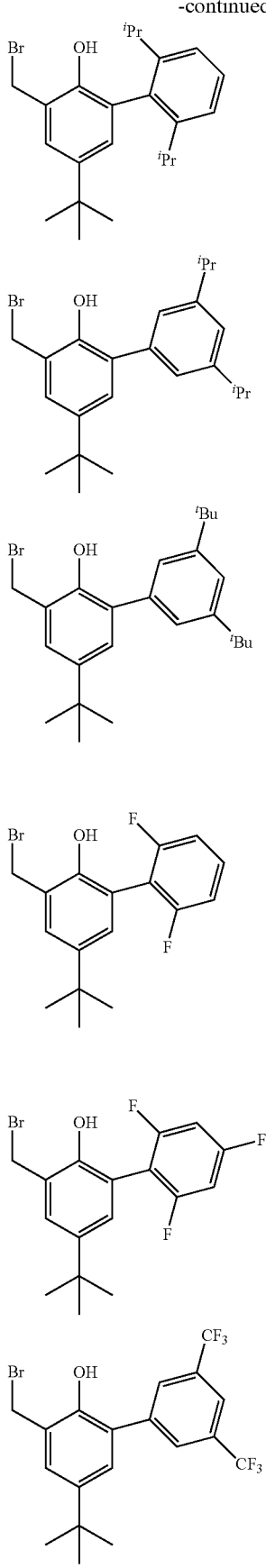
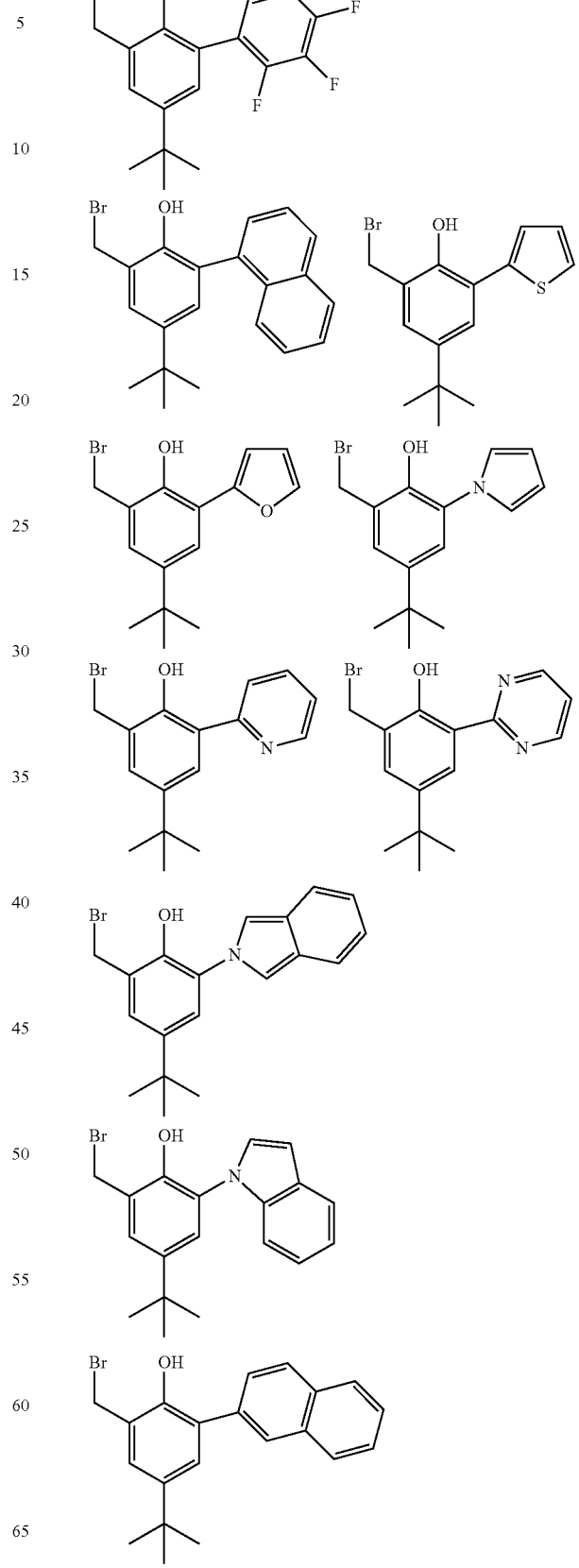

-continued

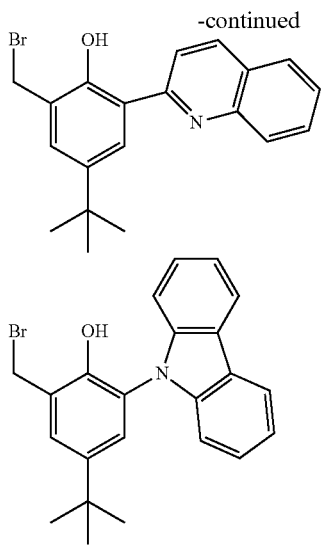

Specific examples of the compound (5) and the compound (7) include, in addition to the compounds as shown above, the above compounds modified such that groups respectively corresponding to $R^{X3}$ and $R^{X7}$ in the general formula (5) or (7) above are independently a hydrogen atom, a fluorine atom, a chlorine atom, a bromine atom, an iodine atom, or a methyl group.

Transition Metal Compound (A-Y)

A transition metal compound (A-Y) for use in the present invention is selected from the group consisting of transition metal compounds other than transition metal compounds represented by the general formula (1-X), which transition metal compounds are represented by the following general formula (1-Y) containing (i) one or a plurality of transition metal atoms and (ii) one or a plurality of group(s)/ligand(s) selected from π-electron conjugated anionic groups, nonconjugated anionic groups, and neutral Lewis basic ligands. Examples of those transition metal compounds include transition metal compounds containing metallocene, halfmetallocene, or multidentate chelate groups in which a heteroatom serves as a coordination element. The following description will discuss the transition metal compounds represented by the formula (1-Y).

[Chem. 21]

$$(ML_aX_bE_c)_n \qquad (1\text{-}Y)$$

M denotes a transition metal atom of any one of Groups 4 to 11 of the periodic table of the elements, and, in a case where n is 2 or more, the M atoms may be the same as or different from each other. In particular, the transition metal atom is selected from the group consisting of preferably Groups 4-10, more preferably Groups 4, 5, 6, 8, 9, and 10, further preferably Groups 4, 6, 8, and 10, and most preferably Group 4.

L denotes a π-electron conjugated anionic group which contains 70 or less atoms in addition to hydrogen atoms and is attached to the M atoms via a conjugated π electron, and, in a case where a is 2 or more, the L groups may be the same as or different from each other.

X denotes a nonconjugated anionic group containing 70 or less atoms in addition to hydrogen atoms, and, in a case where b is 2 or more, the X groups may be the same as or different from each other.

E denotes a neutral Lewis basic ligand which contains 70 or less atoms in addition to hydrogen atoms and is attached to the M group via one or more unshared electron pairs, and, in a case where c is 2 or more, the E groups may be the same as or different from each other.

a denotes an integer of any of 0 to 6, b denotes an integer of any of 0 to 8, c denotes an integer of any of 0 to 9, and n denotes an integer of any of 1 to 4. In a case where atomicities of the M, L, and X groups are $m^e$, $l^e$, and $x^e$, respectively, a relationship of $me = l^e \times a + x^e \times b$ is satisfied. Two or more of the L, X, and E groups are optionally linked to each other to form a ring. In a case where a is 2 or more, the L groups are optionally linked to each other to form a ring. In a case where b is 2 or more, the X groups are optionally linked to each other to form a ring. In a case where c is 2 or more, the E groups are optionally linked to each other to form a ring. In a case where n is 2 or more, the L groups, the X groups, or the E groups are optionally linked to each other to form a ring.

The π-electron conjugated anionic group may be any group provided that the π-electron conjugated anionic group is an anionic group attached to M via the conjugated π-electron, and examples of the π-electron conjugated anionic group include a cyclopentadienyl group, an indenyl group, a fluorenyl group, a tetrahydroindenyl group, a tetrahydrofluorenyl group, an octahydrofluorenyl group, a pentadienyl group, a cyclohexadienyl group, a dihydroanthracenyl group, a hexahydroanthracenyl group, a decahydroanthracenyl group, a phosphole group, and a boratabenzyl, and derivatives thereof (especially, a $C_{1-10}$ hydrocarbyl substituted derivatives and a tris($C_{1-10}$hydrocarbyl)silyl substituted derivatives. In particular, the π-electron conjugated anionic group is preferably a cyclopentadienyl group, a pentamethyl cyclopentadienyl group, a tetramethyl cyclopentadienyl group, a tetramethyl trimethylsilyl cyclopentadienyl group, an indenyl group, a tetrahydroindenyl group, a 2,3-dimethylindenyl group, a 2-methylindenyl group, a 2-methyl-4-phenylindenyl group, a fluorenyl group, a tetrahydrofluorenyl group, or an octahydrofluorenyl group.

Examples of the nonconjugated anionic group include a hydrogen atom, an oxygen atom, a sulfur atom, a halogen atom, a boron-containing group, an aluminium-containing group, a gallium-containing group, a carbon-containing group, a silicon-containing group, a germanium-containing group, a tin-containing group, a nitrogen-containing group, a phosphorus-containing group, an oxygen-containing group, a sulfur-containing group, a selenium-containing group, a halogen-containing group, and a heterocyclic compound residue.

The halogen atom is a fluorine atom, a chlorine atom, a bromine atom, or an iodine atom, and is preferably a chlorine atom.

A boron-containing group is a group having 1 to 5 boron atoms. A preferable boron-containing group is a hydroboryl group or a group in which a part of or all of hydrogen atoms of a hydroboryl group are replaced with one or a plurality of the following atoms/groups: halogen atoms; nitrogen-containing groups; oxygen-containing groups; hydrocarbyl groups; and groups in each of which a part of or all of hydrocarbyl groups are replaced with one or a plurality of halogen atoms, nitrogen containing groups, and oxygen-containing groups.

The aluminium-containing group is preferably a group in which a boron atom of the boron-containing group is replaced with an aluminium atom, and a gallium-containing group is preferably a group in which a boron atom of the boron-containing group is replaced with a gallium atom.

The carbon-containing group is a hydrocarbyl group or a group in which a part of or all of hydrogen atoms of the hydrocarbyl group are replaced with at least one of a halogen atom, a boron-containing group, an aluminium-containing group, a gallium-containing group, a silicon-containing group, a germanium-containing group, a tin-containing group, a nitrogen-containing group, a phosphorus-containing group, an oxygen-containing group, a sulfur-containing group, a selenium-containing group, a halogen-containing group, and a heterocyclic compound residue. Specific examples of the hydrocarbyl group include: linear or branched alkyl groups having 1 to 30 carbon atoms, preferably 1 to 20 carbon atoms, such as methyl group, ethyl group, n-propyl group, isopropyl group, n-butyl group, isobutyl group, sec-butyl group, tert-butyl group, n-pentyl group, neopentyl group, and n-hexyl group; cyclic alkyl groups having 3 to 30 carbon atoms, preferably 3 to 20 carbon atoms, such as cyclopropyl group, cyclobutyl group, cyclopentyl group, cyclohexyl group, norbornyl group, and adamantyl group; aryl groups having 6 to 30 carbon atoms, preferably 6 to 20 carbon atoms such as phenyl group, naphthyl group, anthryl group, phenanthryl group, biphenyl group, and terphenyl group; linear or branched alkenyl groups having 2 to 30 carbon atoms, preferably 2 to 20 carbon atoms, such as vinyl group, allyl group, and isopropenyl group; and linear or branched alkynyl group having 2 to 30 carbon atoms, preferably 2 to 20 carbon atoms, such as ethynyl group and propargyl group. Further, the hydrocarbyl group is also optionally a group in which a part of or all of the hydrogen atoms are replaced with other hydrocarbyl groups. Examples of hydrocarbyl groups replaced with the other hydrocarbyl groups include: aralkyl groups such as benzyl and cumyl; and alkyl-substituted aryl groups such as tolyl group, isopropylphenyl group, tert-butylphenyl group, dimethylphenyl group, and di-tert-butylphenyl group.

A silicon-containing group is a group having 1 to 5 silicon atoms, and a preferable silicon-containing group is as follows: hydrocarbyl-substituted silyloxy groups such as a methylsilyl group, a dimethylsilyl group, a trimetylsilyl group, an ethylsilyl group, a diethylsilyl group, a triethylsilyl group, a diphenylmethylsilyl group, a triphenylsilyl group, a dimethylphenylsilyl group, a dimethyl-t-butylsilyl group, a dimethyl(pentafluorophenyl)silyl group; hydrocarbyl-substituted silylalkyl groups such as trimetylsilylmethyl group; and hydrocarbyl-substituted silylaryl groups such as a trimetylsilylphenyl group.

The germanium-containing group is preferably a group in which a silicon atom of the silicon-containing group is replaced with a germanium atom, and the tin-containing group is preferably a group in which the silicon atom of the silicon-containing group is replaced with a tin atom.

The nitrogen-containing group is a group having 1 to 5 nitrogen atoms, and a preferable nitrogen content group is as follows: an alkylamino group such as an amino group, a methylamino group, a dimethylamino group, a diethylamino group, a dicyclohexylamino group, a benzylamino group, and a cumylamino group; an arylamino group such as a phenylamino group, a diphenylamino group, a ditlylamino group, a dinaphthylamino group, and a methylphenylamino group; an aralkylamino group such as a benzylamino group and a cumylamino group; an imino group; an amide group; an imido group; a hydrazino group; a hydrazono group; a nitro group; a nitroso group; a cyano group; an isocyano group; a cyanate ester group; an amidino group; a diazo group, and the like.

The phosphorus-containing group is a group having 1 to 5 phosphorus atoms, and are preferably a phosphide group, a phosphoryl group, a thiophosphoryl group, a phosphate group, etc.

An oxygen-containing group is a group having 1 to 5 oxygen atoms, and a preferable oxygen-containing group is as follows: an alkoxy groups such as a hydroxy group, a methoxy group, an ethoxy group, a phenylmethoxy group, and a phenylethoxy group; an aryloxy groups such as a phenoxy group, a methylphenoxy group, a dimethylphenoxy group, and a naphthoxy group; an acyl group; an ester group; a carboxyl group; a carboxylic acid group; a carbonate group; a carboxylic anhydride group, a peroxy group, etc.

The sulfur-containing group is a group having 1 to 5 sulfur atoms, and preferable sulfur-containing groups are a mercapto group, an alkylthio group, an arylthio group, a thioacyl group, a thioester group, a dithioester group, a thioether group, a thiocyanate group, an isothiocyanate group, a sulfonate group, a sulfonamide group, a thiocarboxyl group, a dithiocarboxyl group, a sulfo group, a sulfonyl group, a sulfinyl group, a sulfenyl group, etc.

A preferable selenium-containing group is a group in which a sulfur atom of the sulfur-containing group is replaced with a selenium atom.

A preferable halogen-containing group is as follows: a fluorine-containing group such as $PF_6$ and $BF_4$; a chlorine-containing group such as $ClO_4$ and $SbCl_6$; and an iodine-containing group such as $IO_4$.

A preferable heterocyclic compound residue is as follows: residues of nitrogen-containing compounds such as pyrrole, pyridine, pyrimidine quinoline, and triazine; oxygen-containing compounds such as furan and pyrane; sulfur-containing compounds such as thiophene; and a group in which any of the residues of the heterocyclic compounds is substituted with an alkyl group, an alkoxy group, or the like having 1 to 30 carbon atoms, preferably 1 to 20 carbon atoms.

The neutral Lewis basic ligand may be any neutral ligand provided that the neutral Lewis basic ligand is attached to M via one or more unshared electron pairs, and examples of the neutral Lewis basic ligand include: linear or cyclic saturated or unsaturated ethers such as dimethyl ether, diethyl ether, diisopropyl ether, tetrahydrofuran, dimethoxyethane, furan, dioxane, dimethylfuran, anisole, diphenyl ether, and methyl-t-butyl ether; linear or cyclic saturated or unsaturated aldehydes such as acetaldehyde, propionaldehyde, n-butylaldehyde, benzaldehyde, p-tolylaldehyde, p-nitrobenzaldehyde, and phenylacetaldehyde; linear or cyclic saturated or unsaturated ketones such as acetone, methyl ethyl ketone, methyl-n-propyl ketone, acetophenone, benzophenone, n-butyrophenone, and benzyl methyl ketone; linear or cyclic saturated or unsaturated esters such as methyl acetate, ethyl acetate, benzyl acetate, phenyl acetate, ethyl formate, ethyl propionate, ethyl stearate, and ethyl benzoate; linear or cyclic saturated or unsaturated acid anhydrides such as acetic anhydride, succinic anhydride, and maleic anhydride; linear or cyclic saturated or unsaturated amides such as formamide, acetamide, benzamide, n-valeric amide, stearylamide, N, N-dimethylformamide, N,N-dimethylacetamide, N,N-diethylpropionamide, and N,N-dimethyl-n-butyramide; linear or cyclic saturated or unsaturated imides such as succinimide and phthalimide; linear or cyclic saturated or unsaturated amines such as trimethylamine, triethylamine, triphenylamine, dimethylamine, N,N,N',N'-tetramethylethylenediamine, aniline, N, N-dimethylaniline, pyrrolidine, piperidine, and morpholine; linear or cyclic saturated or unsaturated imines such as methanimine, ethanimine, phenylmethaneimine, and N-methylmethanimine; azotic heterocyclic compounds such as pyridine, α-picoline, β-picoline, quinoline, isoquinoline, 2-methylpyridine, pyrrole, oxazol, imidazole, pyrazole, and indole; thioethers such as dimethylsulfide, methylphenylsulfide, and diphenylsulfide; sulfoxides such as dimethylsulfoxide, methylphenylsulfoxide and diphenylsulfoxide; sulfones such as dimethylsulfone, methylphenylsulfone, and diphenylsulfone; sulfuric heterocyclic compounds such as thiophene and thiazole; phosphines such as trimethylphosphine, triethylphosphine and triphenylphosphine; phosphites such as trimethyl phosphite and triphenyl phosphite; phosphine oxides such as trimethylphosphine oxide and triphenylphosphine oxide; saturated or unsaturated nitriles such as acetonitrile and benzonitrile; inorganic compounds such as carbon monoxide and carbon dioxide; inorganic salts such as lithium chloride, sodium chloride, potassium chloride, magnesium chloride, and calcium chloride.

The transition metal compound (A-Y) forming a polymerization catalyst (Y) for use in the present invention is preferably selected from transition metal compounds represented by the following general formulae (1-Y-1), (1-Y-2), (1-Y-3), (1-Y-4), (1-Y-5), (1-Y-6), (1-Y-7), and (1-Y-8). The following description will discuss the transition metal compounds represented by the following general formulae (1-Y-1), (1-Y-2), (1-Y-3), (1-Y-4), (1-Y-5), (1-Y-6), (1-Y-7), and (1-Y-8).

[Chem. 22]

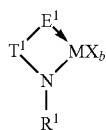

(1-Y-1)

In the general formula (1-Y-1), M, X, and b denotes the same ones to those in the formula (1-Y), M preferably denotes a transition metal atom of Group 4, and, specifically, a titanium atom, a zirconium atom, or a hafnium atom, and particularly preferably a hafnium atom.

$R^1$ denotes a hydrocarbyl group having 1 to 30 atoms in addition to a hydrogen atom. Specific examples of the hydrocarbyl group include: alkyl groups such as a methyl group, an ethyl group, a propyl group, a butyl group, a hexyl group, an octyl group, a nonyl group, a dodecyl group, and an eicosyl group; cycloalkyl groups having 3 to 30 carbon atoms such as a cyclopentyl group, a cyclohexyl group, a norbornyl group, an adamantyl group; aralkyl groups such as a benzyl group, a phenylethyl group, and a phenylpropyl group; and aryl groups such as a phenyl group, a tolyl group, a dimethylphenyl group, a trimetylphenyl group, an ethylphenyl group, a propylphenyl group, an isopropylphenyl group, a diisopropylphenyl group, a triisopropylphenyl group, a tert-butylphenyl group, a di-tert-butylphenyl group, a tri-tert-butylphenyl group, a biphenyl group, a naphthyl group, a methylnaphthyl group, an anthryl group, and a phenanthryl group. Further, those hydrocarbyl groups include a halohydrocarbyl group, specifically, a group in which at least one hydrogen atom of the hydrocarbyl group having 1 to 20 carbon atoms is replaced with a halogen atom.

$T^1$ denotes a bivalent crosslinking group having 1 to 40 atoms in addition to a hydrogen atom, and is preferably a crosslinking group having 1 to 20 atoms in addition to a hydrogen atom, and is more preferably a methylene group or silylene group in which one or two hydrocarbyl groups having 1 to 20 carbon atoms are substituted. Specific examples of the bivalent crosslinking group include: alkyl groups such as methyl group, ethyl group, propyl group, butyl group, hexyl group, octyl group, nonyl group, and dodecyl group; cycloalkyl groups having 3 to 20 carbon atoms such as cyclopentyl, cyclohexyl group, norbornyl group, and adamantyl group; aralkyl groups such as a benzyl group, a phenylethyl group, and a phenylpropyl group; a methylene group or a silylene group in which one or two aryl groups are substituted, which aryl groups are a phenyl group, a tolyl group, a dimethylphenyl group, a trimetylphenyl group, an ethylphenyl group, a propylphenyl group, an isopropylphenyl group, a diisopropylphenyl group, a triisopropylphenyl group, a tert-butylphenyl group, a di-tert-butylphenyl group, a tri-tert-butylphenyl group, a biphenyl group, a naphthyl group, a methylnaphthyl group, an anthryl group, a phenanthryl group, and the like. Among those, the methylene group or the silylene group in which one aryl group having 6 to 20 carbon atoms is substituted is preferable, and a methylene group or silylene group in which a substituted phenyl group or a condensed polycyclic aryl group is substituted is more preferable.

$E^1$ denotes a heterocyclic compound residue having 5 to 40 carbon atoms and having Lewis basicity, and includes a pyridine-2-yl group, a pyrimidine-2-yl group, a quinolin-2-yl group, an isoquinoline-2-yl group, an imidazole-2-yl group, a furan-2-yl group, a 1,4-dioxin-2-yl group, a 1,4-dioxane-2-yl group, a pyrane-2-yl group, a thiophene-2-yl group, etc. The heterocyclic compound residue is preferably a pyridine-2-yl group, a substituted pyridine-2-yl group, and bivalent derivatives thereof.

The transition metal compound represented by the general formula (1-Y-1) is preferably a compound represented by the following general formula (1-Y-1a).

[Chem. 23]

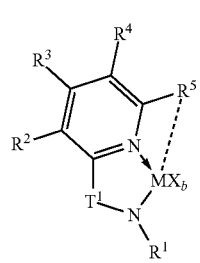

(1-Y-1a)

M, X, $R^1$, $T^1$, and b in the general formula (1-Y-1a) denote the same ones to those in the general formula (1-Y-1). $R^1$ preferably denotes an aryl group having 6 to 20 carbon atoms such as a phenyl group, a tolyl group, a dimethylphenyl group, a trimetylphenyl group, an ethylphenyl group, a propylphenyl group, an isopropylphenyl group, a diisopropylphenyl group, a triisopropylphenyl group, a tert-butylphenyl group, a di-tert-butylphenyl group, a tri-tert-butylphenyl group, a biphenyl group, a naphthyl group, a methylnaphthyl group, an anthryl group, or a phenanthryl group.

$R^2$ to $R^4$ denote a hydrogen atom, a halogen atom, a silyl group, a hydrocarbyl group having 1 to 20 carbon atoms, or a group in which a hydrogen atom of the hydrocarbyl group is replaced with a heteroatom-containing group, and preferably denote a hydrogen atom or an alkyl group having 1 to 4 carbon atoms.

$R^5$ denotes a silyl group, a hydrocarbyl group having 1 to 20 carbon atoms, or a group in which a hydrogen atom of the hydrocarbyl group is replaced with a heteroatom-containing group, and preferably denotes an aryl group having 6 to 20 carbon atoms. Further, the groups of $R^2$ to $R^5$ can be attached to adjacent groups to form a condensed-ring derivative.

The transition metal compound represented by the general formula (1-Y-1a) is more preferably a compound represented by the following general formula (1-Y-1b).

[Chem. 24]

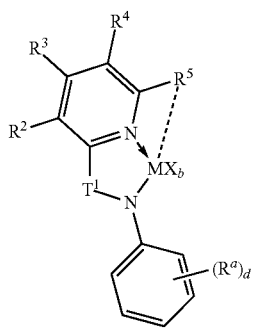

(1-Y-1b)

In the general formula (1-Y-1b), M, X, $R^2$ to $R^5$, $T^1$, and b are to the same as those in the general formula (1-Y-1a). $R^5$ is preferably an aryl group having 6 to 20 carbon atoms such as phenyl group, tolyl group, dimethylphenyl group, trimethylphenyl group, ethylphenyl group, propylphenyl group, isopropylphenyl group, diisopropyl phenyl group, triisopropylphenyl group, tert-butylphenyl group, di-tert-butylphenyl group, tri-tert-butylphenyl group, biphenyl group, naphthyl group, methyl naphthyl group, anthryl group, and phenanthryl group.

The bivalent crosslinking group $T^1$ is preferably —$CR^6R^7$— or —$SiR^6R^7$—, further preferably —$CR^6R^7$—.

$R^6$ and $R^7$ are each independently a hydrogen atom, a halogen atom, or an alkyl group or aryl group having 1 to 20 carbon atoms. Preferably, one of $R^6$ and $R^7$ is a hydrogen atom, and the other is an aryl group having 6 to 20 carbon atoms.

$R^a$ is each independently an alkyl group having 1 to 4 carbon atoms. $R^a$ is preferably methyl group, ethyl group, n-propyl group, isopropyl group, n-butyl group, isobutyl group, sec-butyl group, or t-butyl group, and d is 1 to 5.

The aryl group substituted with $R^a$ is preferably 2,4,6-trimethylphenyl group, 2,4,6-triethylphenyl group, 2,4,6-triisopropylphenyl group, 2,4,6-tri-t-butylphenyl group, 2,6-dimethylphenyl group, 2,6-diethylphenyl group, 2,6-diisopropylphenyl group, or 2,6-di-t-butylphenyl group.

The transition metal compound represented by the general formula (1-Y-1b) is more preferably a compound represented by the following general formula (1-Y-1c).

[Chem. 25]

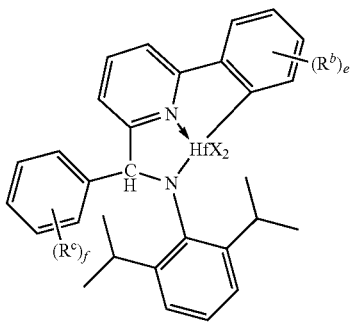

(1-Y-1c)

In the general formula (1-Y-1c), X is the same as that in the general formula (1-Y-1b), preferably a halogen atom, an N,N-dimethylamide group, or an alkyl group having 1 to 4 carbon atoms, further preferably a methyl group.

$R^b$ and $R^c$ are each a hydrogen atom, a halogen atom, an alkyl group having 1 to 6 carbon atoms, or an aryl group having 6 to 20 carbon atoms. $R^b$ groups and $R^c$ groups may be bonded to each other to form a condensed ring derivative in some cases. Further, e is 1 to 4, and f is 1 to 5.

The phenylene group substituted with $R^b$ is preferably 5-methyl phenylene group, 5-ethyl phenylene group, 5-isopropyl phenylene group, or 5-cyclohexyl phenylene group. The condensed ring derivative formed by the bonding between $R^b$ groups is preferably naphthalenyl group, anthryl group, or phenanthryl group.

The phenyl group substituted with $R^c$ is preferably 2,4,6-trimethylphenyl group, 2,4,6-triethylphenyl group, 2,4,6-triisopropylphenyl group, 2,4,6-tricyclohexylphenyl group, 2,6-dimethylphenyl group, 2,6-diethylphenyl group, 2,6-diisopropylphenyl group, 2,6-dicyclohexylphenyl group, 2-methylphenyl group, 2-ethylphenyl group, 2-isopropylphenyl group, or 2-cyclohexylphenyl group. The condensed ring derivative formed by the bonding between $R^c$ groups is preferably naphthalenyl group, anthryl group, or phenanthryl group.

The transition metal compound represented by the general formula (1-Y-1c) is more preferably a compound represented by the following general formulae (1-Y-1d) and (1-Y-1e).

[[Chem. 26]

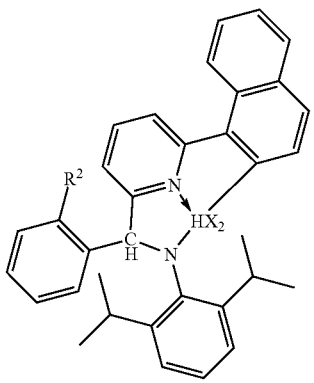

(1-Y-1d)

(1-Y-1e)

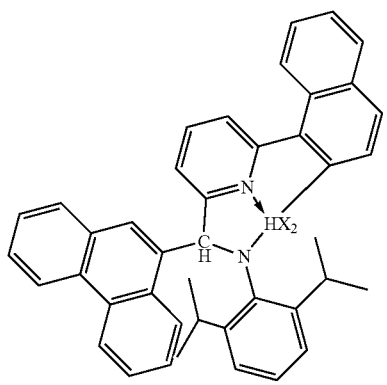

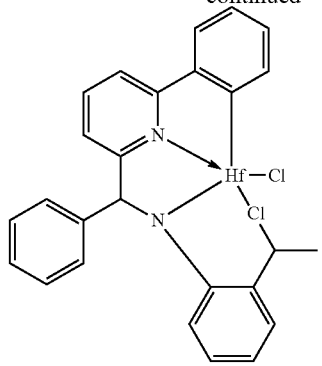

In the general formulae (1-Y-1d) and (1-Y-1e), X is the same as that in the general formula (1-Y-1c), preferably a halogen atom, an N,N-dimethylamide group, or an alkyl group having 1 to 4 carbon atoms, and more preferably a methyl group.

$R^8$ is an alkyl group or cycloalkyl group having 1 to 6 carbon atoms, preferably methyl group, isopropyl group, t-butyl group, or cyclohexyl group.

The following illustrates specific structures of the transition metal compound (A-Y) represented by the general formula (1-Y-1). The transition metal compound (A-Y) represented by the general formula (1-Y-1) is, however, not limited to these structures.

[[Chem. 27]]

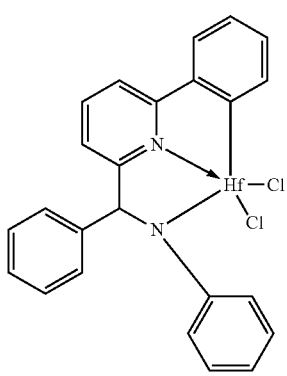

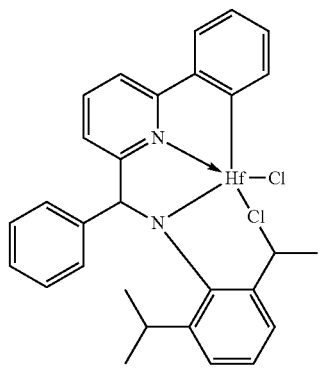

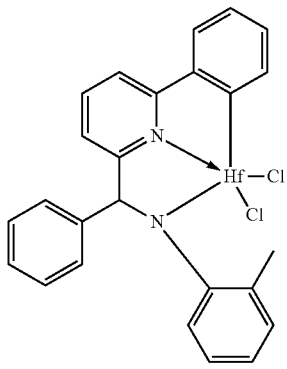

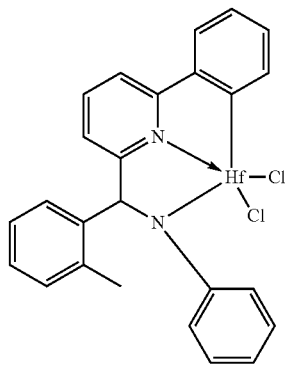

115
-continued
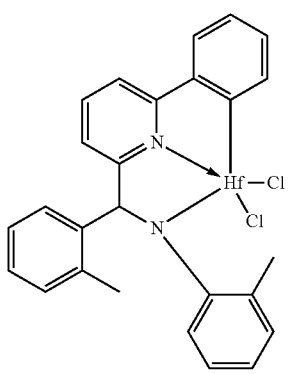
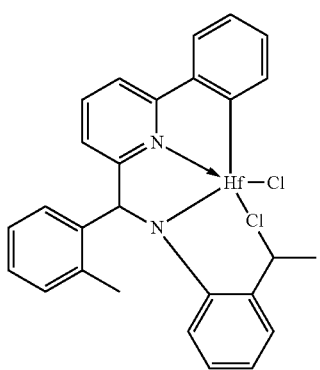
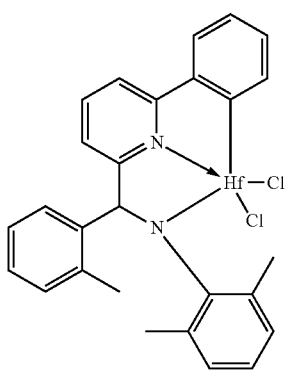
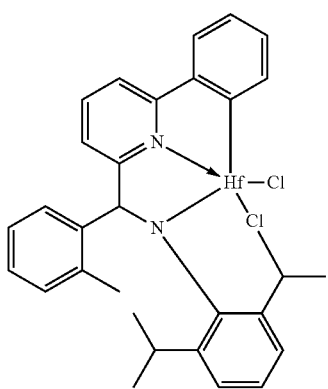
116
-continued
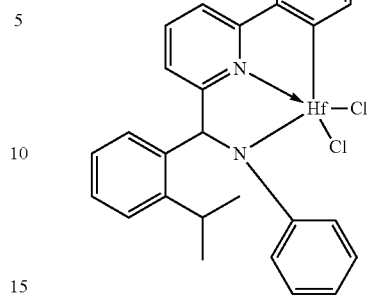
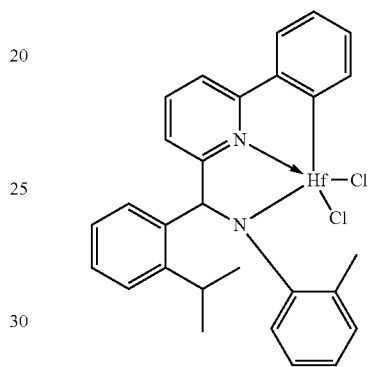
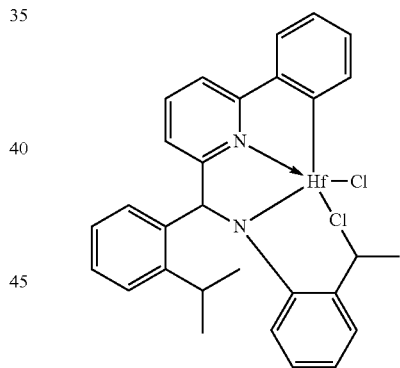
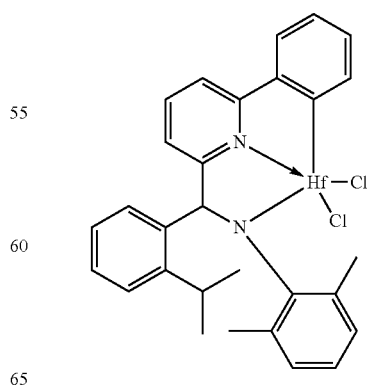

117
-continued
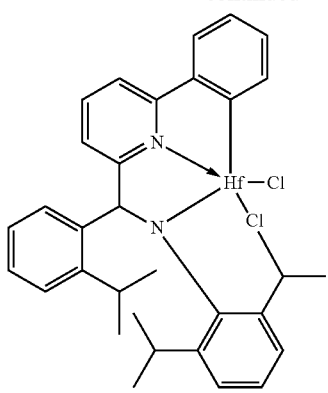
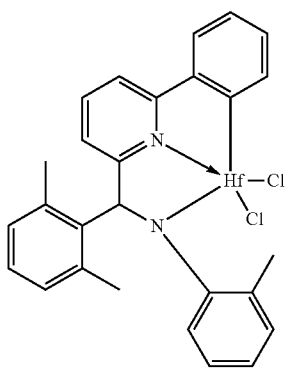
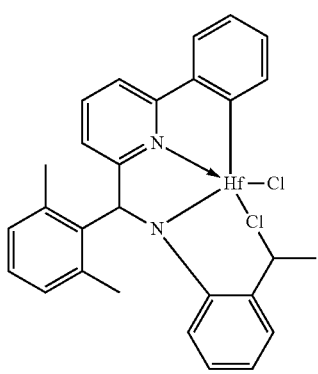
118
-continued
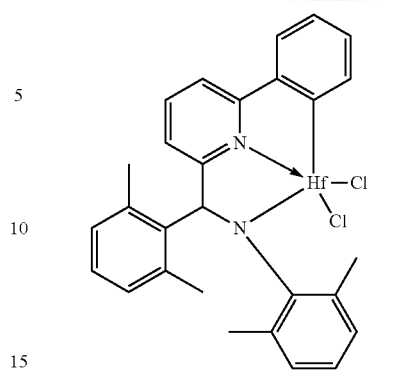
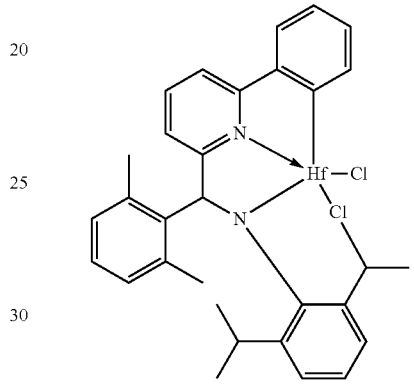
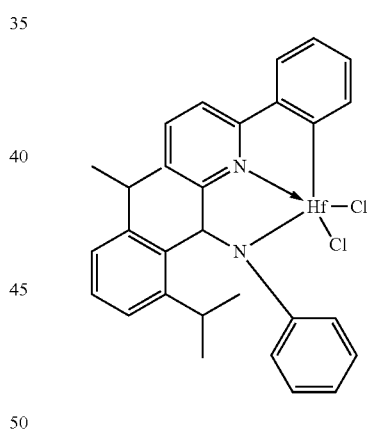
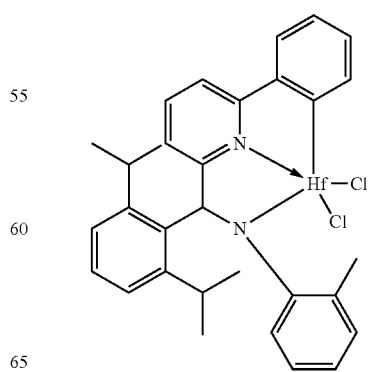

119
-continued
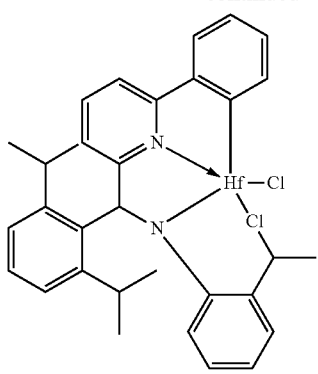
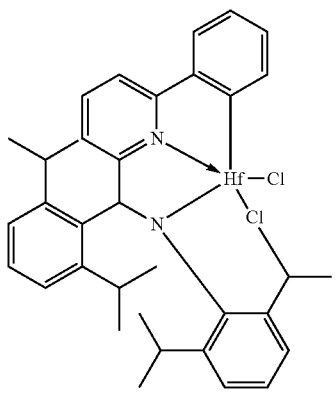
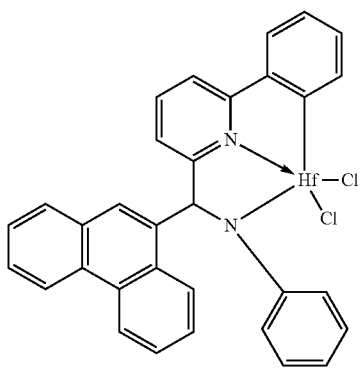
120
-continued
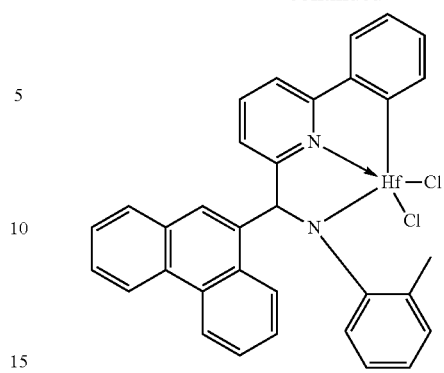
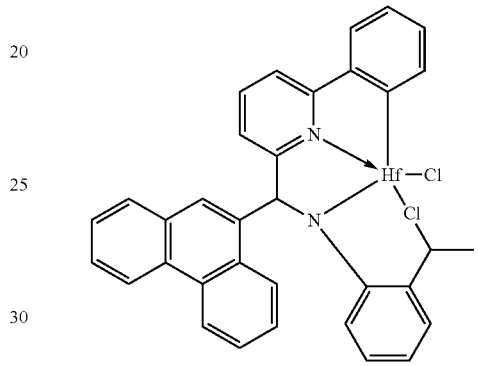
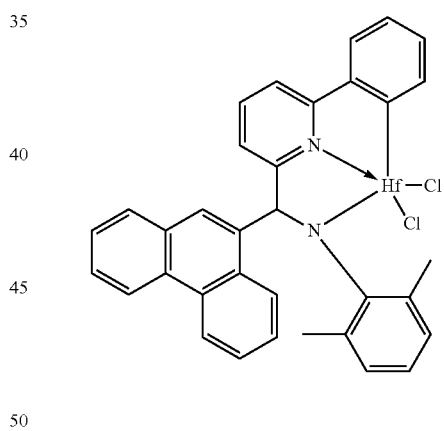
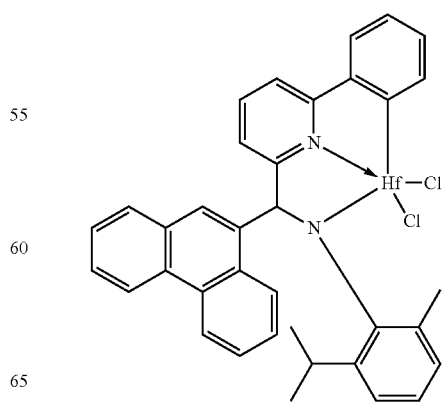

121
-continued
[Chem. 28]
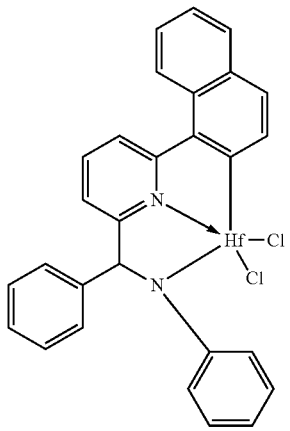
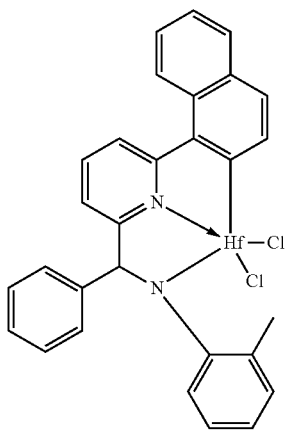
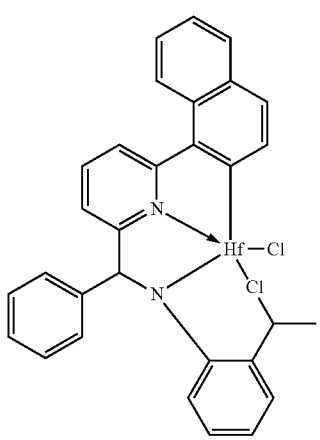
122
-continued
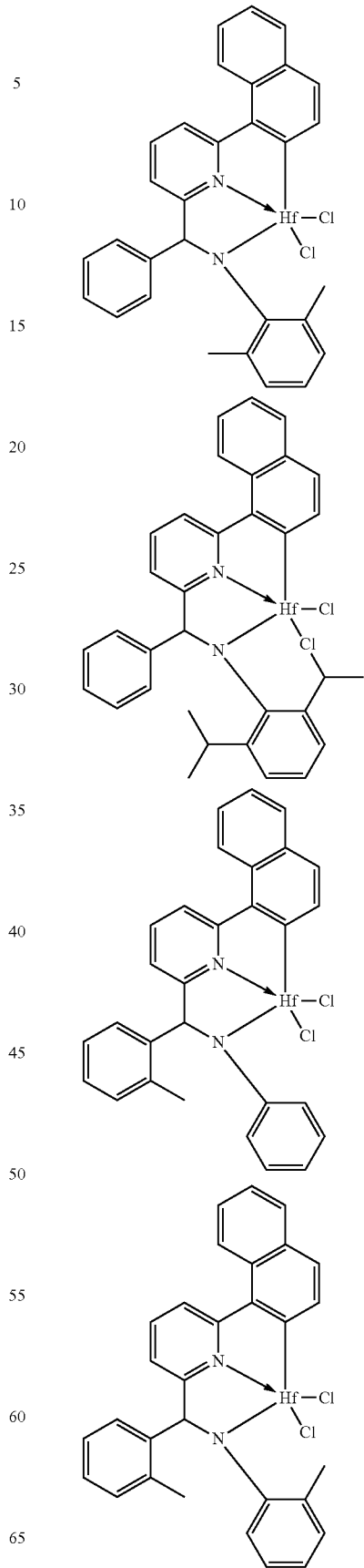

123
-continued
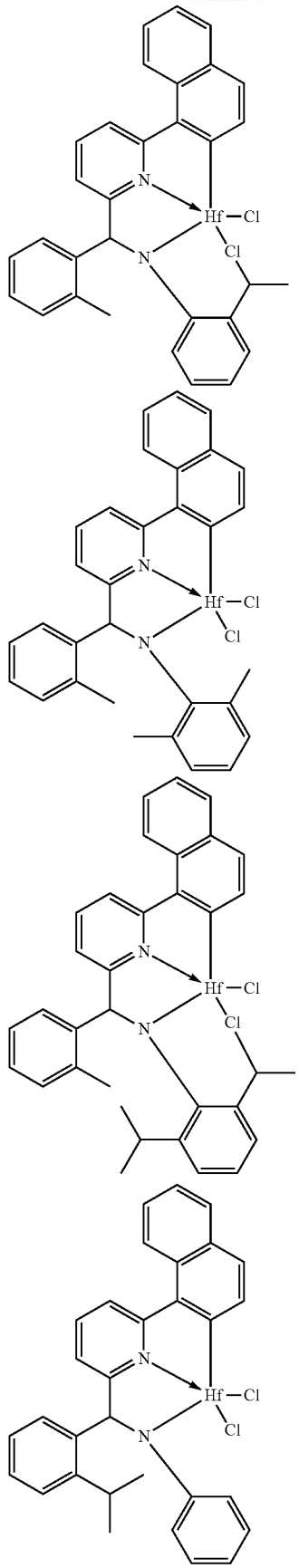
124
-continued
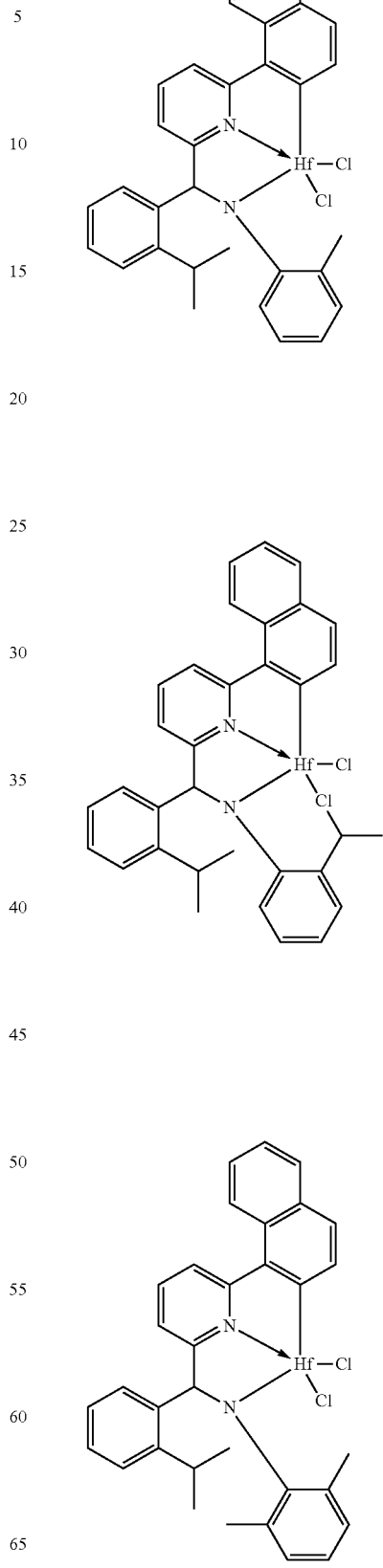

125
-continued
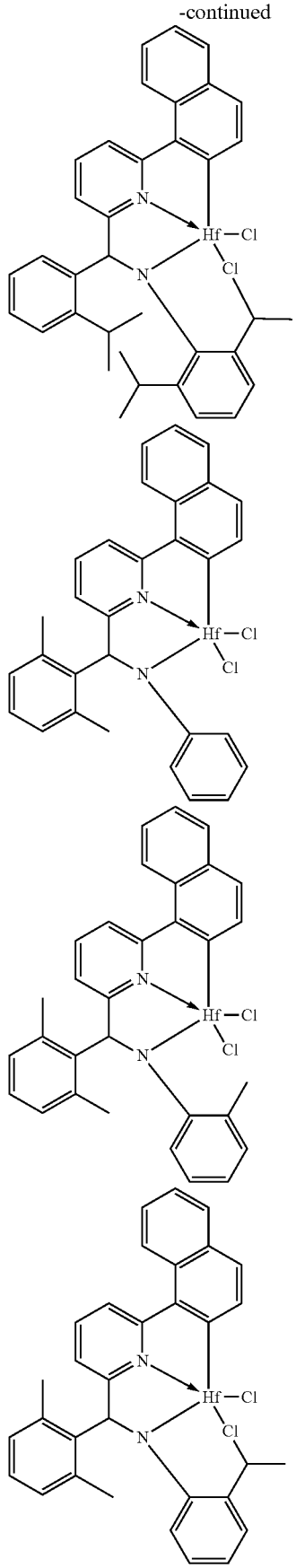
126
-continued
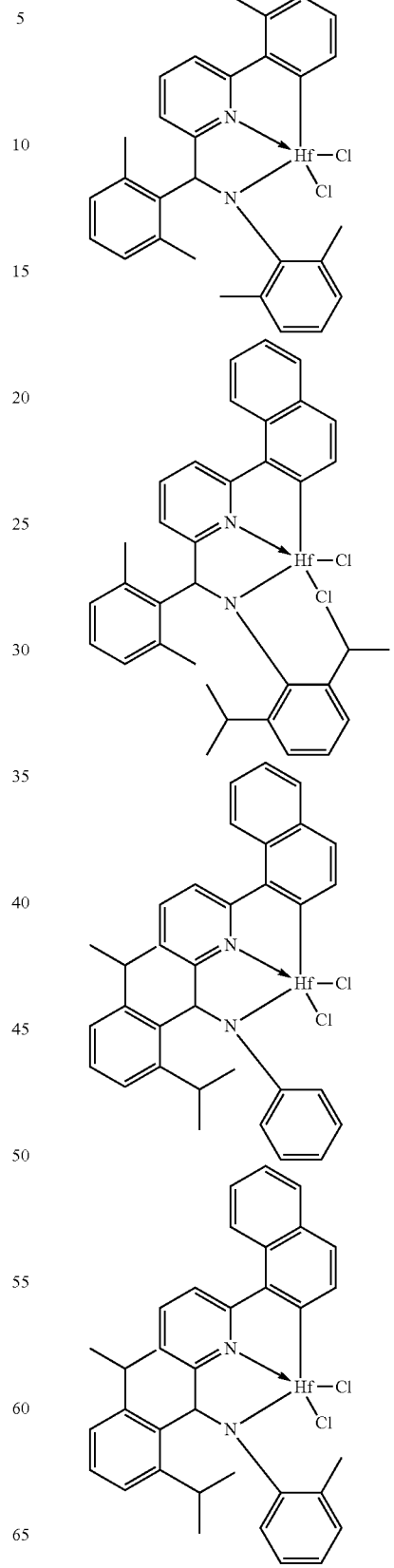

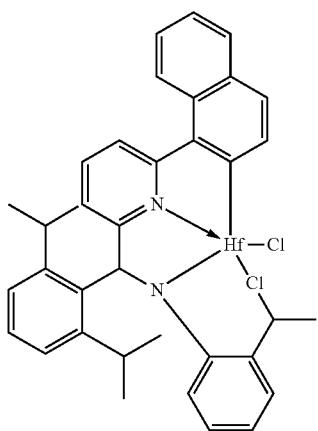
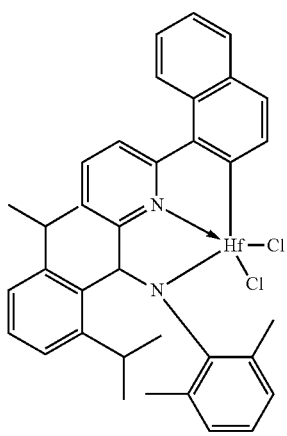
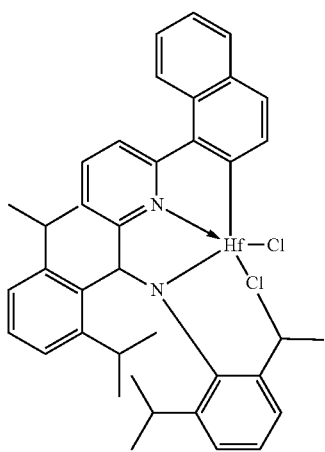
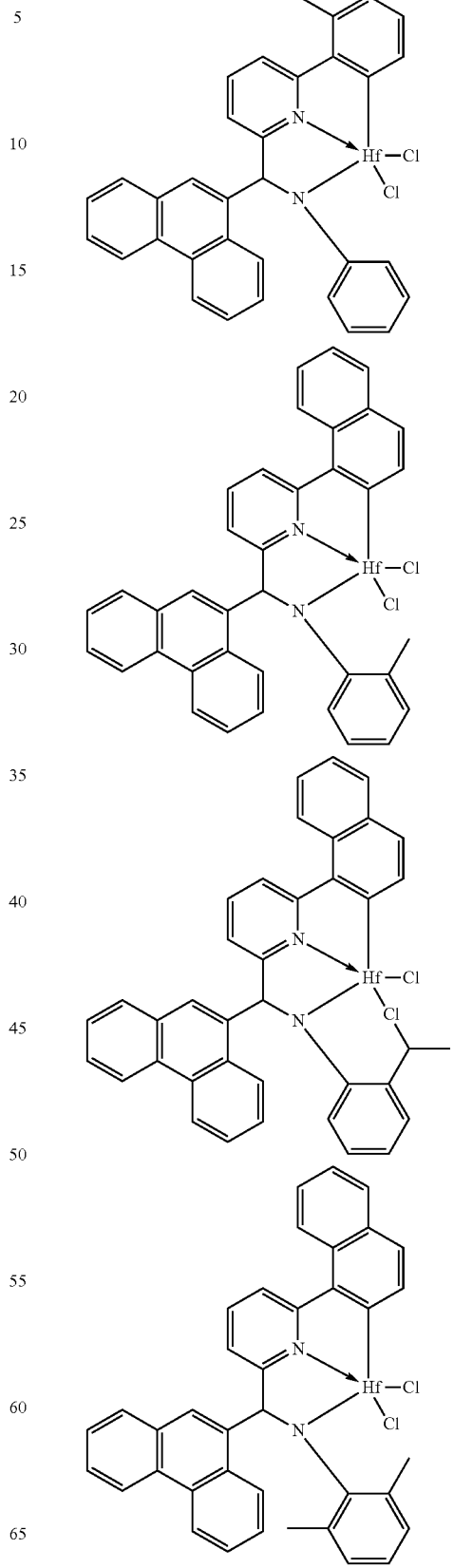

-continued
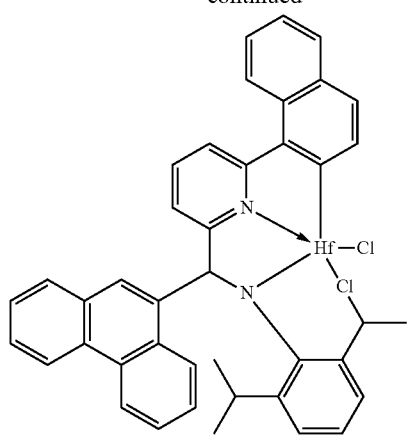
[Chem. 29]
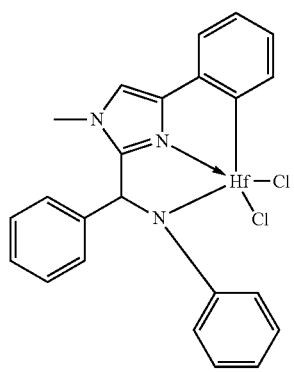
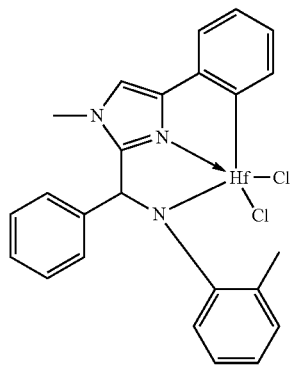
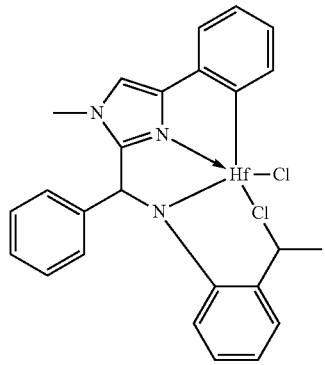
-continued
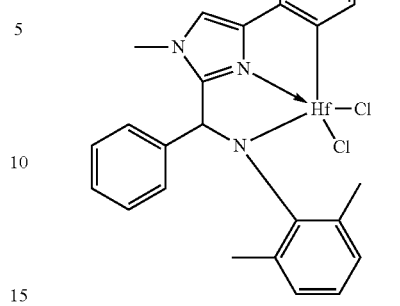
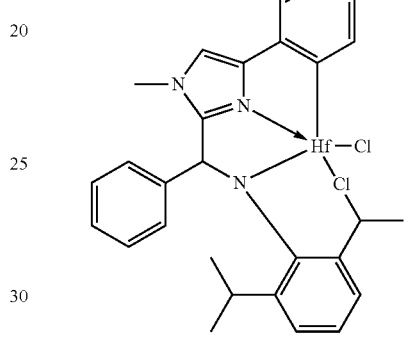
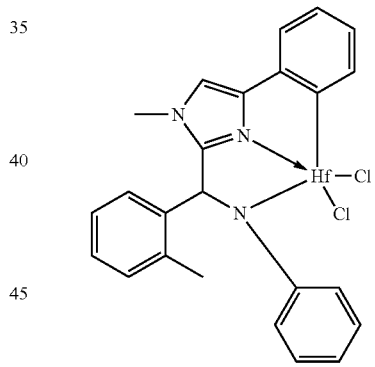
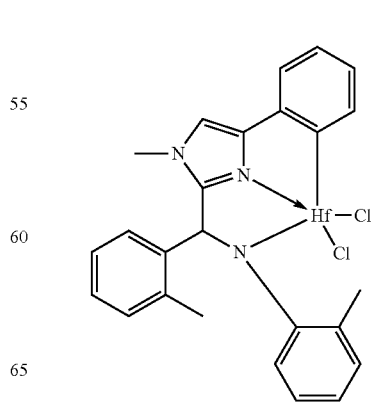

131
-continued
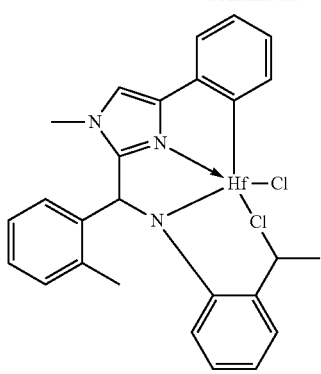
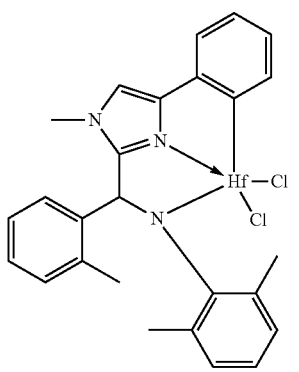
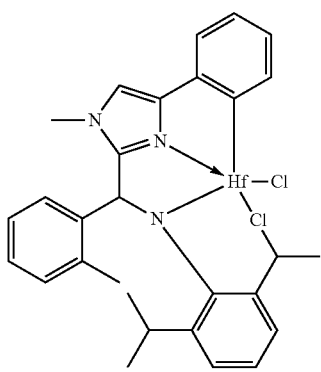
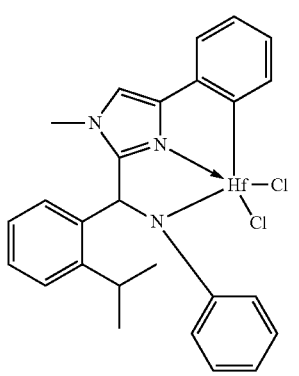
132
-continued
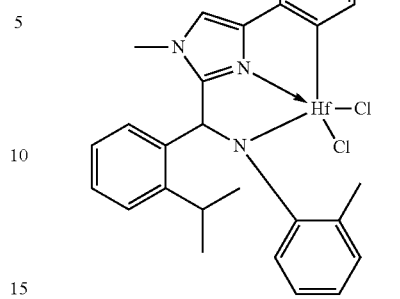
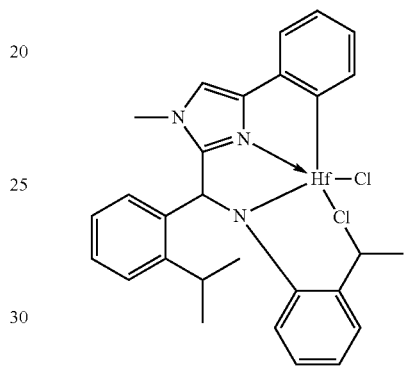
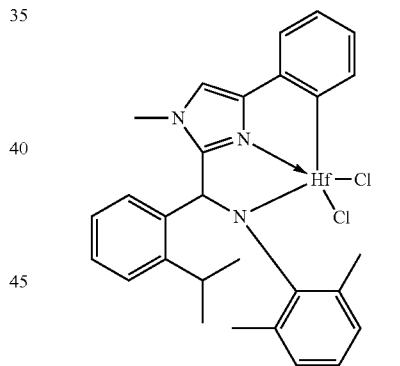
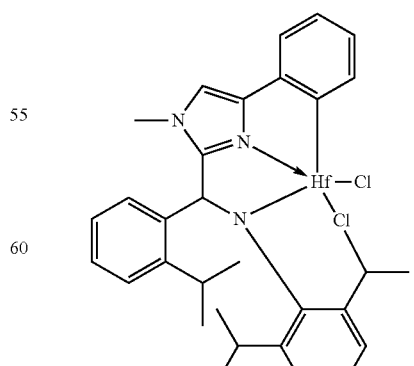

133
-continued
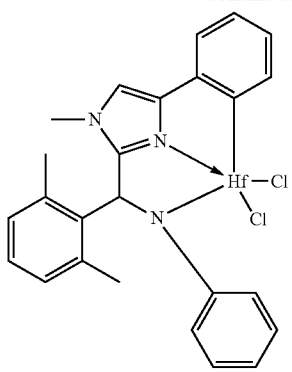
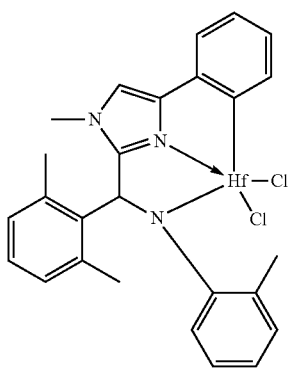
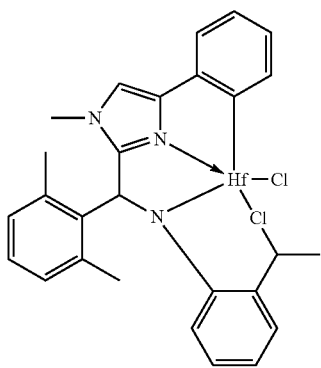
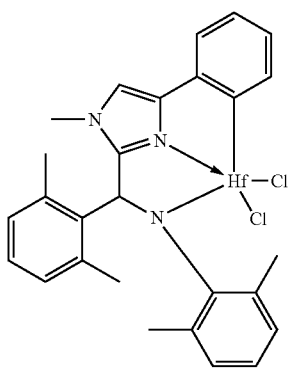
134
-continued
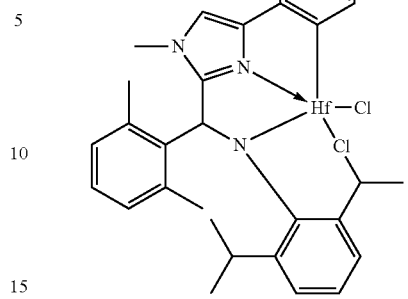
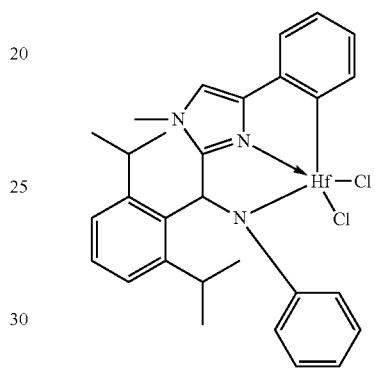
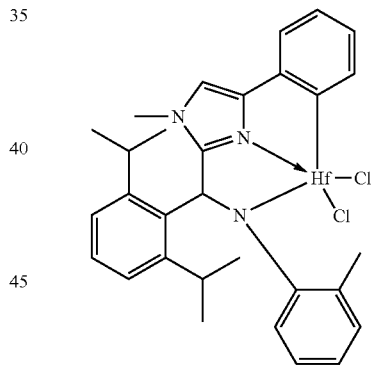
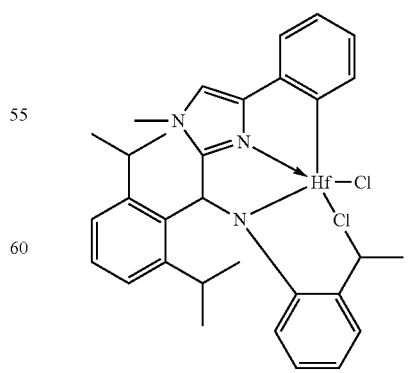

135
-continued
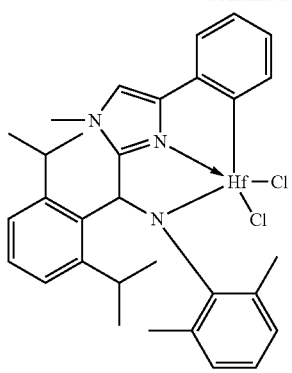
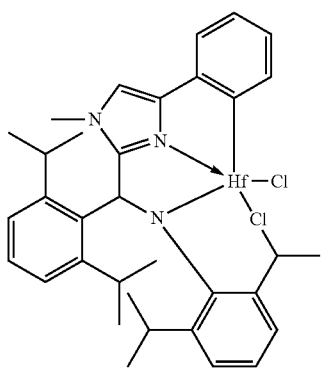
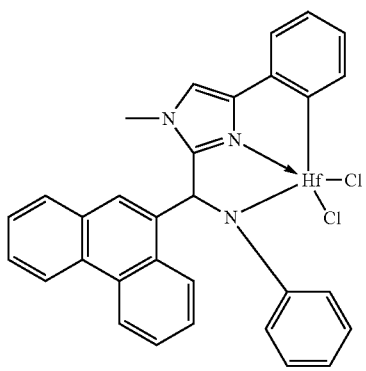
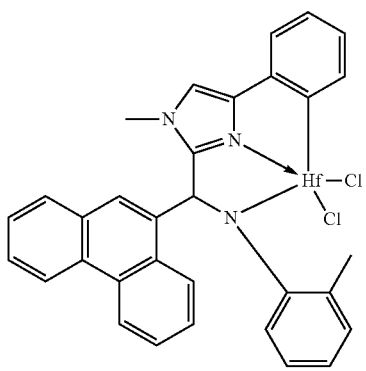
136
-continued
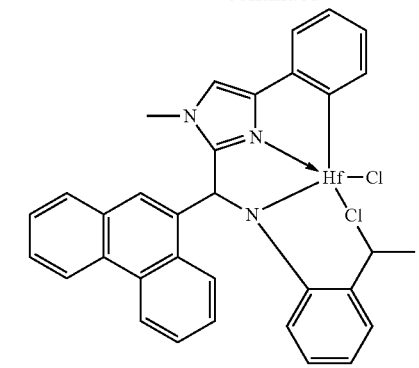
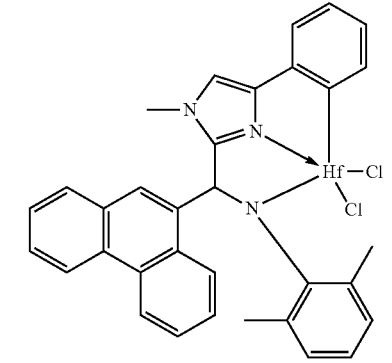
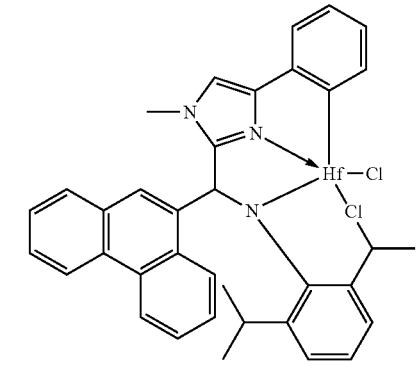
[Chem. 30]
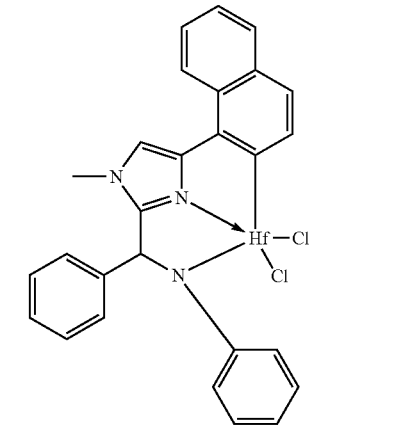

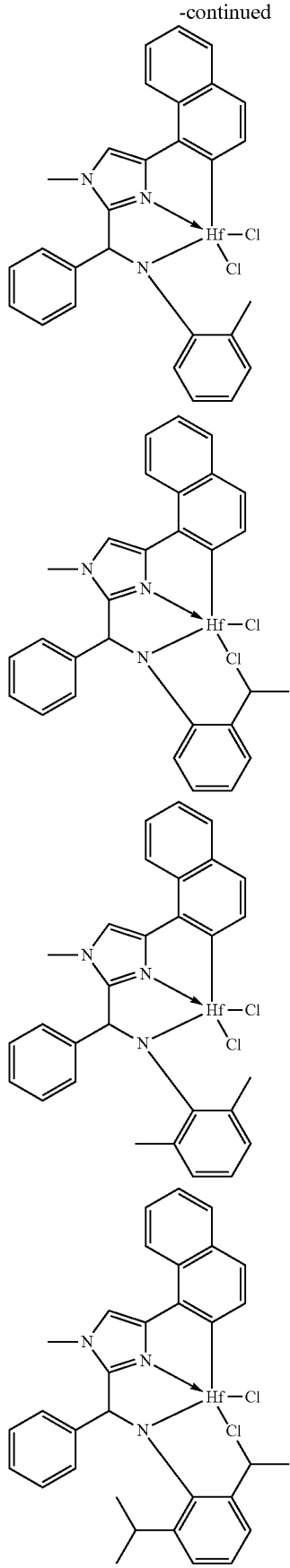
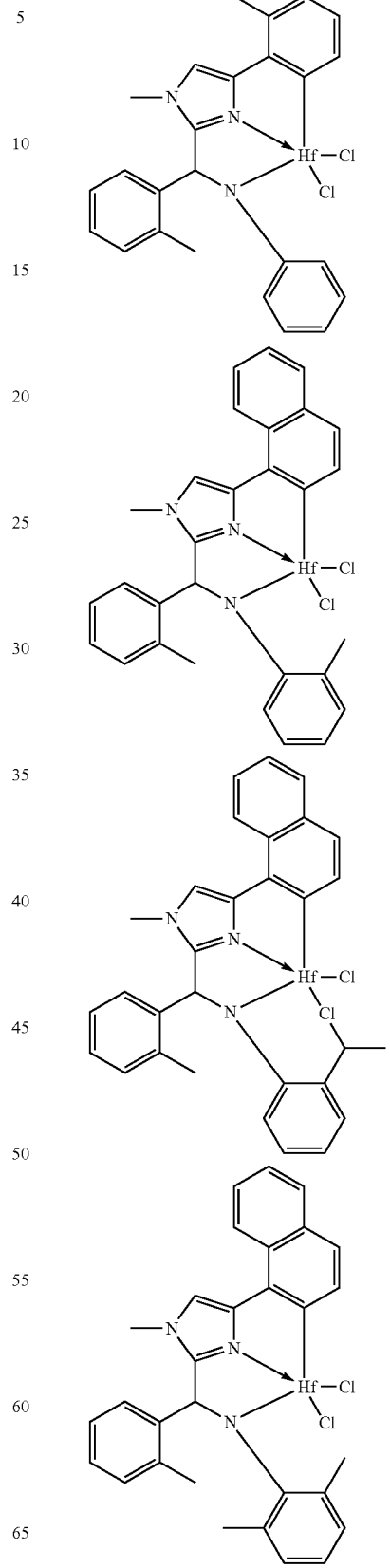

139
-continued
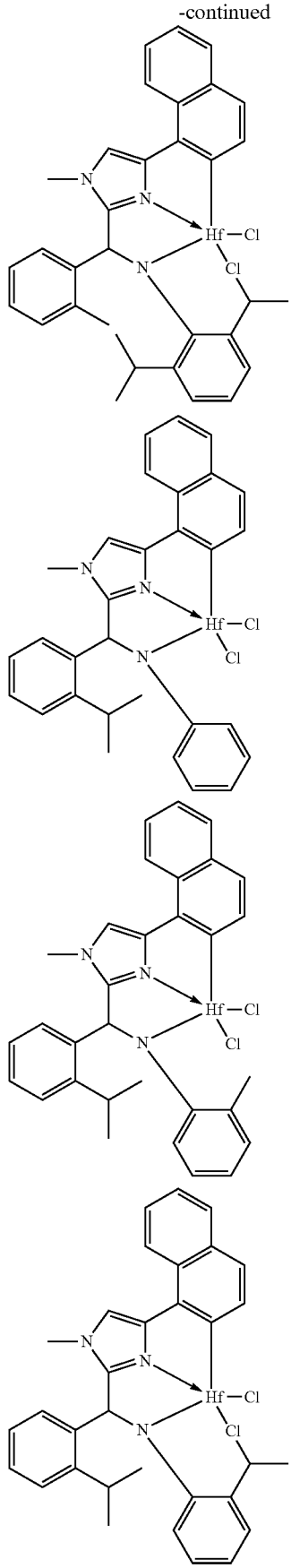
140
-continued
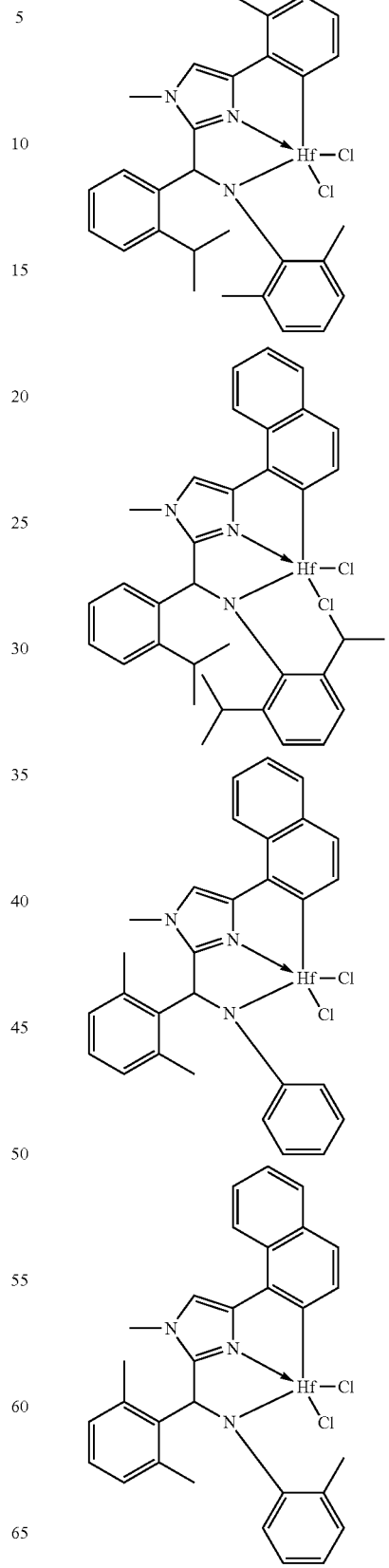

141
-continued
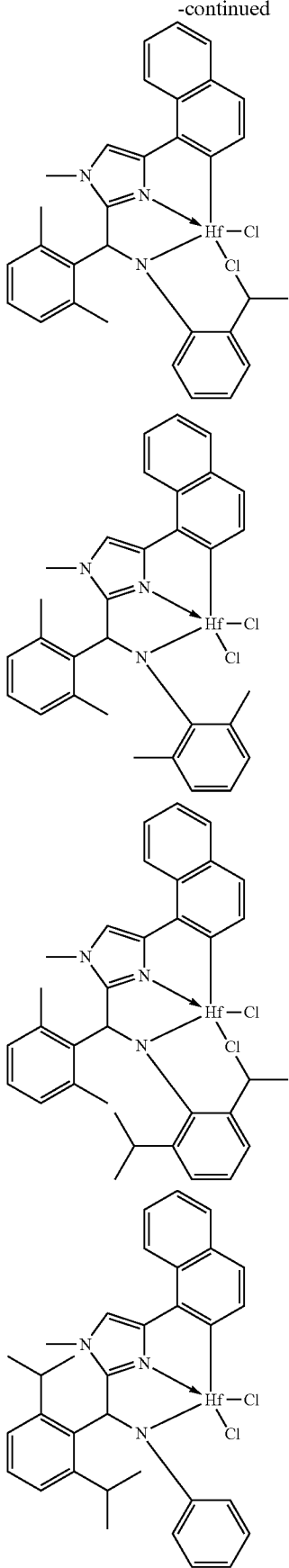
142
-continued
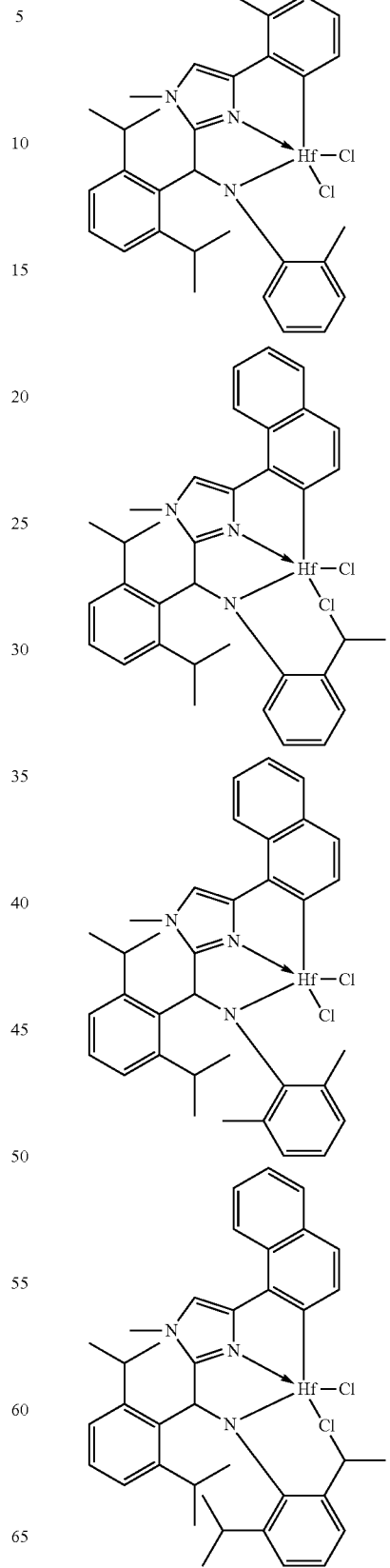

-continued

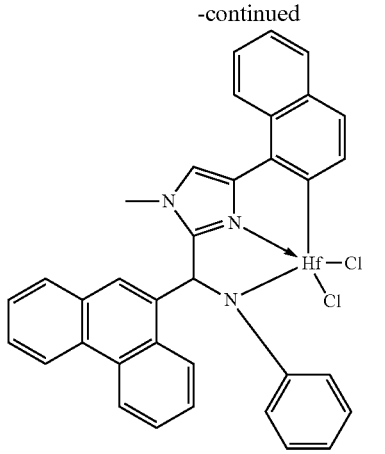

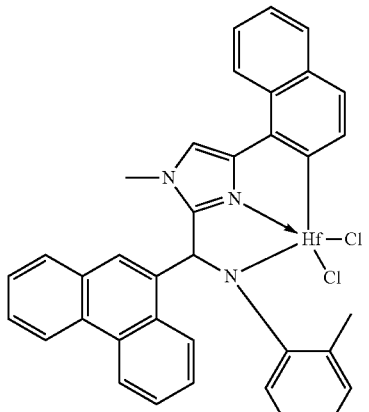

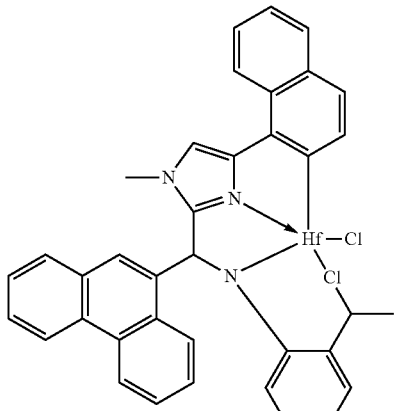

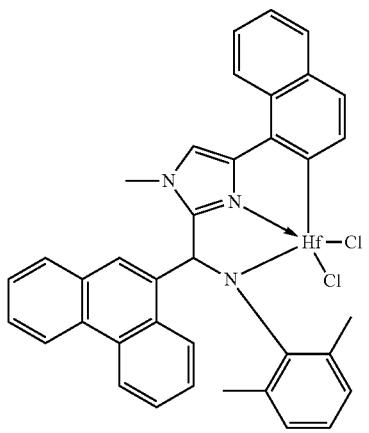

-continued

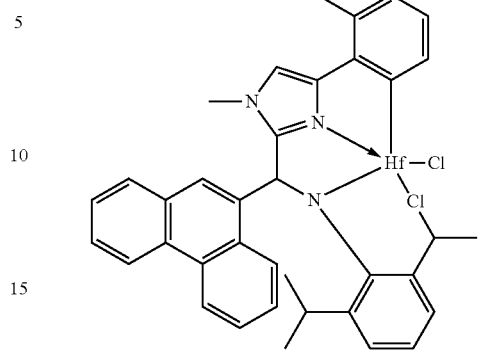

The other compounds that can be exemplified similarly are those modified from the above compounds by (i) replacing a hafnium atom with a zirconium atom or a titanium atom, or (ii) replacing a chloride with a bromide, an iodide, a hydride, a methyl, a benzyl, a methoxide, an isopropoxide, an n-butoxide, a phenoxide, a benzyloxide, a dimethylamide, or a diethylamide.

The transition metal compound (A-Y) represented by the general formula (1-Y-1) can be produced through a method described in U.S. Patent Application Publication No. 2004/0220050, specification.

[Chem. 31]

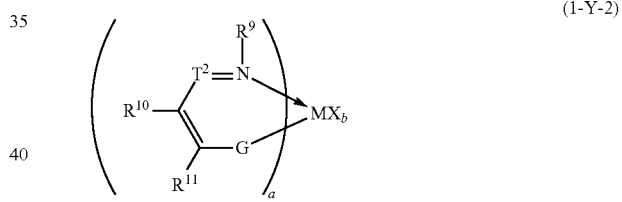

(1-Y-2)

In the general formula (1-Y-2), M, X, a, and b are to the same as those in the general formula (1-Y). M is preferably a transition metal atom of Group 4 or 5 of the periodic table of the elements, more preferably a transition metal atom of Group 4 (specifically, a titanium atom, a zirconium atom, or a hafnium atom), particularly preferably a zirconium atom or a hafnium atom.

G is an oxygen atom, a sulfur atom, a selenium atom, or a nitrogen-containing group having a substituent $R^d$ (—$NR^d$—), preferably an oxygen atom or a sulfur atom, further preferably an oxygen atom. In a case where "a" is 2 or more, G atoms/groups may be the same as or different from each other.

$T^2$ is a nitrogen atom or a carbon-containing group having a substituent $R^e$ (—$CR^e$=), preferably a carbon-containing group. Hereinafter, the symbols "—" and "=" mean a single bond and a double bond, respectively. In a case where "a" is 2 or more, $T^2$ atoms/groups may be the same as or different from each other.

$R^9$ to $R^{11}$, $R^d$ contained in G, and $R^e$ contained in $T^2$ are the same as X in the general formula (1-Y). $R^9$ to $R^{11}$, $R^d$, and $R^e$ may be the same as or different from each other. In a case where "a" is 2 or more, each of the $R^9$ groups, each of the $R^{10}$ groups, each of the $R^{11}$ groups, each of the $R^d$ groups, and each of the $R^e$ groups may each individually be the same as or different from each other. Further, two or more of $R^{10}$ groups, $R^{11}$ groups, $R^d$ groups, and $R^e$ groups may be linked to each other/one another to form a ring. In a case where "a" is 2 or more, any one group of $R^9$ groups to $R^{11}$ groups, $R^d$ groups, and $R^e$ groups may be linked to one group of $R^9$ groups to $R^{11}$ groups, $R^d$ groups, and $R^e$ groups contained in another ligand.

$R^9$ to $R^{11}$, $R^d$, and $R^e$ are each preferably a hydrogen atom, a halogen atom, a carbon-containing group, a silicon-containing group, a nitrogen-containing group, an oxygen-containing group, or a heterocyclic compound residue, further preferably (1) a hydrocarbyl group of (i) a linear or branched alkyl group having 1 to 30 (preferably 1 to 20) carbon atoms such as methyl group, ethyl group, n-propyl group, isopropyl group, n-butyl group, isobutyl group, sec-butyl group, t-butyl group, n-pentyl group, neopentyl group, and n-hexyl group or (ii) an aryl group having 6 to 30 (preferably 6 to 20) carbon atoms such as phenyl group, naphthyl group, biphenyl group, terphenyl group, phenanthryl group, and anthracenyl group, (2) a halohydrocarbyl group or perhalocarbyl group in which a part of or all of the hydrogen atoms in any of the above hydrocarbyl groups are replaced with halogen atoms, or (3) a hydrocarbyl substituted silyl group such as trimethylsilyl group, triethylsilyl group, triphenylsilyl group, and dimethylphenylsilyl group.

As the transition metal compound represented by the general formula (1-Y-2), a compound represented by the following general formula (1-Y-2a) is preferably used.

[Chem. 32]

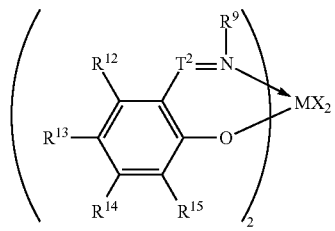

(1-Y-2a)

In the general formula (1-Y-2a), M, X, $T^2$, and $R^9$ are to the same as those in the general formula (1-Y-2). M is preferably a transition metal atom of Group 4 of the periodic table of the elements (specifically, a titanium atom, a zirconium atom, or a hafnium atom), particularly preferably a zirconium atom or a hafnium atom.

X is preferably a halogen atom, methyl group, neopentyl group, benzyl group, trialkyl silylmethyl group, alkoxo group, aryloxo group, or N,N-dialkylamide group.

$R^{12}$ to $R^{15}$ are equal to X in the general formula (1-Y). $R^9$, $R^{12}$ to $R^{15}$, and $R^e$ contained in $T^2$ may be the same as or different from each other. $R^9$ groups, $R^{12}$ groups, $R^{13}$ groups, $R^{14}$ groups, $R^{15}$ groups, and $R^e$ groups may each individually be the same as or different from each other. Further, two or more of $R^{12}$ groups to $R^{15}$ groups and $R^e$ groups may be linked to each other/one another to form a ring. Any one group of $R^9$ groups, $R^{12}$ groups to $R^{15}$ groups, and $R^e$ groups may be linked to one group of $R^9$ groups, $R^{12}$ groups to $R^{15}$ groups, and $R^e$ groups contained in another ligand.

$R^9$, $R^{12}$ to $R^{15}$, and $R^e$ are each preferably a hydrogen atom, a halogen atom, a carbon-containing group, a silicon-containing group, a nitrogen-containing group, an oxygen-containing group, or a heterocyclic compound residue, further preferably (1) a hydrocarbyl group of (i) a linear or branched alkyl group having 1 to 30 (preferably 1 to 20) carbon atoms such as methyl group, ethyl group, n-propyl group, isopropyl group, n-butyl group, isobutyl group, sec-butyl group, t-butyl group, n-pentyl group, neopentyl group, and n-hexyl group or (ii) an aryl group having 6 to 30 (preferably 6 to 20) carbon atoms such as phenyl group, naphthyl group, biphenyl group, terphenyl group, phenanthryl group, and anthracenyl group, (2) a halohydrocarbyl group or perhalocarbyl group in which a part of or all of the hydrogen atoms in any of the above hydrocarbyl groups are replaced with halogen atoms, or (3) a hydrocarbyl substituted silyl group such as trimethylsilyl group, triethylsilyl group, triphenylsilyl group, and dimethylphenylsilyl group.

As the transition metal compound represented by the general formula (1-Y-2), a compound represented by the following general formula (1-Y-2b) is preferably used.

[Chem. 33]

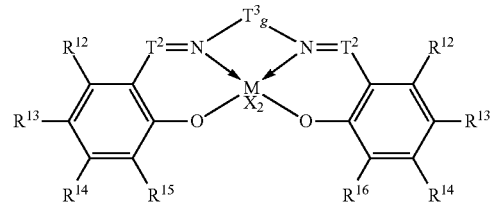

(1-Y-2b)

In the general formula (1-Y-2b), M, X, and $T^2$ equal to those in the general formula (1-Y-2). M is preferably a transition metal atom of Group 4 of the periodic table of the elements (specifically, a titanium atom, a zirconium atom, or a hafnium atom), particularly preferably a zirconium atom or a hafnium atom.

X is preferably a halogen atom, methyl group, neopentyl group, benzyl group, trialkyl silylmethyl group, alkoxo group, aryloxo group, or N,N-dialkylamide group.

$T^3_g$ denotes a bivalent crosslinking group in which $R^9$ groups in the general formula (1-Y-2a) are linked to each other. $T^3$ denotes —$CR^f_2$—, —$SiR^f_2$—, —$NR^f$—, —$PR^f$—, —$P(O)R^f$—, —O—, —S—, —S(O)—, or —$SO_2$—, preferably —$CR^f_2$— or —$SiR^f_2$—, further preferably —$CR^f_2$—. In a case where $T^3$ contains a heteroatom, the heteroatom of $T^3$ may be attached directly to M by a coordinate bond. g is an integer of any of 1 to 7, preferably 2 to 5. In a case where g is 2 or more, $T^3$ groups may be the same as or different from each other.

$R^f$ contained in $T^3$ is, for example, equal to X in the general formula (1-Y). In a case where there are a plurality of $R^f$ groups, $R^f$ groups may be the same as or different from each other, or $R^f$ groups may be linked to each other to form a ring.

$R^{12}$ to $R^{15}$ are equal to those in the general formula (1-Y-2a). $R^{12}$ to $R^{15}$, $R^e$ contained in $T^2$, and $R^f$ contained in $T^3$ may be the same as or different from each other. Each of the $R^{12}$ groups, each of the $R^{13}$ groups, each of the $R^{14}$ groups, each of the $R^{15}$ groups, and each of the $R^e$ groups may be the same as or different from each other. Two or more of $R^{12}$ groups to $R^{15}$ groups, $R^e$ groups, and $R^f$ groups may be linked to each other/one another to form a ring.

$R^{12}$ to $R^{15}$, $R^e$, and $R^f$ are each preferably a hydrogen atom, a halogen atom, a carbon-containing group, a silicon-containing group, a nitrogen-containing group, an oxygen-containing group, or a heterocyclic compound residue, further preferably (1) a hydrocarbyl group of (i) a linear or branched alkyl group having 1 to 30 (preferably 1 to 20) carbon atoms such as methyl group, ethyl group, n-propyl group, isopropyl group, n-butyl group, isobutyl group, sec-butyl group, t-butyl group, n-pentyl group, neopentyl group, and n-hexyl group or (ii) an aryl group having 6 to 30 (preferably 6 to 20) carbon atoms such as phenyl group, naphthyl group, biphenyl group, terphenyl group, phenanthryl group, and anthracenyl group, (2) a halohydrocarbyl group or perhalocarbyl group in which a part of or all of the hydrogen atoms in any of the above hydrocarbyl groups are replaced with halogen atoms, or (3) a hydrocarbyl substituted silyl group such as trimethylsilyl group, triethylsilyl group, triphenylsilyl group, and dimethylphenylsilyl group.

The following illustrates example specific structures of the transition metal compound (A-Y) represented by the general formula (1-Y-2). The transition metal compound (A-Y) represented by the general formula (1-Y-2) is, however, not limited to these structures.

[Chem. 34]

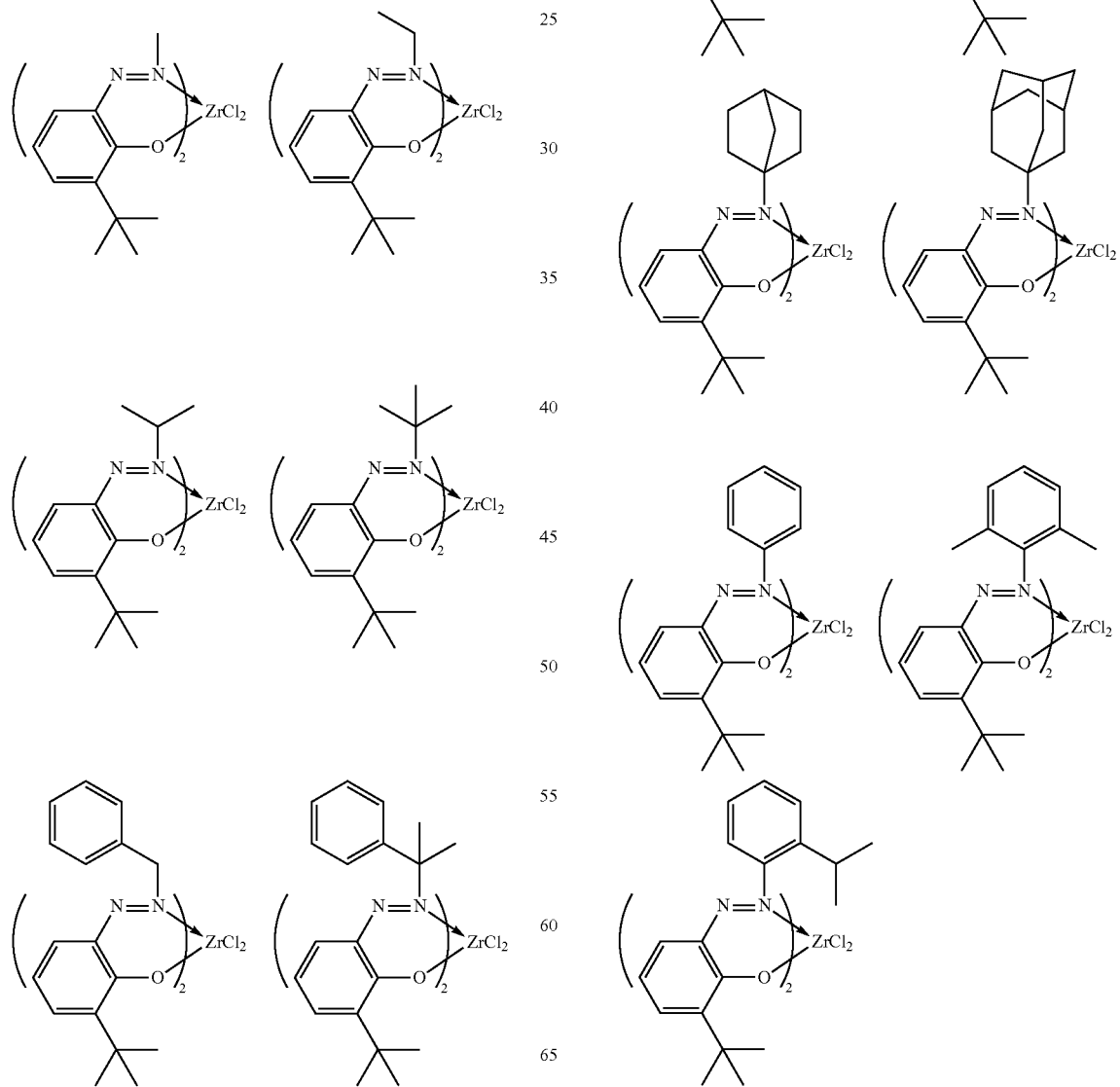

149
-continued
150
-continued
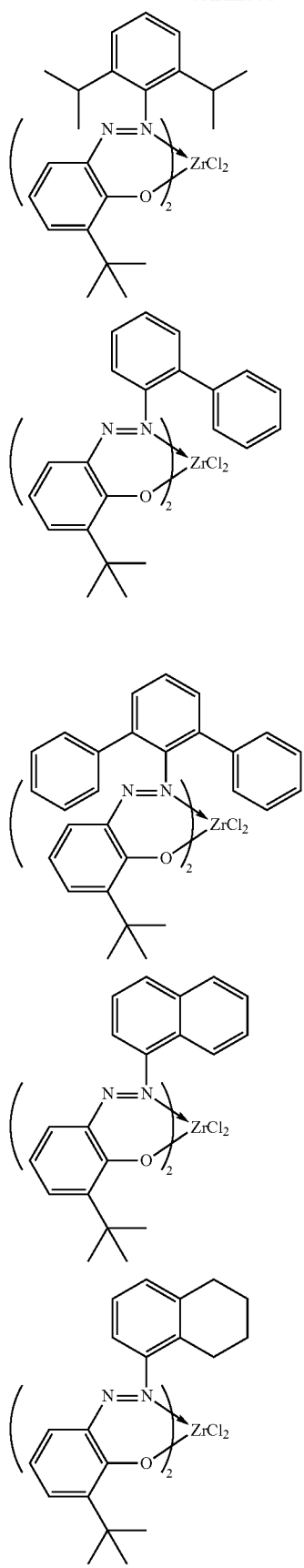
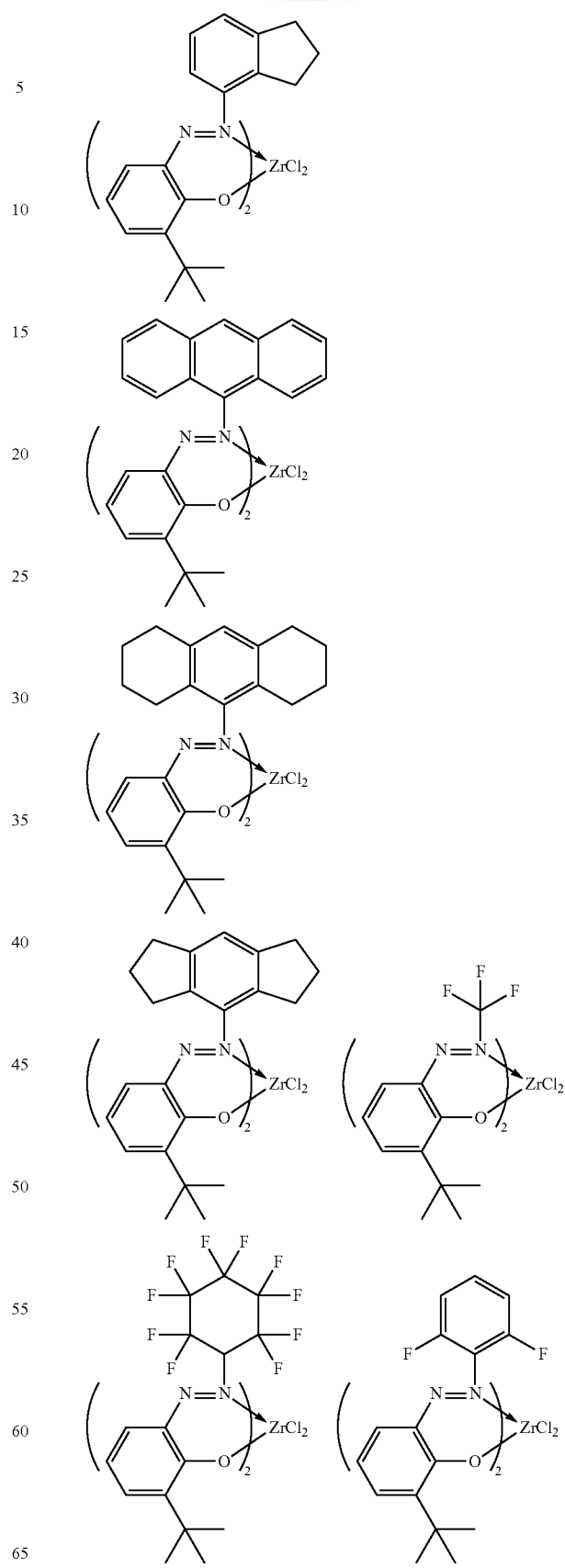

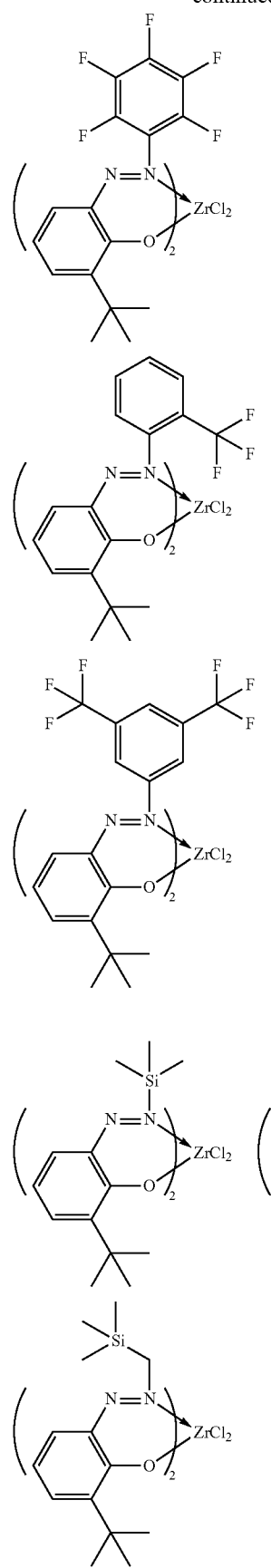
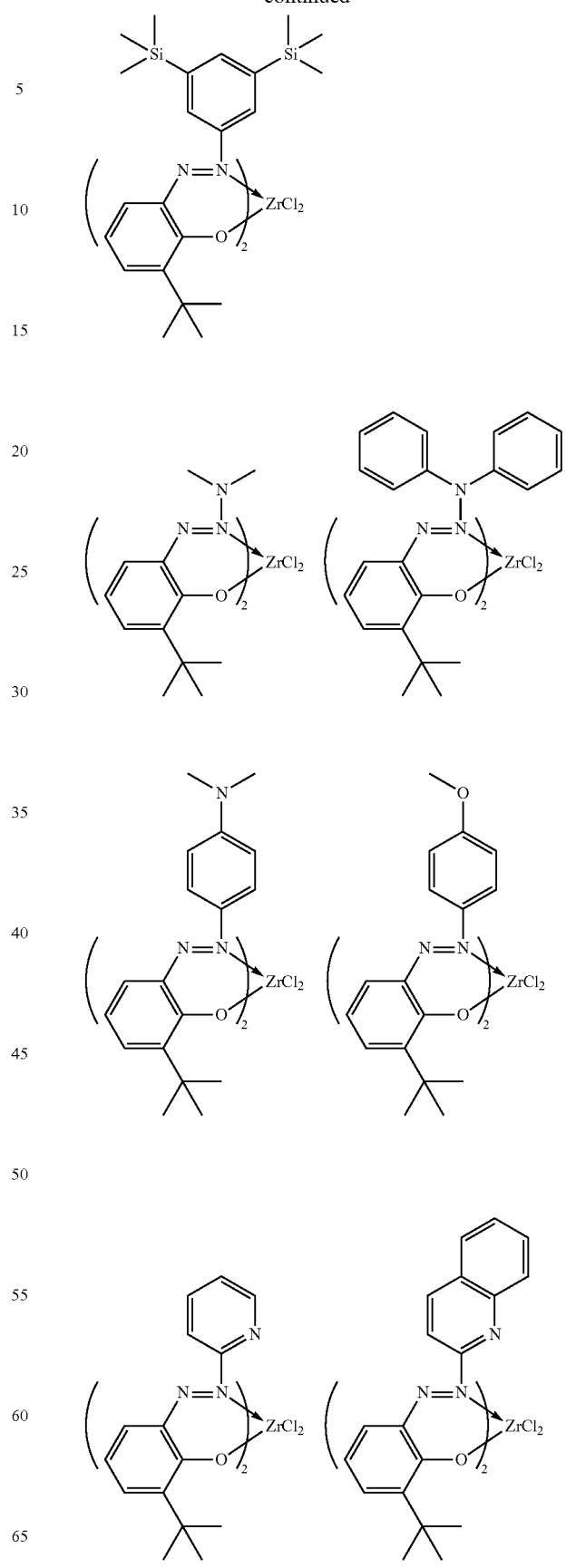

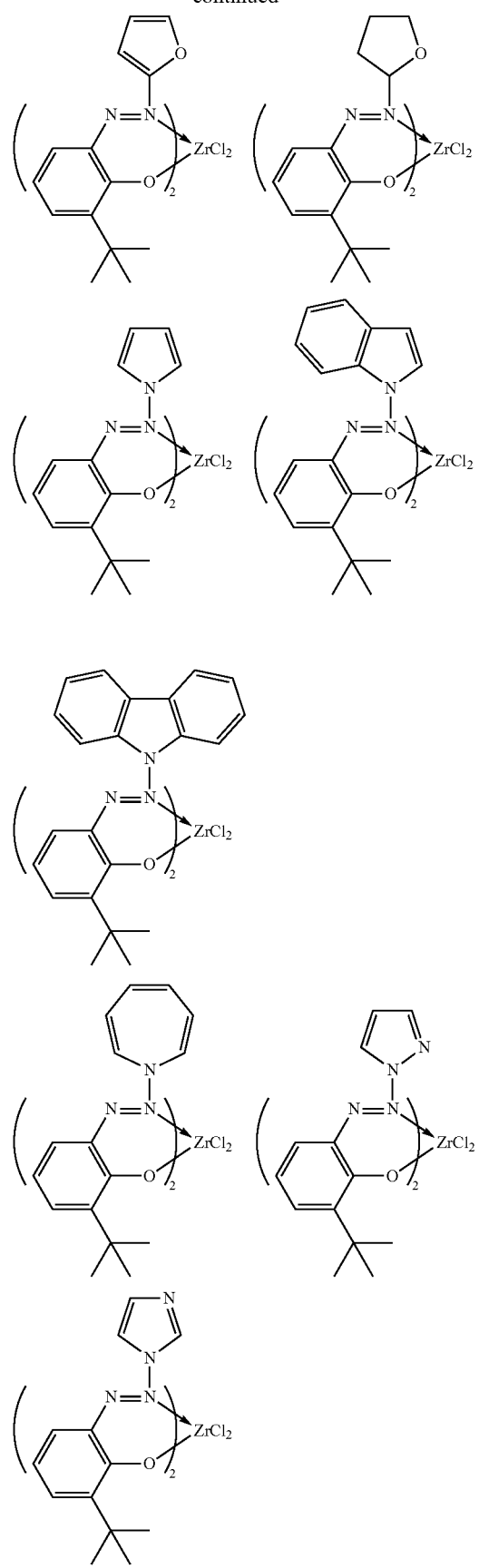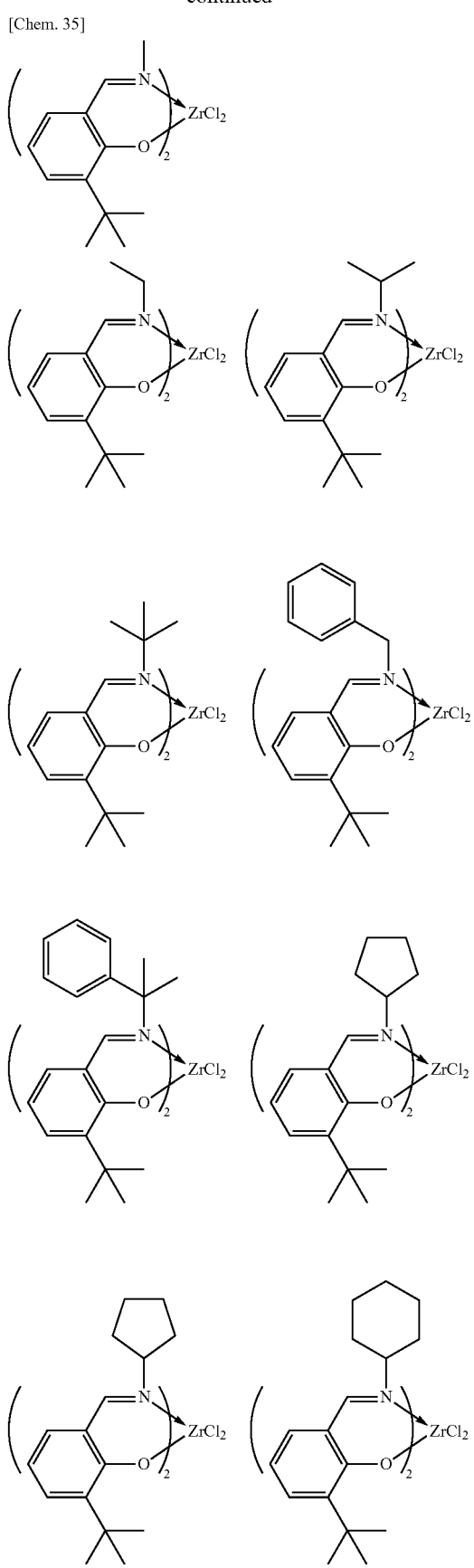

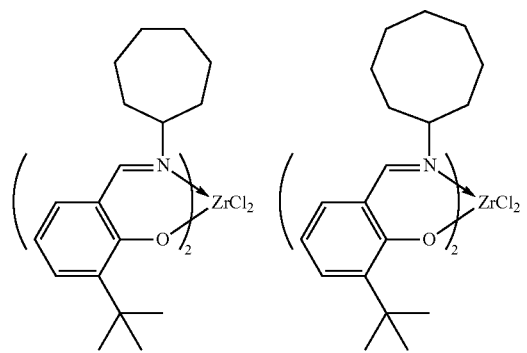
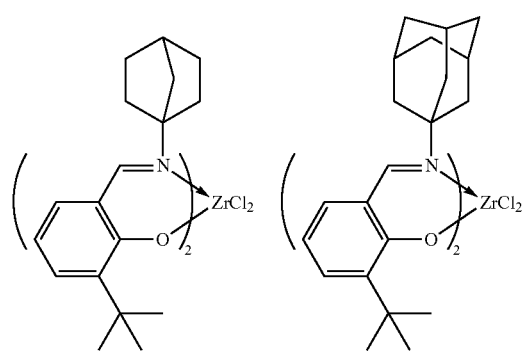
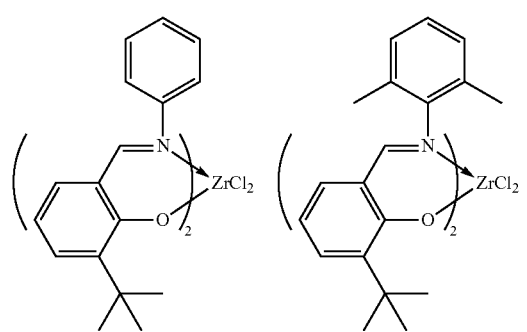
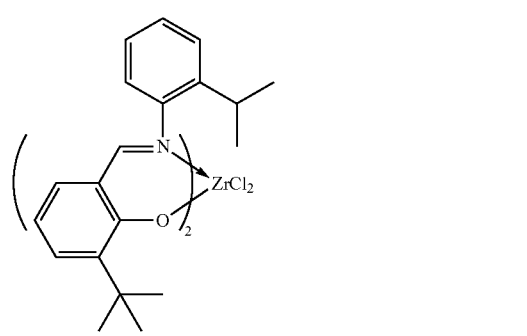
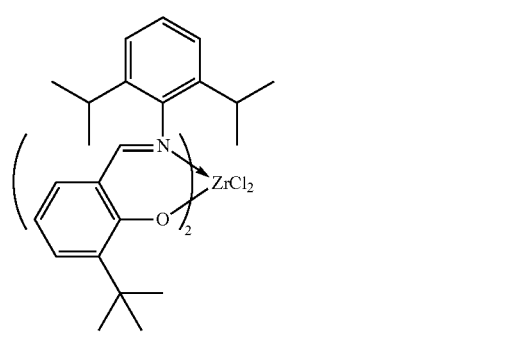
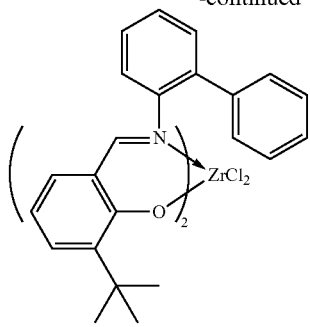
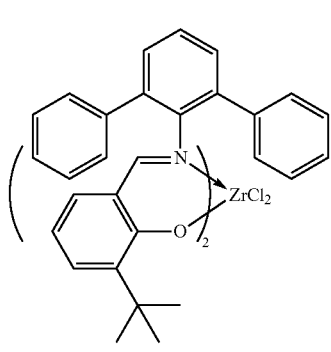
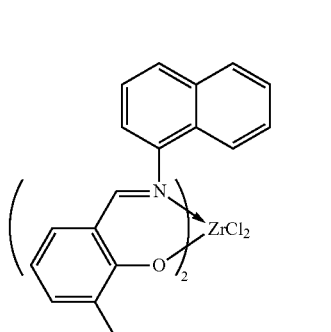
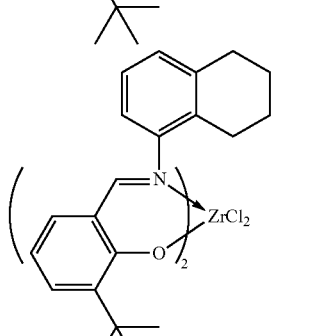
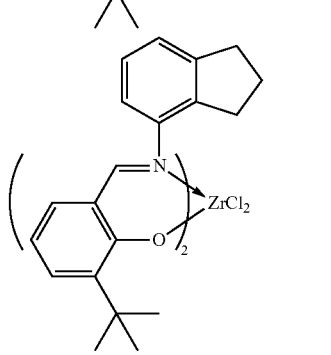

157
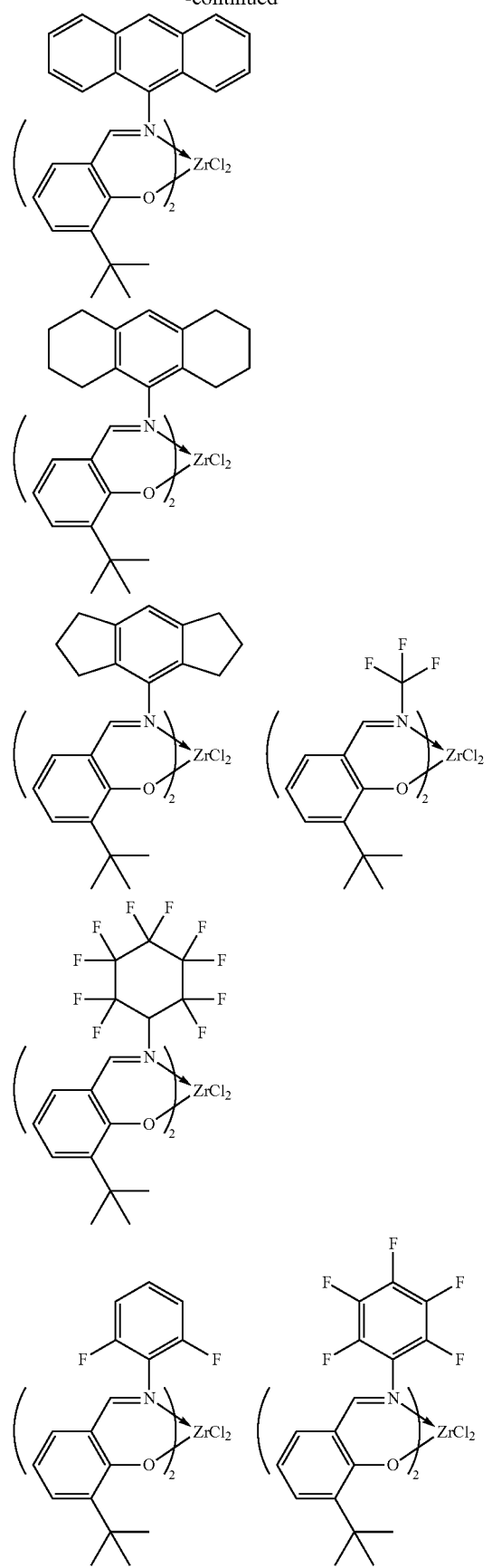
158
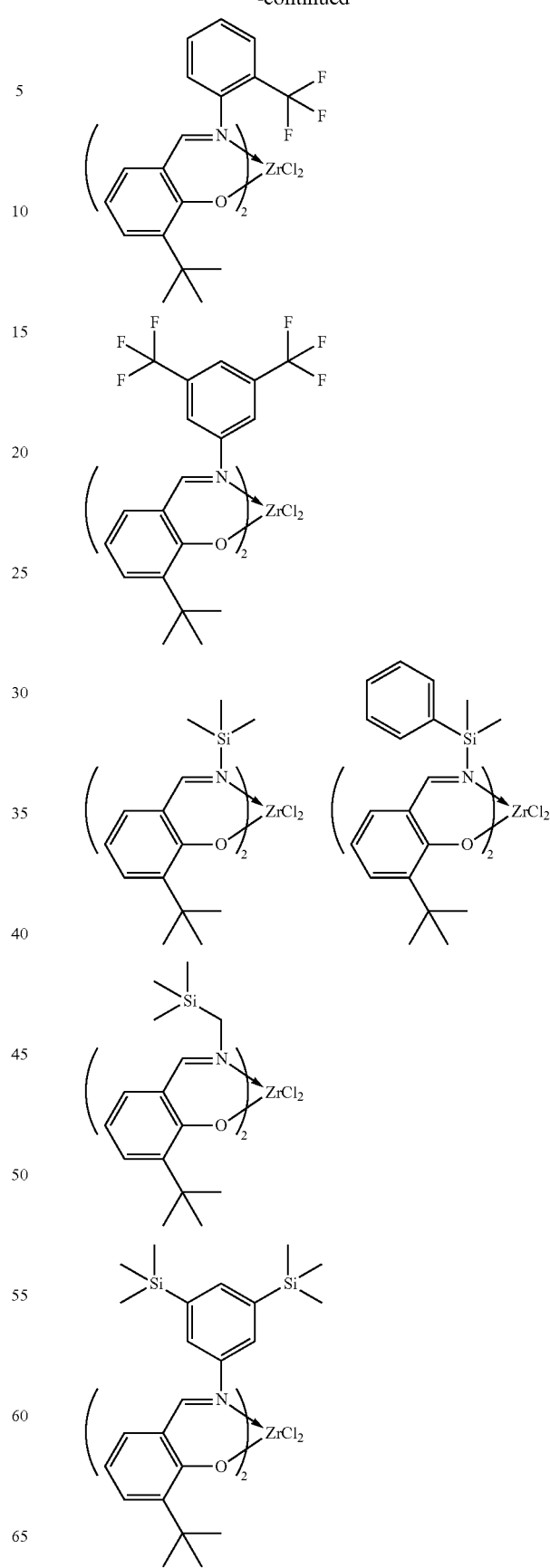

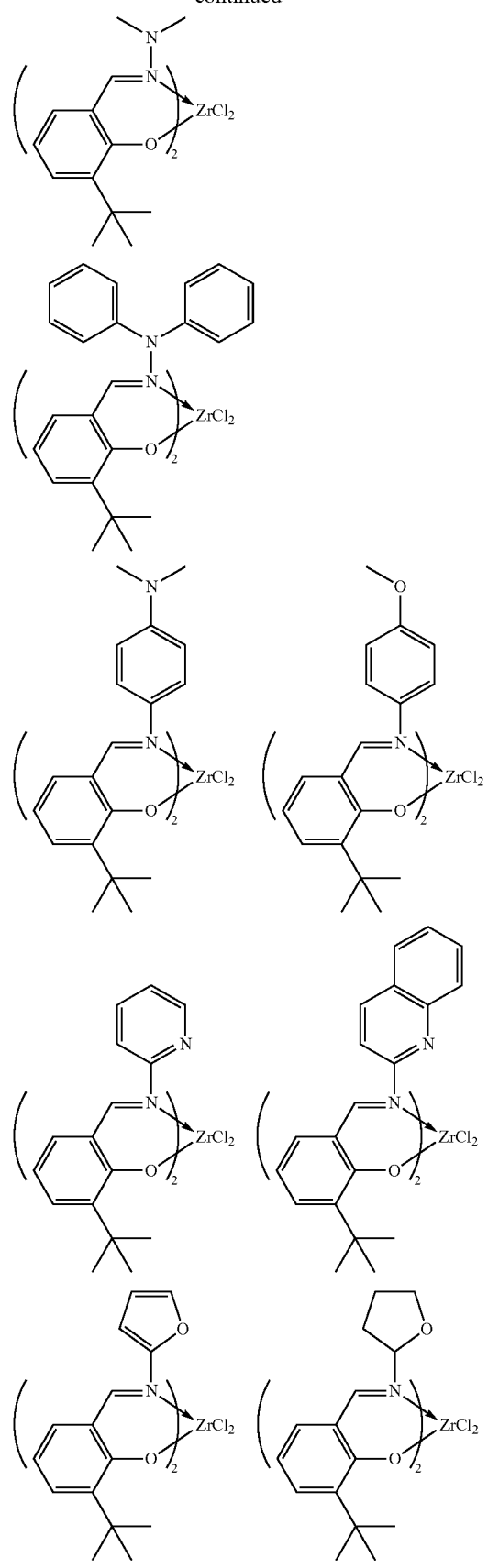
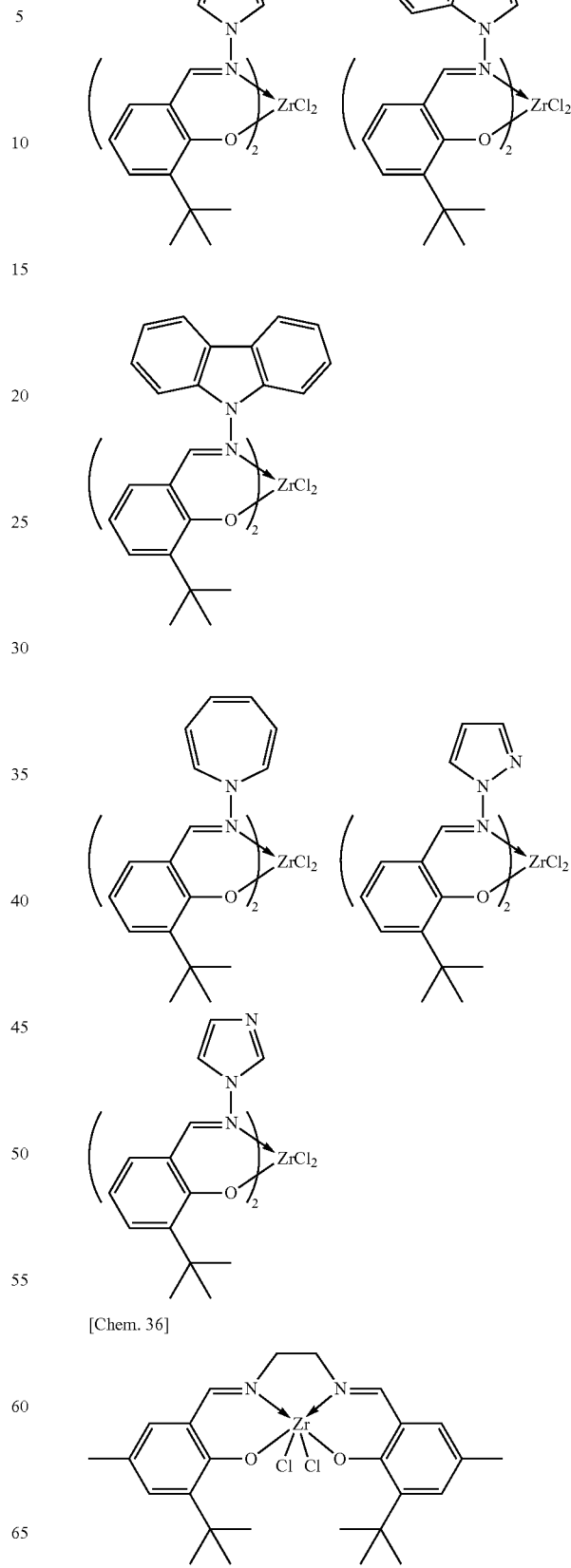
[Chem. 36]

161
-continued
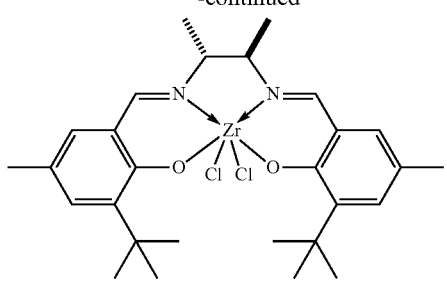
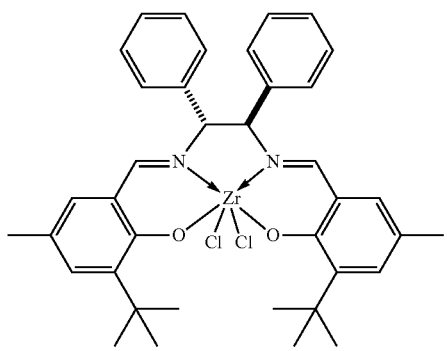
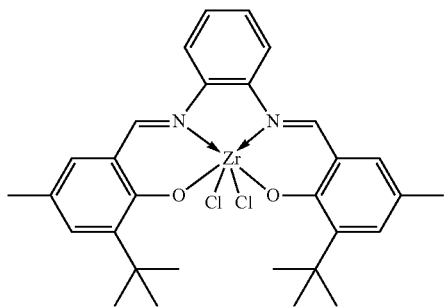
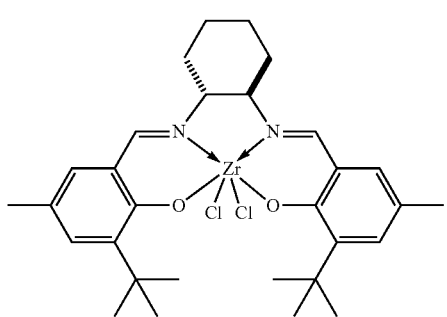
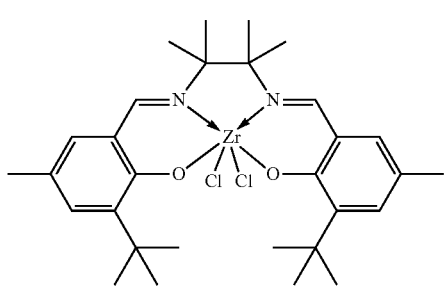
162
-continued
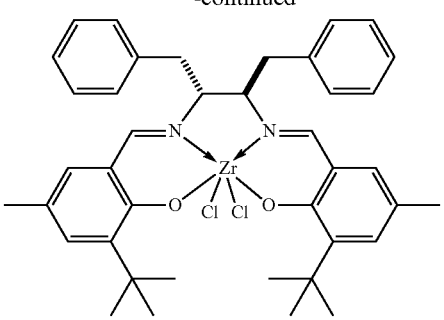
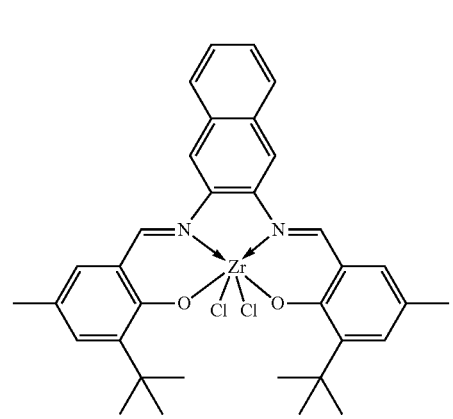
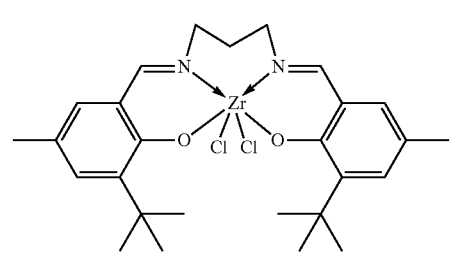
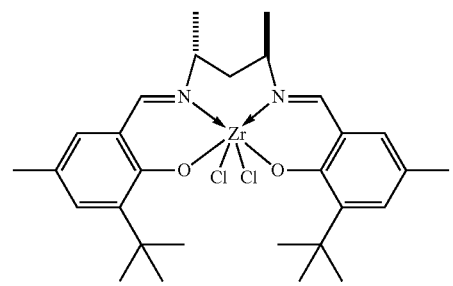
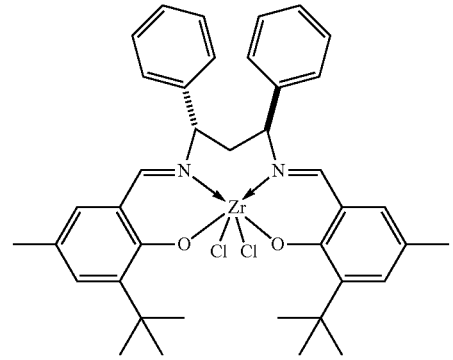

-continued
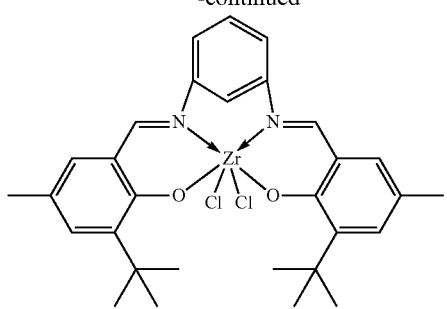
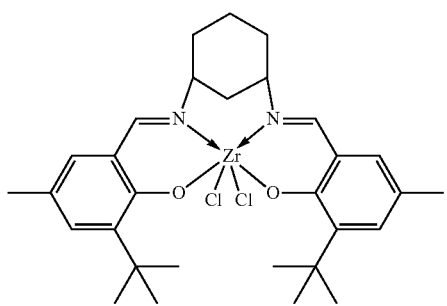
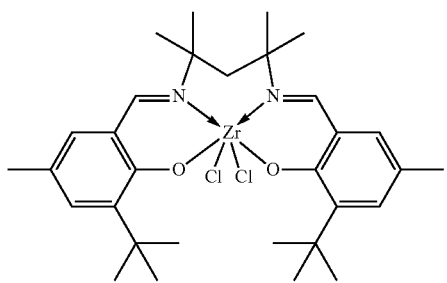
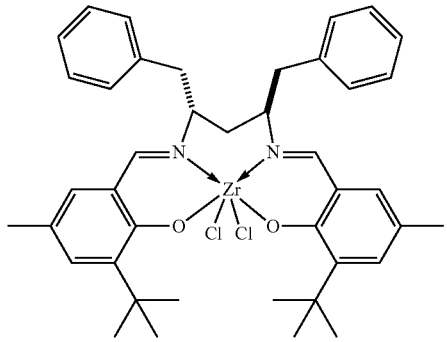
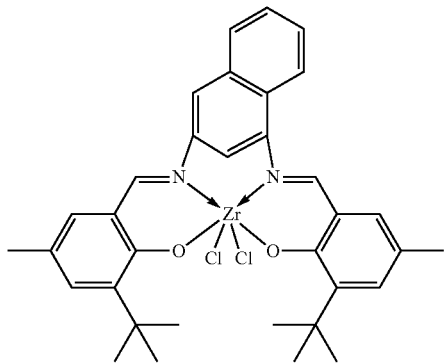
-continued
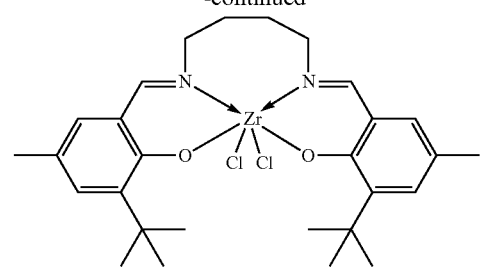
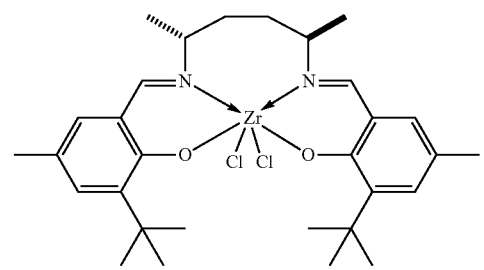
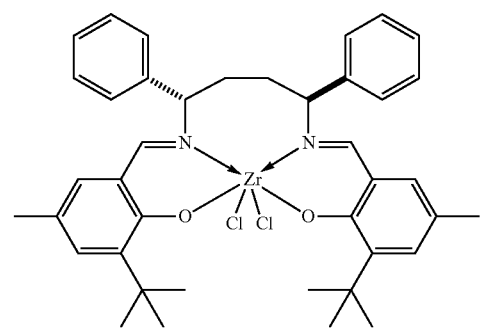
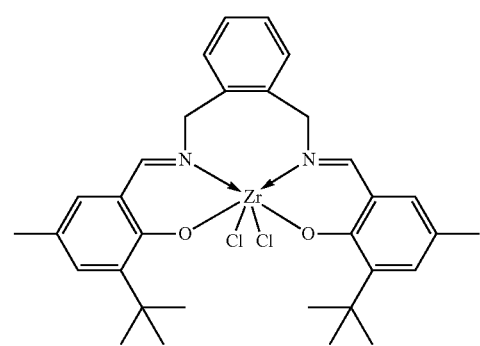
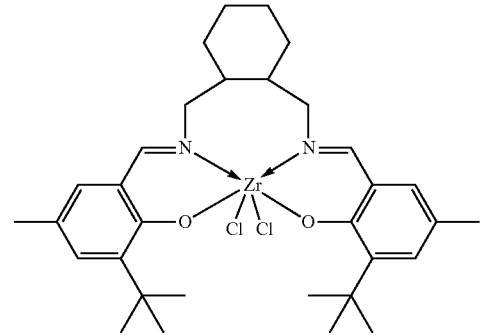

-continued

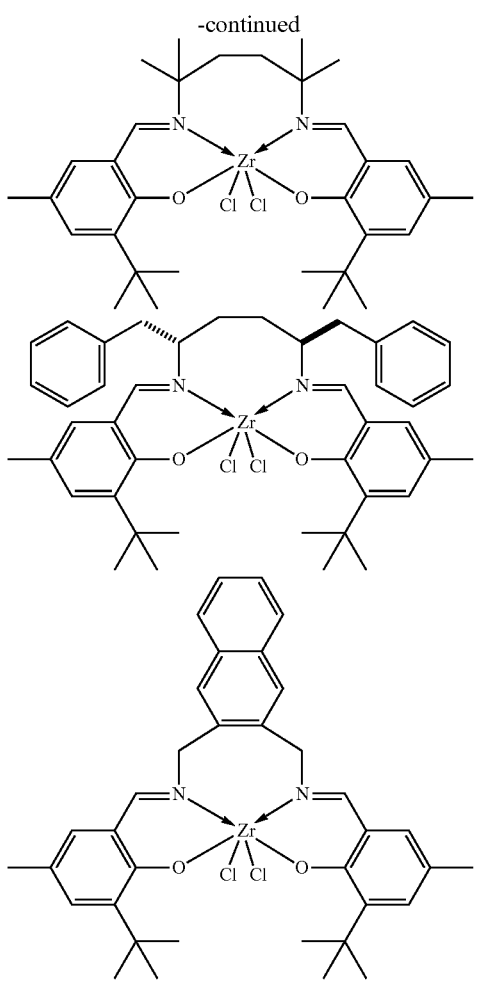

The other compounds that can be exemplified similarly are those modified from the above compounds by (i) replacing a zirconium atom with a hafnium atom or titanium atom, or (ii) replacing a chloride with a bromide, an iodide, a hydride, a methyl, a benzyl, a methoxide, an isopropoxide, an n-butoxide, a phenoxide, a benzyloxide, a dimethylamide, or a diethylamide.

The transition metal compound (A-Y) represented by the general formula (1-Y-2) can be produced through a method described in J. Am. Chem. Soc. Vol. 123, 6847 (2001).

[Chem. 37]

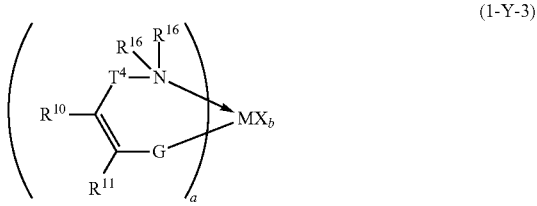

(1-Y-3)

In the general formula (1-Y-3), M, X, G, $R^{10}$, $R^{11}$, a, and b are equal to those in the general formula (1-Y-2). M is preferably a transition metal atom of Group 4 or 5 of the periodic table of the elements, more preferably a transition metal atom of Group 4 (specifically, a titanium atom, a zirconium atom, or a hafnium atom), particularly preferably a zirconium atom or a hafnium atom.

$T^4$ denotes —$CR^g_2$—, —$C_6R^g_4$—, —$SiR^g_2$—, —$NR^g$—, —$PR^g$—, —$P(O)R^g$—, —$S$—, —$S(O)$—, or —$SO_2$—, preferably —$CR^g_2$—, —$C_6R^g_4$—, or —$SiR^g_2$—, further preferably —$CR^g_2$—. In a case where $T^4$ contains a heteroatom, the heteroatom of $T^4$ may be attached directly to M by a coordinate bond.

$R^{10}$, $R^{11}$, $R^{16}$, $R^d$ contained in G, and $R^g$ contained in $T^4$ are equal to X in the general formula (1-Y). Each of the $R^{10}$ groups, each of the $R^{11}$ groups, each of the $R^{16}$ groups, each of the $R^d$ groups, and each of the $R^g$ groups may be the same as or different from each other. The $R^{16}$ groups may be the same as or different from each other. In a case where "a" is 2 or more, each of the $R^{10}$ groups, each of the $R^{11}$ groups, each of the $R^d$ groups, and each of the $R^g$ groups may be the same as or different from each other. Two or more of $R^{10}$ groups, $R^{11}$ groups, $R^d$ groups, and $R^g$ groups may be linked to each other/one another to form a ring. In a case where "a" is 2 or more, any one group of $R^{10}$ groups, $R^{11}$ groups, $R^{16}$ groups, $R^d$ groups, and $R^g$ groups, may be linked to one group of $R^{10}$ groups, $R^{11}$ groups, $R^{16}$ groups, $R^d$ groups, and $R^g$ groups contained in another ligand.

$R^{10}$, $R^{11}$, $R^{16}$, $R^d$, and $R^g$ are each preferably a hydrogen atom, a halogen atom, a carbon-containing group, a silicon-containing group, a nitrogen-containing group, an oxygen-containing group, or a heterocyclic compound residue, further preferably (1) a hydrocarbyl group of (i) a linear or branched alkyl group having 1 to 30 (preferably 1 to 20) carbon atoms such as methyl group, ethyl group, n-propyl group, isopropyl group, n-butyl group, isobutyl group, sec-butyl group, t-butyl group, n-pentyl group, neopentyl group, and n-hexyl group or (ii) an aryl group having 6 to 30 (preferably 6 to 20) carbon atoms such as phenyl group, naphthyl group, biphenyl group, terphenyl group, phenanthryl group, and anthracenyl group, (2) a halohydrocarbyl group or perhalocarbyl group in which a part of or all of the hydrogen atoms in any of the above hydrocarbyl groups are replaced with halogen atoms, or (3) a hydrocarbyl substituted silyl group such as trimethylsilyl group, triethylsilyl group, triphenylsilyl group, and dimethylphenylsilyl group.

As the transition metal compound represented by the general formula (1-Y-3), a compound represented by the following general formula (1-Y-3a) is preferably used.

[Chem. 38]

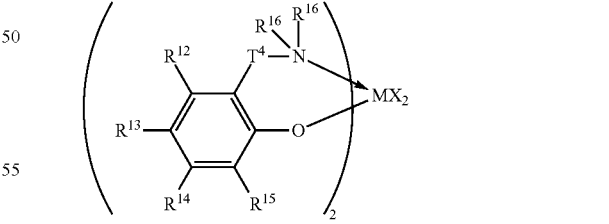

(1-Y-3a)

In the general formula (1-Y-3a), M, X, $T^4$, and $R^{16}$ are equal to those in the general formula (1-Y-3). M is preferably a transition metal atom of Group 4 of the periodic table of the elements (specifically, a titanium atom, a zirconium atom, or a hafnium atom), particularly preferably a zirconium atom or a hafnium atom.

X is preferably a halogen atom, methyl group, neopentyl group, benzyl group, trialkyl silylmethyl group, alkoxo group, aryloxo group, or N,N-dialkylamide group.

$R^{12}$ to $R^{15}$ are equal to those in the general formula (1-Y-2a). $R^{12}$ to $R^{15}$, $R^{16}$, and $R^g$ contained in $T^4$ may be the same as or different from each other. Each of the $R^{12}$ groups, each of the $R^{13}$ groups, each of the $R^{14}$ groups, each of the $R^{15}$ groups, each of the $R^{16}$ groups, and each of the $R^g$ groups may be the same as or different from each other. Two or more of $R^{12}$ groups to $R^{15}$ groups and $R^g$ groups may be linked to each other to form a ring. Any one group of $R^{12}$ groups to $R^{15}$ groups, $R^{16}$ groups, and $R^g$ groups may be linked to one group of $R^{12}$ to $R^{15}$, $R^{16}$, and $R^g$ contained in another ligand.

$R^{12}$ to $R^{15}$, $R^{16}$, and $R^g$ are each preferably a hydrogen atom, a halogen atom, a carbon-containing group, a silicon-containing group, a nitrogen-containing group, an oxygen-containing group, or a heterocyclic compound residue, further preferably (1) a hydrocarbyl group of (i) a linear or branched alkyl group having 1 to 30 (preferably 1 to 20) carbon atoms such as methyl group, ethyl group, n-propyl group, isopropyl group, n-butyl group, isobutyl group, sec-butyl group, t-butyl group, n-pentyl group, neopentyl group, and n-hexyl group or (ii) an aryl group having 6 to 30 (preferably 6 to 20) carbon atoms such as phenyl group, naphthyl group, biphenyl group, terphenyl group, phenanthryl group, and anthracenyl group, (2) a halohydrocarbyl group or perhalocarbyl group in which a part of or all of the hydrogen atoms in any of the above hydrocarbyl groups are replaced with halogen atoms, or (3) a hydrocarbyl substituted silyl group such as trimethylsilyl group, triethylsilyl group, triphenylsilyl group, and dimethylphenylsilyl group.

As the transition metal compound represented by the general formula (1-Y-3), a compound represented by the following general formula (1-Y-3b) is preferably used.

[Chem. 39]

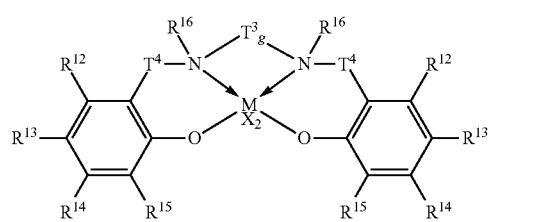

(1-Y-3b)

In the general formula (1-Y-3b), M, X, $T^4$, and $R^{16}$ are equal to those in the general formula (1-Y-3), and $T^3$ and g are equal to those in the general formula (1-Y-2b). M is preferably a transition metal atom of Group 4 of the periodic table of the elements (specifically, a titanium atom, a zirconium atom, or a hafnium atom), particularly preferably a zirconium atom or a hafnium atom.

X is preferably a halogen atom, methyl group, neopentyl group, benzyl group, trialkyl silylmethyl group, alkoxo group, aryloxo group, or N,N-dialkylamide group.

$R^{12}$ to $R^{15}$ are equal to those in the general formula (1-Y-3a). $R^{12}$ to $R^{15}$, $R^{16}$, $R^f$ contained in $T^3$, and $R^g$ contained in $T^4$ may be the same as or different from each other. Each of the $R^{12}$ groups, each of the $R^{13}$ groups, each of the $R^{14}$ groups, each of the $R^{15}$ groups, each of the $R^{16}$ groups, and each of the $R^g$ groups may be the same as or different from each other. In a case where there are a plurality of $R^f$ groups, $R^f$ groups may be the same as or different from each other. Two or more of $R^{12}$s to $R^{15}$ groups, $R^{16}$ groups, $R^f$ groups, and $R^g$ groups may be linked to each other to form a ring. In a case where there are a plurality of $R^f$ groups, two or more $R^f$ groups may be linked to each other to form a ring.

$R^{12}$ to $R^{15}$, $R^{16}$, $R^f$, and $R^g$ are each preferably a hydrogen atom, a halogen atom, a carbon-containing group, a silicon-containing group, a nitrogen-containing group, an oxygen-containing group, or a heterocyclic compound residue, further preferably (1) a hydrocarbyl group of (i) a linear or branched alkyl group having 1 to 30 (preferably 1 to 20) carbon atoms such as methyl group, ethyl group, n-propyl group, isopropyl group, n-butyl group, isobutyl group, sec-butyl group, t-butyl group, n-pentyl group, neopentyl group, and n-hexyl group or (ii) an aryl group having 6 to 30 (preferably 6 to 20) carbon atoms such as phenyl group, naphthyl group, biphenyl group, terphenyl group, phenanthryl group, and anthracenyl group, (2) a halohydrocarbyl group or perhalocarbyl group in which a part of or all of the hydrogen atoms in any of the above hydrocarbyl groups are replaced with halogen atoms, or (3) a hydrocarbyl substituted silyl group such as trimethylsilyl group, triethylsilyl group, triphenylsilyl group, and dimethylphenylsilyl group.

The following illustrates example specific structures of the transition metal compound (A-Y) represented by the general formula (1-Y-3). The transition metal compound (A-Y) represented by the general formula (1-Y-3) is, however, not limited to these structures.

[Chem. 40]

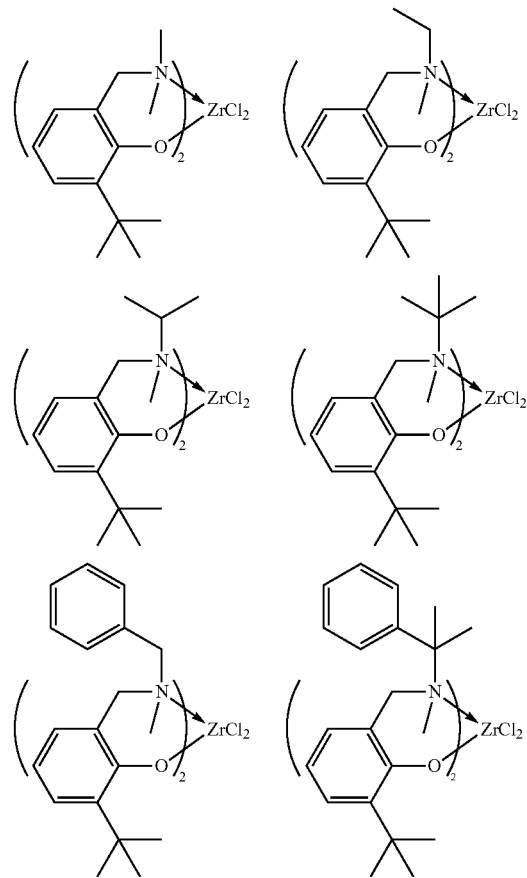

169
-continued
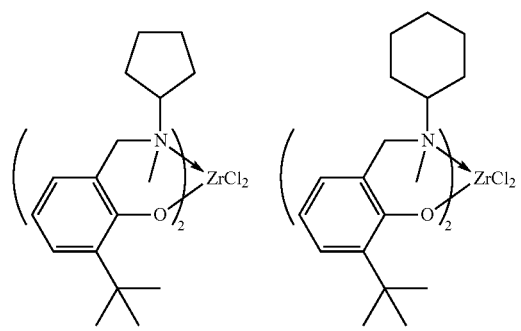
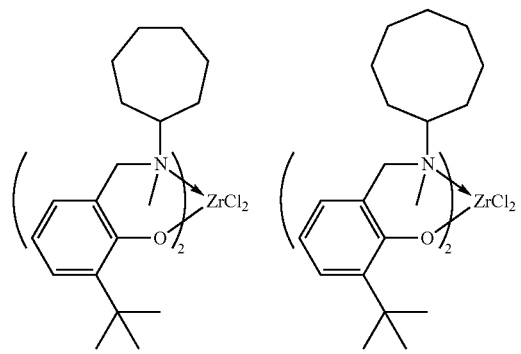
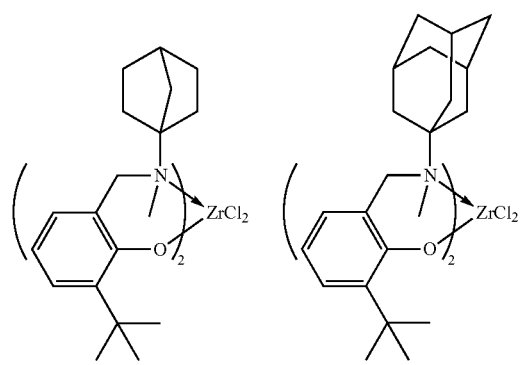
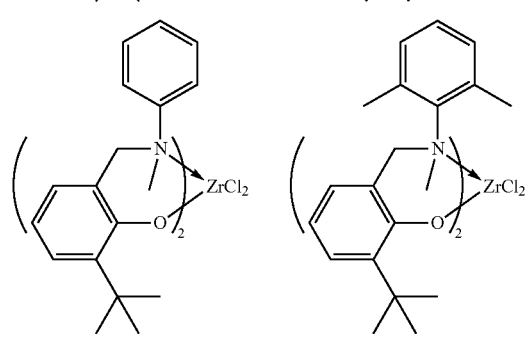
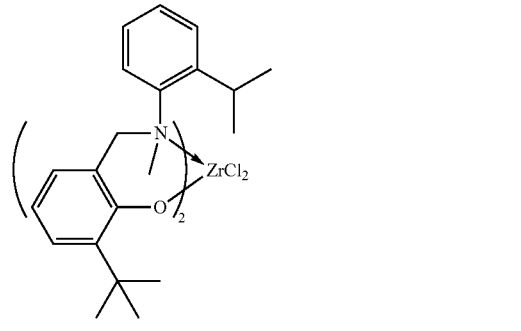
170
-continued
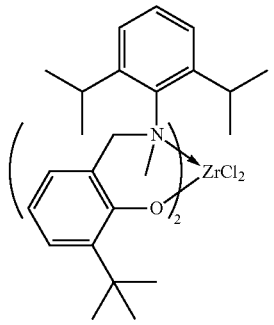
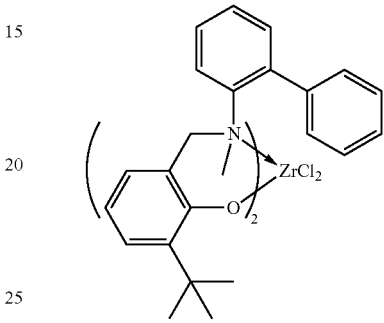
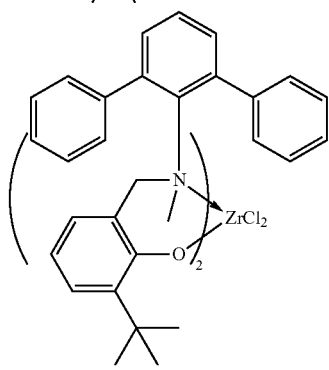
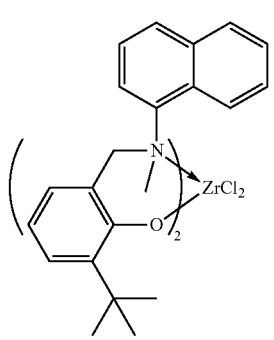
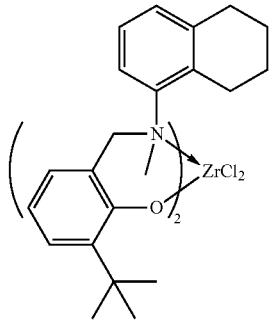

171
-continued
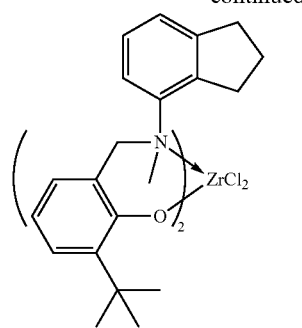
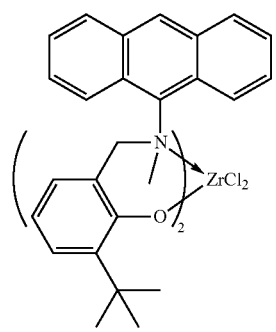
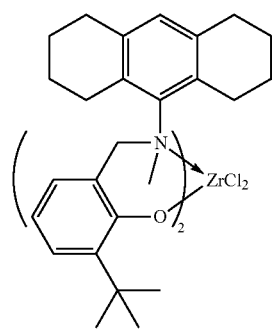
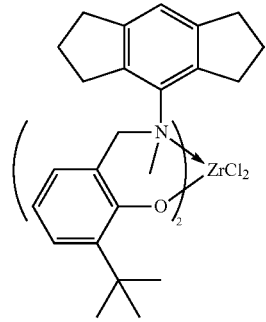
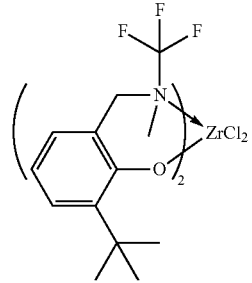
172
-continued
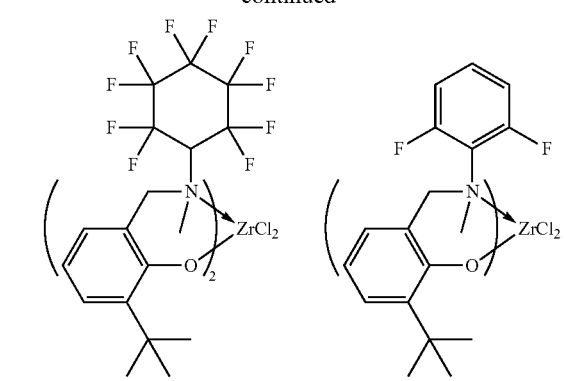
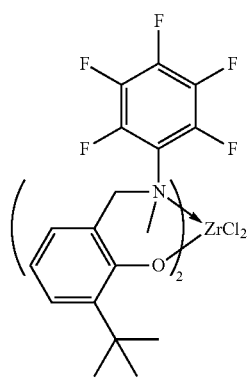
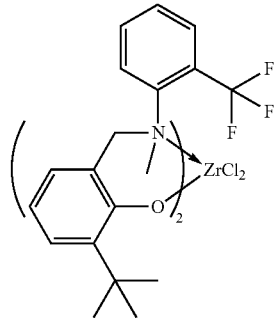
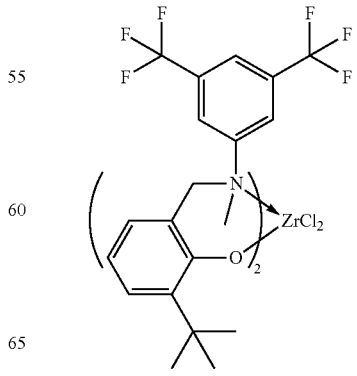

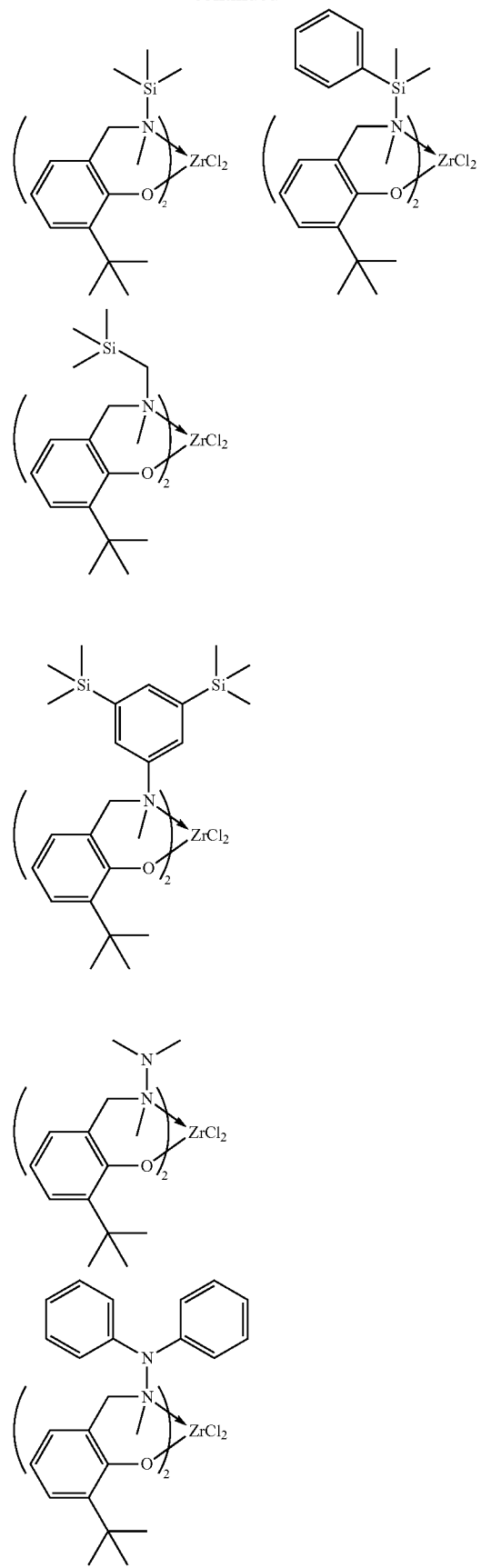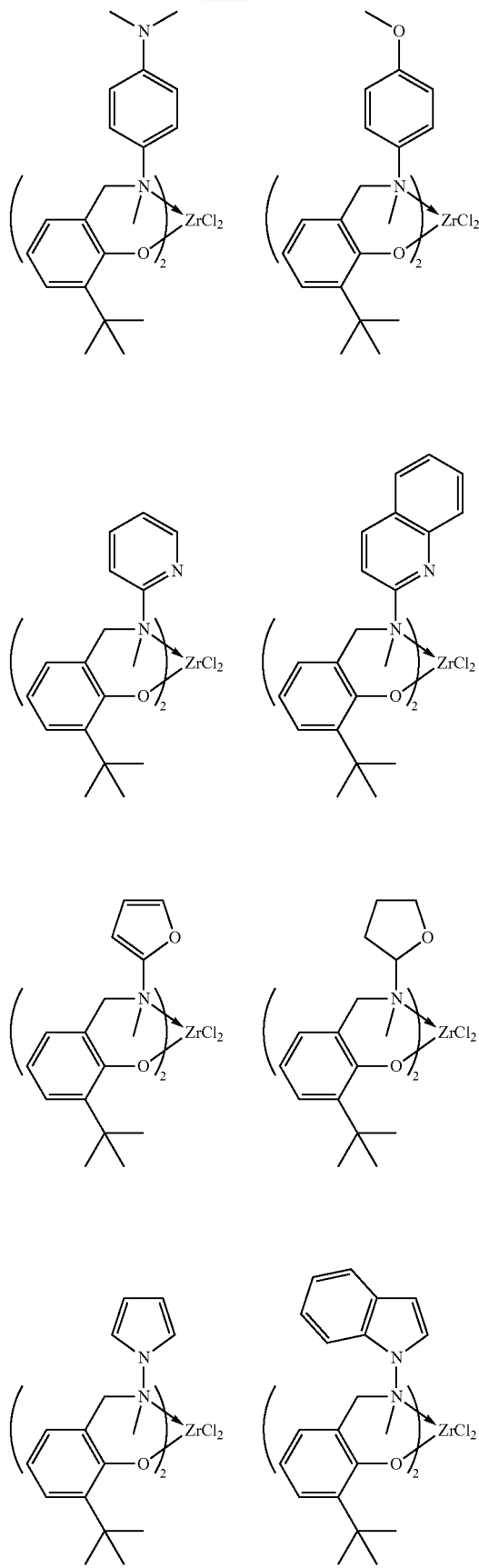

175
-continued
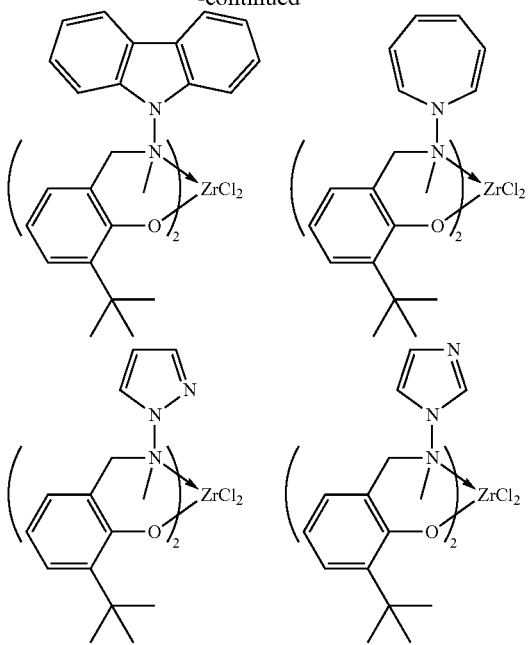
[Chem. 41]
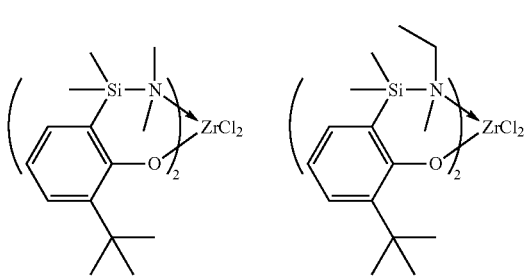
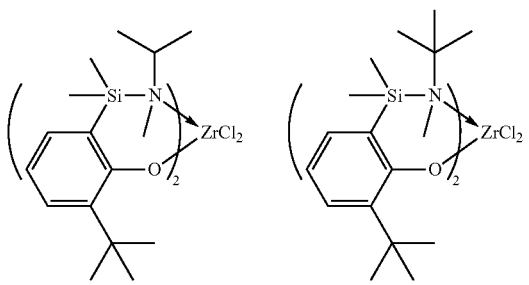
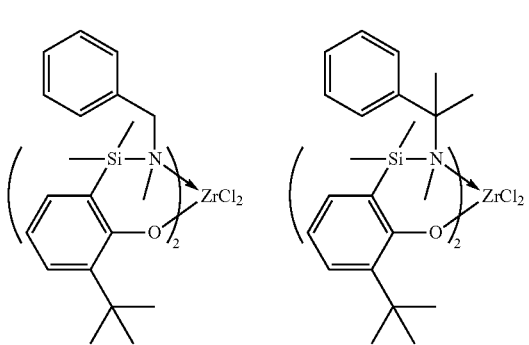
176
-continued
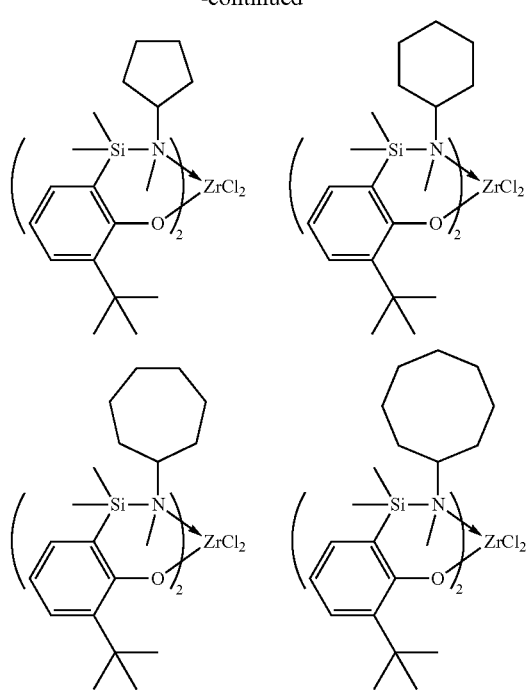
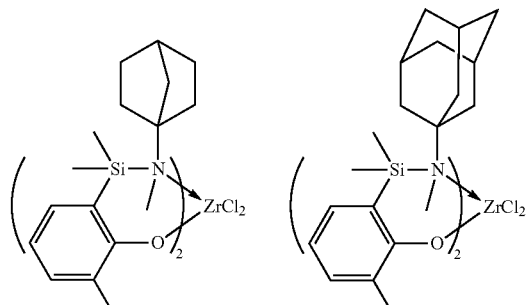
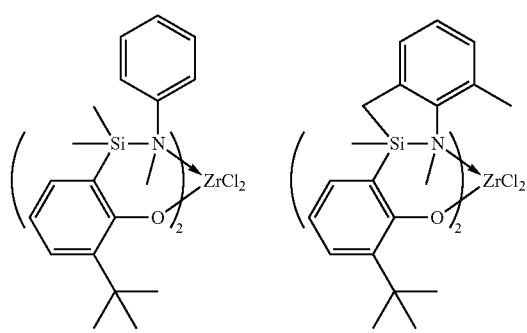
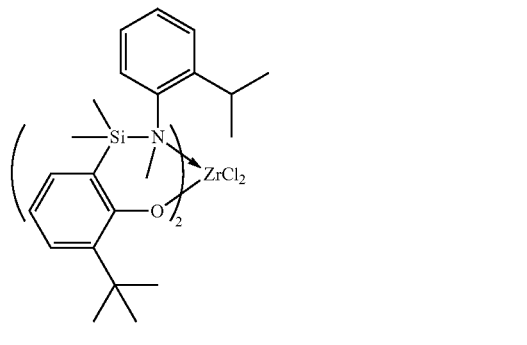

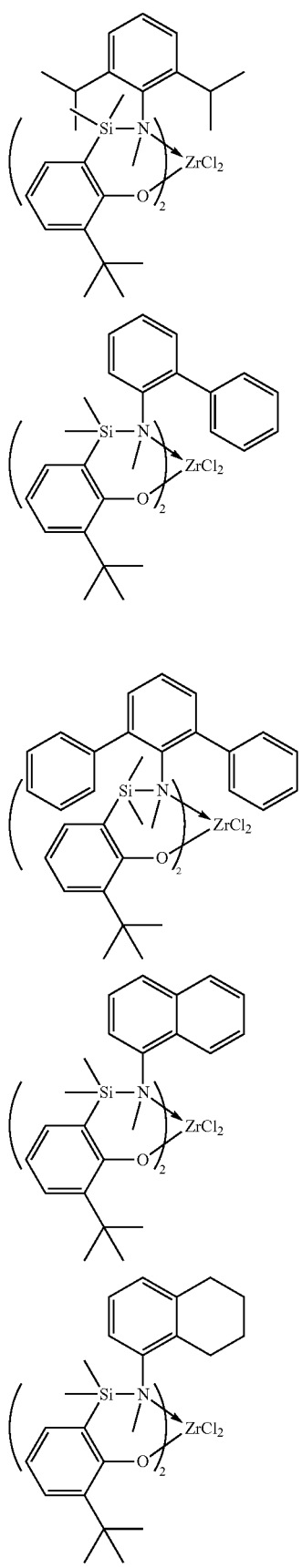
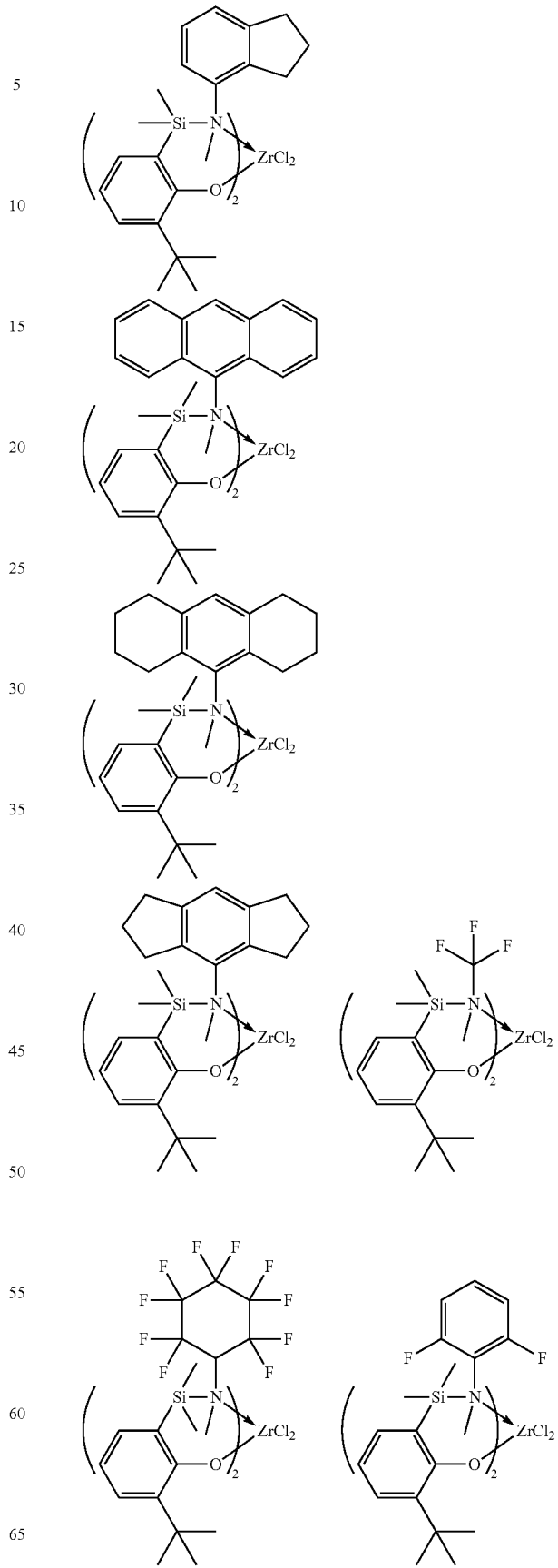

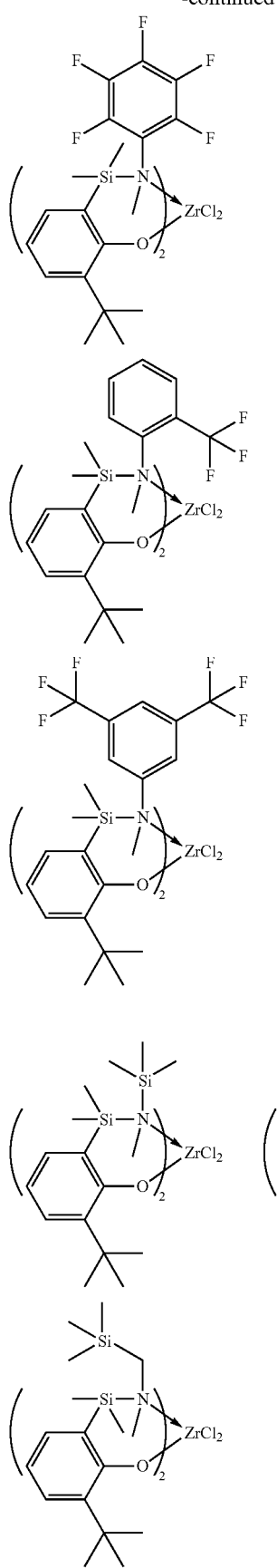
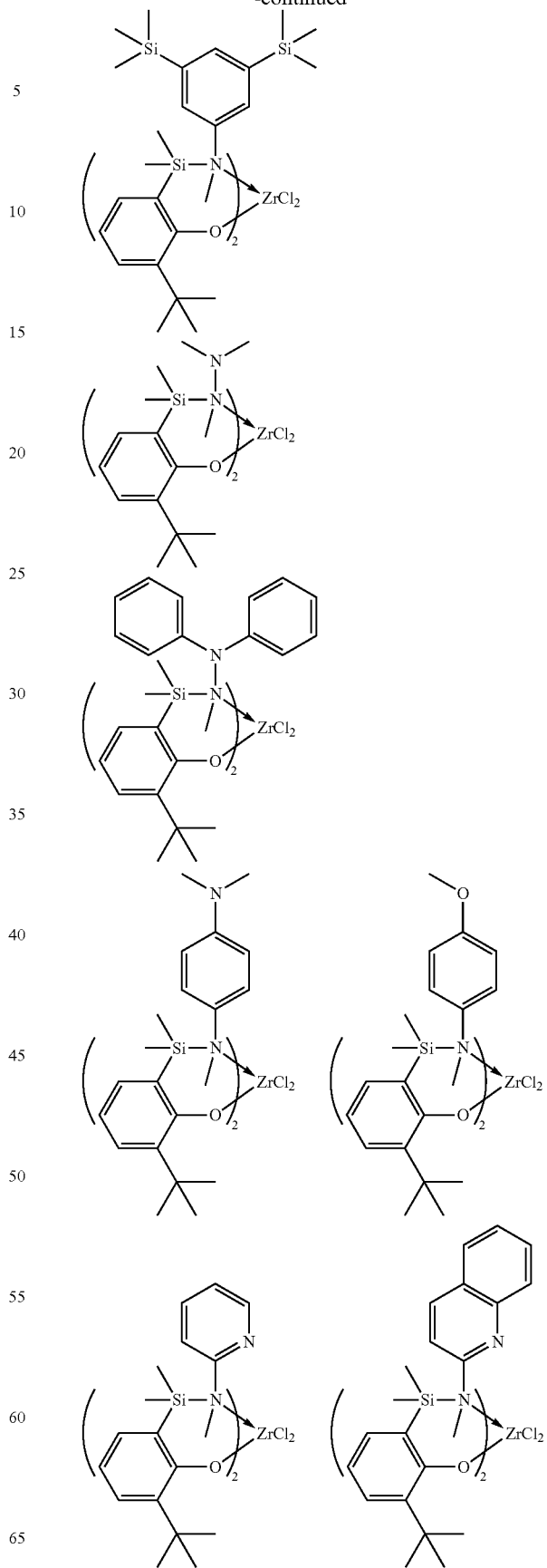

181
-continued
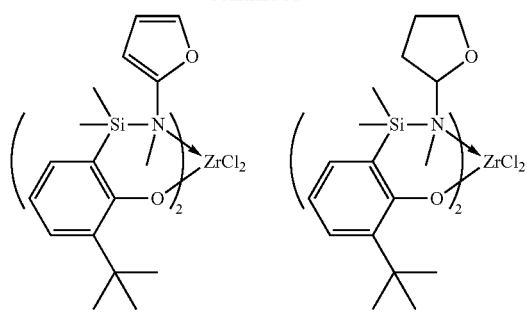
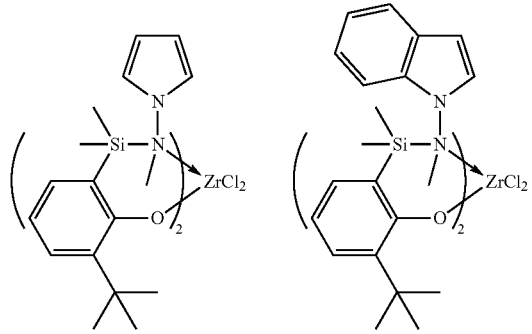
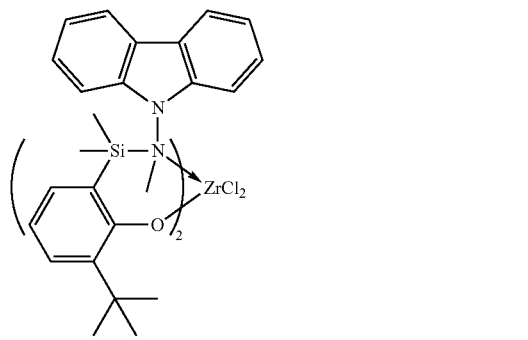
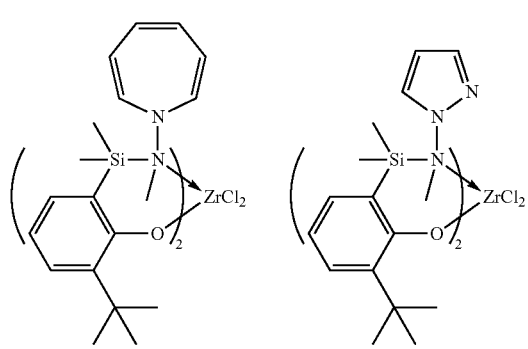
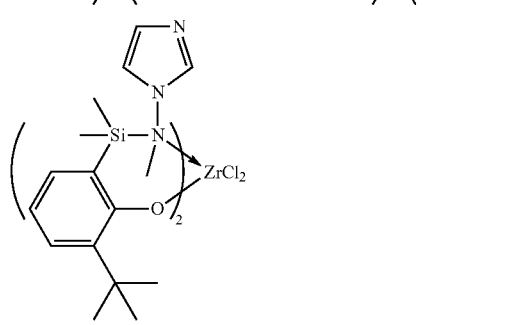
182
-continued
[Chem. 42]
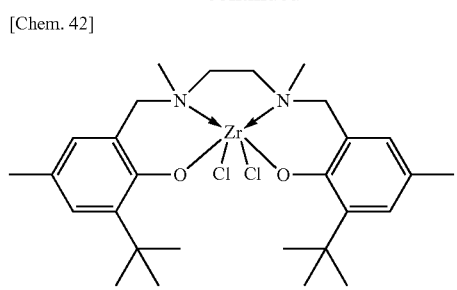
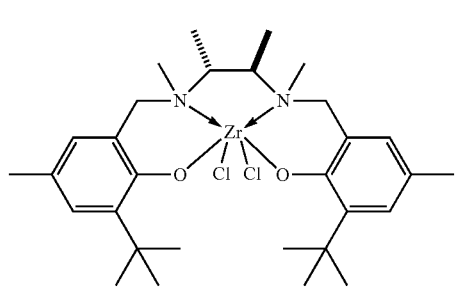
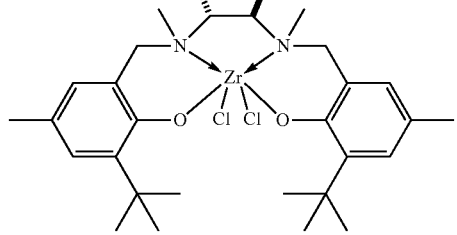
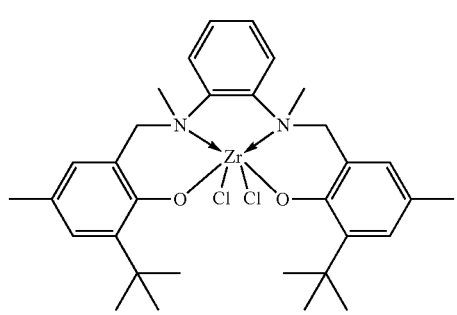
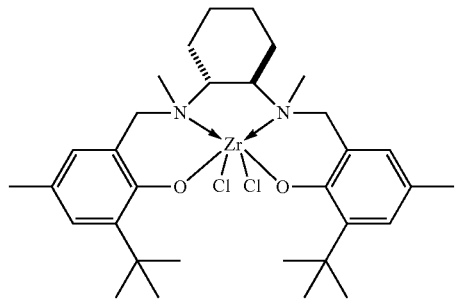

183
-continued
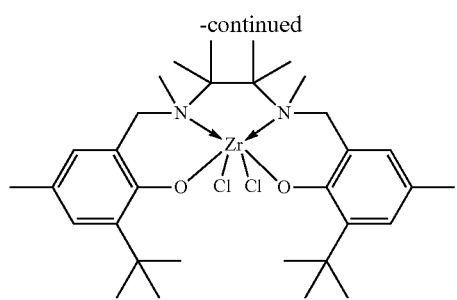
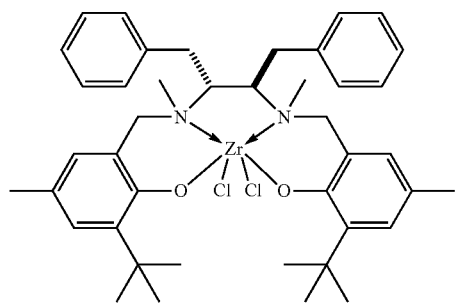
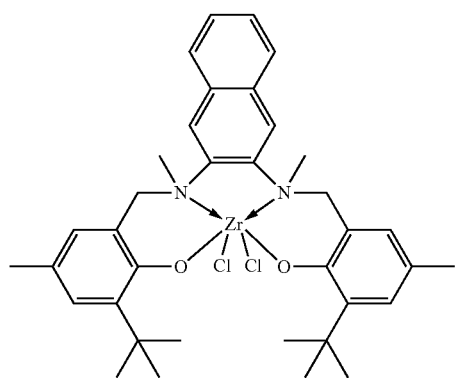
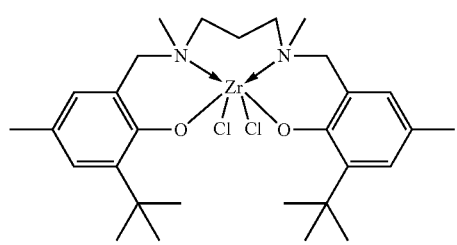
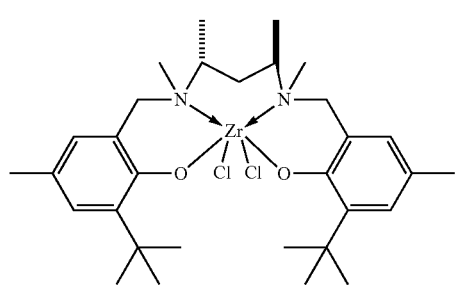
184
-continued
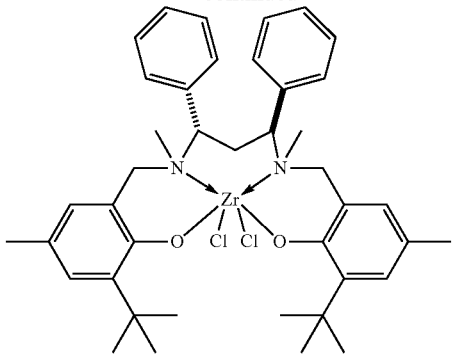
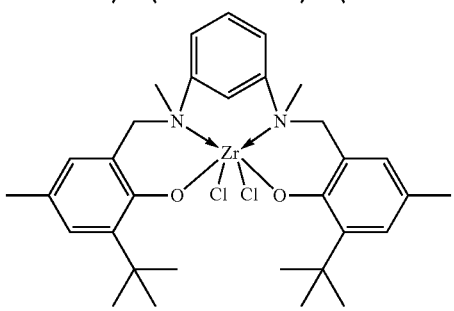
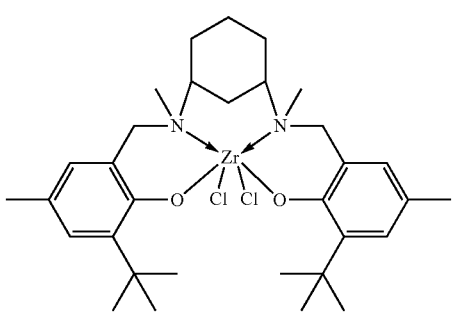
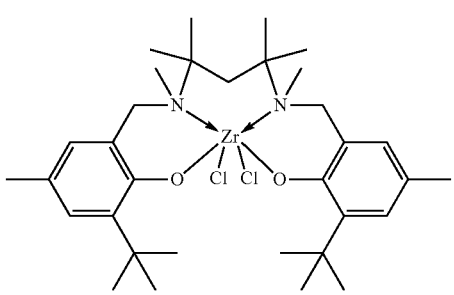
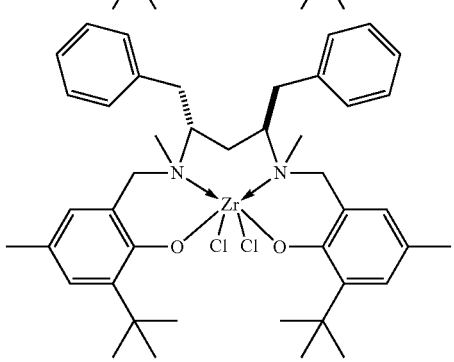

-continued

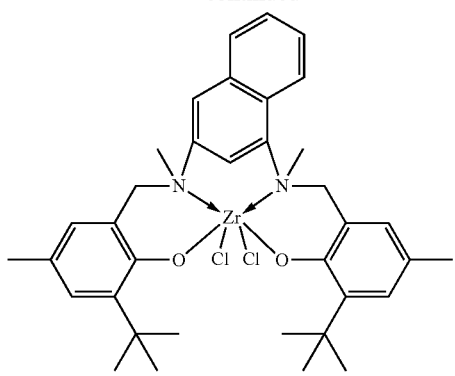
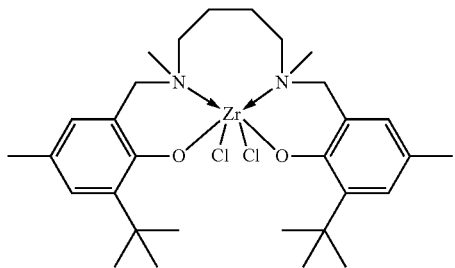
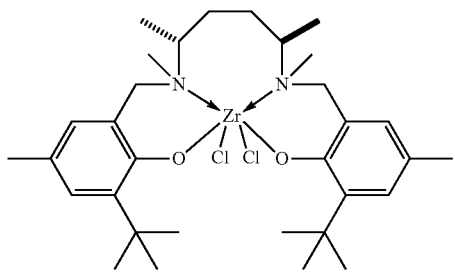
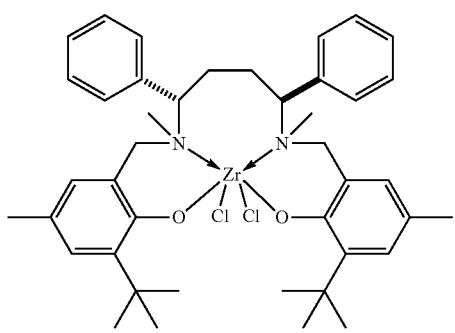
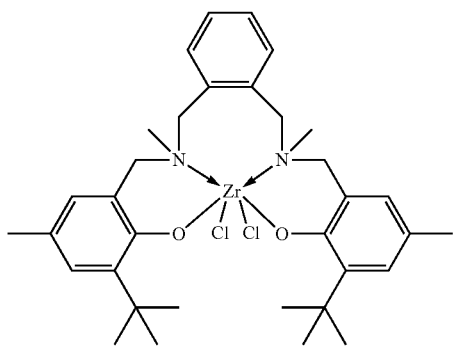

-continued

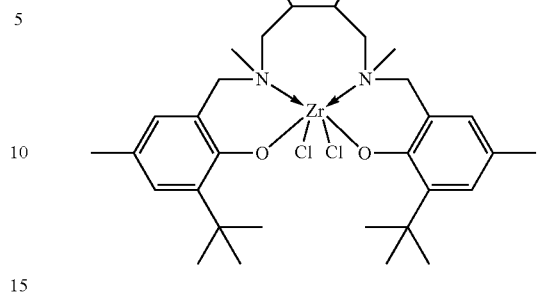
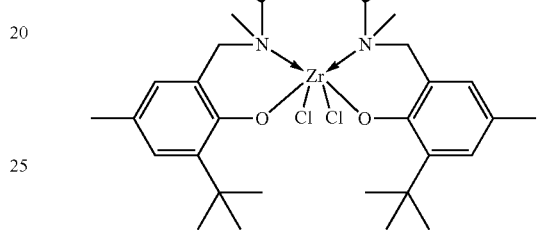
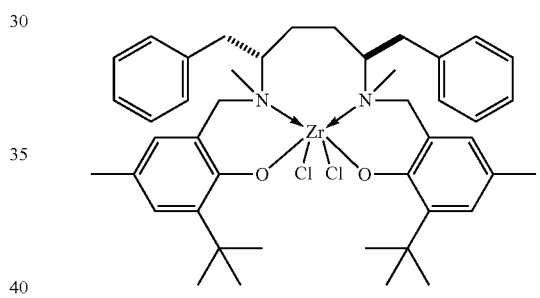
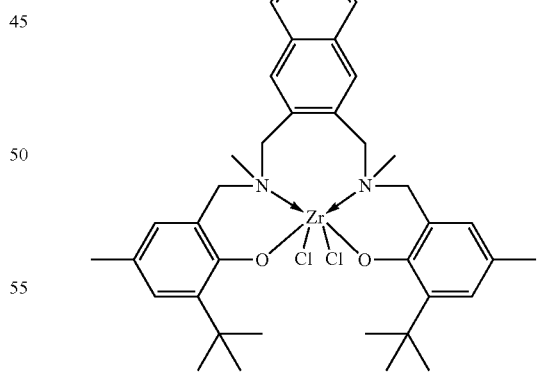

The other compounds that can be exemplified similarly are those modified from the above compounds by (i) replacing a zirconium atom with a hafnium atom or titanium atom, or (ii) replacing a chloride with a bromide, an iodide, a hydride, a methyl, a benzyl, a methoxide, an isopropoxide, an n-butoxide, a phenoxide, a benzyloxide, a dimethylamide, or a diethylamide.

The transition metal compound (A-Y) represented by the general formula (1-Y-3) can be produced through a method described in "Organometallics", Vol. 28, 1391 (2009) or "Macromolecules", Vol. 43, 1689 (2010).

[Chem. 43]

(1-Y-4)

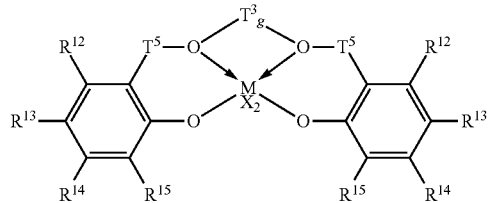

In the general formula (1-Y-4), M, X, and $R^{12}$ to $R^{15}$ are equal to those in the general formula (1-Y-2a), $T^3$ and g are equal to those in the general formula (1-Y-2b). M is preferably a transition metal atom of Group 4 of the periodic table of the elements (specifically, a titanium atom, a zirconium atom, or a hafnium atom), particularly preferably a zirconium atom or a hafnium atom. In a case where g is 2 or more, $T^3$ groups may be the same as or different from each other.

$T^5$ denotes —$CR^h{}_2$—, —$C_6R^h{}_4$—, —$SiR^h{}_2$—, —$NR^h$—, —$PR^h$—, —$P(O)R^h$—, —S—, —S(O)—, or —$SO_2$—, preferably —$CR^h{}_2$—, —$C_6R^h{}_4$—, or —$SiR^h{}_2$—, further preferably —$C_6R^h{}_4$—. In a case where $T^5$ contains a heteroatom, the heteroatom of $T^5$ may be attached directly to M by a coordinate bond. $T^5$ groups may be the same as or different from each other.

$R^h$ contained in $T^5$ is, for example, equal to X in the general formula (1-Y).

$R^{12}$ to $R^{15}$ are equal to those in the general formula (1-Y-2a). $R^{12}$ to $R^{15}$, $R^f$ contained in $T^3$, and $R^h$ contained in $T^5$ may be the same as or different from each other. Each of the $R^{12}$ groups, each of the $R^{13}$ groups, each of the $R^{14}$ groups, each of the $R^{15}$ groups, and each of the $R^h$ groups may be the same as or different from each other. In a case where there are a plurality of $R^f$ groups and $R^f$ groups may be the same as or different from each other. Two or more of $R^{12}$ groups, to $R^{15}$ groups, $R^f$ groups, and $R^h$ groups linked to each other/one another to form a ring.

$R^{12}$ to $R^{15}$, $R^f$, and $R^h$ are each preferably a hydrogen atom, a halogen atom, a carbon-containing group, a silicon-containing group, a nitrogen-containing group, an oxygen-containing group, or a heterocyclic compound residue, further preferably (1) a hydrocarbyl group of (i) a linear or branched alkyl group having 1 to 30 (preferably 1 to 20) carbon atoms such as methyl group, ethyl group, n-propyl group, isopropyl group, n-butyl group, isobutyl group, sec-butyl group, t-butyl group, n-pentyl group, neopentyl group, and n-hexyl group or (ii) an aryl group having 6 to 30 (preferably 6 to 20) carbon atoms such as phenyl group, naphthyl group, biphenyl group, terphenyl group, phenanthryl group, and anthracenyl group, (2) a halohydrocarbyl group or perhalocarbyl group in which a part of or all of the hydrogen atoms in any of the above hydrocarbyl groups are replaced with halogen atoms, (3) a hydrocarbyl substituted silyl group such as trimethylsilyl group, triethylsilyl group, triphenylsilyl group, and dimethylphenylsilyl group, (4) a heterocyclic compound residue having 2 to 30 (preferably 2 to 20) carbon atoms such as pyrrolidyl group, pyrrolyl group, piperidyl group, pyrazolyl group, imidazolyl group, indolyl group, and carbazolyl group, or (5) a group in which a part of or all of the hydrogen atoms in any of the above heterocyclic compound residues are replaced with hydrocarbyl groups.

As the transition metal compound represented by the general formula (1-Y-4), a compound represented by the following general formula (1-Y-4a) is preferably used.

[Chem. 44]

(1-Y-4a)

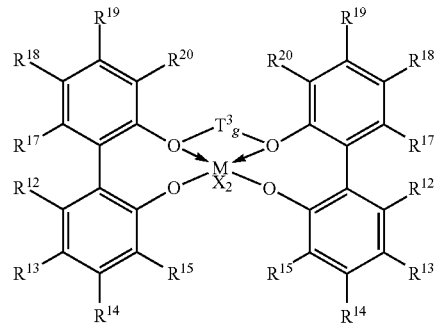

In the general formula (1-Y-4a), M, X, $T^3$ and g are equal to those in the general formula (1-Y-4). M is preferably a transition metal atom of Group 4 of the periodic table of the elements (specifically, a titanium atom, a zirconium atom, or a hafnium atom), particularly preferably a zirconium atom or a hafnium atom. In a case where g is 2 or more, $T^3$ groups may be the same as or different from each other.

X is preferably a halogen atom, methyl group, neopentyl group, benzyl group, trialkyl silylmethyl group, alkoxo group, aryloxo group, or N,N-dialkylamide group.

$R^{12}$ to $R^{15}$ are equal to those in the general formula (1-Y-4). $R^{17}$ to $R^{20}$ are also equal to $R^{12}$ to $R^{15}$ in the general formula (1-Y-4). $R^{12}$ to $R^{15}$, $R^{17}$ to $R^{20}$, and $R^f$ contained in $T^3$ may be the same as or different from each other. Each of the $R^{12}$ groups, each of the $R^{13}$ groups, each of the $R^{14}$ groups, each of the $R^{15}$ groups, each of the $R^{17}$ groups, each of the $R^{18}$ groups, each of the $R^{19}$ groups, and each of the $R^{20}$ groups may be the same as or different from each other. In a case where g is 2 or more, $R^f$ groups may be the same as or different from each other. Two or more of $R^{12}$ groups to $R^{15}$ groups, $R^{17}$ groups to $R^{20}$ groups, and $R^f$ groups may be linked to each other/one another to form a ring. In a case where g is 2 or more, two or more of $R^f$ groups may be linked to each other to form a ring.

$R^{12}$ to $R^{15}$, $R^{17}$ to $R^{20}$, and $R^f$ are each preferably a hydrogen atom, a halogen atom, a carbon-containing group, a silicon-containing group, a nitrogen-containing group, an oxygen-containing group, or a heterocyclic compound residue, further preferably (1) a hydrocarbyl group of (i) a linear or branched alkyl group having 1 to 30 (preferably 1 to 20) carbon atoms such as methyl group, ethyl group, n-propyl group, isopropyl group, n-butyl group, isobutyl group, sec-butyl group, t-butyl group, n-pentyl group, neopentyl group, and n-hexyl group or (ii) an aryl group having 6 to 30 (preferably 6 to 20) carbon atoms such as phenyl group, naphthyl group, biphenyl group, terphenyl group, phenanthryl group, and anthracenyl group, (2) a halohydrocarbyl group or perhalocarbyl group in which a part of or all of the hydrogen atoms in any of the above hydrocarbyl groups are replaced with halogen atoms, (3) a hydrocarbyl substituted silyl group such as trimethylsilyl group, triethylsilyl group, triphenylsilyl group, and dimethylphenylsilyl group, (4) a heterocyclic compound residue having 2 to 30 (preferably 2 to 20) carbon atoms such as pyrrolidyl group, pyrrolyl group, piperidyl group, pyrazolyl group, imidazolyl group, indolyl group, and carbazolyl group, or (5) a group in which a part of or all of the hydrogen atoms in any of the above heterocyclic compound residues are replaced with hydrocarbyl groups.

As the transition metal compound represented by the general formula (1-Y-4a), a compound represented by the following general formula (1-Y-4b) is preferably used.

[Chem. 45]

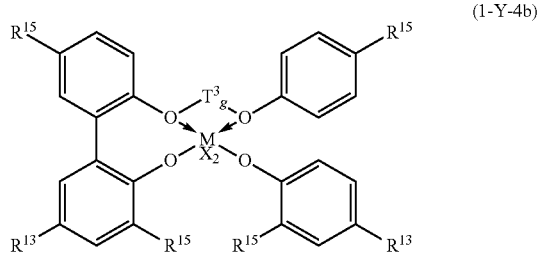

(1-Y-4b)

In the general formula (1-Y-4b), M, X, $T^3$ and g are equal to those in the general formula (1-Y-4a). M is preferably a transition metal atom of Group 4 of the periodic table of the elements (specifically, a titanium atom, a zirconium atom, or a hafnium atom), particularly preferably a zirconium atom or a hafnium atom. In a case where g is 2 or more, $T^3$ groups may be the same as or different from each other.

X is preferably a halogen atom, methyl group, neopentyl group, benzyl group, trialkyl silylmethyl group, alkoxo group, aryloxo group, or N,N-dialkylamide group.

$R^{13}$, $R^{15}$, and $R^{18}$ are equal to those in the general formula (1-Y-4a). $R^{13}$, $R^{15}$, $R^{18}$, and $R^f$ contained in $T^3$ may be the same as or different from each other. Each of the $R^{13}$ groups, each of the $R^{15}$ groups, and each of the $R^{18}$ groups may be the same as or different from each other. In a case where g is 2 or more, $R^f$ groups may be the same as or different from each other. Two or more of $R^{13}$ groups, $R^{15}$ groups, $R^{18}$ groups, and $R^f$ groups may be linked to each other/one another to form a ring. In a case where g is 2 or more, two or more of $R^f$ groups may be linked to each other to form a ring.

$R^{13}$, $R^{15}$, $R^{18}$, and $R^f$ are each preferably a hydrogen atom, a halogen atom, a carbon-containing group, a silicon-containing group, a nitrogen-containing group, an oxygen-containing group, or a heterocyclic compound residue, further preferably (1) a hydrocarbyl group of (i) a linear or branched alkyl group having 1 to 30 (preferably 1 to 20) carbon atoms such as methyl group, ethyl group, n-propyl group, isopropyl group, n-butyl group, isobutyl group, sec-butyl group, t-butyl group, n-pentyl group, neopentyl group, and n-hexyl group or (ii) an aryl group having 6 to 30 (preferably 6 to 20) carbon atoms such as phenyl group, naphthyl group, biphenyl group, terphenyl group, phenanthryl group, and anthracenyl group, (2) a halohydrocarbyl group or perhalocarbyl group in which a part of or all of the hydrogen atoms in any of the above hydrocarbyl groups are replaced with halogen atoms, (3) a hydrocarbyl substituted silyl group such as trimethylsilyl group, triethylsilyl group, triphenylsilyl group, and dimethylphenylsilyl group, (4) a heterocyclic compound residue having 2 to 30 (preferably 2 to 20) carbon atoms such as pyrrolidyl group, pyrrolyl group, piperidyl group, pyrazolyl group, imidazolyl group, indolyl group, and carbazolyl group, or (5) a group in which a part of or all of the hydrogen atoms in any of the above heterocyclic compound residues are replaced with hydrocarbyl groups.

As the transition metal compound represented by the general formula (1-Y-4b), a compound represented by the following general formula (1-Y-4c) is preferably used.

[Chem. 46]

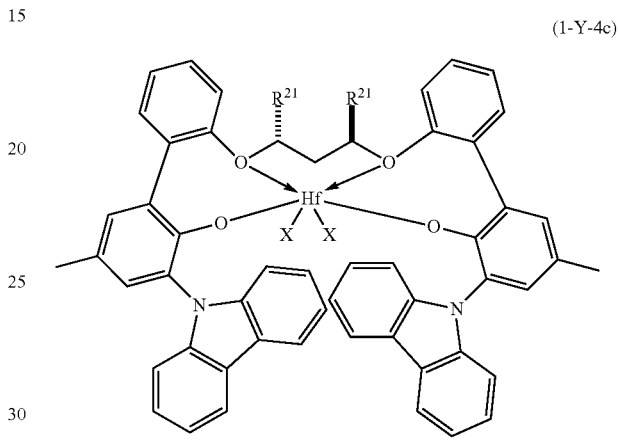

(1-Y-4c)

In the general formula (1-Y-4c), X is each equal to that in the general formula (1-Y-4b). X is preferably a halogen atom, methyl group, neopentyl group, benzyl group, trialkyl silylmethyl group, alkoxo group, aryloxo group, or N,N-dialkylamide group.

$R^{21}$ is, for example, equal to X in the general formula (1-Y). $R^{21}$ groups may be the same as or different from each other. $R^{21}$ groups may be linked to each other to form a ring.

$R^{21}$ is preferably a hydrogen atom, a halogen atom, a carbon-containing group, a silicon-containing group, a nitrogen-containing group, an oxygen-containing group, or a heterocyclic compound residue, further preferably (1) a hydrocarbyl group of (i) a linear or branched alkyl group having 1 to 30 (preferably 1 to 20) carbon atoms such as methyl group, ethyl group, n-propyl group, isopropyl group, n-butyl group, isobutyl group, sec-butyl group, t-butyl group, n-pentyl group, neopentyl group, and n-hexyl group or (ii) an aryl group having 6 to 30 (preferably 6 to 20) carbon atoms such as phenyl group, naphthyl group, biphenyl group, terphenyl group, phenanthryl group, and anthracenyl group, (2) a halohydrocarbyl group or perhalocarbyl group in which a part of or all of the hydrogen atoms in any of the above hydrocarbyl groups are replaced with halogen atoms, or (3) a hydrocarbyl substituted silyl group such as trimethylsilyl group, triethylsilyl group, triphenylsilyl group, and dimethylphenylsilyl group.

The following illustrates example specific structures of the transition metal compound (A-Y) represented by the general formula (1-Y-4). The transition metal compound (A-Y) represented by the general formula (1-Y-4) is, however, not limited to these structures.

[Chem. 47]
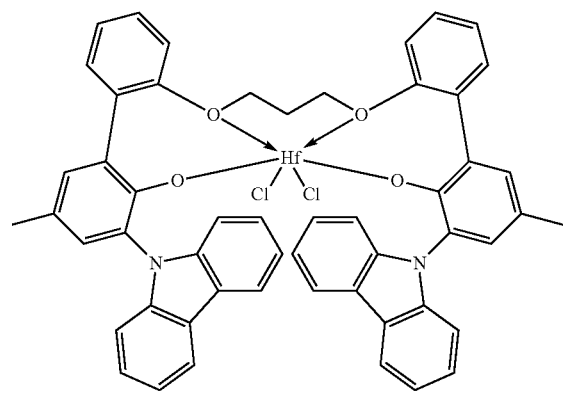
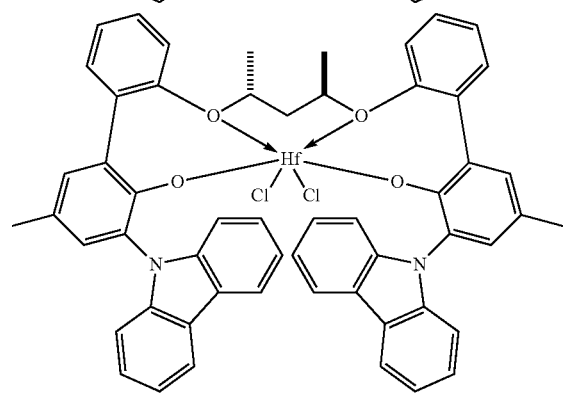
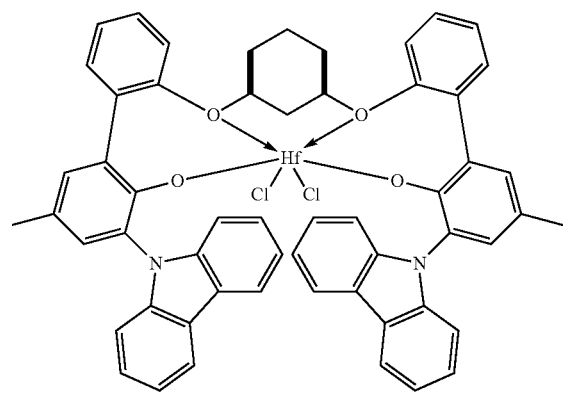
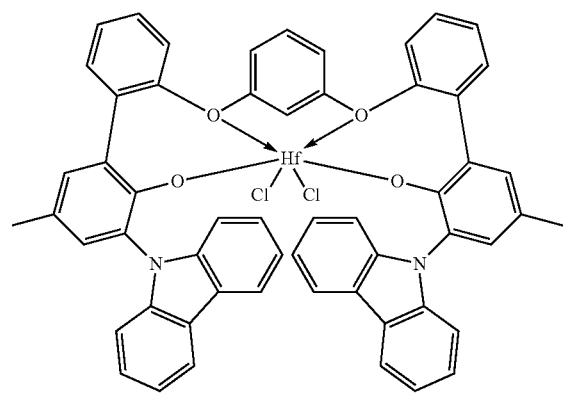
-continued
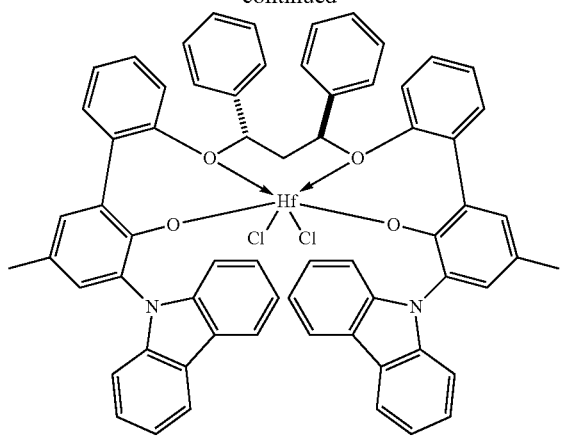
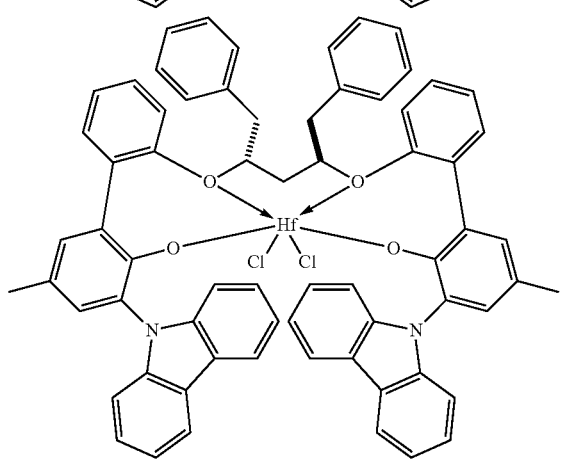

193
-continued
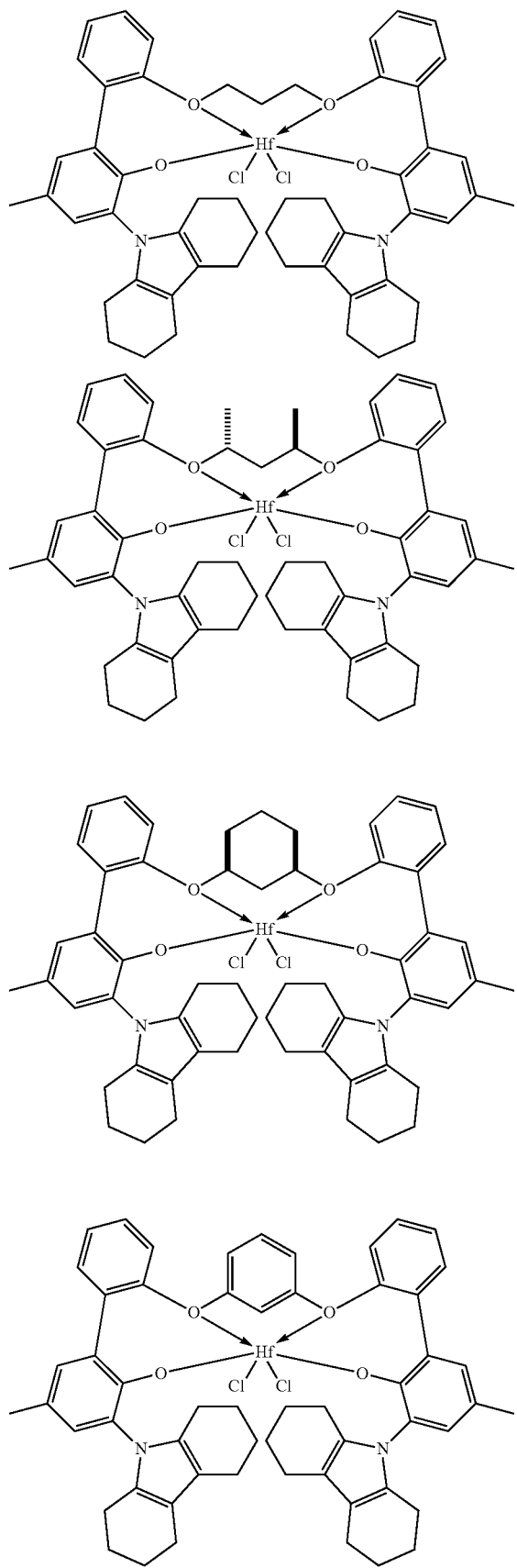
194
-continued
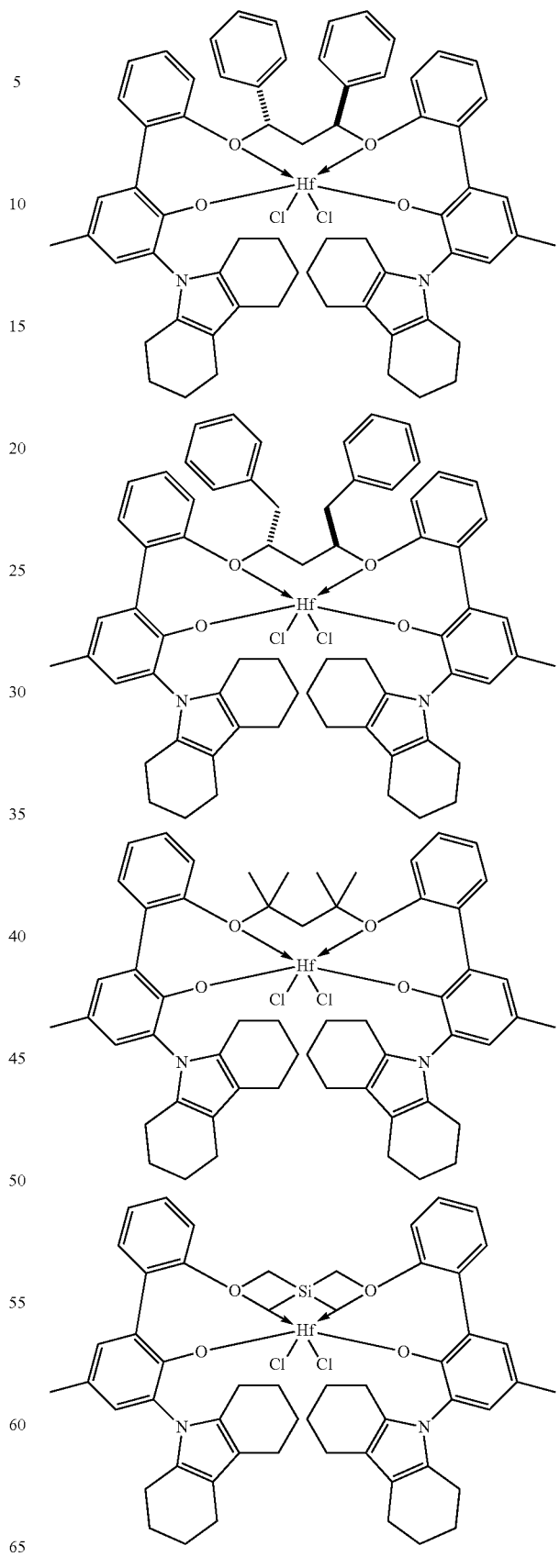

195
-continued
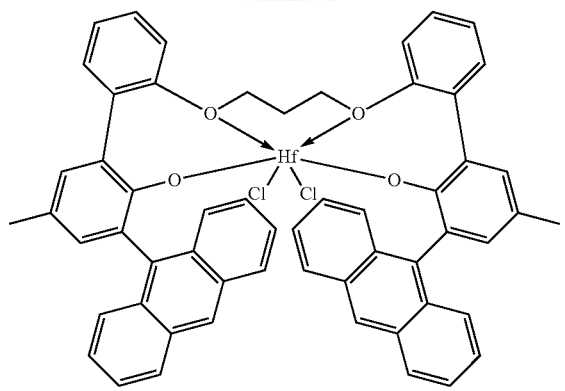
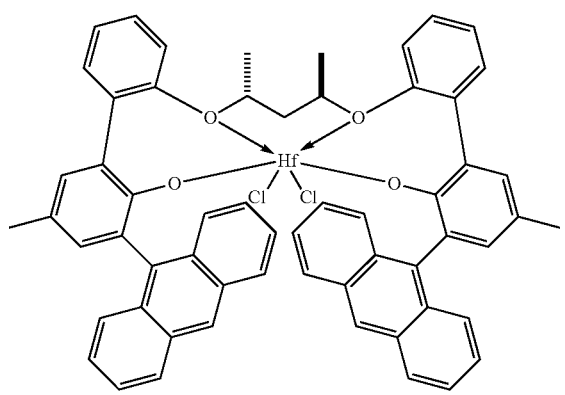
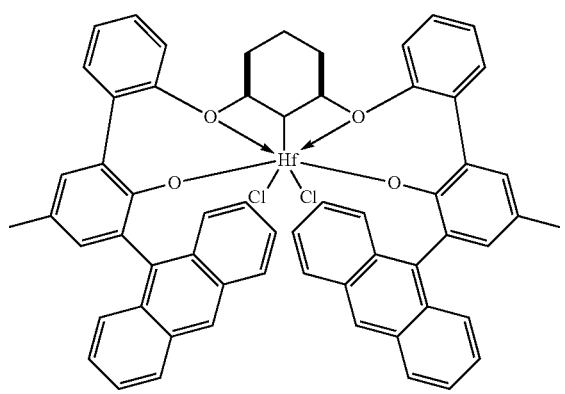
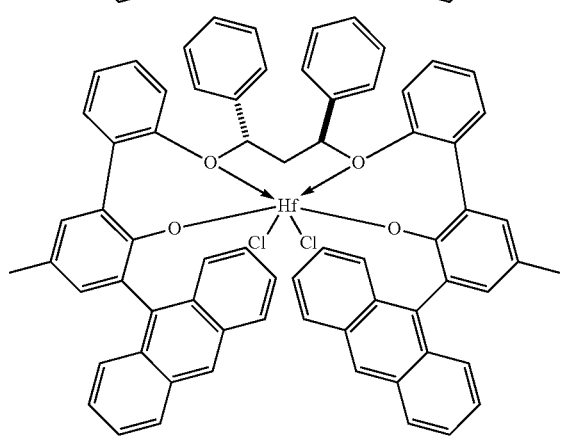
196
-continued
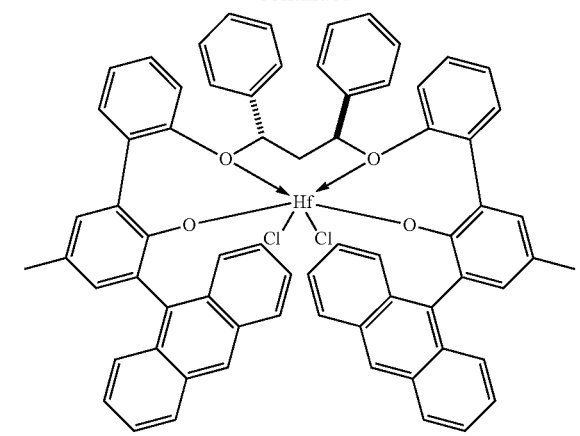
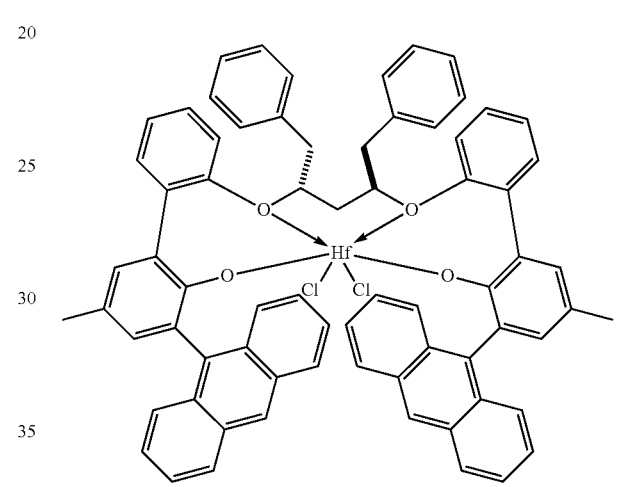
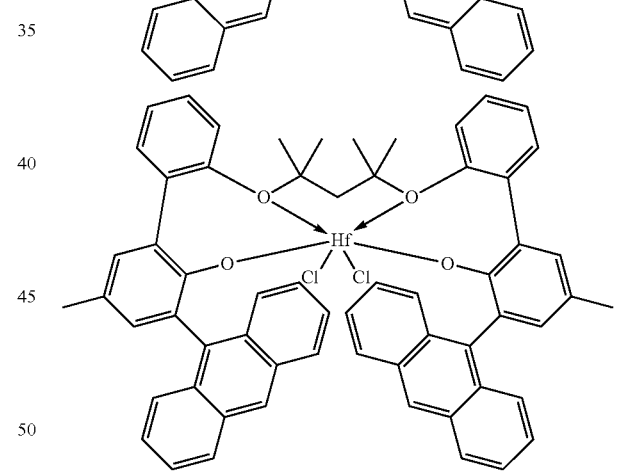
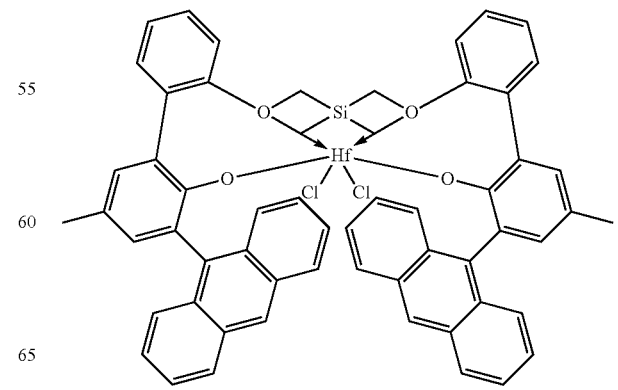

197
-continued
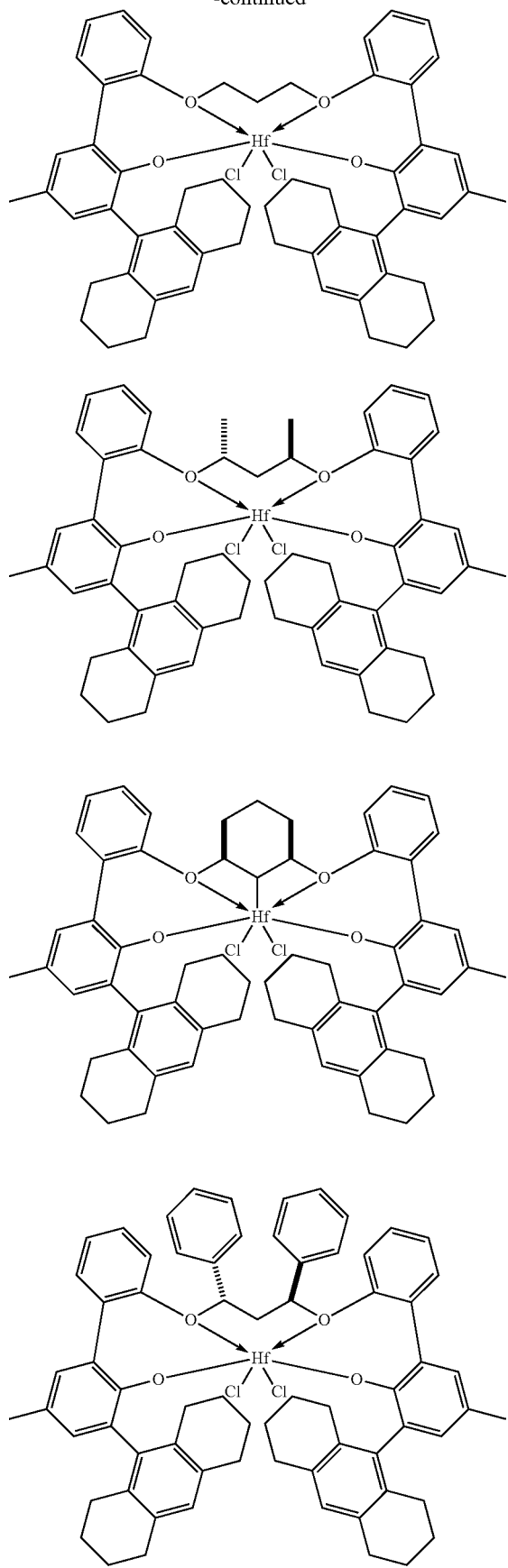
198
-continued
[Chem. 48]
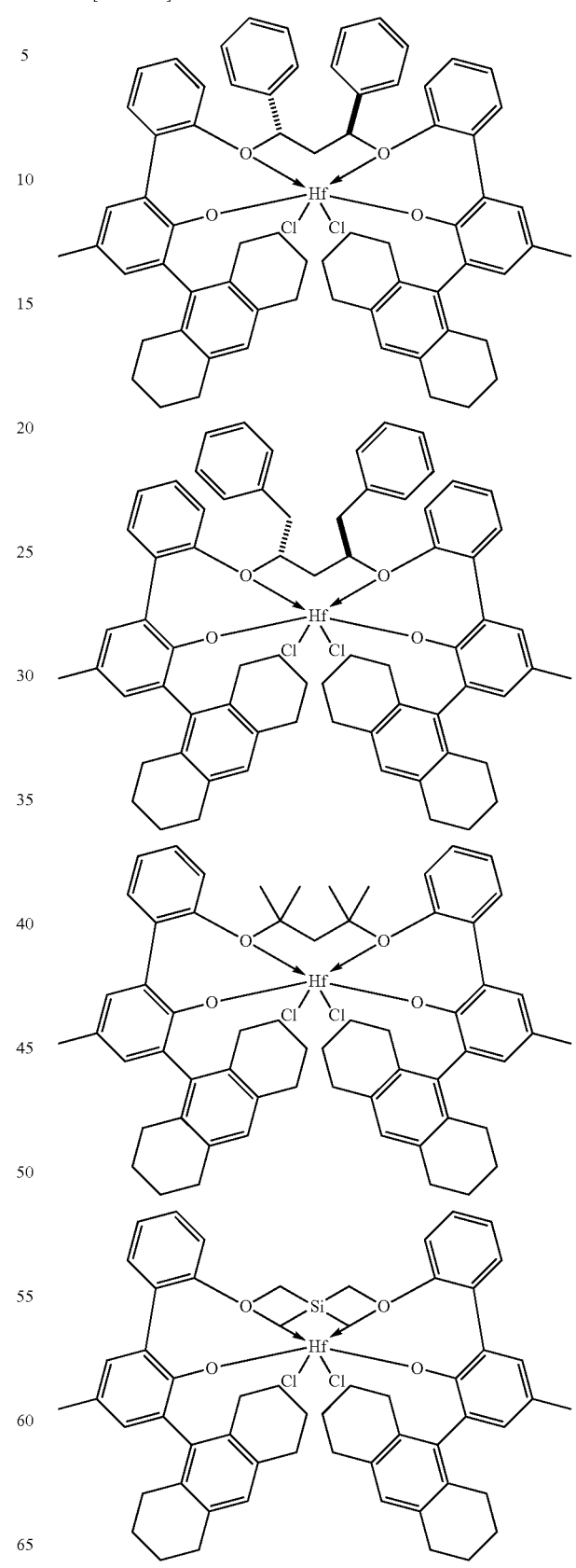

199
-continued
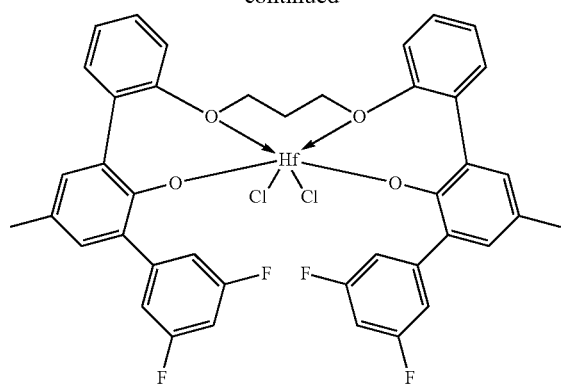
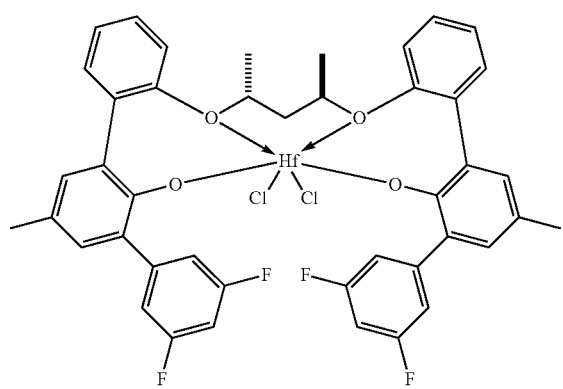
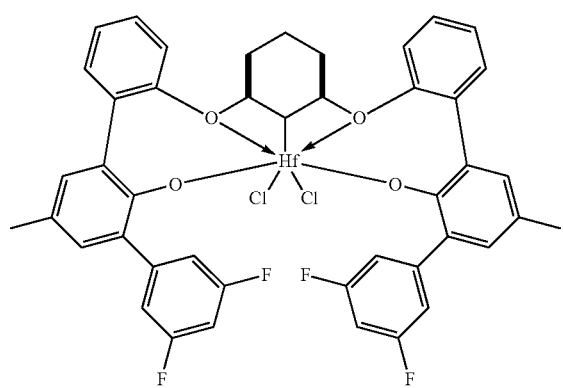
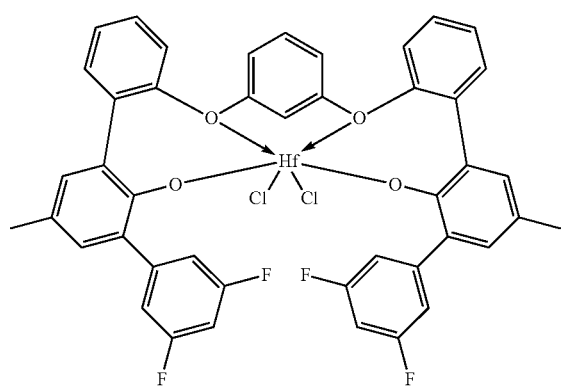
200
-continued
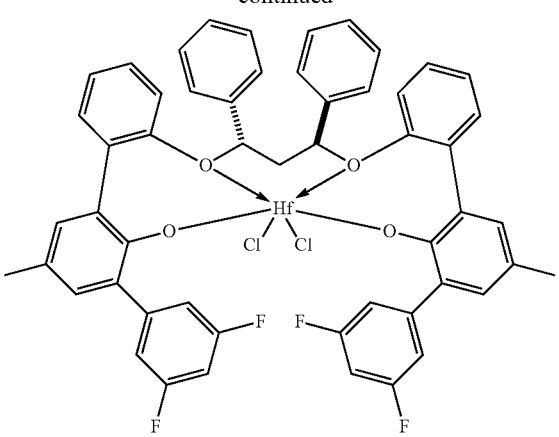
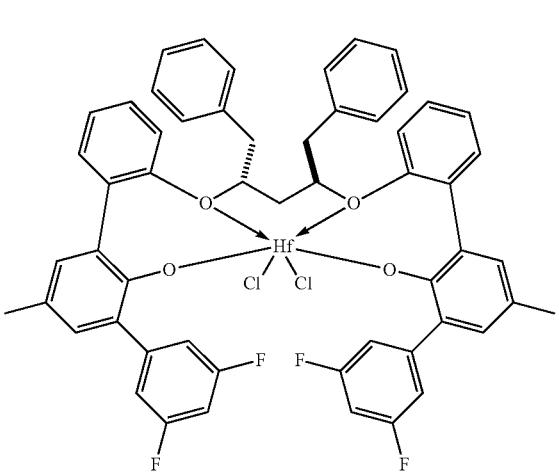
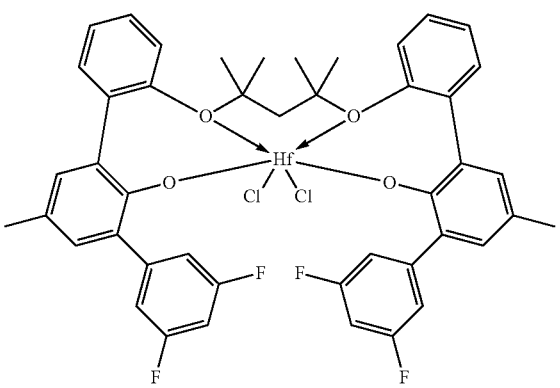
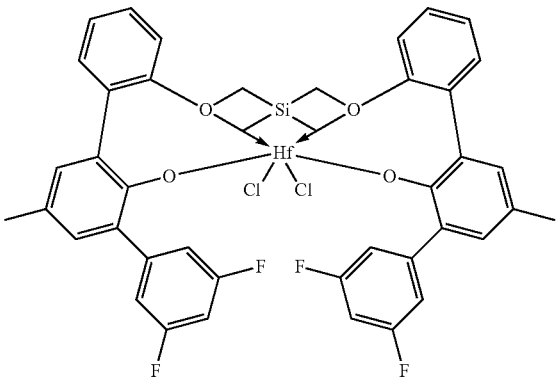

| 201 | 202 |
|---|---|
| -continued | -continued |
| 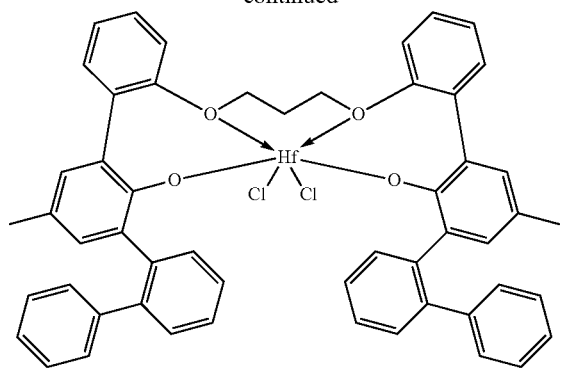 | 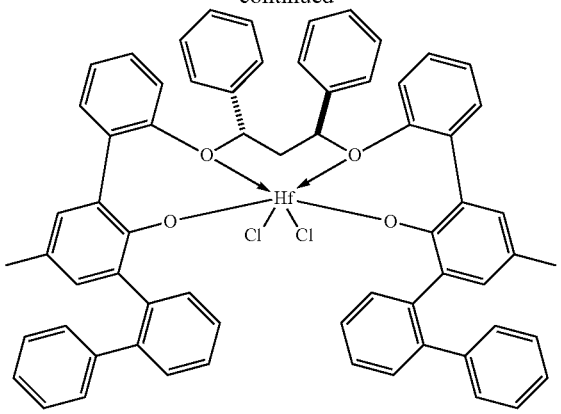 |
| 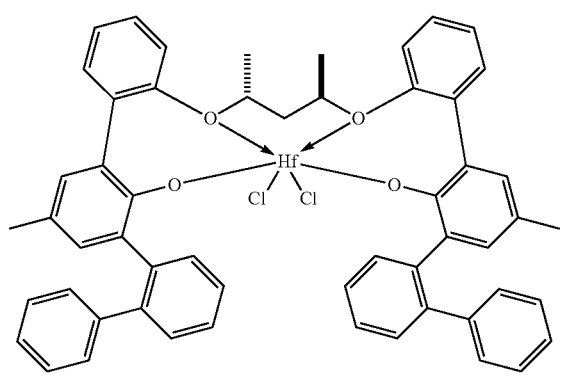 | 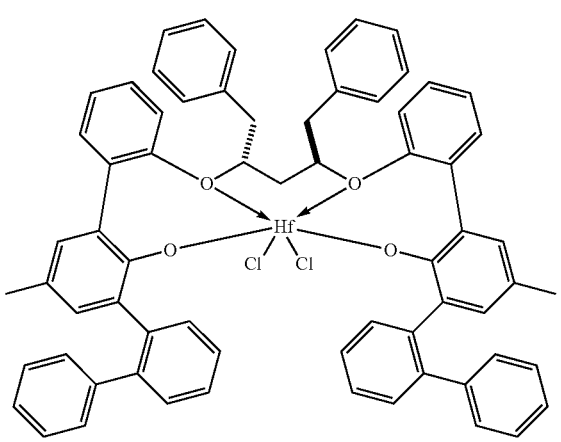 |
| 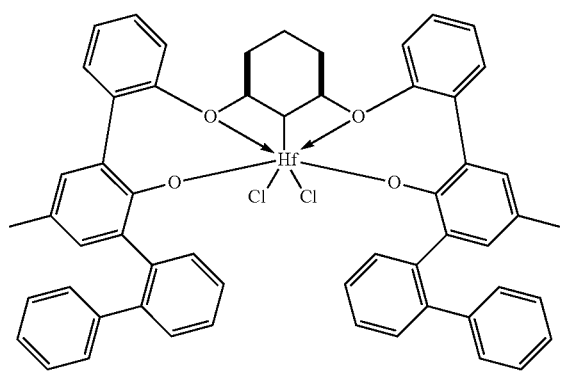 | 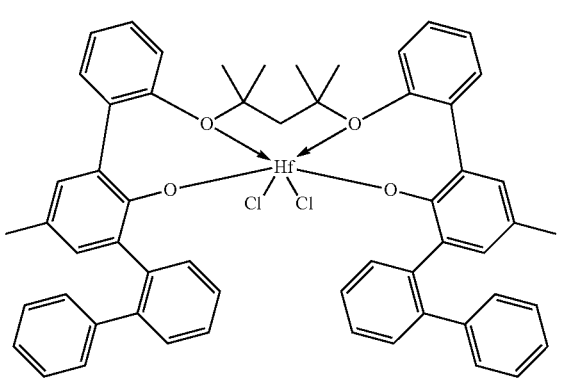 |
| 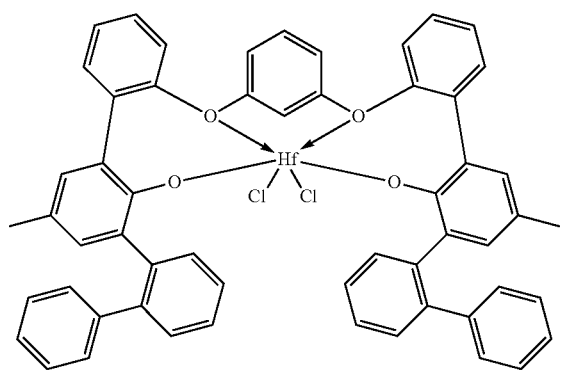 | 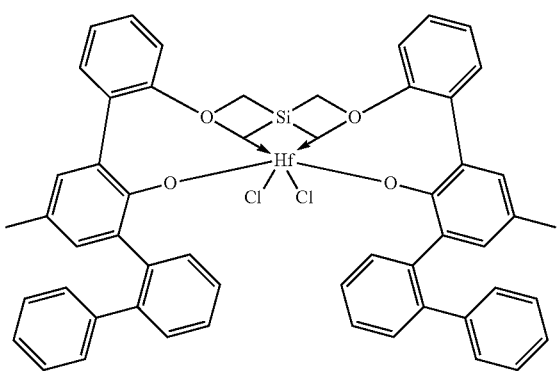 |

203
-continued
204
-continued
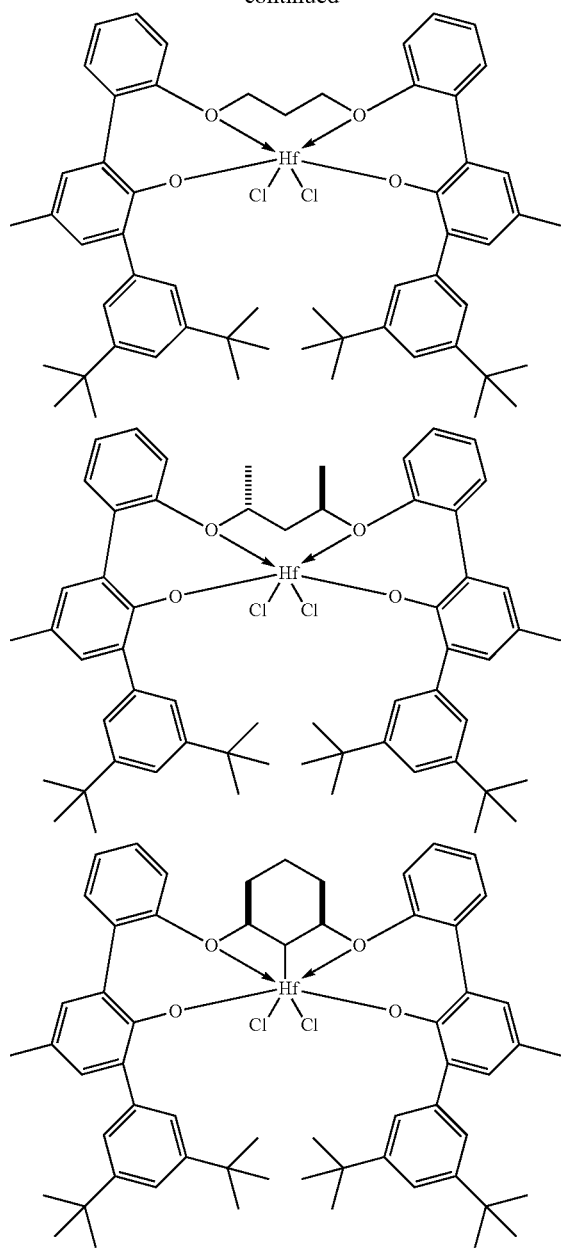
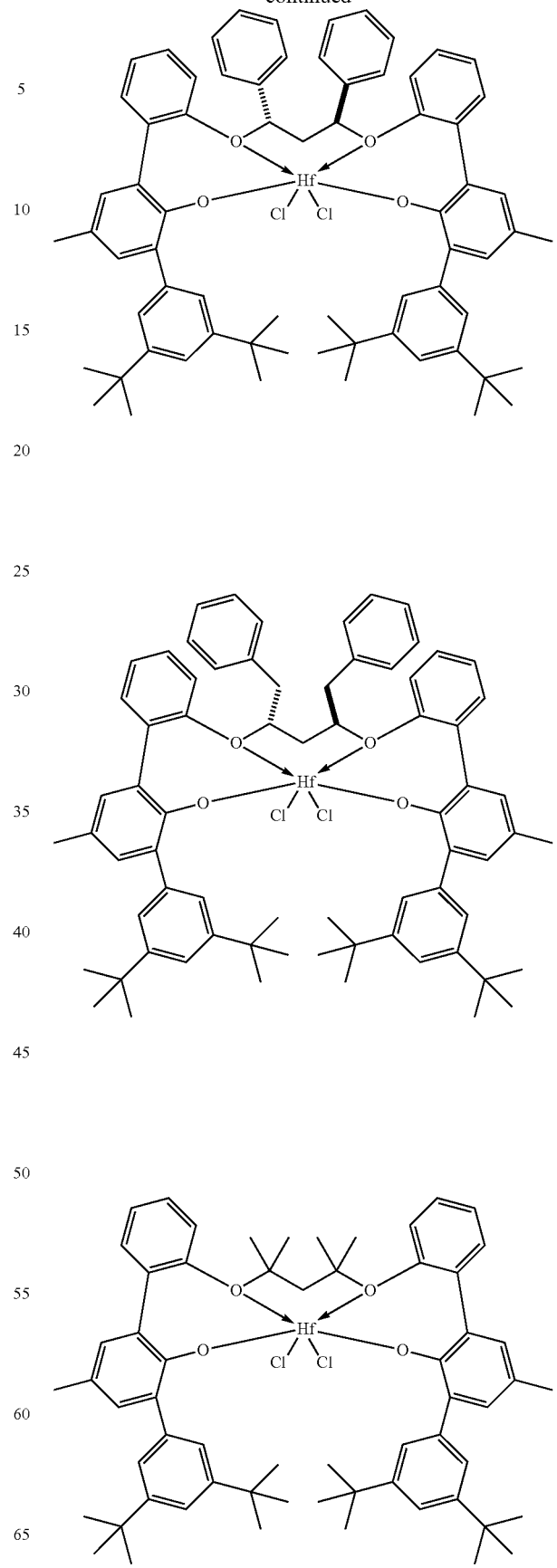

205
-continued
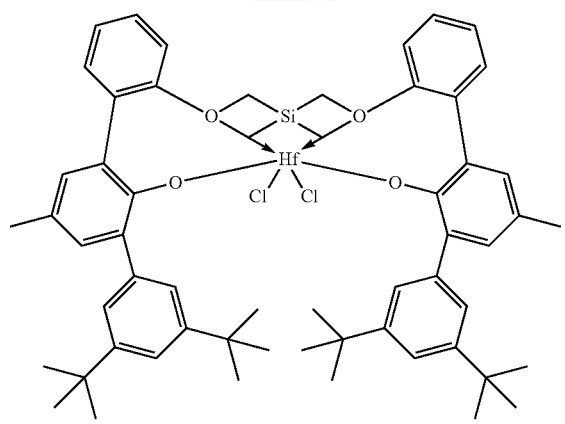
[Chem. 49]
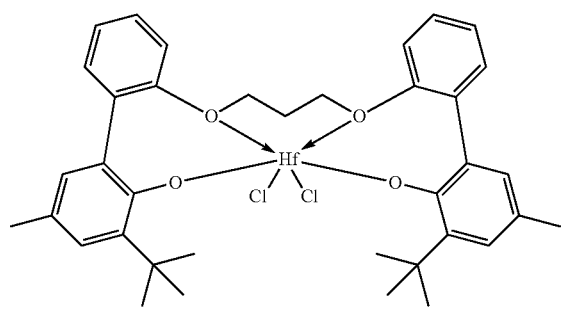
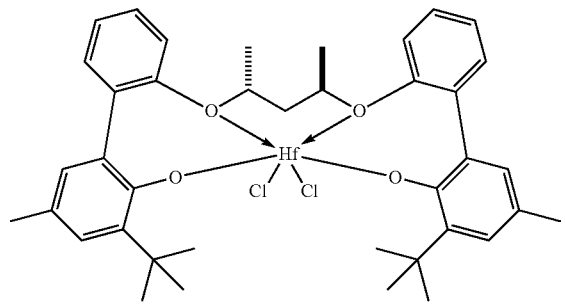
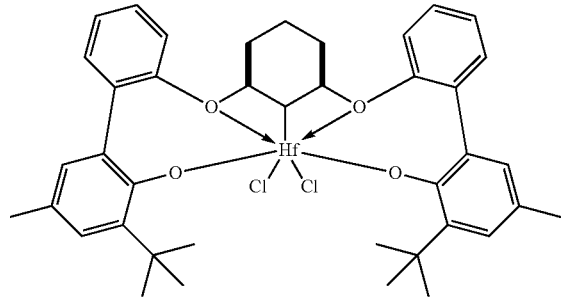
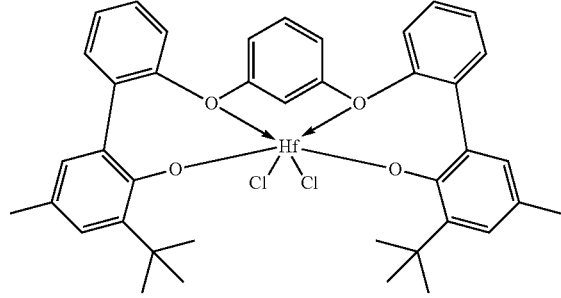
206
-continued
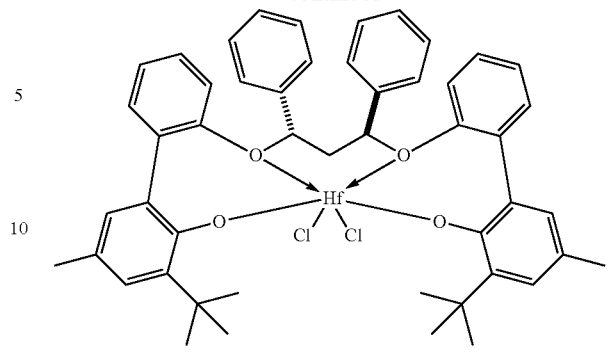
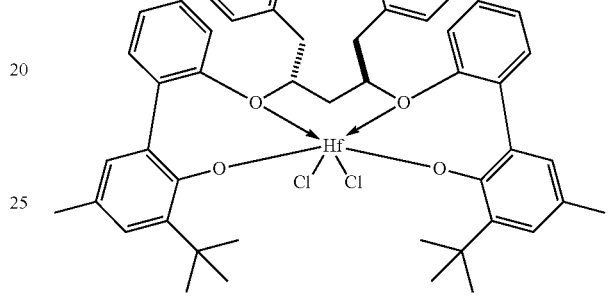
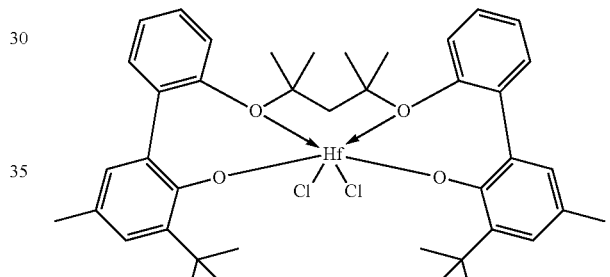
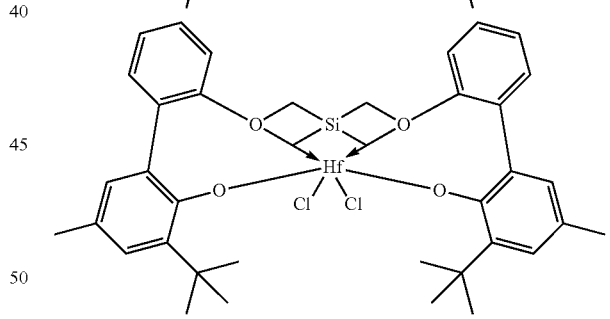
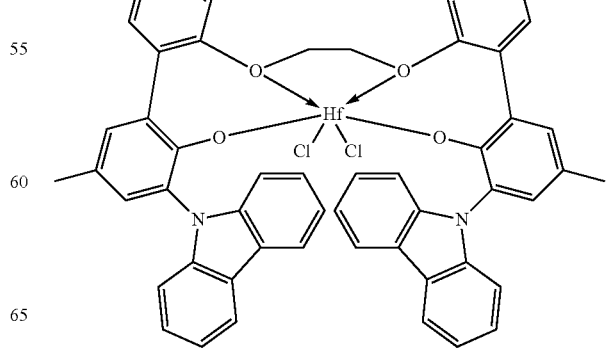

207
-continued
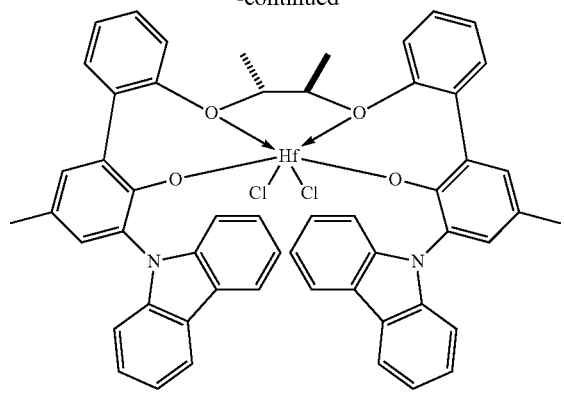
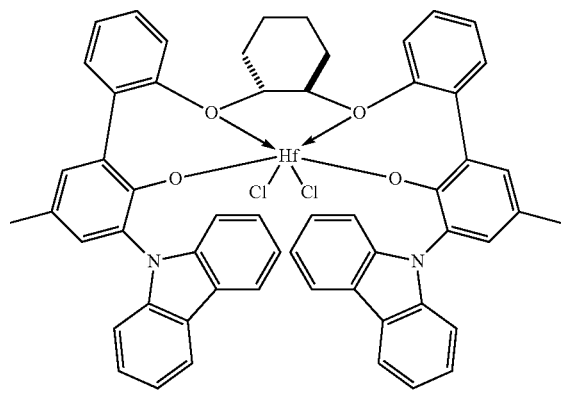
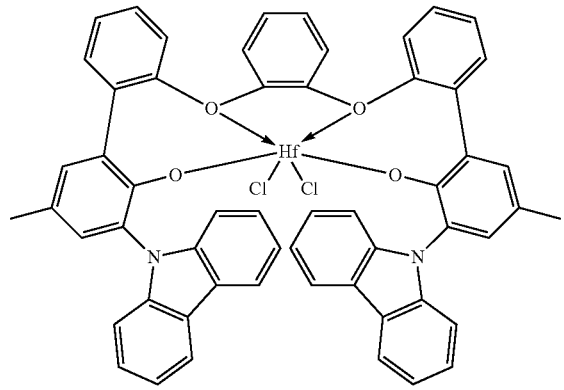
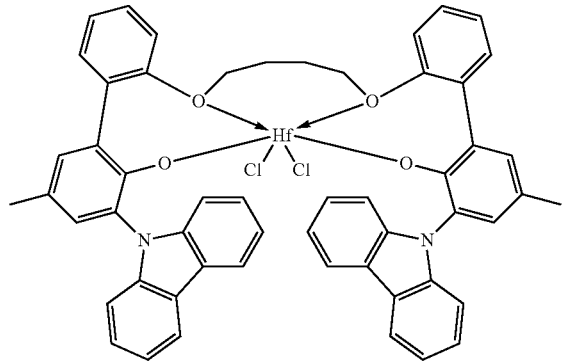
208
-continued
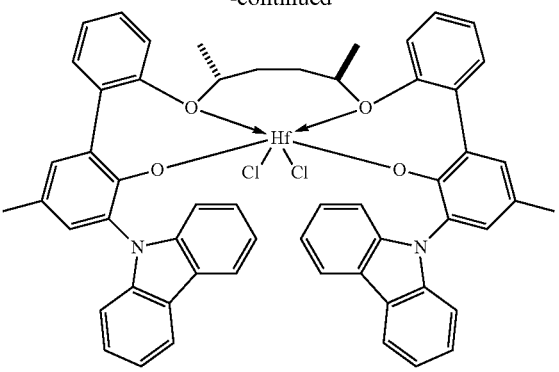
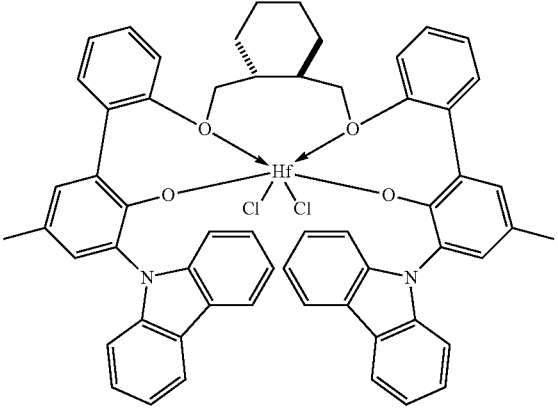
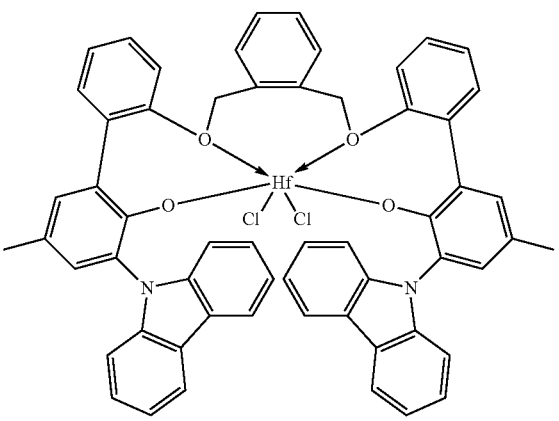
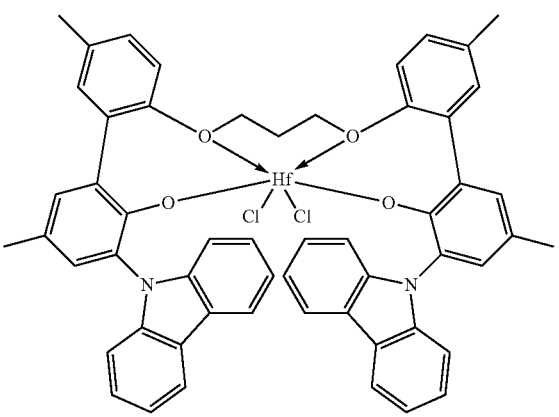

-continued

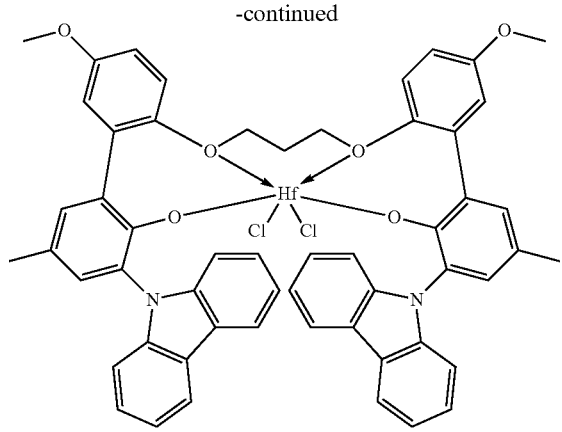

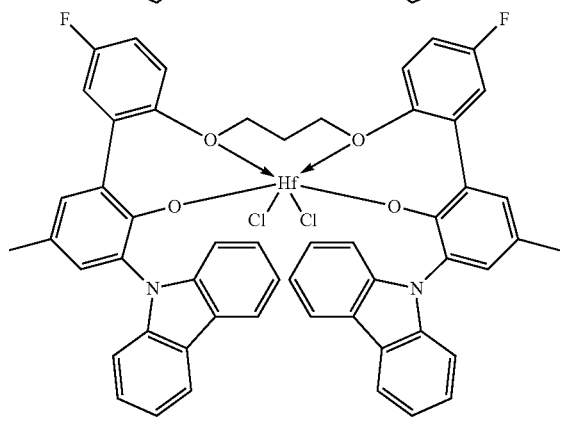

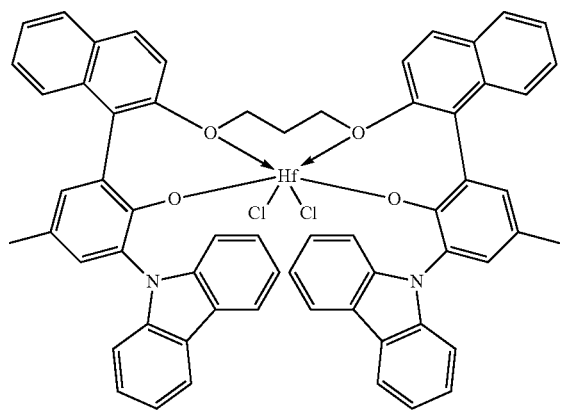

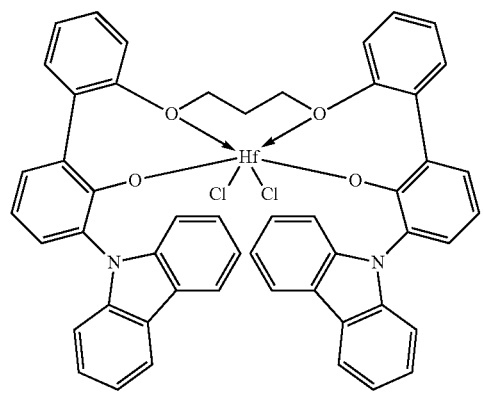

-continued

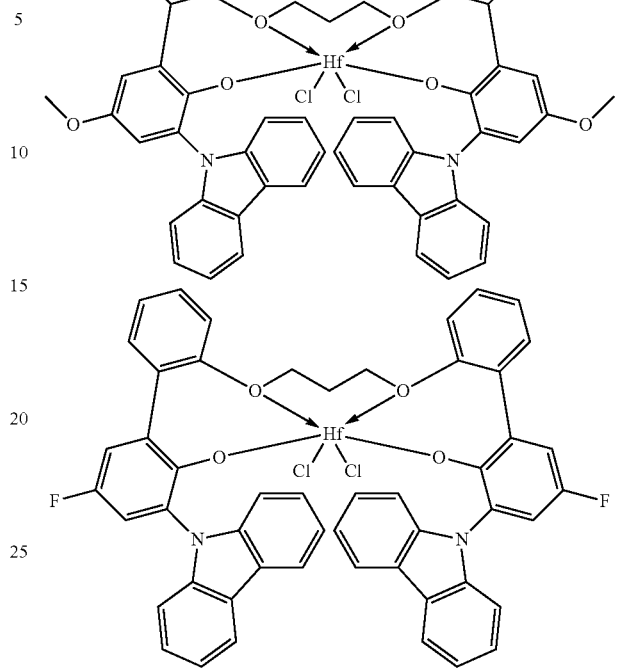

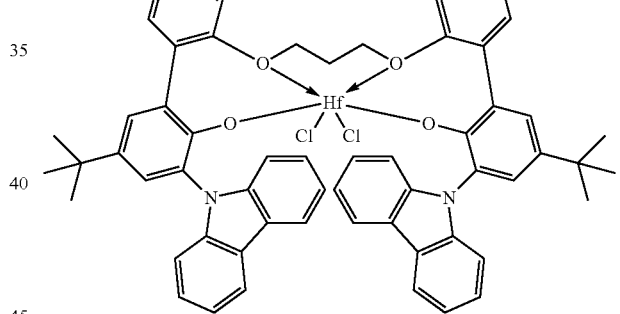

The other compounds that can be exemplified similarly are those modified from the above compounds by (i) replacing a hafnium atom with a zirconium atom or a titanium atom, or (ii) replacing a chloride with a bromide, an iodide, a hydride, a methyl, a benzyl, a methoxide, an isopropoxide, an n-butoxide, a phenoxide, a benzyloxide, a dimethylamide, or a diethylamide.

The transition metal compound (A-Y) represented by the general formula (1-Y-4) can be produced through a method described in U.S. Pat. No. 7,241,714, specification.

[Chem. 50]

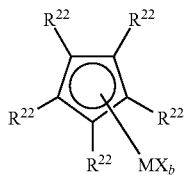

(1-Y-5)

In the general formula (1-Y-5), M and X are equal to those in the general formula (1-Y), and $R^{22}$ is equal to X in the general formula (1-Y).

M is preferably a transition metal atom of Group 4 or 5 of the periodic table of the elements, more preferably a transition metal atom of Group 4 (specifically, a titanium atom, a zirconium atom, or a hafnium atom), and particularly preferably a titanium atom or a zirconium atom.

X is preferably a hydrogen atom, a halogen atom, an oxygen-containing group, a sulfur-containing group, a nitrogen-containing group, a phosphorus-containing group, a hydrocarbyl group, or a silicon-containing group. These groups are each a group containing up to 20 atoms other than hydrogen atoms. The hydrocarbyl group may be a group in which a part of or all of the hydrogen atoms are replaced with one of or two or more of a halogen atom, an oxygen-containing group, and a nitrogen-containing group. b is an integer of any of 1 to 4. In a case where b is 2 or more, X groups may be the same as or different from each other, or two or more X groups may be linked to each other to form a ring.

$R^{22}$ is preferably a hydrogen atom, a halogen atom, an oxygen-containing group, a sulfur-containing group, a nitrogen-containing group, a phosphorus-containing group, a hydrocarbyl group, or a silicon-containing group. These groups are each a group containing up to 20 atoms other than hydrogen atoms. The hydrocarbyl group may be a group in which a part of or all of the hydrogen atoms are replaced with one of or two or more of a halogen atom, an oxygen-containing group, and a nitrogen-containing group. $R^{22}$ groups may be the same as or different from each other, or an adjacent pair of $R^{22}$ groups may be linked to each other to form a ring.

The above ring formed by the bonding between substituents $R^{22}$ on a cyclopentadienyl ring may be any ring such as an aromatic ring, an aliphatic ring, and a heterocycle, preferably a ring such as an indenyl ring, a fluorenyl ring, and an azulenyl ring. Further, a part of or all of the hydrogen atoms on any of the above rings may be replaced with $R^{22}$.

[Chem. 51]

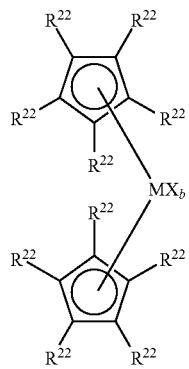

(1-Y-6)

In the general formula (1-Y-6), M, X, and $R^{22}$ are equal to those in the general formula (1-Y-5).

M is preferably a transition metal atom of Group 4 or 5 of the periodic table of the elements, more preferably a transition metal atom of Group 4 (specifically, a titanium atom, a zirconium atom, or a hafnium atom), particularly preferably a zirconium atom or a hafnium atom.

X is preferably a hydrogen atom, a halogen atom, an oxygen-containing group, a sulfur-containing group, a nitrogen-containing group, a phosphorus-containing group, a hydrocarbyl group, or a silicon-containing group. These groups are each a group containing up to 20 atoms other than hydrogen atoms. The hydrocarbyl group may be a group in which a part of or all of the hydrogen atoms are replaced with one of or two or more of a halogen atom, an oxygen-containing group, and a nitrogen-containing group. b is an integer of any of 1 to 3. In a case where b is 2 or more, X groups may be the same as or different from each other, or two or more X groups may be linked to each other to form a ring.

$R^{22}$ is preferably a hydrogen atom, a halogen atom, an oxygen-containing group, a nitrogen-containing group, a hydrocarbyl group, or a silicon-containing group. These groups are each a group containing up to 20 atoms other than hydrogen atoms. The hydrocarbyl group may be a group in which a part of or all of the hydrogen atoms are replaced with one of or two or more of a halogen atom, an oxygen-containing group, and a nitrogen-containing group. $R^{22}$ groups may be the same as or different from each other, or an adjacent pair of $R^{22}$ groups may be linked to each other to form a ring.

The above ring formed by the bonding between substituents $R^{22}$ on a cyclopentadienyl ring may be any ring such as an aromatic ring, an aliphatic ring, and a heterocycle, preferably a ring such as an indenyl ring, a fluorenyl ring, and an azulenyl ring. Further, a part of or all of the hydrogen atoms on any of the above rings may be replaced with $R^{22}$.

The following lists examples of the general formula (1-Y-6):

bis(cyclopentadienyl)zirconium dichloride, bis(methyl cyclopentadienyl)zirconium dichloride, bis(n-butyl cyclopentadienyl)zirconium dichloride, bis(t-butyl cyclopentadienyl)zirconium dichloride, bis(pentamethylcyclopentadienyl)zirconium dichloride, bis(indenyl)zirconium dichloride, bis(fluorenyl)zirconium dichloride, (cyclopentadienyl)(methylcyclopentadienyl)zirconium dichloride, (cyclopentadienyl)(n-butyl cyclopentadienyl)zirconium dichloride, (cyclopentadienyl)(t-butylcyclopentadienyl)zirconium dichloride, (cyclopentadienyl)(pentamethylcyclopentadienyl)zirconium dichloride, (cyclopentadienyl)(indenyl)zirconium dichloride, and (cyclopentadienyl)(fluorenyl)zirconium dichloride The other compounds that can be exemplified similarly are those modified from the above compounds by (i) replacing a zirconium atom with a titanium atom or a hafnium atom, (ii) replacing cyclopentadienyl with methyl cyclopentadienyl, n-butyl cyclopentadienyl, t-butyl cyclopentadienyl, tetramethyl cyclopentadienyl, indenyl, or fluorenyl, or (iii) replacing a chloride with a bromide, an iodide, a hydride, a methyl, a phenyl, a benzyl, a methoxide, an n-butoxide, an isopropoxide, a phenoxide, a benzyloxide, a dimethylamide, or a diethylamide.

The transition metal compound (A-Y) represented by the general formulae (1-Y-5) and (1-Y-6) can be produced through a method described in any of Japanese Patent Application Publications, Tokukaihei, Nos. 3-163088 A, 3-188092 A, 4-268307 A, 6-206890 A, and 9-87313 A.

[Chem. 52]

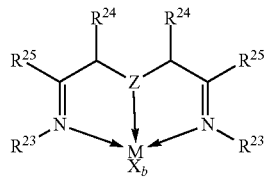

(1-Y-7)

In the general formula (1-Y-7), M, X, and b are equal to those in the general formula (1-Y). M is preferably a transition metal atom of Group 8 or 9 of the periodic table of the elements, more preferably an iron atom or a cobalt atom, further preferably an iron atom.

Z is a nitrogen atom, a phosphorus atom, an oxygen atom, a sulfur atom, a nitrogen-containing group having a substituent $R^m$ (—$NR^m$—), or a phosphorus-containing group having a substituent $R^m$ (—$PR^m$—), preferably a nitrogen atom, an oxygen atom, or a sulfur atom, further preferably a nitrogen atom.

$R^{23}$ to $R^{25}$ and $R^m$ contained in Z are each equal to X in the general formula (1-Y). $R^{23}$ to $R^{25}$ and $R^m$ may be the same as or different from each other. Each of the $R^{23}$ groups, each of the $R^{24}$ groups, and each of the $R^{25}$ groups may be the same as or different from each other. Two or more of $R^{23}$ groups, $R^{24}$ groups, $R^{25}$ groups, and $R^m$ groups may be linked to each other/one another to form a ring.

The following illustrates example specific structures of the transition metal compound (A-Y) represented by the general formula (1-Y-7). The transition metal compound (A-Y) represented by the general formula (1-Y-7) is, however, not limited to these structures.

[Chem. 53]

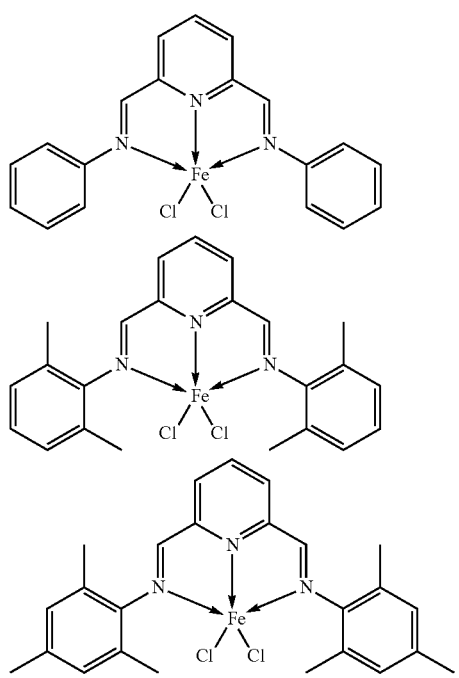

-continued

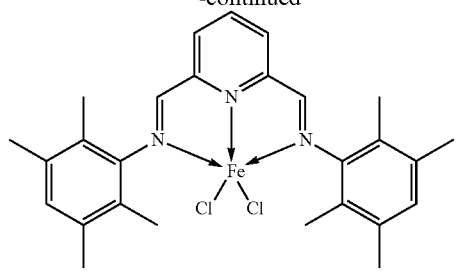

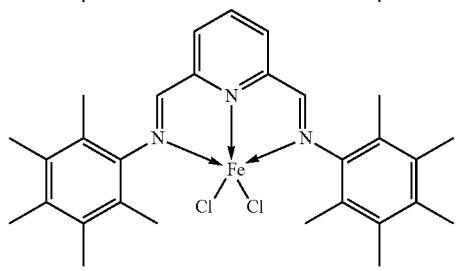

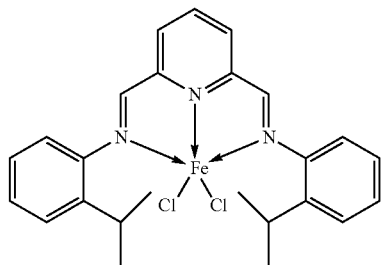

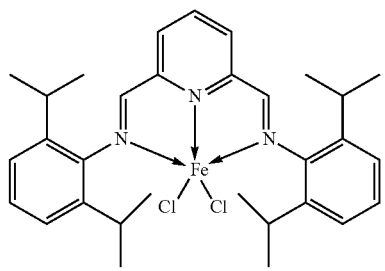

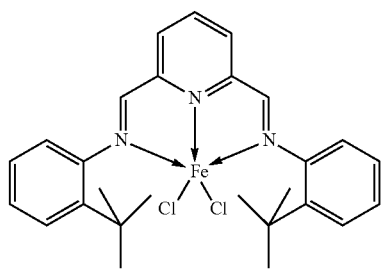

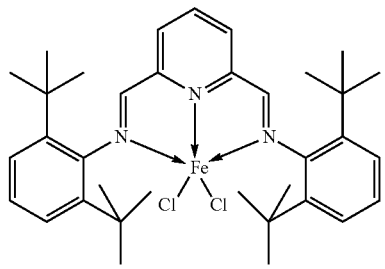

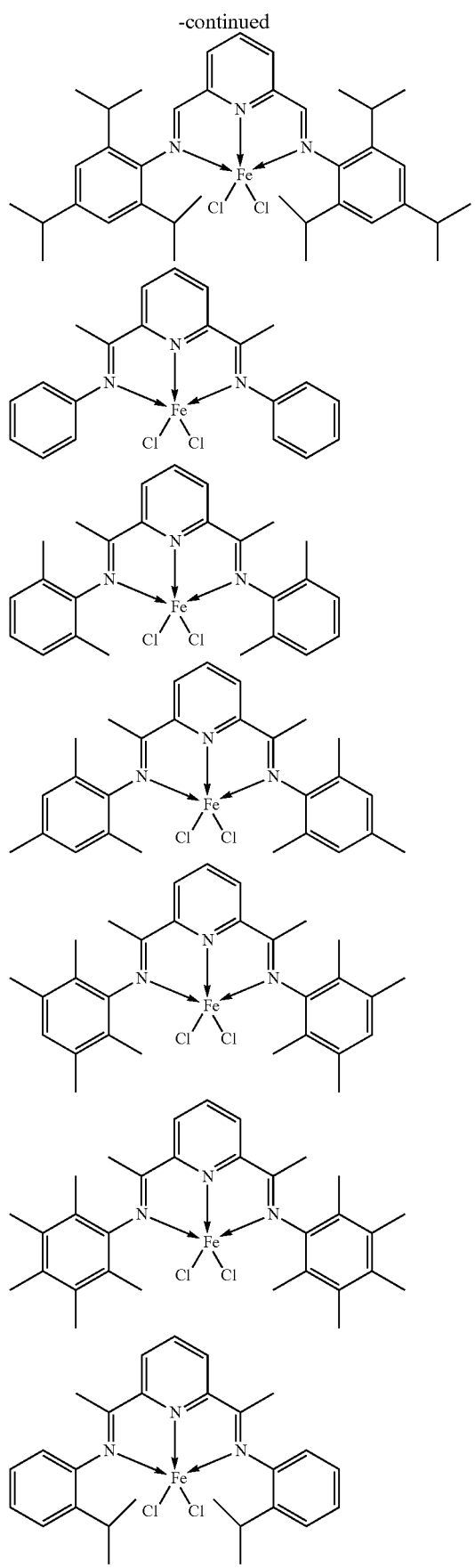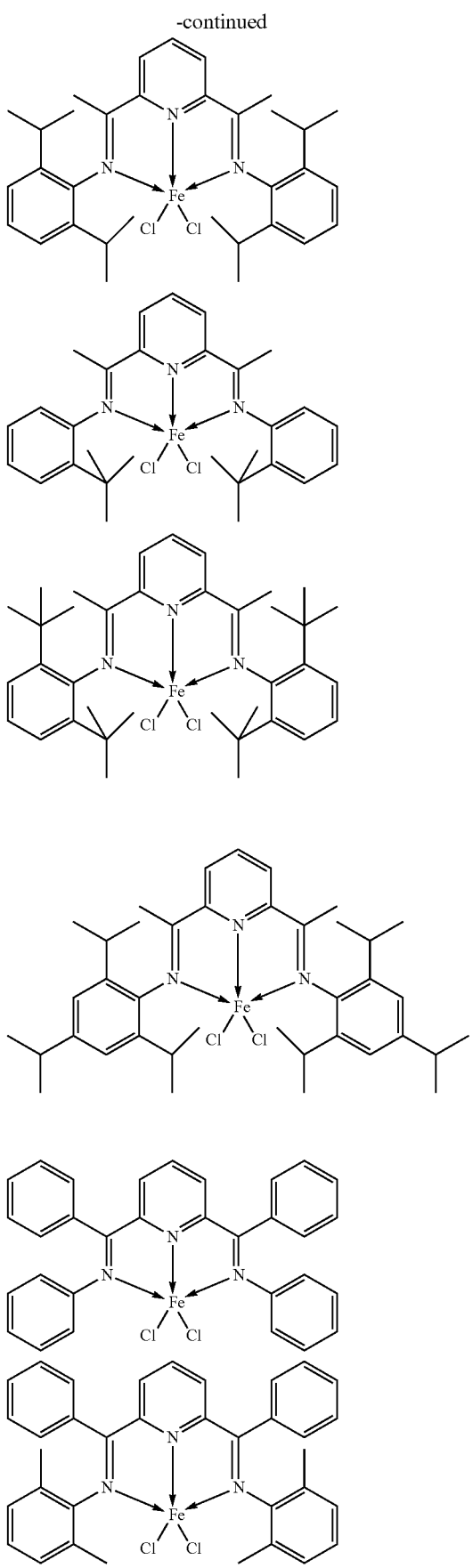

217
-continued
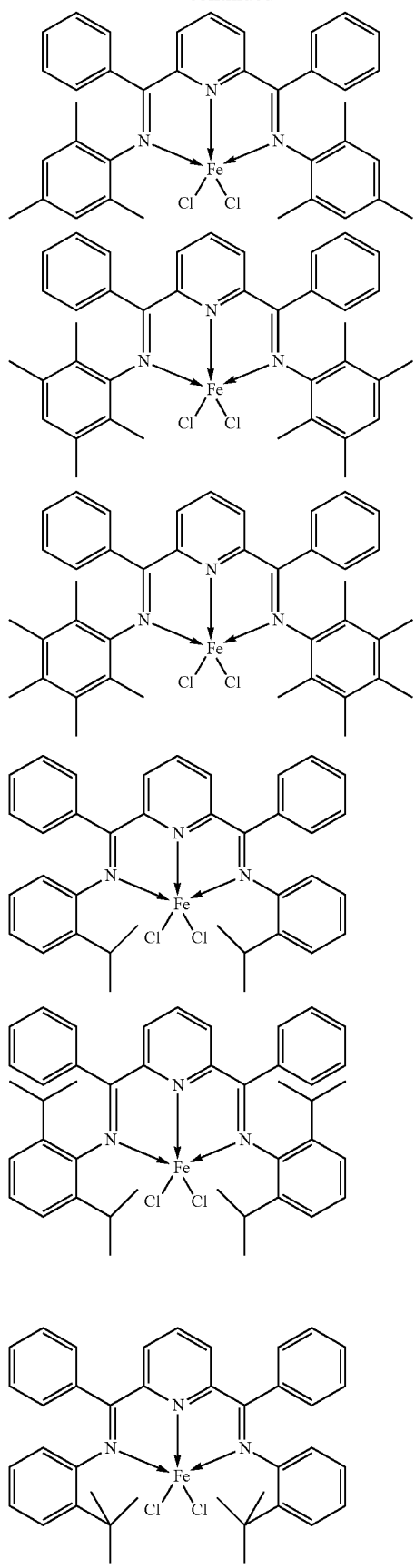
218
-continued
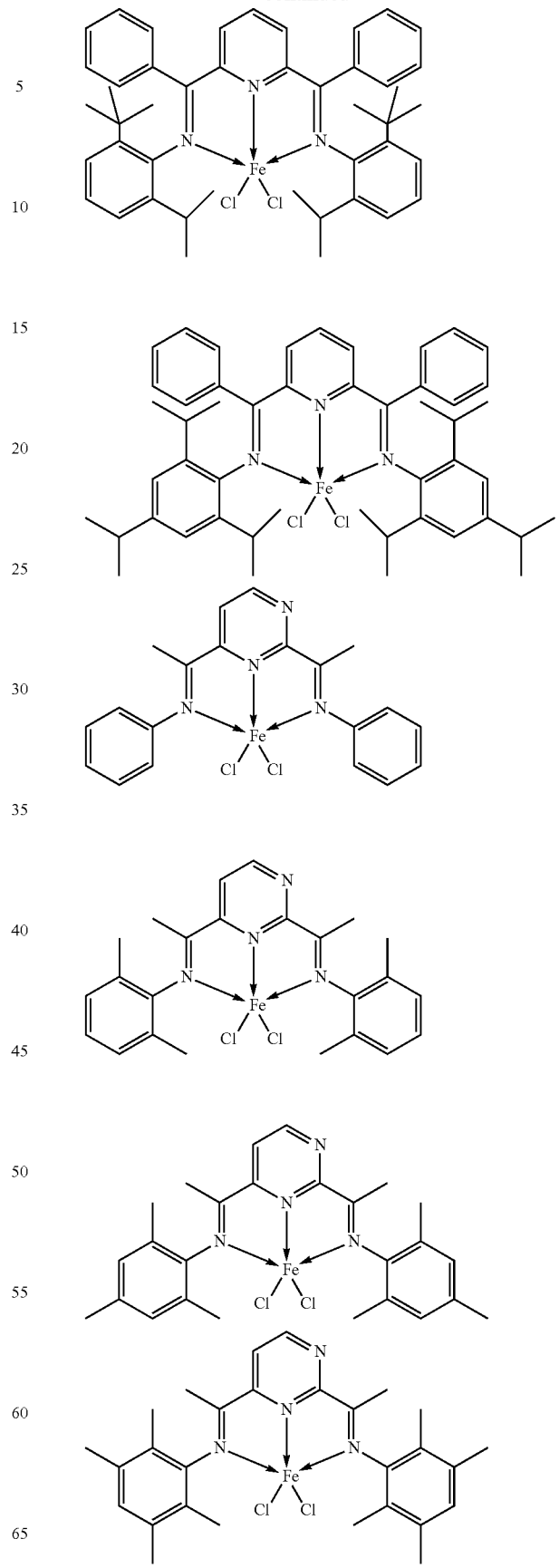

219
-continued
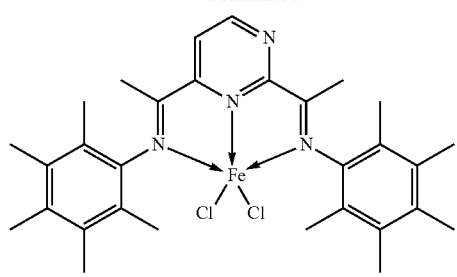
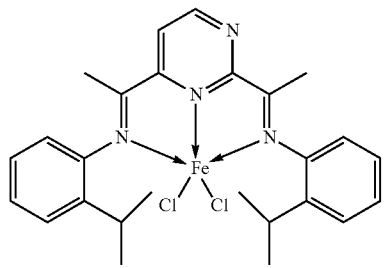
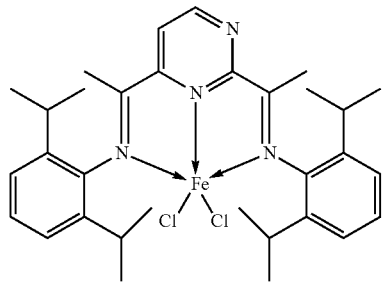
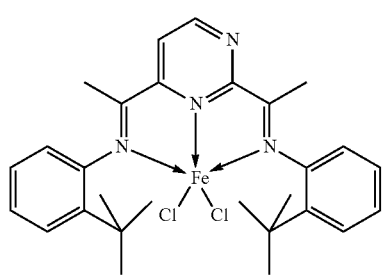
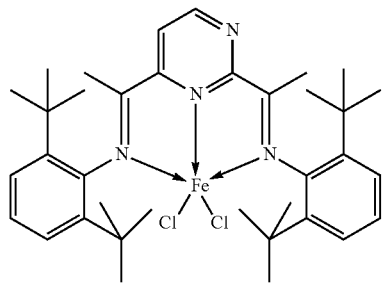
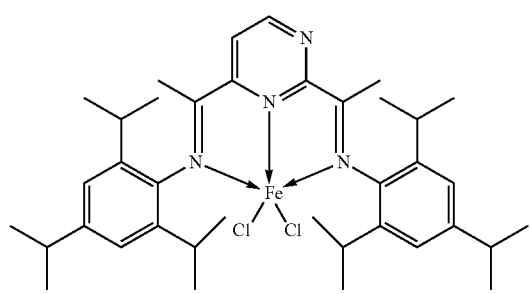
220
-continued
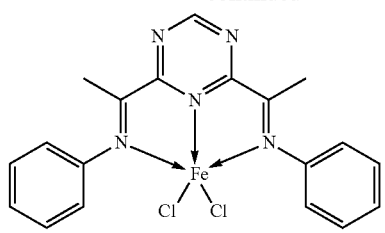
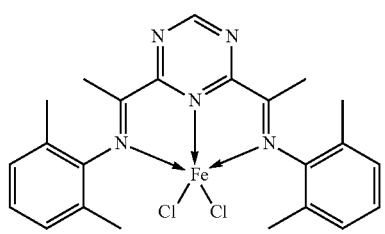
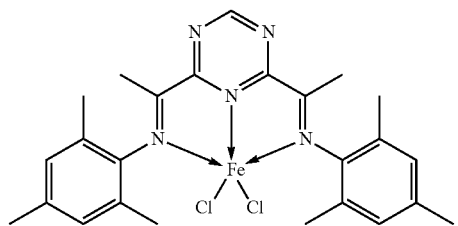
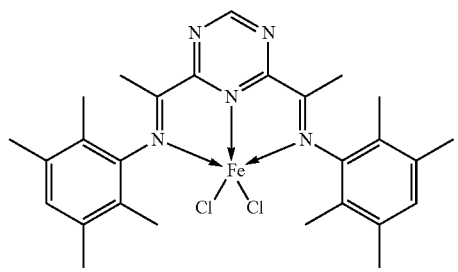
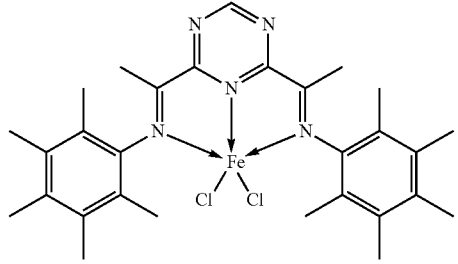
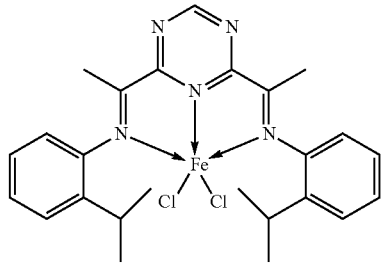

221
-continued
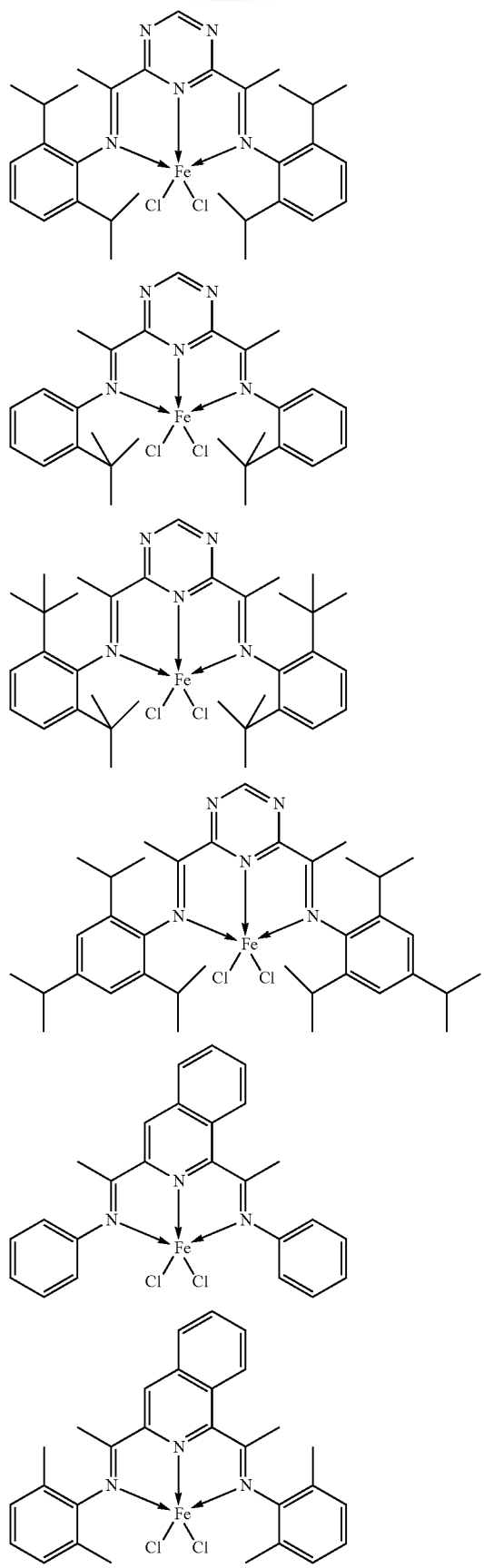
222
-continued
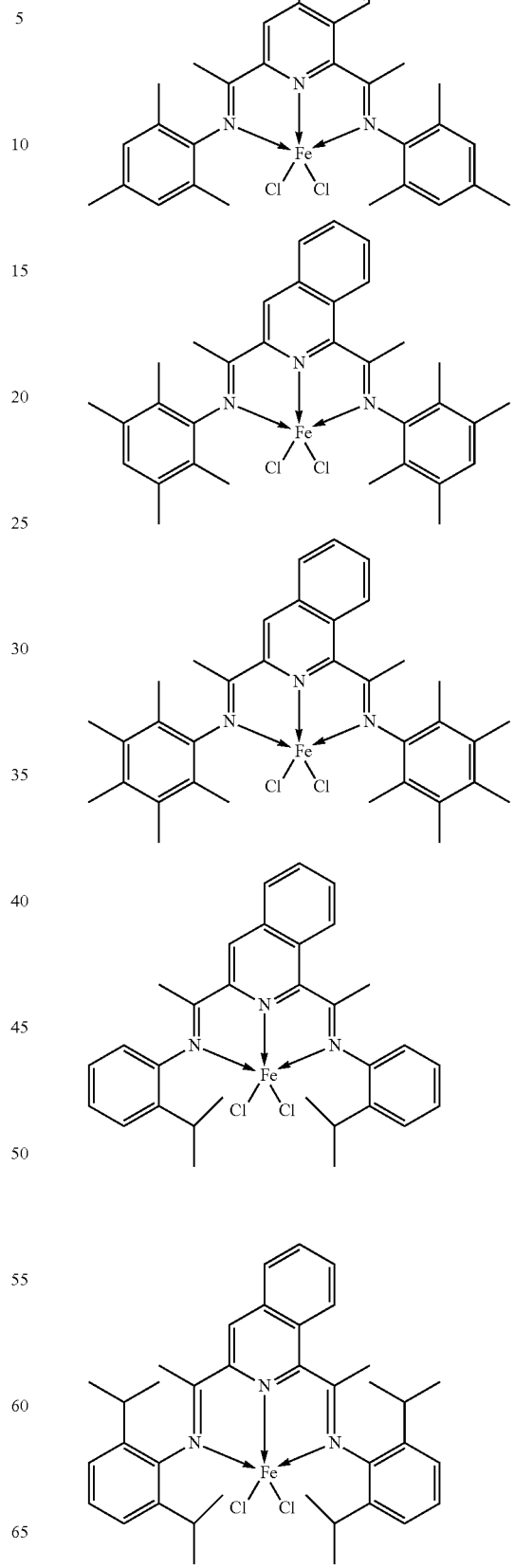

223
-continued
224
-continued
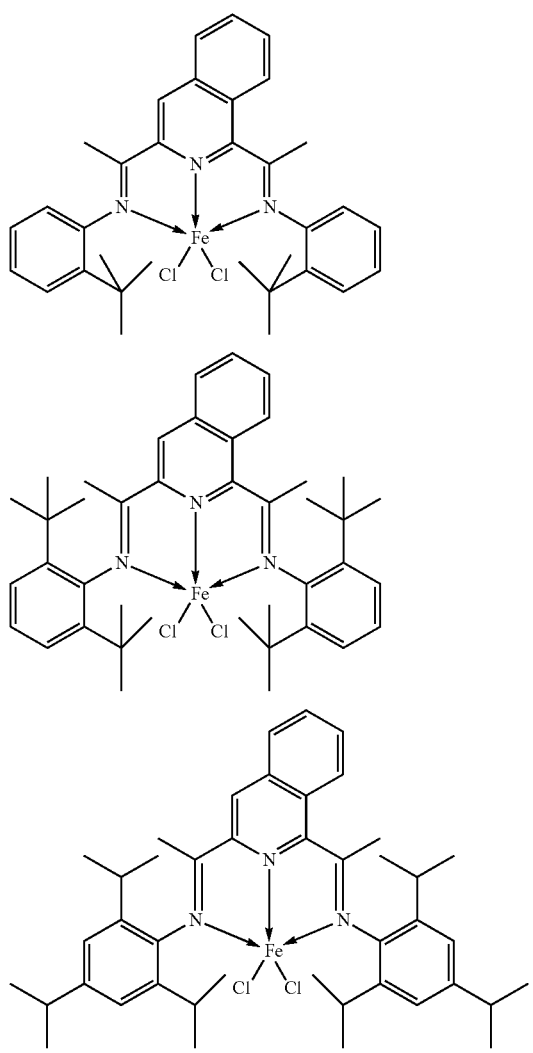
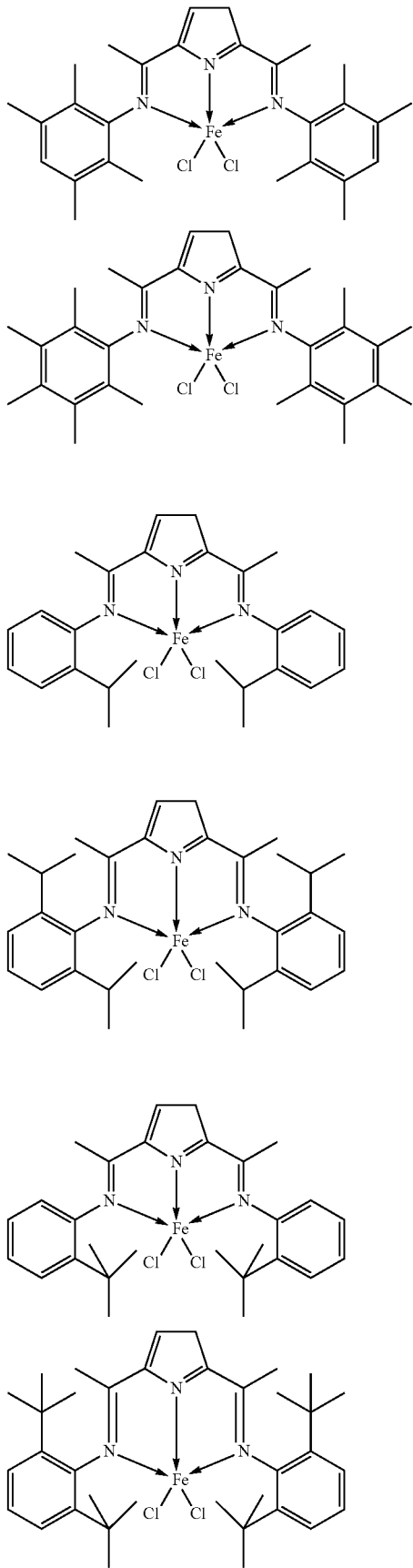
[Chem. 54]

225
-continued
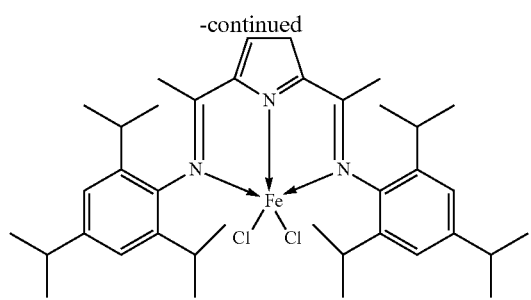
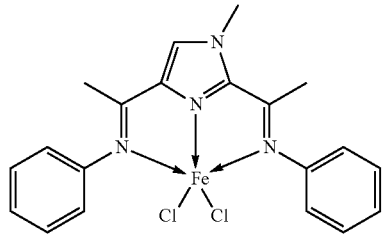
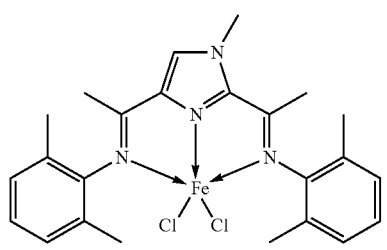
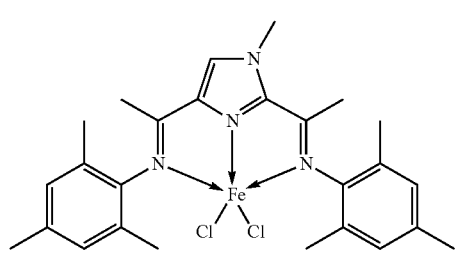
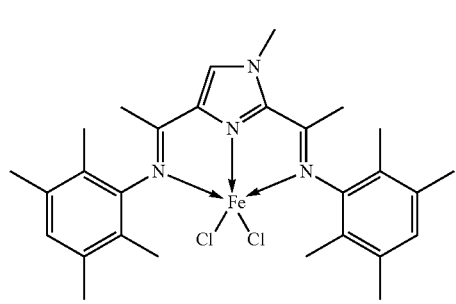
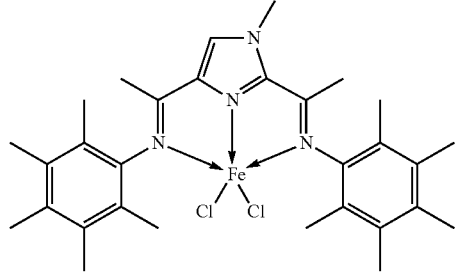
226
-continued
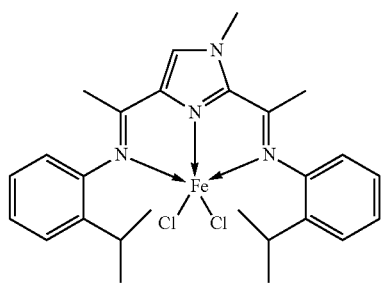
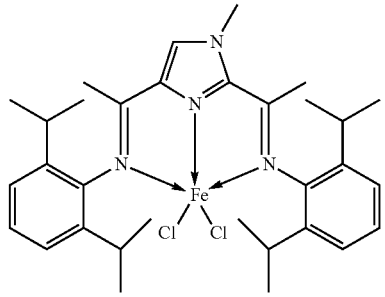
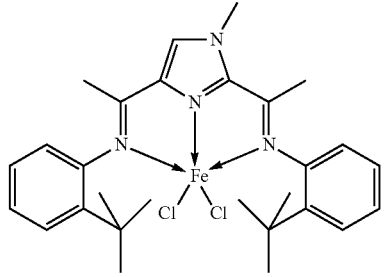
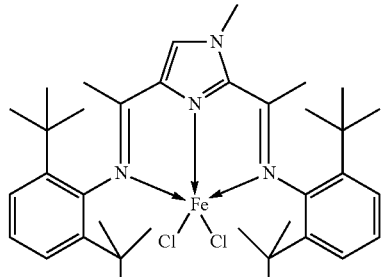
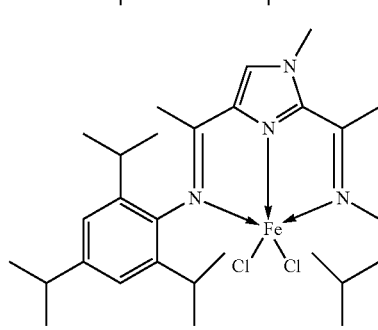
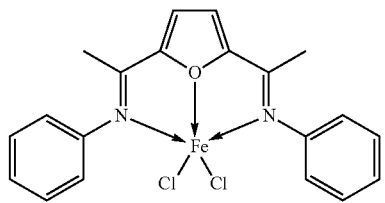

227
-continued
228
-continued
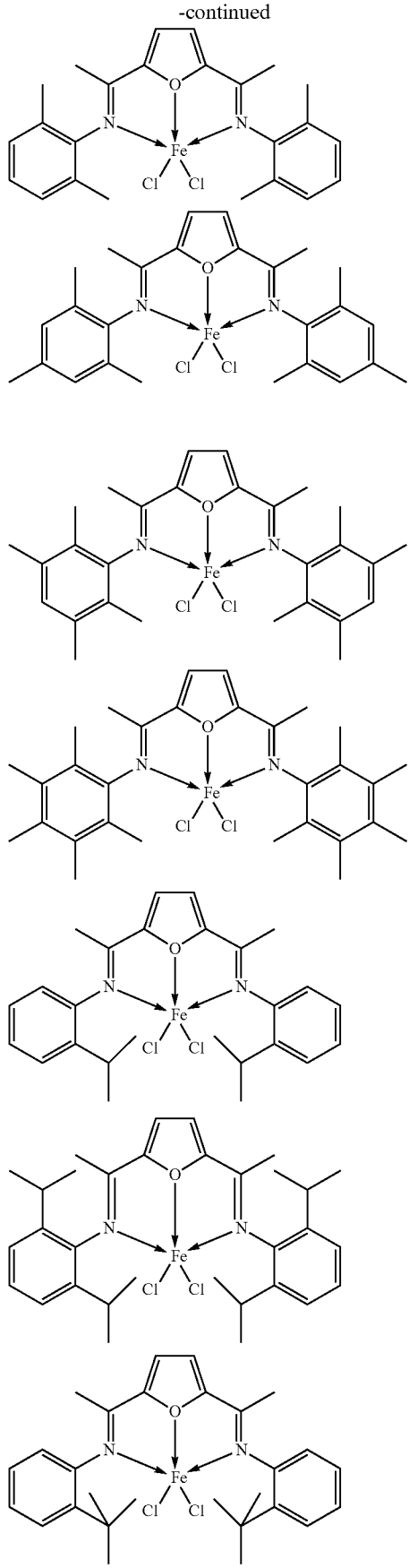
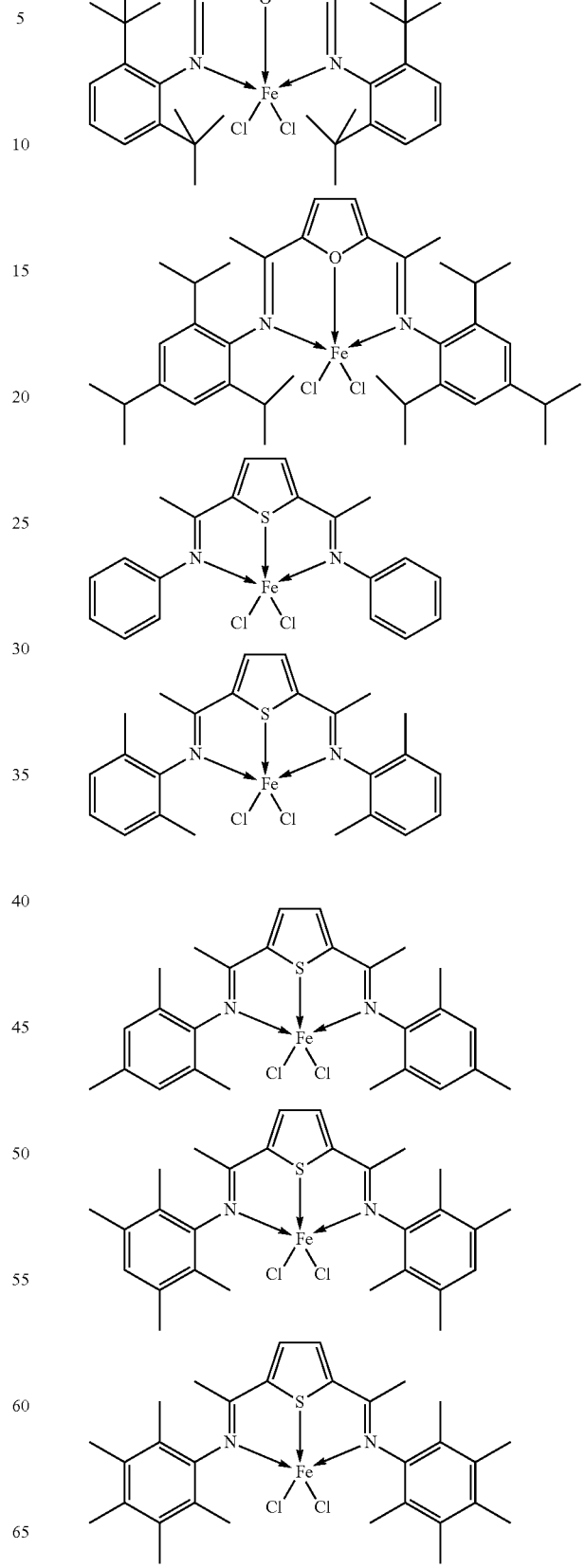

229
-continued
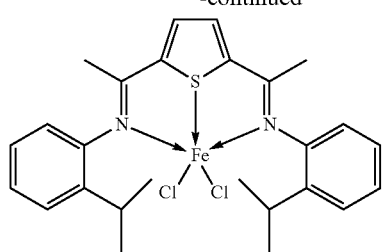
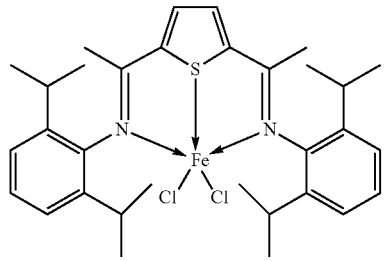
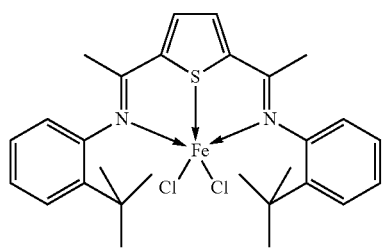
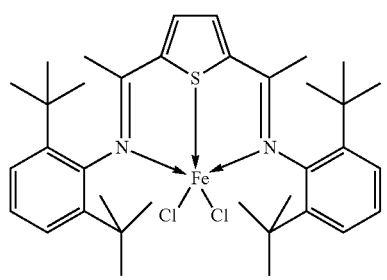
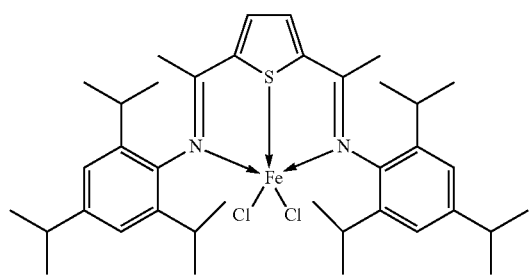
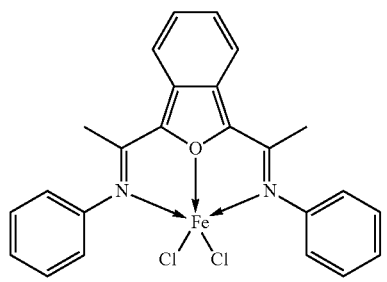
230
-continued
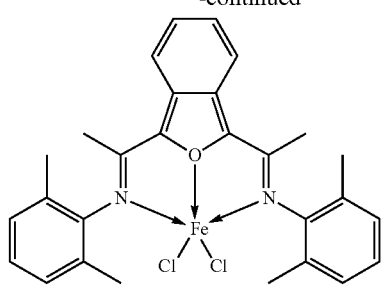
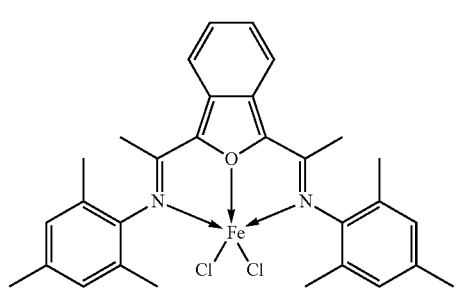
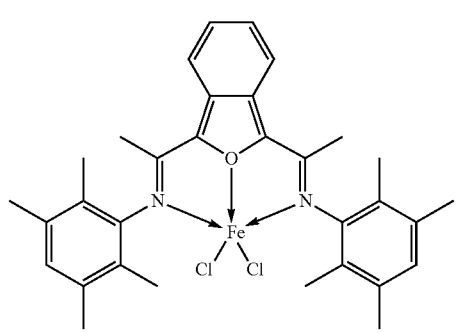
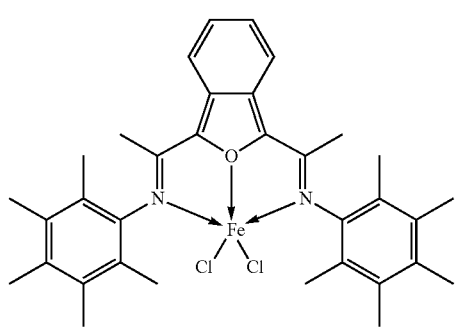
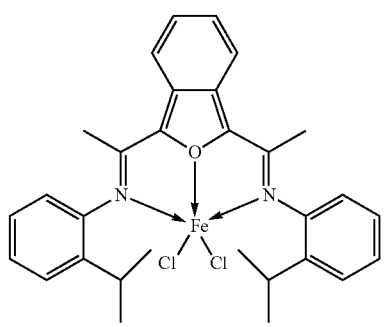

231
-continued
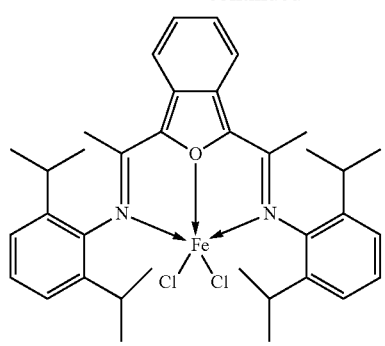
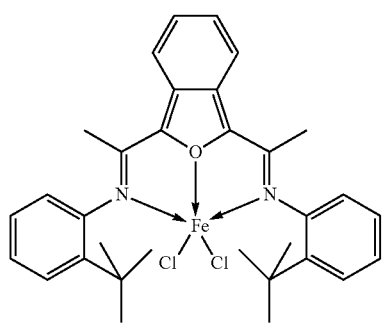
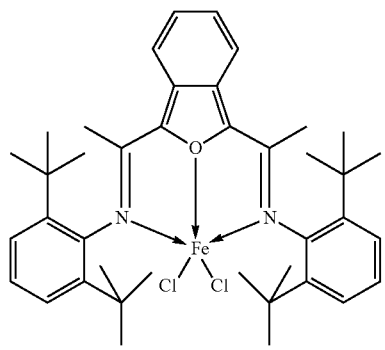
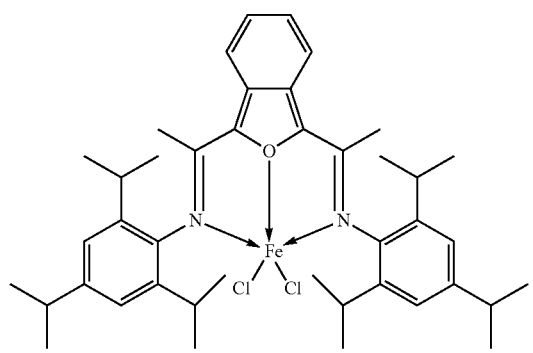
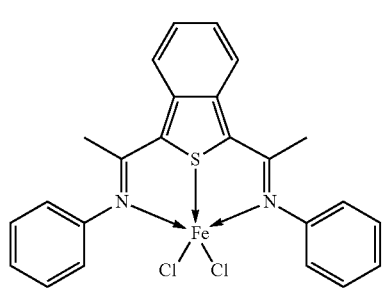
232
-continued
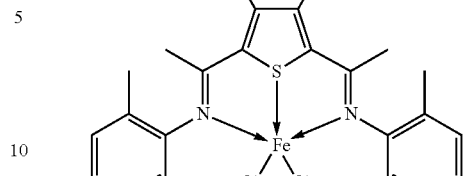
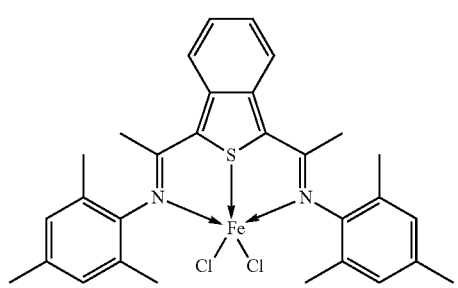
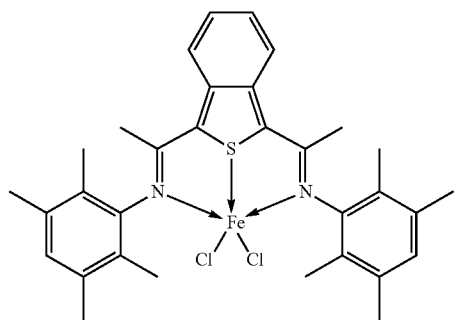
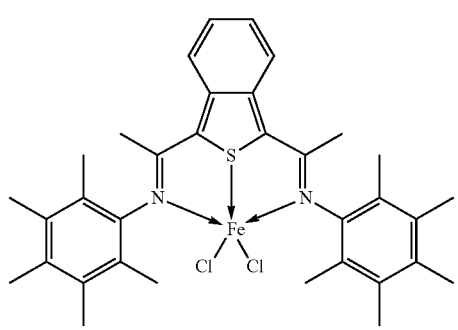
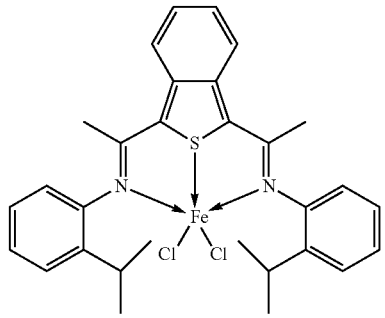

233
-continued
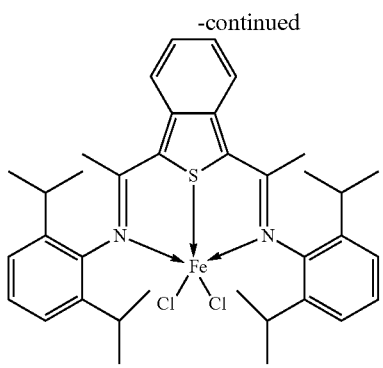
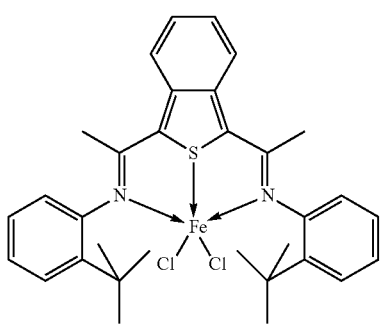
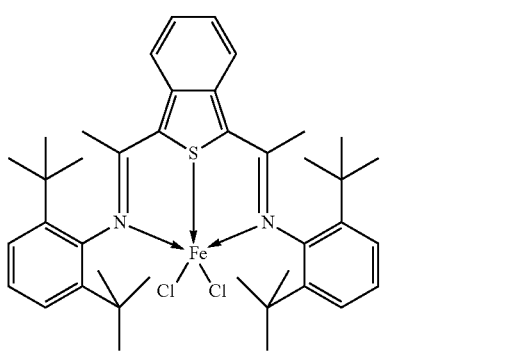
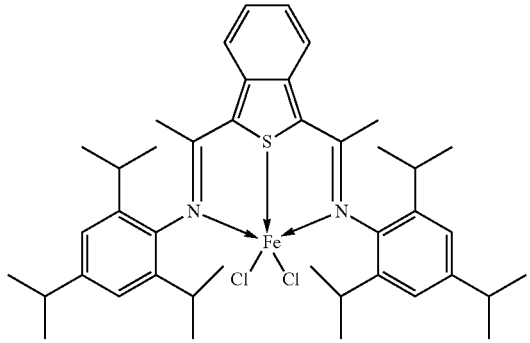
[Chem. 55]
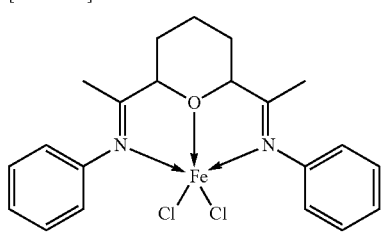
234
-continued
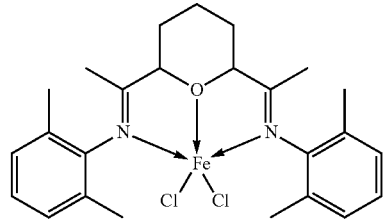
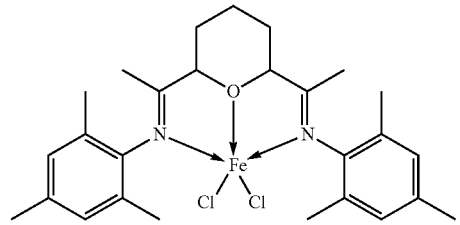
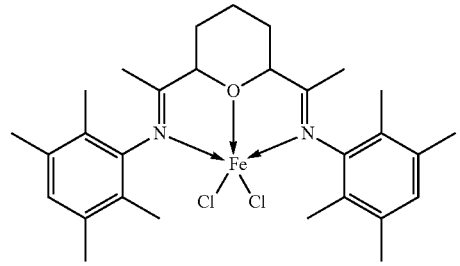
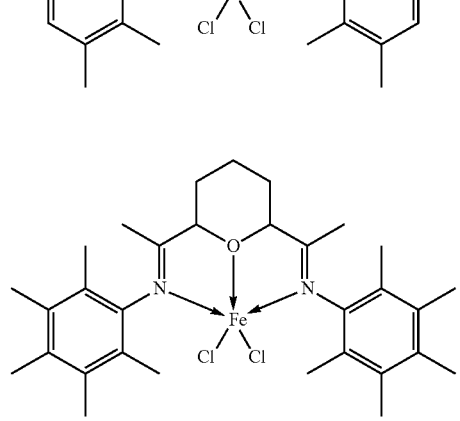
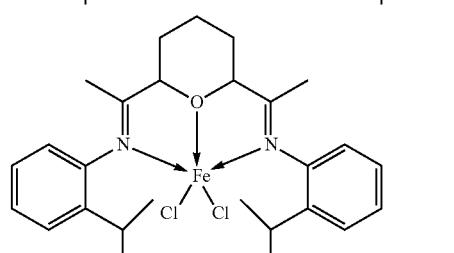
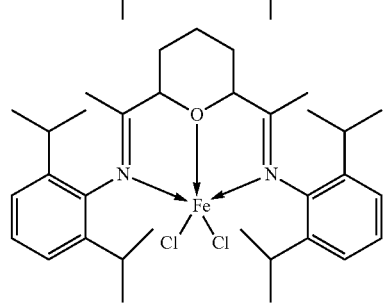

235
-continued
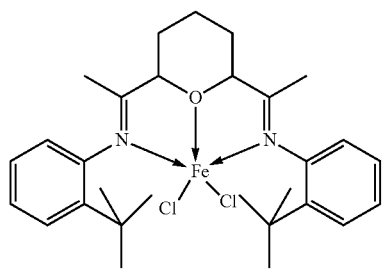
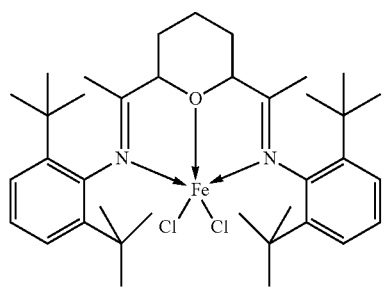
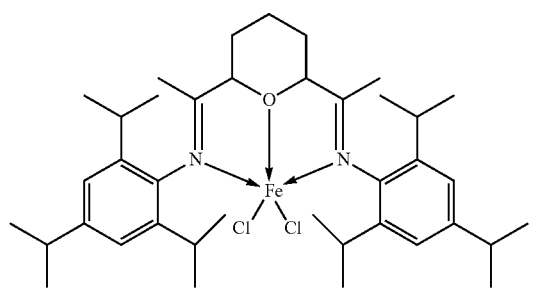
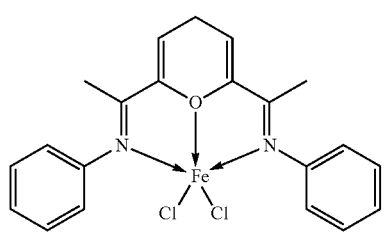
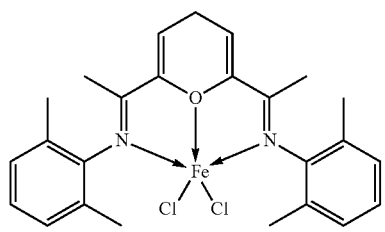
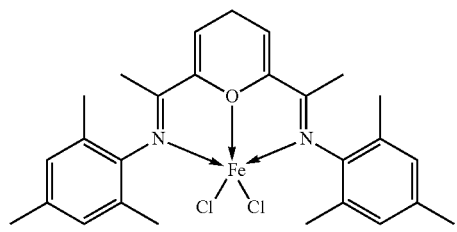
236
-continued
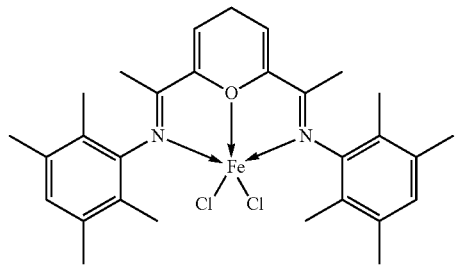
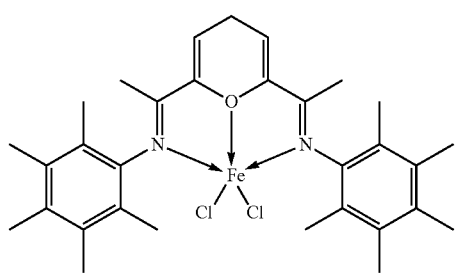
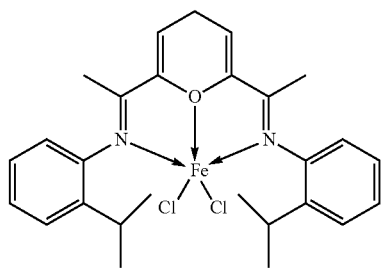
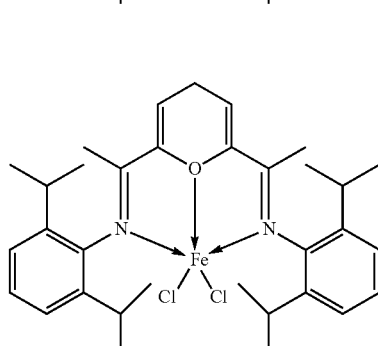
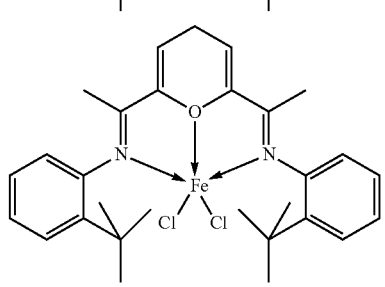
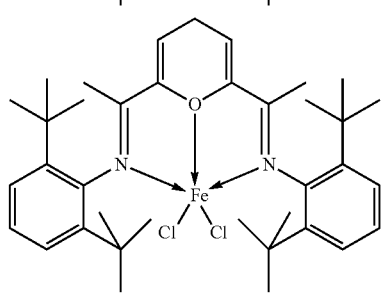

237
-continued
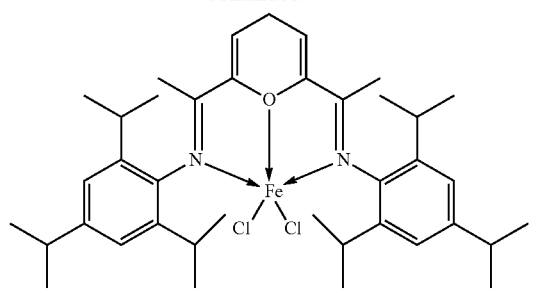
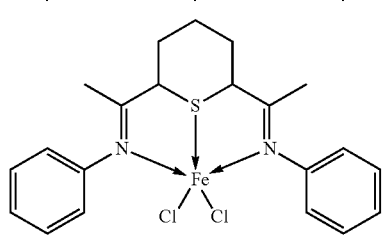
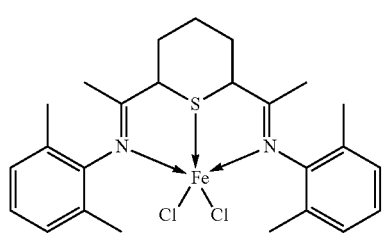
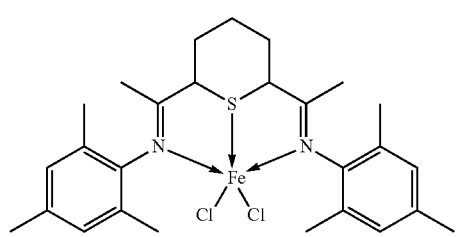
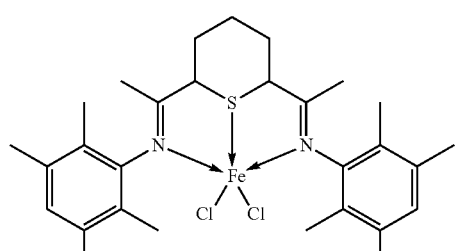
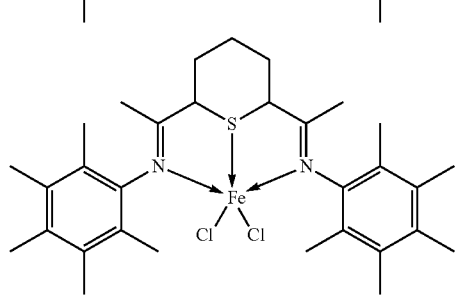
238
-continued
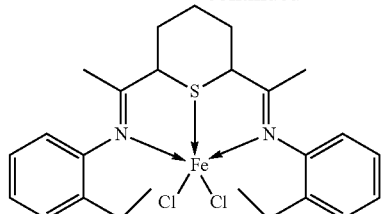
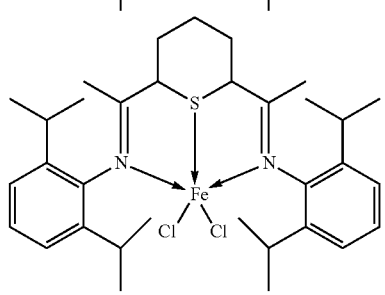
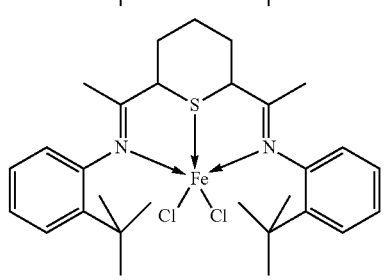
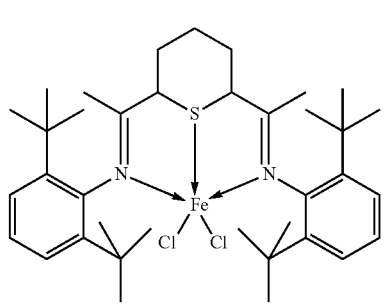
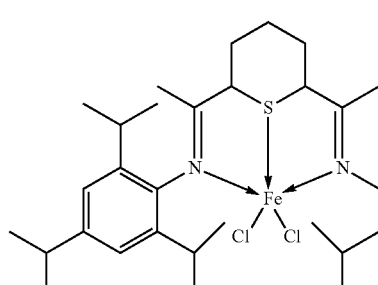
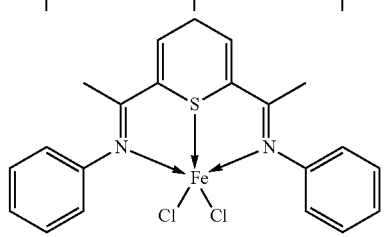

239
-continued
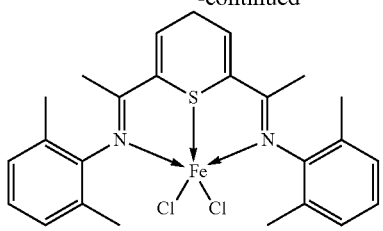
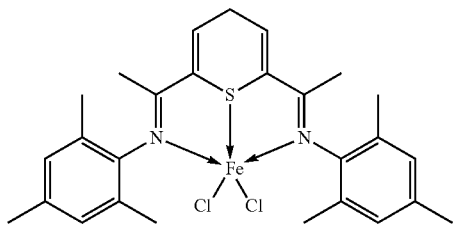
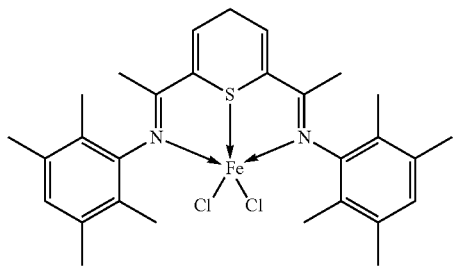
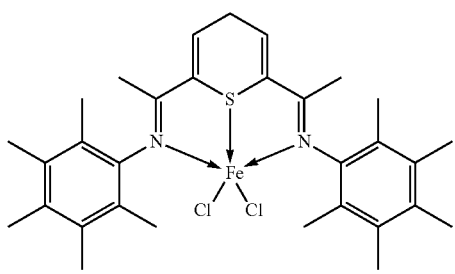
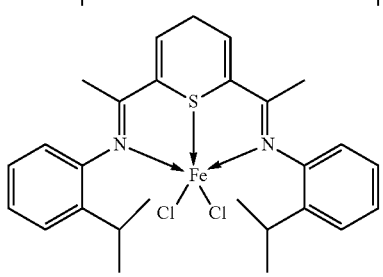
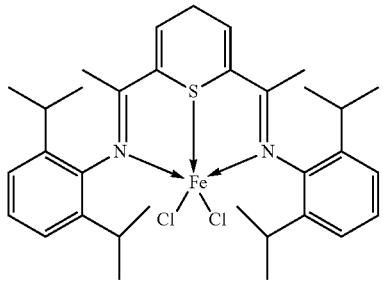
240
-continued
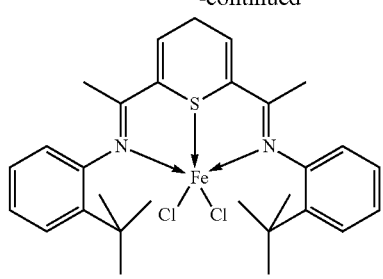
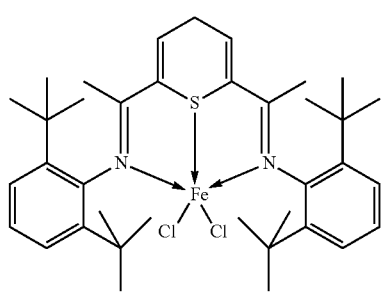
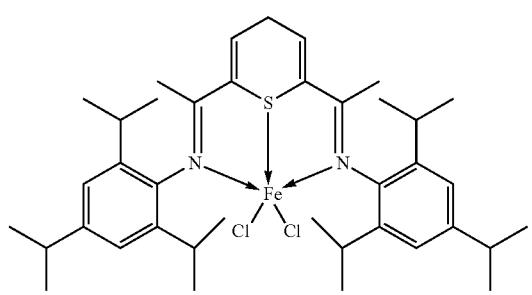
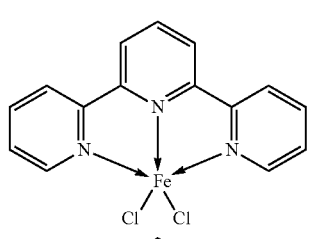
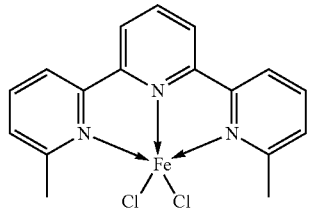
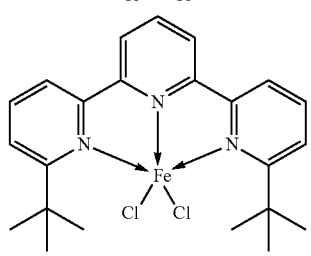

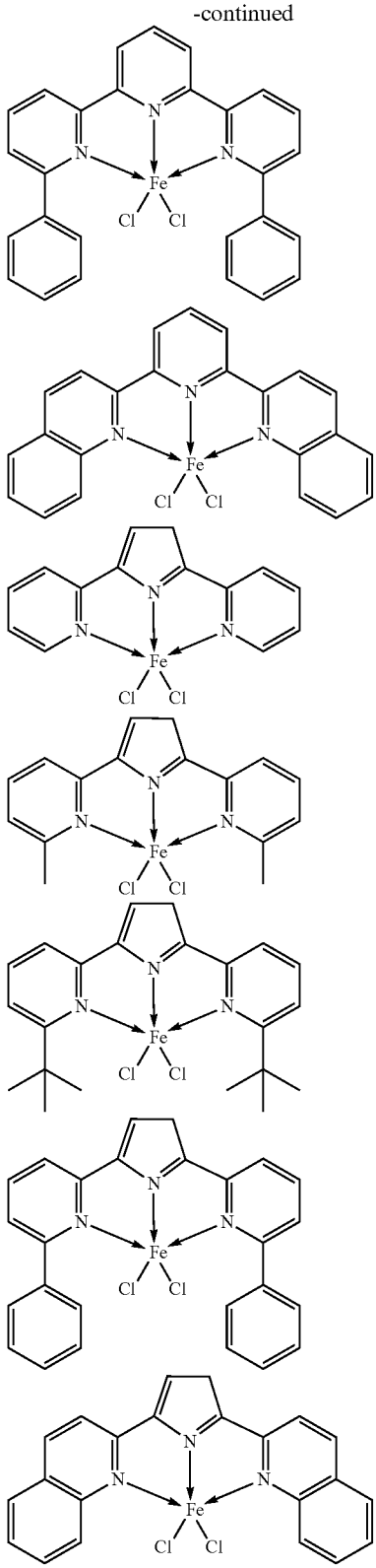

methoxide, an n-butoxide, an isopropoxide, a phenoxide, a benzyloxide, a dimethylamide, a diethylamide, a sulfonate, or a hexafluoro phosphate.

The transition metal compound (A-Y) represented by the general formula (1-Y-7) can be produced through a method described in Small, B. L.; Brookhart, M.; Bennett, A. M. A. J. Am. Chem. Soc. 1998, 120, 4049-4050.

[Chem. 56]

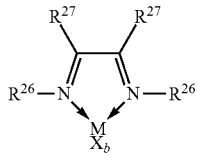

(1-Y-8)

In the general formula (1-Y-8), M, X, and b are equal to those in the general formula (1-Y). M is preferably a transition metal atom of Group 10 of the periodic table of the elements, more preferably a nickel atom or a palladium atom, further preferably a nickel atom.

$R^{26}$ and $R^{27}$ are each independently, for example, equal to X in the general formula (1-Y). Each of the $R^{26}$ groups and each of the $R^{27}$ groups may be the same as or different from each other. Two or more selected from two $R^{26}$ groups and two $R^{27}$ groups may be linked to each other to form a ring.

The following illustrates example specific structures of the transition metal compound (A-Y) represented by the general formula (1-Y-8). The transition metal compound (A-Y) represented by the general formula (1-Y-8) is, however, not limited to these structures.

[Chem. 57]

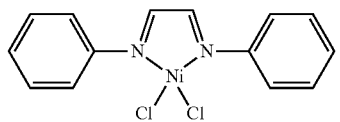

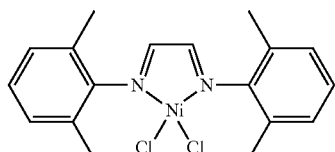

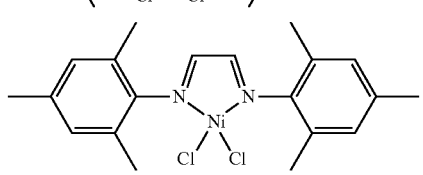

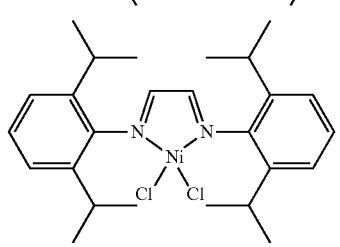

The other compounds that can be exemplified similarly are those modified from the above compounds by (i) replacing an iron atom with a ruthenium atom, an osmium atom, or a cobalt atom, or (ii) replacing a chloride with a bromide, an iodide, a hydride, a methyl, a phenyl, a benzyl, a

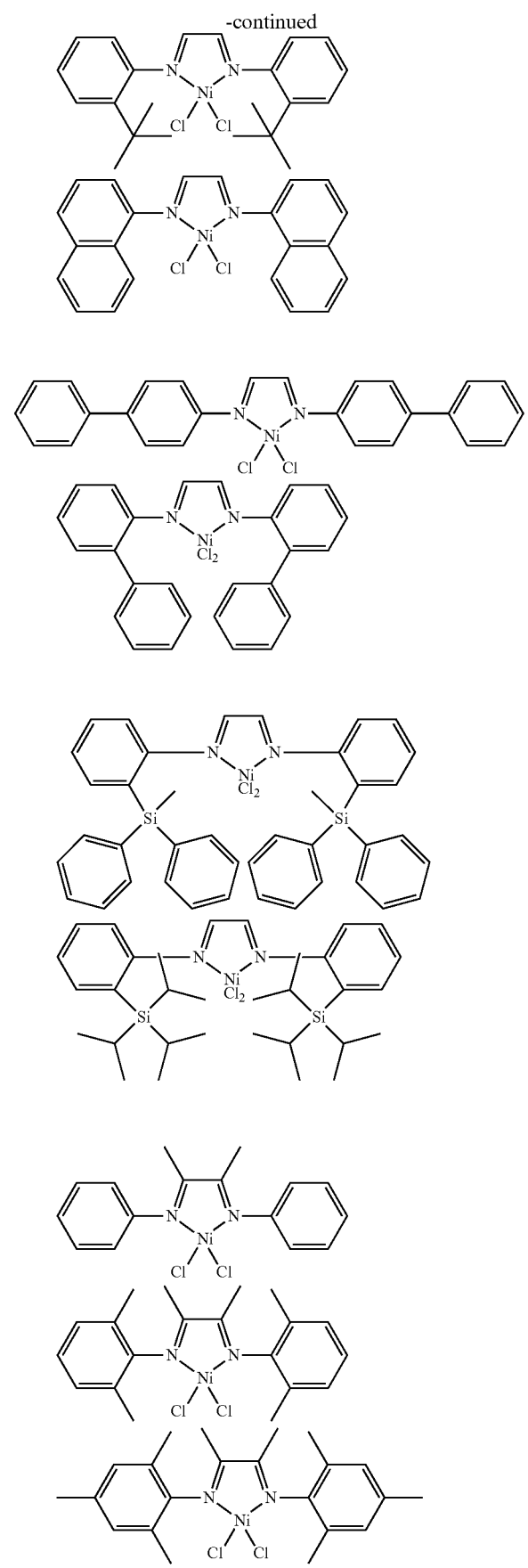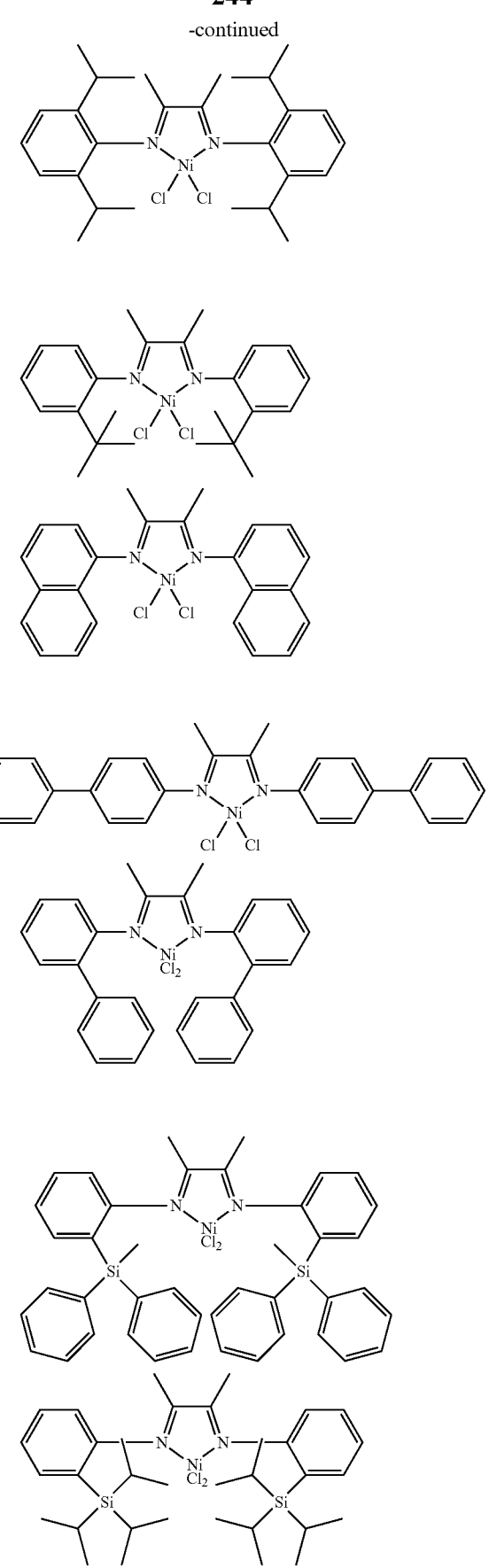

245
-continued
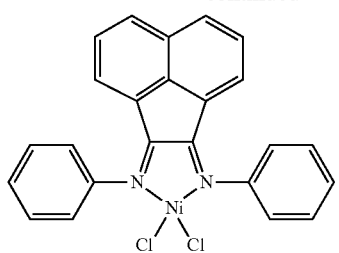
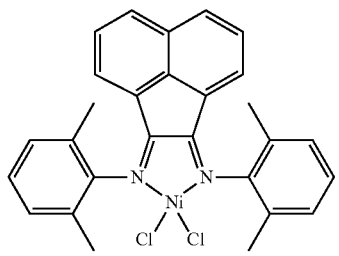
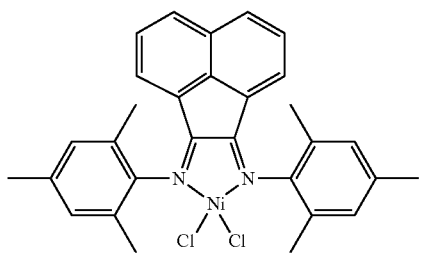
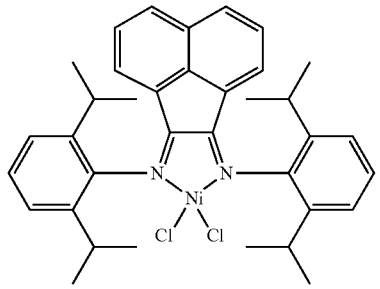
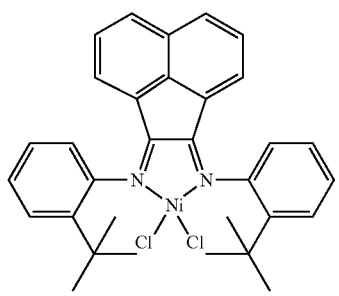
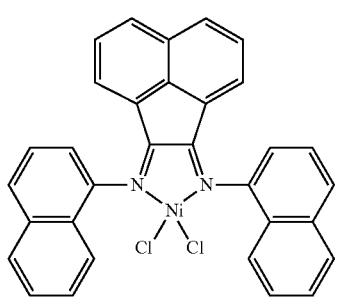
246
-continued
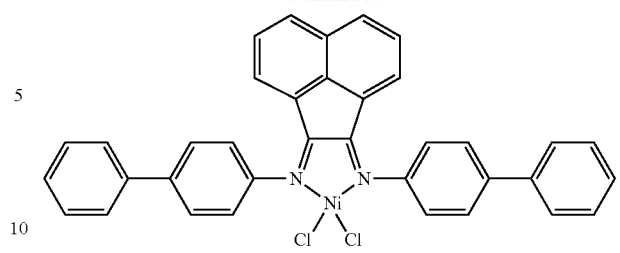
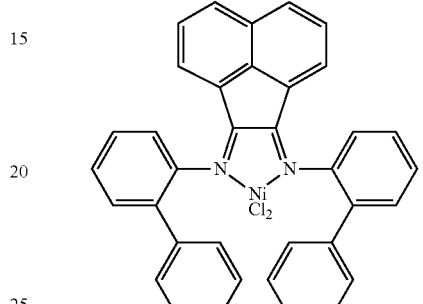
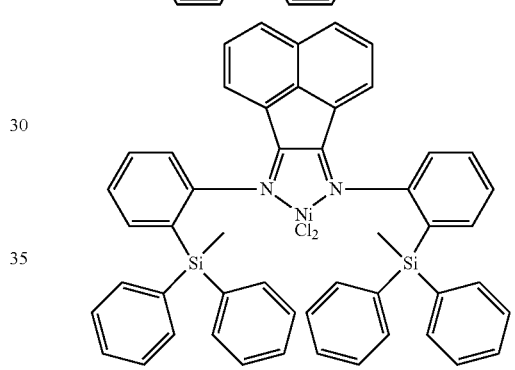
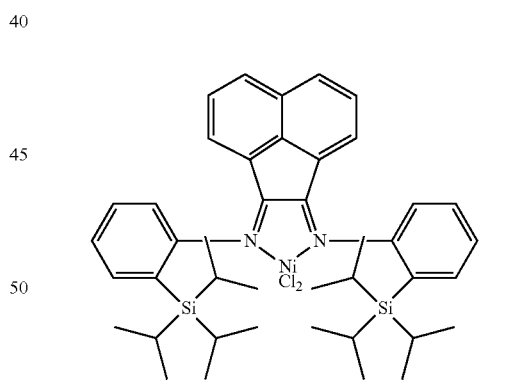
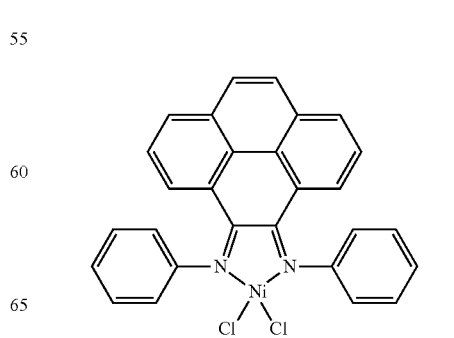

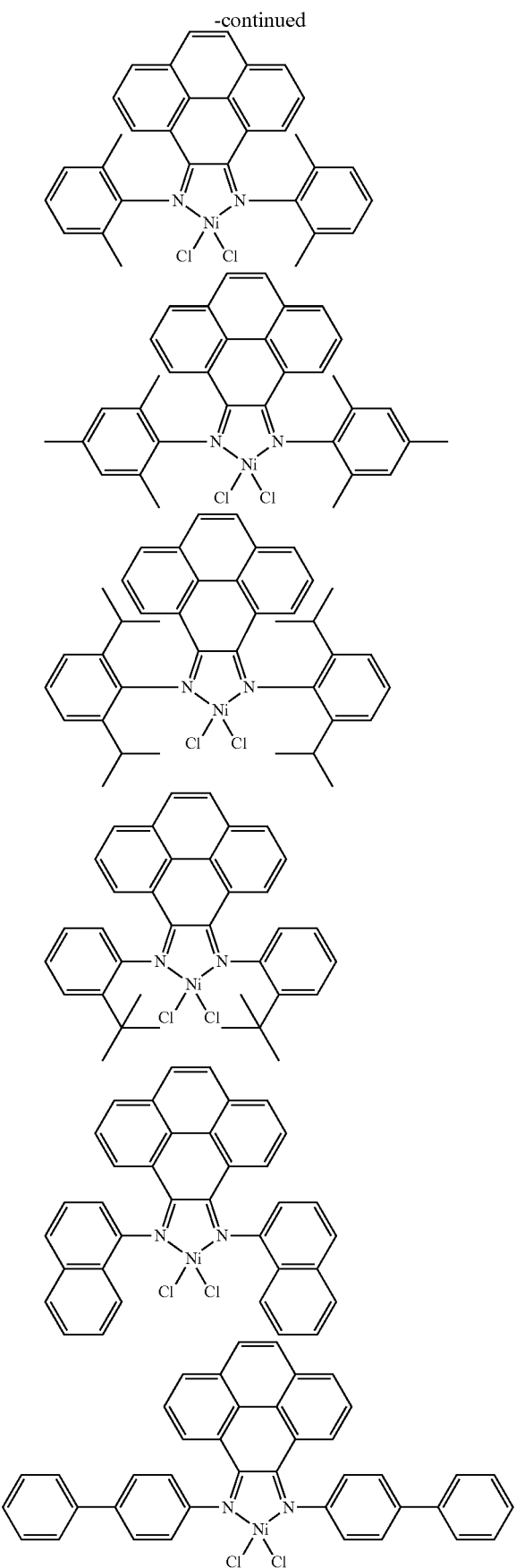
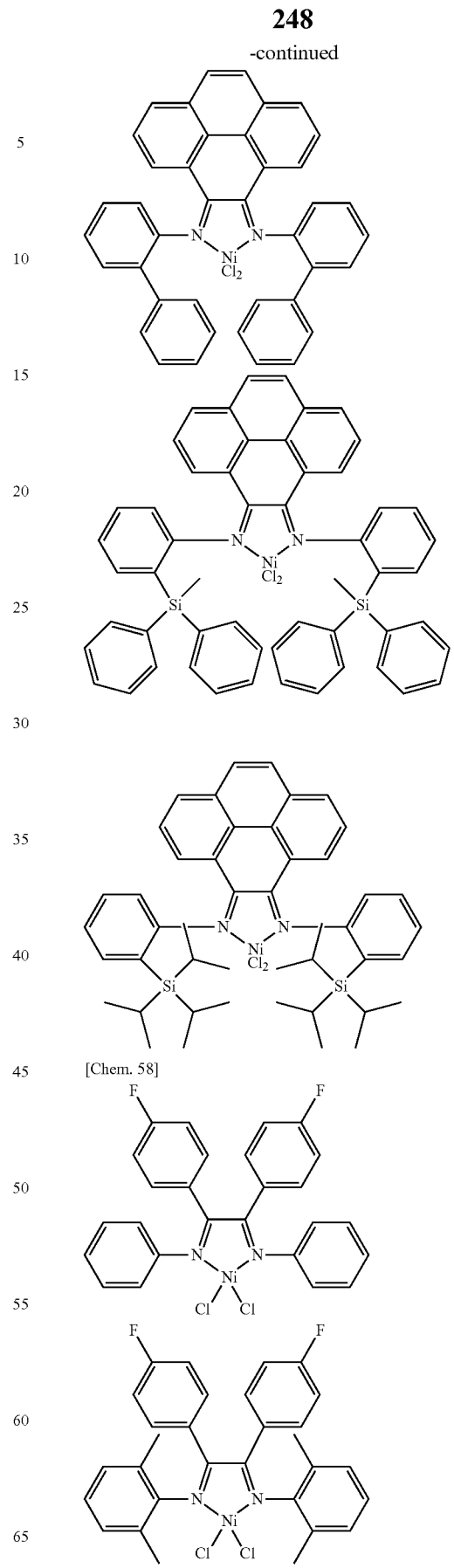
[Chem. 58]

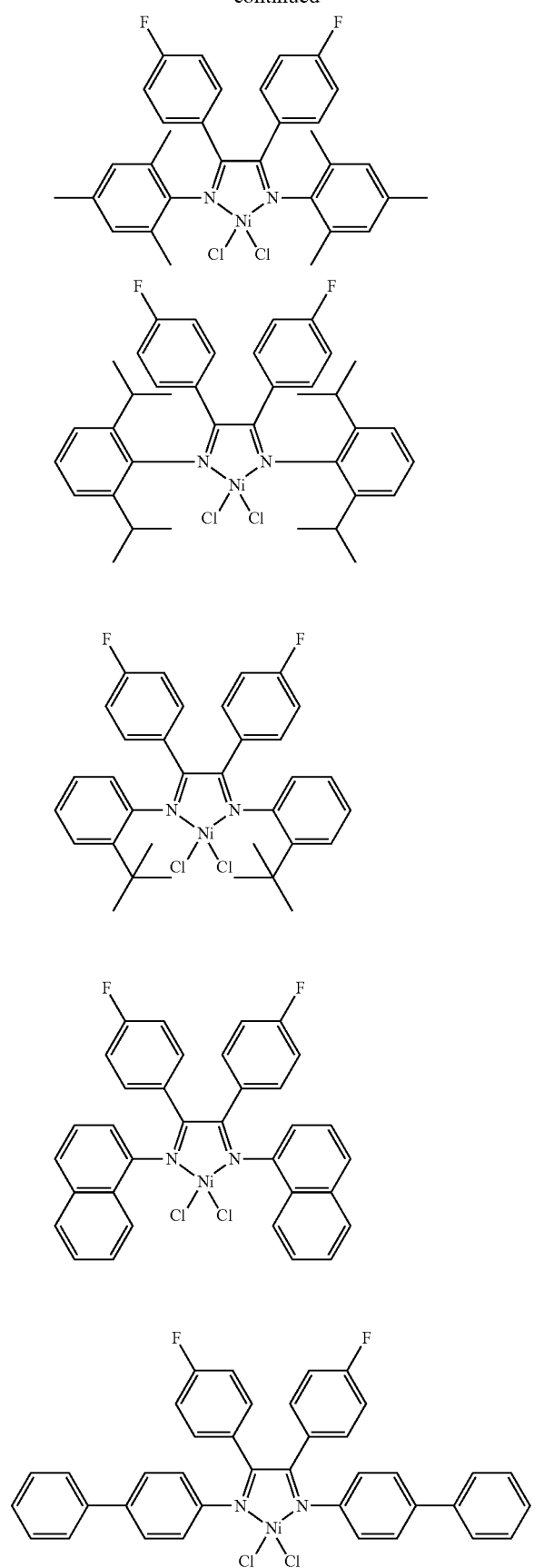
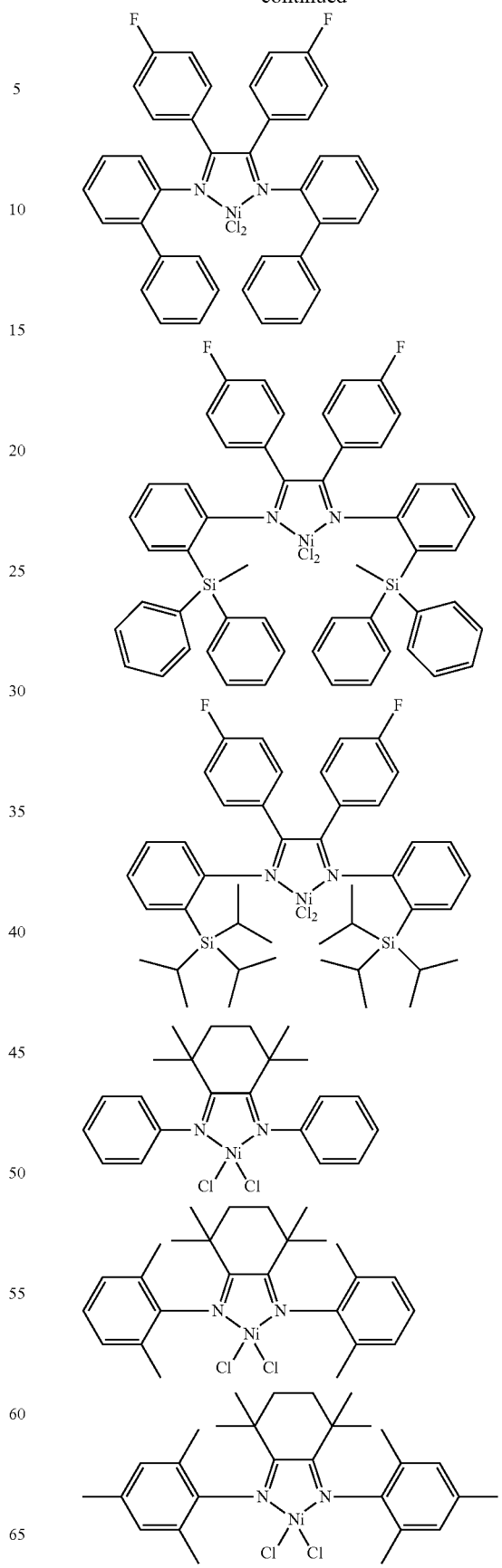

-continued
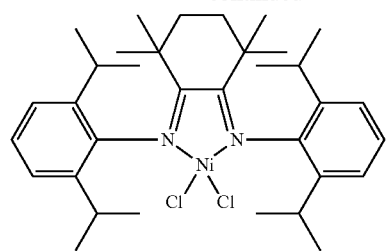
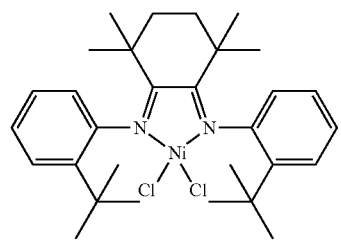
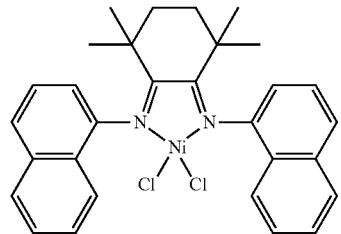
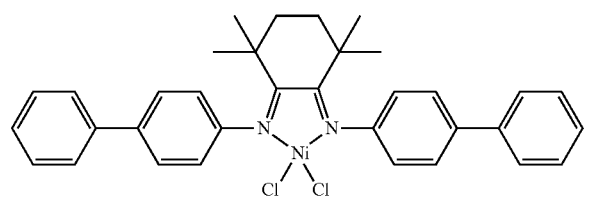
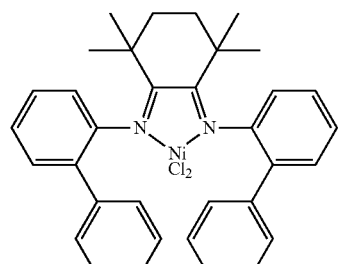
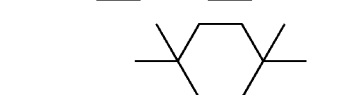
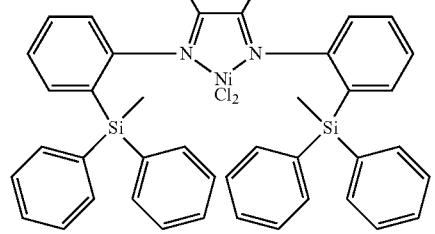
-continued
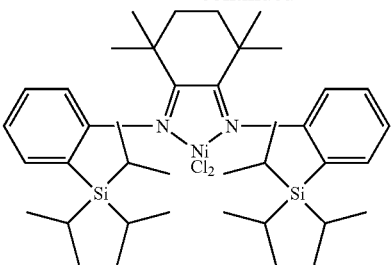
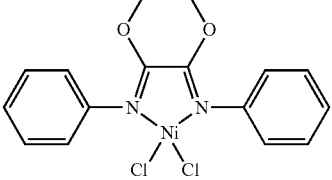
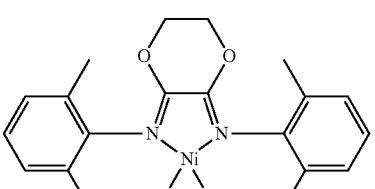
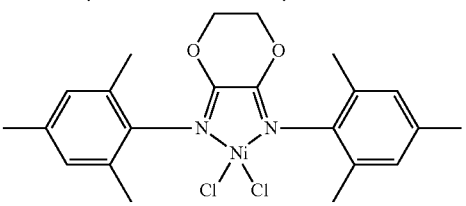
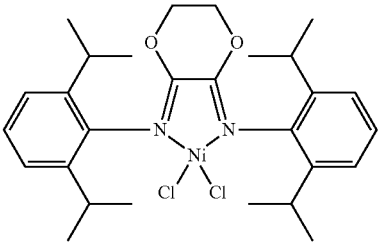
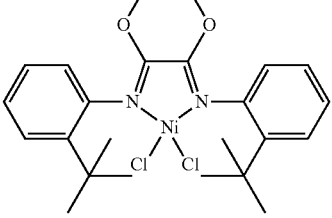
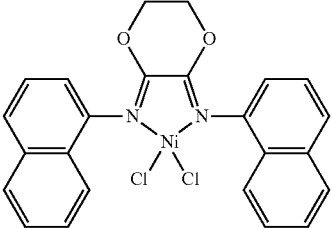

-continued
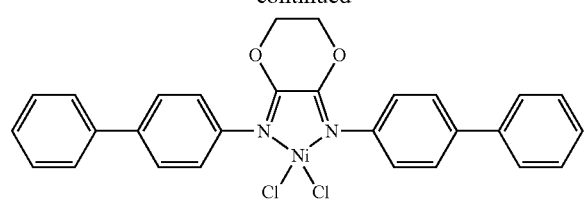
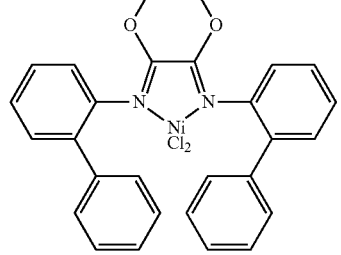
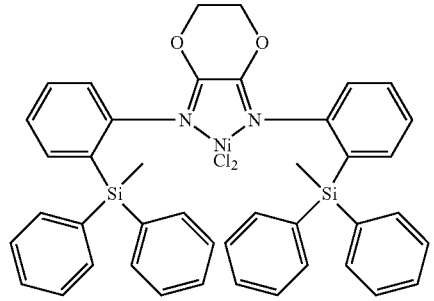
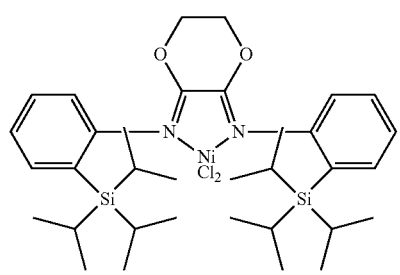
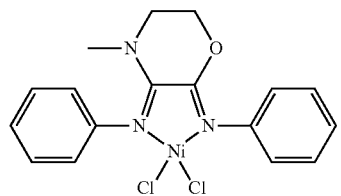
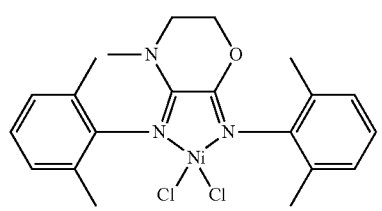
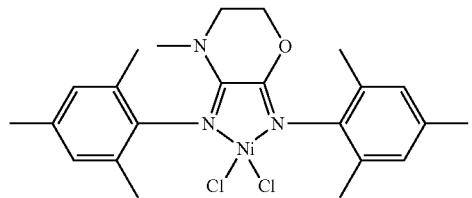
-continued
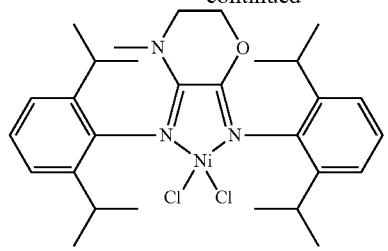
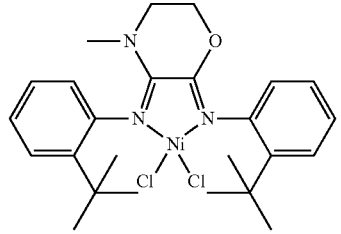
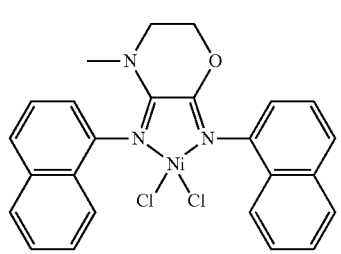
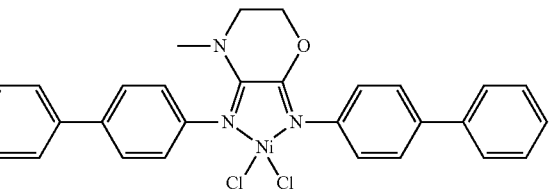
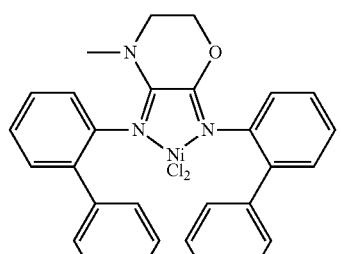
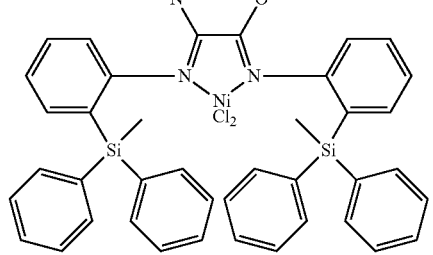

255
-continued
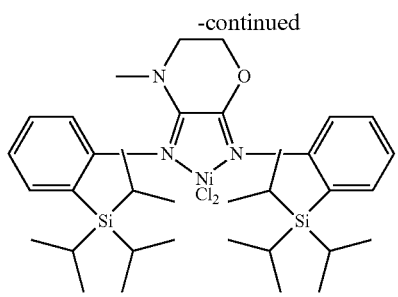
[Chem. 59]
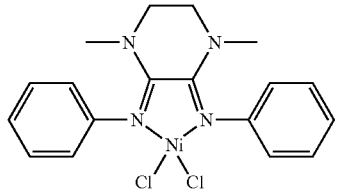
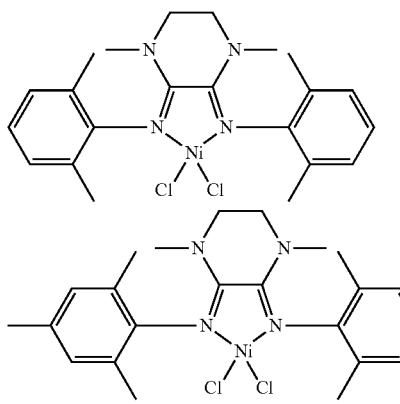
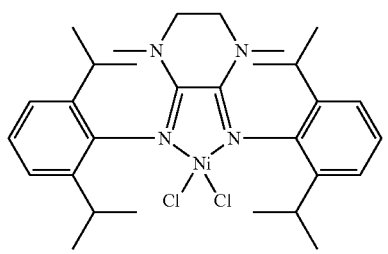
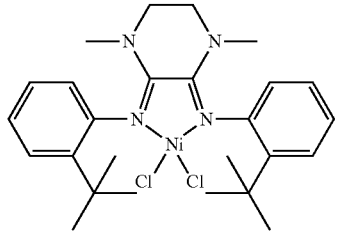
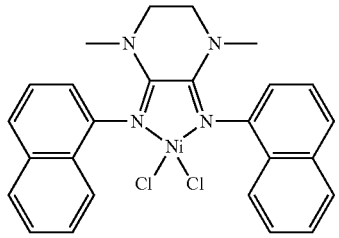
256
-continued
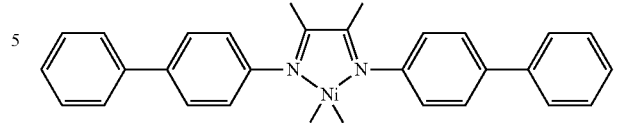
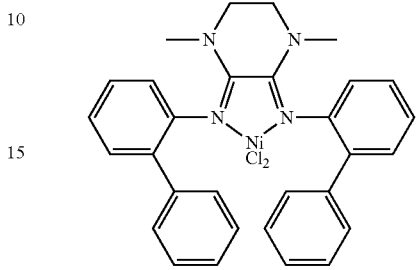
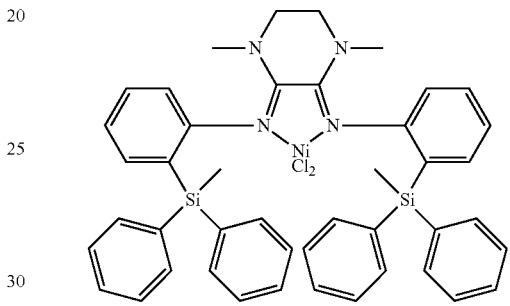
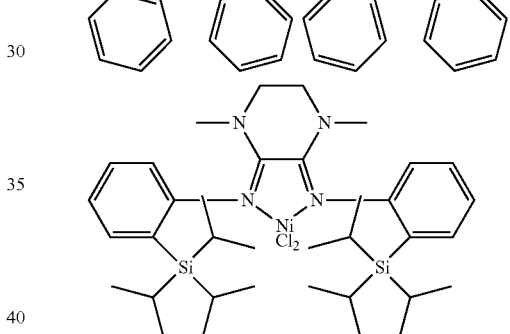
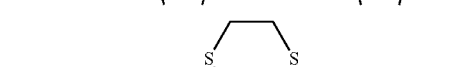
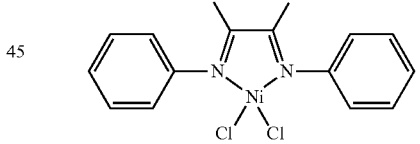
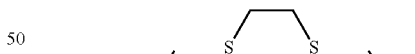
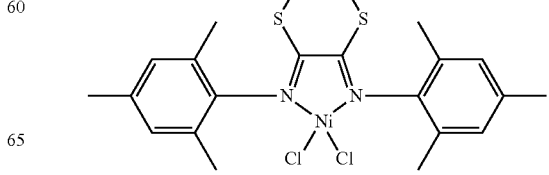

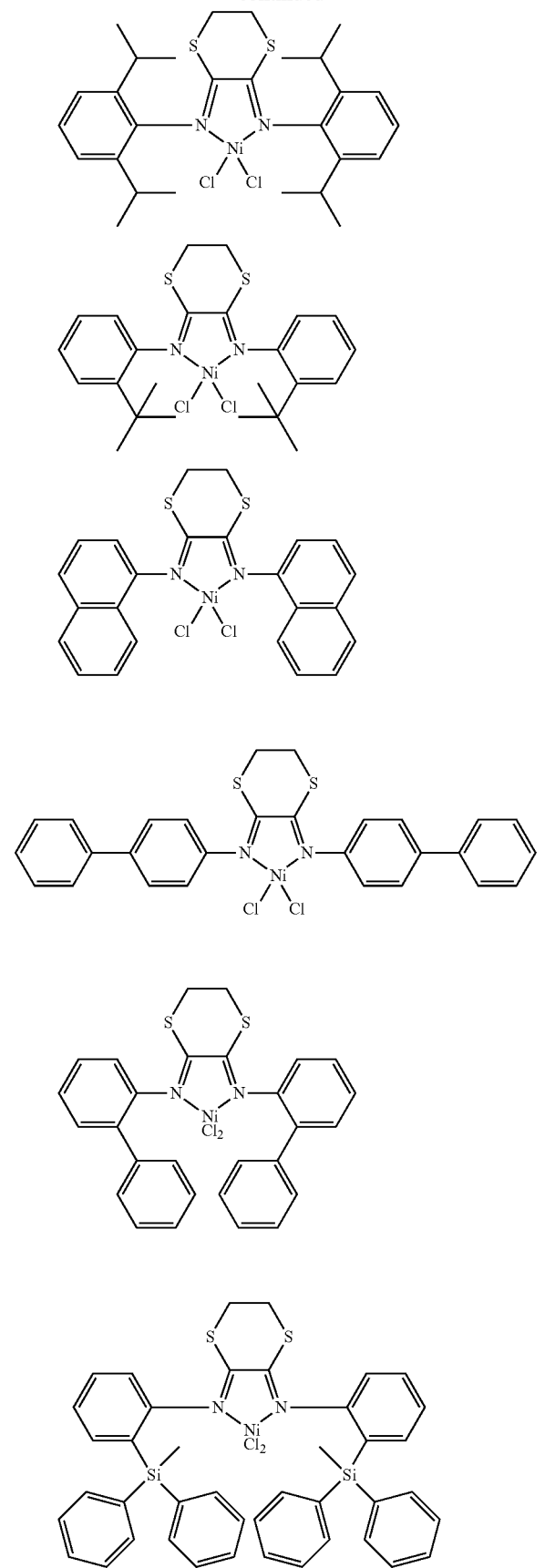
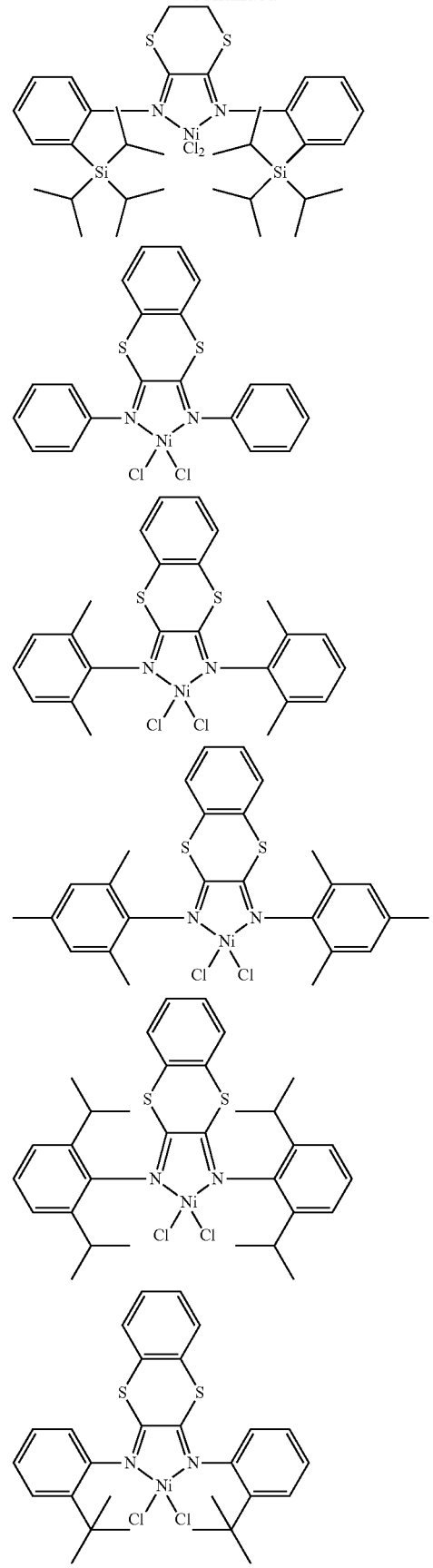

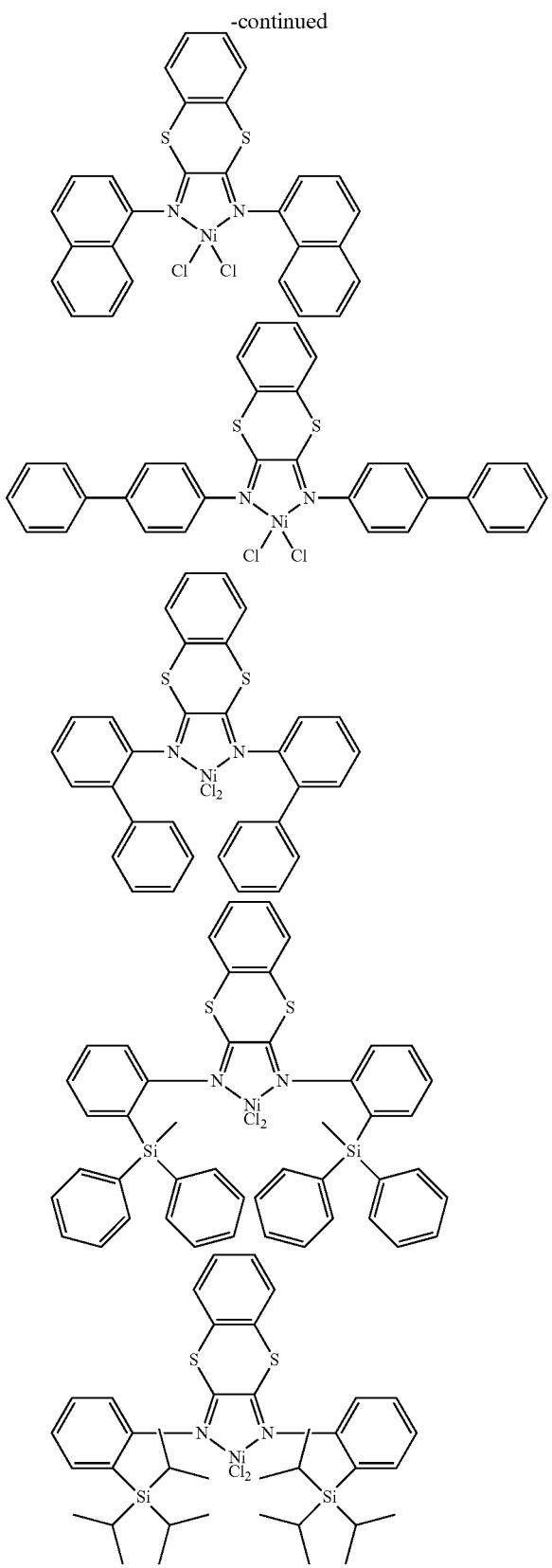

The other compounds that can be exemplified similarly are those modified from the above compounds by (i) replacing a nickel atom with a palladium atom or a platinum atom, or (ii) replacing a chloride with a bromide, an iodide, a hydride, a methyl, a phenyl, a benzyl, a methoxide, an n-butoxide, an isopropoxide, a phenoxide, a benzyloxide, a dimethylamide, a diethylamide, a sulfonate, or a hexafluoro phosphate.

The transition metal compound (A-Y) represented by the general formula (1-Y-8) can be produced through a method described in Ittel, S. D.; Johnson, L. K.; Brookhart, M. Chem. Rev. 2000, 100, 1169-1204.

Activating Co-Catalyst Agent (B)

Examples of the activating co-catalyst agent (B) used in the present invention include at least one kind of compound selected from among an organoaluminumoxy compound (B-1), an organicboron compound (B-2), a zinc co-catalyst component (B-3), and an ion-exchange layered silicate (B-4).

<Organoaluminumoxy Compound (B-1)>

Examples of the organoaluminumoxy compound (B-1) include one or more kinds of compounds selected from the compounds (B-1-1) and (B-1-2) below.

(B-1-1): chain aluminoxane represented by general formula $R^{B1}\{-Al(R^{B1})-O-\}_{B1}AlR^{B1}{}_2$ (B-1-2): cyclic aluminoxane represented by general formula $\{-Al(R^{B2})-O-\}_{B2}$ $R^{B1}$ and $R^{B2}$ individually represent a hydrocarbyl group having 1 to 20 carbon atoms. $R^{B1}$ groups may be identical with each other or different from each other, and $R^{B2}$ groups may be identical with each other or different from each other. Subscript B1 and B2 individually represent an integer of any of 2 or more.

Specific examples of $R^{B1}$ and $R^{B2}$ include: linear or branched alkyl groups having 1 to 20 carbon atoms, preferably 1 to 10 carbon atoms, such as methyl group, ethyl group, n-propyl group, isopropyl group, n-butyl group, isobutyl group, sec-butyl group, tert-butyl group, n-pentyl group, neopentyl group, and n-hexyl group; cyclic alkyl groups having 3 to 20 carbon atoms, preferably 3 to 10 carbon atoms, such as cyclopropyl group, cyclobutyl group, cyclopentyl group, cyclohexyl group, norbornyl group, and adamantyl group; linear or branched alkenyl groups having 2 to 20 carbon atoms, preferably 2 to 10 carbon atoms, such as vinyl group, allyl group, and isopropenyl group; and linear or branched alkynyl group having 2 to 20 carbon atoms, preferably 2 to 10 carbon atoms, such as ethynyl group and propargyl group. $R^{B1}$ and $R^{B2}$ are each more preferably methyl group or isobutyl group.

The organoaluminumoxy compound (B-1) can be produced by the following methods for example, and is generally obtained as a solution of hydrocarbyl solvent.

(1) A method in which an organoaluminum compound such as trialkyl aluminum is added to a hydrocarbyl suspension of a compound containing adsorption water or salt containing crystal water, such as magnesium chloride hydrate, copper sulfate hydrate, aluminum sulfate hydrate, nickel sulfate hydrate, and cerium (I) chloride hydrate so as to react adsorption water or crystal water with the organoaluminum compound.

(2) A method in which an organoaluminum compound such as trialkyl aluminum in a solvent such as benzene, toluene, ethyl ether, and tetrahydrofuran is reacted with water, ice, or water vapor.

(3) A method in which an organoaluminum compound such as trialkyl aluminum in a solvent such as decane, benzene, and toluene is reacted with an organotin oxide such as dimethyl tin oxide and dibutyl tin oxide.

The organoaluminumoxy compound (B-1) may contain a little amount of an organoaluminum compound. Aluminoxane may be produced by removing a solvent or an unreacted organoaluminoxy compound from a solution of the organoaluminumoxy compound (B-1) by distillation, and then dissolved in a solvent again or suspended in a poor solvent.

<Organicboron Compound (B-2)>

Examples of the organicboron compound (B-2) include one or more kinds of compounds selected from the compounds (B-2-1), (B-2-2), and (B-2-3) below.

(B-2-1): boron compound represented by general formula $BR^{B3}_3$ (B-2-2): borate compound represented by general formula $Q^{B+}+BR^{B4}_4{}^-$ (B-2-3): borate compound represented by general formula $E^BH^++BR^{B5}_4{}^-$ $Q^{B+}$ represents inorganic or organic cation. Preferable examples of the inorganic cation include lithium cation, sodium cation, potassium cation, silver cation, ferrocenium cation, and substituted ferrocenium cation. A preferable example of the organic cation is triphenyl methyl cation.

$E^BH^+$ represents Brønsted acid. Preferable examples thereof include trialkyl-substituted ammonium, N,N-dialkyl anilinium, dialkyl ammonium, and triaryl phosphonium.

$R^{B3}$, $R^{B4}$, and $R^{B5}$ independently represent a halogen atom, a hydrocarbyl group having 1 to 20 carbon atoms, a halohydrocarbyl group having 1 to 20 carbon atoms, a hydrocarbyl silyl group having 1 to 20 carbon atoms, an alkoxy group having 1 to 20 carbon atoms, or a hydrocarbyl amino group having 2 to 20 carbon atoms, and preferably a halogen atom, a hydrocarbyl group having 1 to 20 carbon atoms, or a halohydrocarbyl group having 1 to 20 carbon atoms. $R^{B3}$ groups may be identical with each other or different from each other, $R^{B4}$ groups may be identical with each other or different from each other, and $R^{B5}$ groups may be identical with each other or different from each other.

$BR^{B4}_4{}^-$ and $BR^{B5}_4{}^-$ indicate borate anion. Examples thereof include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, tetrakis(3,5-bis trifluoromethylphenyl)borate, and phenyltris(pentafluorophenyl)borate.

Examples of the borane compound (B-2-1) represented by general formula $BR^{B3}_3$ include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, tris(3,5-bis trifluoromethylphenyl)borane, and phenylbis(pentafluorophenyl)borane.

Examples of the borate compound (B-2-2) represented by general formula $Q^{B+}BR^{B4}_4{}^-$ include sodium tetrakis(pentafluorophenyl)borate, silver tetrakis(pentafluorophenyl)borate, ferrocenium tetrakis(pentafluorophenyl)borate, 1,1'-bis-trimethylsilyl ferrocenium tetrakis(pentafluorophenyl)borate, triphenylmethyltetrakis(pentafluorophenyl)borate, and triphenylmethyltetrakis(3,5-bis trifluoromethylphenyl)borate.

Examples of the borate compound (B-2-3) represented by general formula $E^BH^+BR^{B5}_4{}^-$ include triethyl ammonium tetrakis(pentafluorophenyl)borate, tripropyl ammonium tetrakis(pentafluorophenyl)borate, tri(normal butyl) ammonium tetrakis(pentafluorophenyl)borate, tri(normal butyl) ammonium tetrakis(3,5-bis trifluoromethylphenyl)borate, N,N-bis-trimethyl silylanilinium tetrakis(pentafluorophenyl)borate, N,N-dimethyl anilinium tetrakis(pentafluorophenyl)borate, N,N-diethyl anilinium tetrakis(pentafluorophenyl)borate, N,N-2,4,6-pentamethyl anilinium tetrakis(pentafluorophenyl)borate, N,N-bis-trimethyl silylanilinium tetrakis(3,5-bis trifluoromethylphenyl)borate, diisopropyl ammonium tetrakis(pentafluorophenyl)borate, dicyclohexyl ammonium tetrakis(pentafluorophenyl)borate, triphenyl phosphonium tetrakis(pentafluorophenyl)borate, tri(methylphenyl) phosphonium tetrakis(pentafluorophenyl)borate, and tri(bis-trimethylsilylphenyl) phosphonium tetrakis(pentafluorophenyl)borate.

Two or more kinds of organicboron compounds (B-2) as above may be used in combination or the organicboron compound (B-2) may be used in combination with the organoaluminumoxy compound (B-1).

<Zinc Co-Catalyst Component (B-3)>

Examples of the zinc co-catalyst component (B-3) include a zinc co-catalyst component (B-3-1) obtained by contacting compounds (B-3a) and (B-3b) below with each other or a zinc co-catalyst component (B-3-2) obtained by contacting compounds (B-3a) to (B-3c) below with each other.

(B-3a): Compound represented by general formula $ZnR^{B6}_2$ (B-3b): Compound represented by general formula $R^{B7}_{B3-1}T^{B1}H$ (B-3c): Compound represented by general formula $R^{B8}_{B4-1}T^{B2}H_2$ $R^{B6}$ is a hydrogen atom, a halogen atom, a hydrocarbyl group, or a halogenated hydrocarbyl group, and a plurality of $R^{B6}$ may be identical with each other or different from each other. $R^{B7}$ and $R^{B8}$ are independently a hydrocarbyl group, a halogenated hydrocarbyl group, an electron withdrawing group, or a group containing an electron withdrawing group, and a plurality of $R^{B7}$ may be identical with each other or different from each other, and a plurality of $R^{B8}$ may be identical with each other or different from each other. $T^{B1}$ and $T^{B2}$ are independently an atom of Group 15 or 16 of the periodic table of the elements. B3 is an atomic valence of $T^{B1}$, and B4 is an atomic valence of $T^{B2}$.

Examples of the compound (B-3a) include dialkylzinc such as dimethylzinc, diethylzinc, dipropylzinc, dinormalbutylzinc, diisobutylzinc, dinormalhexyl zinc, diallylzinc, and bis(cyclopentadienyl)zinc; diarylzinc such as diphenylzinc, dinaphthylzinc, and bis(pentafluorophenyl)zinc; alkylzinc halides such as methylzinc chloride, ethylzinc chloride, propylzinc chloride, normal butylzinc chloride, isobutylzinc chloride, normal hexylzinc chloride, methylzinc bromide, ethylzinc bromide, propylzinc bromide, normal butylzinc bromide, isobutylzinc bromide, normal hexylzinc bromide, methylzinc iodide, ethylzinc iodide, propylzinc iodide, normal butylzinc iodide, isobutylzinc iodide, and normal hexylzinc iodide; zinc halides such as zinc fluoride, zinc chloride, zinc bromide, and zinc iodide.

Examples of amines of the compound (B-3b) include di(fluoromethyl)amine, di(chloromethyl)amine, di(bromomethyl)amine, di(iodomethyl)amine, bis(difluoromethyl)amine, bis(dichloromethyl)amine, bis(dibromomethyl)amine, bis(diiodomethyl)amine, bis(trifluoromethyl)amine, bis(trichloromethyl)amine, bis(tribromomethyl)amine, bis(triiodomethyl)amine, bis(2,2,2-trifluoroethyl)amine, bis(2,2,2-trichloroethyl)amine, bis(2,2,2-tribromoethyl)amine, bis(2,2,2-triiodoethyl)amine, bis(2,2,3,3,3-pentafluoropropyl)amine, bis(2,2,3,3,3-pentachloropropyl)amine, bis(2,2,3,3,3-penta bromopropyl)amine, bis(2,2,3,3,3-pentaiodopropyl)amine, bis(2,2,2-trifluoro-1-trifluoromethylethyl)amine, bis(2,2,2-trichloro-1-trichloromethylethyl)amine, bis(2,2,2-tribromo-1-tribromomethylethyl)amine, bis(2,2,2-triiodo-1-triiodomethylethyl)amine, bis(1,1-bis(trifluoromethyl)-2,2,2-trifluoroethyl)amine, bis(1,1-bis(trichloromethyl)-2,2,2-trichloroethyl)amine, bis(1,1-bis(tribromomethyl)-2,2,2-tribromoethyl)amine, bis(1,1-bis(triiodomethyl)-2,2,2- triiodoethyl)amine, bis(2-fluorophenyl)amine, bis(3-fluorophenyl)amine, bis(4-fluorophenyl)amine, bis(2-chlorophenyl)amine, bis(3-chlorophenyl)amine, bis(4-chlorophenyl)amine, bis(2-bromophenyl)amine, bis(3-bromophenyl)amine, bis(4-bromophenyl)amine, bis(2-iodophenyl)amine, bis(3-iodophenyl)amine, bis(4-iodophenyl)amine, bis(2,6-difluorophenyl)amine, bis(3,5-difluorophenyl)amine, bis(2,6-dichlorophenyl)amine, bis(3,5-dichlorophenyl)amine, bis(2,6-dibromophenyl)amine. bis (3,5-dibromophenyl)amine, bis(2,6-diiodophenyl)amine, bis(3,5-diiodophenyl)amine, bis(2,4,6-trifluorophenyl)amine, bis(2,4,6-trichlorophenyl)amine, bis(2,4,6-tribromophenyl)amine, bis(2,4,6-triiodophenyl)amine, bis(pentafluorophenyl)amine, bis(pentachlorophenyl)amine, bis(pentabromophenyl)amine, bis(pentaiodophenyl)amine, bis (2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(2-cyanophenyl)amine, (3-cyanophenyl)amine, bis(4-cyanophenyl)amine, bis(2-nitrophenyl)amine, bis(3-nitrophenyl)amine, and bis(4-nitrophenyl)amine. A phosphine compound obtained by replacing nitrogen atoms in the compound with phosphine atoms is also encompassed in the examples of the compound (B-3b). Such a phosphine compound is, for example, a compound obtained by replacing amine in the aforementioned specific examples with phosphine.

Examples of alcohols of the compound (B-3b) include fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 2,2,3,3,3-pentafluoropropanol, 2,2,3,3,3-pentachloropropanol, 2,2,3,3,3-pentabromopropanol, 2,2,3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1-bis(trifluoromethyl)-2,2,2-trifluoroethanol, 1,1-bis(trichloromethyl)-2,2,2-trichloroethanol, 1,1-bis(tribromomethyl)-2,2,2-tribromoethanol, and 1,1-bis(triiodomethyl)-2,2,2-triiodoethanol. Furthermore, a thiol compound obtained by replacing oxygen atoms in the compound with sulfur atoms is also encompassed in the example of the compound (B-3b). Such a thiol compound is, for example, a compound obtained by replacing methanol in the specific example with methane thiol, ethanol in the specific example with ethane thiol, and propanol in the specific example with propane thiol.

Examples of phenols of the compound (B-3b) include 2-fluorophenol, 3-fluorophenol, 4-fluorophenol, 2-chlorophenol, 3-chlorophenol, 4-chlorophenol, 2-bromophenol, 3-bromophenol, 4-bromophenol, 2-iodophenol, 3-iodophenol, 4-iodophenol, 2,6-difluorophenol, 3,5-difluorophenol, 2,6-dichlorophenol, 3,5-dichlorophenol, 2,6-dibromophenol, 3,5-dibromophenol, 2,6-diiodophenol, 3,5-diiodophenol, 2,4,6-trifluorophenol, 3,4,5-trifluorophenol, 2,4,6-trichlorophenol, 2,4,6-tribromophenol, 2,4,6-triiodophenol, pentafluorophenol, pentachlorophenol, pentabromophenol, pentaiodophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 2-cyanophenol, 3-cyanophenol, 4-cyanophenol, 2-nitrophenol, 3-nitrophenol, and 4-nitrophenol. Furthermore, a thiophenol compound obtained by replacing oxygen atoms in the compound with sulfur atoms is also encompassed in the example of the compound (B-3b). Such a thiophenol compound is, for example, a compound obtained by replacing phenol in the specific example with thiophenol.

Examples of carboxylic acids of the compound (B-3b) include 2-fluorobenzoic acid, 3-fluorobenzoic acid, 4-fluorobenzoic acid, 2,3-difluorobenzoic acid, 2,4-difluorobenzoic acid, 2,5-difluorobenzoic acid, 2,6-difluorobenzoic acid, 2,3,4-trifluorobenzoic acid, 2,3,5-trifluorobenzoic acid, 2,3,6-trifluorobenzoic acid, 2,4,5-trifluorobenzoic acid, 2,4,6-trifluorobenzoic acid, 2,3,4,5-tetrafluorobenzoic acid, 2,3,4,6-tetrafluorobenzoic acid, pentafluorobenzoic acid, fluoroacetic acid, difluoroacetic acid, trifluoroacetic acid, pentafluoropropanoic acid, heptafluorobutanoic acid, and 1,1-bis(trifluoromethyl)-2,2,2-trifluoroethanoic acid.

Examples of sulfonic acids of the compound (B-3b) include fluoromethanesulfonic acid, difluoromethanesulfonic acid, trifluoromethanesulfonic acid, pentafluoroethanesulfonic acid, heptafluoropropane sulfonic acid, and 1,1-bis(trifluoromethyl)-2,2,2-trifluoroethanesulfonic acid.

Preferable examples of the compound (B-3b) include: amines such as bis(trifluoromethyl)amine, bis(2,2,2-trifluoroethyl)amine, bis(2,2,3,3,3-pentafluoropropyl)amine, bis (2,2,2-trifluoro-1-trifluoromethylethyl)amine, bis(1,1-bis(trifluoromethyl)-2,2,2-trifluoroethyl)amine, and bis (pentafluorophenyl)amine; alcohols such as trifluoromethanol, 2,2,2-trifluoroethanol, 2,2,3,3,3-pentafluoropropanol, 2,2,2-trifluoro-1-trifluoromethylethanol, and 1,1-bis(trifluoromethyl)-2,2,2-trifluoroethanol; phenols such as 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, and 2,4,6-tris(trifluoromethyl)phenol; carboxylic acids such as penta fluorobenzoic acid and trifluoroacetic acid; sulfonic acids such as trifluoromethanesulfonic acid.

The used amounts of the compounds (B-3a) and (B-3b) to be contacted with each other are such that when the used amount of the compound (B-3a) is 1 mol, the used amount of the compound (B-3b) is preferably larger than 0 mol and not larger than 100 mol, more preferably larger than 0 mol and not larger than 20 mol, still more preferably larger than 0 mol and not larger than 10 mol, particularly preferably larger than 0 mol and not larger than 5 mol, and most preferably larger than 0 mol and not larger than 4 mol.

The following description will discuss in more detail a specific example of a method for producing the zinc co-catalyst component (B-3-1) in a case where the compound (B-3a) is diethylzinc and the compound (B-3b) is halogenated alcohol.

A hexane solution of diethylzinc is added to a toluene solvent, and the mixture is cooled down to 0° C., and halogenated alcohol in an amount of 2 mol to 4 mol with respect to the diethylzinc is dropped into the mixture, and then the mixture is stirred at 90° C. to 120° C. for 10 minutes to 24 hours. Under a reduced pressure, a volatile substance is distilled off from the mixture, and then the residue is dried for 1 to 20 hours under a reduced pressure at room temperature. Thus, the compound (B-3-1) can be produced.

Preferable examples of the compound (B-3c) include water, hydrogen sulfide, alkylamine, arylamine, aralkylamine, halogenated alkylamine, halogenated arylamine, and (alkyl halide) arylamine. More preferable examples of the compound (B-3c) include water, hydrogen sulfide, methylamine, ethylamine, n-propylamine, isopropylamine, n-butylamine, sec-butylamine, tert-butylamine, isobutylamine, n-pentylamine, neo pentylamine, amylamine, n-hexylamine, n-octylamine, n-decylamine, n-dodecylamine, n-pentadecylamine, n-eicosylamine, allylamine, cyclopentadienylamine, aniline, 2-tolylamine, 3-tolylamine, 4-tolylamine, 2,3-xylylamine, 2,4-xylylamine, 2,5-xylylamine, 2,6-xylylamine, 3,4-xylylamine, 3,5-xylylamine, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, ethylaniline, n-propylaniline, isopropylaniline, n-butylaniline, sec-butylaniline, tert-butylaniline, n-pentylaniline, neopentylaniline, n-hexylaniline, n-octylaniline, n-decylaniline, n-dodecylaniline, n-tetradecylaniline, naphthylamine, anthracenylamine, benzylamine, (2-methylphenyl)methylamine, (3-methylphenyl)methylamine, (4-methylphenyl)methylamine, (2,3-dimethylphenyl)methylamine, (2,4-dimethylphenyl)methylamine, (2,5-dimethylphenyl)methylamine, (2,6-dimethylphenyl)methylamine, (3,4-dimethylphenyl)methylamine, (3,5-dimethylphenyl)methylamine, (2,3,4-trimethylphenyl)methylamine, (2,3,5-trimethylphenyl)methylamine, (2,3,6-trimethylphenyl)methylamine, (3,4,5-trimethylphenyl)methylamine, (2,4,6-trimethylphenyl)methylamine, (2,3,4,5-tetramethylphenyl)methylamine, (2,3,4,6-tetramethylphenyl)methylamine, (2,3,5,6-tetramethylphenyl)methylamine, (pentamethylphenyl)methylamine, (ethylphenyl)methylamine, (n-propylphenyl)methylamine, (isopropylphenyl)methylamine, (n-butyl phenyl)methylamine, (sec-butylphenyl)methylamine, (tert-butylphenyl)methylamine, (n-pentylphenyl)methylamine, (neopentylphenyl)methylamine, (n-hexyl phenyl)methylamine, (n-octyl phenyl)methylamine, (n-decyl phenyl)methylamine, (n-tetradecylphenyl)methylamine, naphthylmethylamine, anthracenylmethylamine, fluoromethylamine, chloromethylamine, bromomethylamine, iodomethylamine, difluoromethylamine, dichloromethylamine, dibromomethylamine, diiodomethylamine, trifluoromethylamine, trichloromethylamine, tribromomethylamine, triiodomethylamine, 2,2,2-trifluoroethylamine, 2,2,2-trichloroethylamine, 2,2,2-tribromoethylamine, 2,2,2-triiodoethylamine, 2,2,3,3,3-pentafluoro propylamine, 2,2,3,3,3-pentachloro propylamine, 2,2,3,3,3-pentabromopropylamine, 2,2,3,3,3-pentaiodopropylamine, 2,2,2-trifluoro-1-trifluoromethylethylamine, 2,2,2-trichloro-1-trichloromethylethylamine, 2,2,2-tribromo-1-tribromomethylethylamine, 2,2,2-triiodo-1-triiodomethylethylamine, 1,1-bis(trifluoromethyl)-2,2,2-trifluoroethylamine, 1,1-bis(trichloromethyl)-2,2,2-trichloroethylamine, 1,1-bis(tribromomethyl)-2,2,2-tribromoethylamine, 1,1-bis(triiodomethyl)-2,2,2-triiodoethylamine, 2-fluoroaniline, 3-fluoroaniline, 4-fluoroaniline, 2-chloroaniline, 3-chloroaniline, 4-chloroaniline, 2-bromoaniline, 3-bromoaniline, 4-bromoaniline, 2-iodoaniline, 3-iodoaniline, 4-iodoaniline, 2,6-difluoroaniline, 3,5-difluoroaniline, 2,6-dichloroaniline, 3,5-dichloroaniline, 2,6-dibromoaniline, 3,5-dibromoaniline, 2,6-diiodoaniline, 3,5-diiodoaniline, 2,4,6-trifluoroaniline, 2,4,6-trichloroaniline, 2,4,6-tribromoaniline, 2,4,6-triiodoaniline, pentafluoroaniline, pentachloroaniline, pentabromoaniline, pentaiodoaniline, 2-(trifluoromethyl)aniline, 3-(trifluoromethyl)aniline, 4-(trifluoromethyl)aniline, 2,6-di(trifluoromethyl)aniline, 3,5-di(trifluoromethyl)aniline, and 2,4,6-tri(trifluoromethyl)aniline.

The compound (B-3-2) can be obtained by contacting the compounds (B-3a), (B-3b), and (B-3c) with each other. The order of contacting the compounds (B-3a), (B-3b), and (B-3c) with each other is not particularly limited. For example, the order may be (1) to (3) below.

(1) A method of contacting (B-3a) with (B-3b) and then contacting the resultant with (B-3c)

(2) A method of contacting (B-3a) with (B-3c) and then contacting the resultant with (B-3b)

(3) A method of contacting (B-3b) with (B-3c) and then contacting the resultant with (B-3a)

The order of contacting the compounds is preferably (1) or (2), and more preferably (1). That is, the compound (B-3-2) is preferably a compound obtained by contacting the resultant of contact between (B-3a) and (B-3b) with (B-3c), or a compound obtained by contacting the resultant of contact between (B-3a) and (B-3c) with (B-3b), and more preferably a compound obtained by contacting the resultant of contact between (B-3a) and (B-3b) with (B-3c).

Used amounts of individual compounds are not particularly limited. Assume that a molar ratio of used amounts of individual compounds is (B-3a): (B-3b): (B-3c)=1: y: z. In this case, it is preferable that y and z meet formulae [B1] to [B3] below.

$$|2-y-2z| \leq 1 \quad [B1]$$

$$0 < y < 2 \quad [B2]$$

$$0 < z \quad [B3]$$

y in the formulae [B1] and [B2] is preferably in a range of 0.20 to 1.80, and more preferably in a range of 0.25 to 1.50, and most preferably in a range of 0.50 to 1.00.

<Ion-Exchange Layered Silicate (B-4)>

Ion-exchange layered silicate used in the present invention (hereinafter merely referred to as "silicate") is a silicate compound having a crystal structure in which planes formed by ionic bond etc. are laminated in parallel with each other by a bonding force and containing exchangeable ions. In nature, most of silicate is produced mainly as a main component of a clay mineral, and therefore often contains a foreign substance other than the ion-exchange layered silicate (e.g. quartz, cristobalite). The silicate used in the present invention may contain such a foreign substance. Specific examples of the silicate include the following layered silicates described in, for example, Reference Document: "Clay Mineralogy" (SHIROZU Haruo, Asakura Shoten, 1995).

That is, specific examples of the silicate include: smectite group such as montmorillonite, sauconite, beidellite, nontronite, saponite, hectorite, and stevensite; vermiculite group such as vermiculite; mica group such as mica, illite, sericite, and glauconite; attapulgite; sepiolite; palygorskite; bentonite; pyrophyllite; talc; and chlorites.

The silicate used as a raw material in the present invention is preferably silicate whose main component is silicate having a 2: 1 structure, more preferably smectite, and particularly preferably montmorillonite. The interlayer cation is preferably that of silicate, which interlayer cation contains alkaline metal or alkaline earth metal as a main component, in consideration of the fact that such silicate can be obtained relatively easily and at a relatively low cost as an industrial raw material.

Although the silicate used in the present invention can be used without any treatment, the silicate is preferably subjected to a chemical treatment. The chemical treatment may be any of a surface treatment which removes impurities on the surface or a treatment which influences the structure of clay. Specific examples of the chemical treatment used in the present invention include (1) an acid treatment, (2) a saline treatment, (3) an alkaline treatment, and (4) an organic treatment.

(1) Acid Treatment

The acid treatment removes impurities on the surface of silicate, and can elute a part of or all of cations of Al, Fe, Mg. etc. in a crystalline structure.

The acid used in the acid treatment is preferably hydrochloric acid, sulfuric acid, nitric acid, phosphoric acid, acetic acid, or oxalic acid. Two or more kinds of acids may be used in the treatment. The silicate is treated with acid generally under such conditions that an acid concentration ranges from 0.1 to 50 wt %, a treatment temperature ranges from a room temperature to a boiling point, and a treatment time ranges from 5 minutes to 24 hours. The acid is generally used in an aqueous solution.

(2) Saline Treatment

In the present invention, it is preferable to ion-exchange 40% or more, preferably 60% or more of cations of an exchangeable metal (I) contained in the silicate before being subjected to the saline treatment, with cations dissociated from salts mentioned below.

The salt used in such a saline treatment intended for ion-exchange is a compound containing cations including at least one kinds of atom selected from the group consisting of Group 1-14 atoms and at least one kinds of anion selected from the group consisting of halogen atoms, inorganic acid and organic acid. The salt used in the saline treatment is more preferably a compound containing cations including at least one kinds of atom selected from the group consisting of Group 2-14 atoms and at least one kinds of anion selected from the group consisting of Cl, Br, I, F, $PO_4$, $SO_4$, $NO_3$, $CO_3$, $C_2O_4$, $ClO_4$, $OOCCH_3$, $CH_3COCHCOCH_3$, $OCl_2$, $O(NO_3)_2$, $O(ClO_4)_2$, $O(SO_4)$, OH, $O_2Cl_2$, $OCl_3$, OOCH, $OOCCH_2CH_3$, $C_2H_4O_4$, and $C_5H_5O_7$.

Specific examples of the salt include: LiF, LiCl, LiBr, LiI, $Li_2SO_4$, $Li(CH_3COO)$, $LiCO_3$, $Li(C_6H_5O_7)$, $LiCHO_1$, $LiC_2O_4$, $LiClO_4$, $Li_3PO_4$, $CaCl_2$, $CaSO_4$, $CaC_2O_4$, $Ca(NO_3)_2$, $Ca_3(C6H5O7)_2$, $MgCl_2$, $MgBr_2$, $MgSO_4$, $Mg(PO_4)_2$, $Mg(ClO_4)_2$, $MgC_2O_4$, $Mg(NO_3)_2$, $Mg(OOCCH_3)_2$, and $MgC_4H_4O_4$; $Ti(OOCCH_3)_4$, $Ti(CO_3)_2$, $Ti(NO_3)_4$, $Ti(SO_4)_2$, $TiF_4$, $TiCl_4$, $Zr(OOCCH_3)_4$, $Zr(CO_3)_2$, $Zr(NO_3)_4$, $Zr(SO_4)_2$, $ZrF_4$, $ZrCl_4$, $ZrOCl_2$, $ZrO(NO_3)_2$, $ZrO(ClO_4)_2$, $ZrO(SO_4)$, $HF(OOCCH_3)_4$, $HF(CO_3)_2$, $HF(NO_3)_4$, $HF(SO_4)_2$, $HFOCl_2$, $HFF_4$, $HFCl_4$, $V(CH_3COCHCOCH_3)_3$, $VOSO_4$, $VOCl_3$, $VCl_3$, $VCl_4$, and $VBr_3$; $Cr(CH_3COCHCOCH_3)_3$, $Cr(OOCCH_3)_2OH$, $Cr(NO_3)_3$, $Cr(ClO_4)_3$, $CrPO_4$, $Cr_2(SO_4)_3$, $CrO_2Cl_2$, $CrF_3$, $CrCl_3$, $CrBr_3$, $CrI_3$, $Mn(OOCCH_3)_2$, $Mn(CH_3COCHCOCH_3)_2$, $MnCO_3$, $Mn(NO_3)_2$, MnO, $Mn(ClO_4)_2$, $MnF_2$, $MnCl_2$, $Fe(OOCCH_3)_2$, $Fe(CH_3COCHCOCH_3)_3$, $FeCO_3$, $Fe(NO_3)_3$, $Fe(ClO_4)_3$, $FePO_4$, $FeSO_4$, $Fe_2(SO_4)_3$, $FeF_3$, $FeCl_3$, and $FeC_6H_5O_7$; $Co(OOCCH_3)_2$, $Co(CH_3COCHCOCH_3)_3$, $CoCO_3$, $Co(NO_3)_2$, $CoC_2O_4$, $Co(ClO_4)_2$, $Co_3(PO_4)_2$, $CoSO_4$, $CoF_2$, $CoCl_2$, $NiCO_3$, $Ni(NO_3)_2$, $NiC_2O_4$, $Ni(ClO_4)_2$, $NiSO_4$, $NiCl_2$, and $NiBr_2$; $Zn(OOCCH_3)_2$, $Zn(CH_3COCHCOCH_3)_2$, $ZnCO_3$, $Zn(NO_3)_2$, $Zn(ClO_4)_2$, $Zn_3(PO_4)_2$, $ZnSO_4$, $ZnF_2$, $ZnCl_2$, $AlF_3$, $AlCl_3$, $AlBr_3$, $AlI_3$, $Al_2(SO_4)_3$, $Al_2(C_2O_4)_3$, $Al(CH_3COCHCOCH_3)_3$, $Al(NO_3)_3$, $AlPO_4$, $GeCl_4$, $GeBr_4$, and $GeI_4$.

(3) Alkaline Treatment

Examples of the treating agent used in the alkaline treatment include LiOH, NaOH, KOH, $Mg(OH)_2$, $Ca(OH)_2$, $Sr(OH)_2$, and $Ba(OH)_2$.

(4) Organic Treatment

Examples of an organic matter used in the organic treatment include trimethyl ammonium, triethyl ammonium, N,N-dimethyl anilinium, and triphenyl phosphonium.

Examples of anions constituting the organic treating agent include anions shown as anions constituting an agent for saline treatment, hexafluoro phosphate, tetrafluoro borate, and tetraphenyl borate.

Generally, these silicates contain adsorption water and interlayer water. In the present invention, it is preferable to use these silicates after removing these adsorption water and interlayer water. Adsorption water and interlayer water of the silicate can be removed by heating the silicate. In this process, it is necessary to select heating conditions so that interlayer water does not remain and a structure of the silicate is not destructed. A heating time is 0.5 hour or longer, and preferably 1 hour or longer. It is preferable to heat the silicate so that moisture content of the silicate is 3 wt % or less, and preferably 1 wt % or less, when moisture content of silicate obtained by dehydrating the silicate for 2 hours at a temperature of 200° C. and a pressure of 1 mmHg is defined as 0 wt %.

As has been described, in the present invention, what is particularly preferable as the ion-exchange layered silicate (B-4) is a silicate with a moisture content of 3 wt % or less, obtained by being subjected to the saline treatment and/or acid treatment.

It is preferable to treat the silicate with a later-mentioned organometallic compound (C) before the silicate is used as a catalyst or a raw material for a catalyst. The used amount of the organometallic compound (C) with respect to 1 g of the silicate is generally 20 mmol or less, and preferably 0.5 mmol or more and 10 mmol or less. A treatment temperature is generally 0° C. or more and 70° C. or less, and a treatment time is 10 minutes or more and 3 hours or less. It is preferable to wash the silicate after treating the silicate. A solvent used for the washing is a hydrocarbon solvent, similarly with a case of later-mentioned preliminary polymerization or slurry polymerization.

The ion-exchange layered silicate (B-4) is preferably made of spherical particles whose average particle size is 5 μm or more. The ion-exchange layered silicate (B-4) may be a natural silicate or a commercially available silicate as it is if particles of the silicate are spherical. Alternatively, the ion-exchange layered silicate (B-4) may be a silicate whose particle shape and particle size are controlled by granulation, size classification, fractionation, etc. Examples of a method for the granulation include stirring granulation and spray granulation. An organic matter, an inorganic solvent, an inorganic salt, and binders may be used in the granulation. It is desirable that the spherical particles obtained as above have compressive breaking strength of 0.2 MPa or more, and particularly preferably 0.5 MPa or more, in consideration of preventing crushing or generation of fine powder in the polymerization step. Use of particles having such strength effectively exerts an effect of improving polymer particle properties particularly in the case of the preliminary polymerization.

In the present invention, the organoaluminumoxy compound (B-1), the organicboron compound (B-2), the zinc co-catalyst component (B-3), and the ion-exchange layered silicate (B-4) may be used alone or two or more kinds thereof may be used in combination.

Organometallic Compound (C)

The organometallic compound (C) used in the present invention is not limited in particular, provided that it is a compound that contains an element of any of Groups 2, 12, and 13 of the periodic table of the elements (excluding an activating co-catalyst agent (B)), but the organometallic compound (C) is one or more kinds of compounds selected from the group of compounds represented by the following formula.

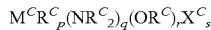

$M^C R^C_p (NR^C_2)_q (OR^C)_r X^C_s$ $M^C$ represents an atom of any of Groups 2, 12, and 13 of the periodic table of the elements. Examples of $M^C$ encompass a beryllium atom, a magnesium atom, a calcium atom, a strontium atom, a barium atom, a zinc atom, a cadmium atom, a mercury atom, a boron atom, an aluminum atom, a gallium atom, an indium atom, and a thallium atom. $M^C$ is preferably a magnesium atom, a calcium atom, an aluminum atom, a zinc atom, or a gallium atom, more preferably an aluminum atom or a zinc atom.

$R^C$ represents a hydrogen atom or a hydrocarbyl group having 1 to 20 carbon atoms. Examples of $R^C$ encompass an alkyl group, an aralkyl group, an aryl group, and an alkenyl group, and these optionally have a halogen atom, a hydrocarbyloxy group, an amino group, a nitro group, a sulfonyl group, or a silyl group as a substituent. Moreover, a plurality of $R^C$s may be the same as each other or may be different from each other.

Examples of the alkyl group encompass linear alkyl groups such as a methyl group, an ethyl group, an n-propyl group, an n-butyl group, an n-pentyl group, an n-hexyl group, an n-heptyl group, and an n-octyl group; branched alkyl groups such as an isopropyl group, an isobutyl group, a tert-butyl group, an isopentyl group, a neopentyl group, an isoamyl group, and a 2-ethylhexyl group; and cyclicalkyl groups such as a cyclopropyl group, a cyclobutyl group, a cyclopentyl group, a cyclohexyl group, a cycloheptyl group, and a cyclooctyl group. The alkyl group is preferably a linear or branched alkyl group having 1 to 20 carbon atoms.

Examples of the aralkyl group encompass a benzyl group and a phenethyl group. The aralkyl group is preferably an aralkyl group having 7 to 20 carbon atoms.

Examples of the aryl group encompass a phenyl group, a naphthyl group, and a tolyl group. The aryl group is preferably an aryl group having 6 to 20 carbon atoms.

Examples of the alkenyl group encompass linear alkenyl groups such as a vinyl group, an allyl group, a 3-butenyl group, and 5-hexenyl group; branched alkenyl groups such as an isobutenyl group and a 4-methyl-3-pentenyl group; and cyclic alkenyl groups such as a 2-cyclohexenyl group and a 3-cyclohexenyl group. The alkenyl group is preferably a linear or branched alkenyl group having 2 to 20 carbon atoms.

$X^C$ represents a halogen atom. Examples of $X^C$ encompass a chlorine atom, a bromine atom, an iodine atom, and a fluorine atom. $X^C$ is preferably a chlorine atom. A plurality of $R^C$s may be the same as each other or may be different from each other.

In the formula, p, q, r, and s are each an integer of any of 0 to 3. In a case where $M^C$ is an atom of Group 2 or 12 of the periodic table of the elements, p+q+r+s=2. Meanwhile, in a case where $M^C$ is an atom of Group 13 of the periodic table of the elements, p+q+r+s=3.

Examples of an organoaluminum compound used as the organometallic compound (C) in the present invention encompass tri-n-alkylaluminum such as trimethylaluminum, triethylaluminum, tri-n-propylaluminum, tri-n-butylaluminum, tri-n-pentylaluminum, tri-n-hexylaluminum, tri-n-octylaluminum, and tri-n-decyl aluminum; tri-branched chain alkylaluminum such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, and tri-2-ethylhexylaluminum; tricycloalkylaluminum such as tricyclohexylaluminum and tricyclooctylaluminum; triarylaluminum such as triphenylaluminum; di-n-alkylaluminum halides such as diethylaluminum bromide, di-n-propylaluminum bromide, di-n-butylaluminum bromide, di-n-pentylaluminum bromide, di-n-hexylaluminum bromide, diethylaluminum chloride, di-n-propylaluminum chloride, di-n-butylaluminum chloride, di-n-pentylaluminum chloride, and di-n-hexylaluminum chloride; di-branched chain alkylaluminum halides such as diisopropylaluminum bromide, diisobutylaluminum bromide, di-sec-butylaluminum bromide, di-tert-butylaluminum bromide, di-2-methylbutylaluminum bromide, di-3-methylbutylaluminum bromide, di-2-methylpentylaluminum bromide, di-3-methylpentylaluminum bromide, di-4-methylpentylaluminum bromide, di-2-methylhexylaluminum bromide, di-3-methylhexylaluminum bromide, di-2-ethylhexylaluminum bromide, diisopropylaluminum chloride, diisobutylaluminum chloride, di-sec-butylaluminum chloride, di-tert-butylaluminum chloride, di-2-methylbutylaluminum chloride, di-3-methylbutylaluminum chloride, di-2-methylpentylaluminum chloride, di-3-methylpentylaluminum chloride, di-4-methylpentylaluminum chloride, di-2-methylhexylaluminum chloride, di-3-methylhexylaluminum chloride, and di-2-ethylhexylaluminum chloride; and diarylaluminum halides such as diphenylaluminum bromide, dimethylphenylaluminum bromide, diethylphenylaluminum bromide, dibromophenylaluminum bromide, dichlorophenylaluminum bromide, difluorophenylaluminum bromide, dicyanophenylaluminum bromide, diphenylaluminum chloride, dimethylphenylaluminum chloride, diethylphenylaluminum chloride, dibromophenylaluminum chloride, dichlorophenylaluminum chloride, difluorophenylaluminum chloride, and dicyanophenylaluminum chloride. The organoaluminum compound is preferably an organoaluminum compound having 3 to 24 carbon atoms, more preferably tri-n-alkylaluminum, tri-branched chain alkylaluminum, or triarylaluminum each having 3 to 24 carbon atoms, further more preferably trimethylaluminum, triethylaluminum, triisobutylaluminum, or tri-n-octylaluminum.

Examples of an organoaluminum compound used as the organometallic compound (C) in the present invention encompass tri-n-alkylaluminum such as trimethylaluminum, triethylaluminum, tri-n-propylaluminum, tri-n-butylaluminum, tri-n-pentylaluminum, tri-n-hexylaluminum, tri-n-octylaluminum, and tri-n-decyl aluminum; tri-branched chain alkylaluminum such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, and tri-2-ethylhexylaluminum; tricycloalkylaluminum such as tricyclohexylaluminum and tricyclooctylaluminum; triarylaluminum such as triphenylaluminum; di-n-alkylaluminum halides such as diethylaluminum bromide, di-n-propylaluminum bromide, di-n-butylaluminum bromide, di-n-pentylaluminum bromide, di-n-hexylaluminum bromide, diethylaluminum chloride, di-n-propylaluminum chloride, di-n-butylaluminum chloride, di-n-pentylaluminum chloride, and di-n-hexylaluminum chloride; di-branched chain alkylaluminum halides such as diisopropylaluminum bromide, diisobutylaluminum bromide, di-sec-butylaluminum bromide, di-tert-butylaluminum bromide, di-2-methylbutylaluminum bromide, di-3-methylbutylaluminum bromide, di-2-methylpentylaluminum bromide, di-3-methylpentylaluminum bromide, di-4-methylpentylaluminum bromide, di-2-methylhexylaluminum bromide, di-3-methylhexylaluminum bromide, di-2-ethylhexylaluminum bromide, diisopropylaluminum chloride, diisobutylaluminum chloride, di-sec-butylaluminum chloride, di-tert-butylaluminum chloride, di-2-methylbutylaluminum chloride, di-3-methylbutylaluminum chloride, di-2-methylpentylaluminum chloride, di-3-methylpentylaluminum chloride, di-4-methylpentylaluminum chloride, di-2-methylhexylaluminum chloride, di-3-methylhexylaluminum chloride, and di-2-ethylhexylaluminum chloride; and diarylaluminum halides such as diphenylaluminum bromide, dimethylphenylaluminum bromide, diethylphenylaluminum bromide, dibromophenylaluminum bromide, dichlorophenylaluminum bromide, difluorophenylaluminum bromide, dicyanophenylaluminum bromide, diphenylaluminum chloride, dimethylphenylaluminum chloride, diethylphenylaluminum chloride, dibromophenylaluminum chloride, dichlorophenylaluminum chloride, difluorophenylaluminum chloride, and dicyanophenylaluminum chloride. The organoaluminum compound is preferably an organoaluminum compound having 3 to 24 carbon atoms, more preferably tri-n-alkylaluminum, tri-branched chain alkylaluminum, or triarylaluminum each having 3 to 24 carbon atoms, further more preferably trimethylaluminum, triethylaluminum, triisobutylaluminum, or trioctylaluminum.

Examples of the organozinc compound used as the organometallic compound (C) in the present invention encompass di-n-alkylzinc such as dimethylzinc, diethylzinc, di-n-propylzinc, di-n-butylzinc, di-n-pentylzinc, di-n-hexylzinc, di-n-octylzinc, and di-n-decylzinc; di-branched chain dialkylzinc such as diisopropylzinc, diisobutylzinc, di-sec-butylzinc, di-tert-butylzinc, di-2-methylbutylzinc, di-3-methylbutylzinc, di-2-methylpentylzinc, di-3-methylpentylzinc, di-4-methylpentylzinc, di-2-methylhexylzinc, di-3-methylhexylzinc, and di-2-ethylhexylzinc; dicycloalkylzinc such as dicyclohexylzinc and dicyclooctylzinc; diarylzinc such as diphenylzinc; n-alkylzinc halides such as ethylzinc bromide, n-propylzinc bromide, n-butylzinc bromide, n-pentylzinc bromide, n-hexylzinc bromide, ethylzinc chloride, n-propylzinc chloride, n-butylzinc chloride, n-pentylzinc chloride, and n-hexylzinc chloride; branched chain alkylzinc halides such as isopropylzinc bromide, isobutylzinc bromide, sec-butylzinc bromide, tert-butylzinc bromide, 2-methylbutylzinc bromide, 3-methylbutylzinc bromide, 2-methylpentylzinc bromide, 3-methylpentylzinc bromide, 4-methylpentylzinc bromide, 2-methylhexylzinc bromide, 3-methylhexylzinc bromide, 2-ethylhexylzinc bromide, isopropylzinc chloride, isobutylzinc chloride, sec-butylzinc chloride, tert-butylzinc chloride, 2-methylbutylzinc chloride, 3-methylbutylzinc chloride, 2-methylpentylzinc chloride, 3-methylpentylzinc chloride, 4-methylpentylzinc chloride, 2-methylhexylzinc chloride, 3-methylhexylzinc chloride, and 2-ethylhexylzinc chloride; and arylzinc halides such as phenylzinc bromide, methylphenylzinc bromide, ethylphenylzinc bromide, bromophenylzinc bromide, chlorophenylzinc bromide, fluorophenylzinc bromide, cyanophenylzinc bromide, phenylzinc chloride, methylphenylzinc chloride, ethylphenylzinc chloride, bromophenylzinc chloride, chlorophenylzinc chloride, fluorophenylzinc chloride, and cyanophenylzinc chloride. The organozinc compound is preferably an organozinc compound having 2 to 16 carbon atoms, more preferably di-n-alkylzinc, di-branched chain alkylzinc, or diarylzinc each having 2 to 16 carbon atoms, further more preferably dimethylzinc, diethylzinc, diisobutylzinc, or di-n-octylzinc.

Support (D)

In the present invention, the support (D) is used as needed for the purpose of supporting the transition metal compound (A-X) and/or the transitional metal compound (A-Y) and/or the activating co-catalyst agent (B).

Examples of the support (D) encompass inorganic oxide particles, inorganic halide particles, and organic polymer particles. Above all, the support (D) is preferably porous particles with uniform particle diameters. From the perspective of a particle dismter distribution of an obtained polymer, the support (D) has a volume-based geometrical standard deviation of particle diameters of preferably 2.5 or less, more preferably 2.0 or less, further more preferably 1.7 or less.

The inorganic oxide particles may be made of any inorganic oxide. The inorganic oxide particles may be made of a mixture of a plurality of inorganic substances. Examples of the inorganic oxide encompass $SiO_2$, $Al_2O_3$, $MgO$, $ZrO_2$, $TiO_2$, $B_2O_3$, $CaO$, $ZnO$, $BaO$, $ThO_2$, a mixture of these, $SiO_2$—$MgO$, $SiO_2MgO$, $SiO_2$—$Al_2O_3$, $SiO_2$—$TiO_2$, $SiO_2$—$V_2O_5$, $SiO_2$—$Cr_2O_3$, and $SiO_2$—$TiO_2$—$MgO$. The inorganic oxide is preferably $SiO_2$ and/or $Al_2O_3$, especially preferably $SiO_2$. The inorganic oxide may contain a small amount of carbonate, sulfate, nitrate, or an oxide component such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, and $Li_2O$.

The inorganic oxide is preferably dried so that moisture is substantially removed. A preferable drying method is drying by heating. A drying temperature is generally 100° C. to 1500° C., preferably 100° C. to 1000° C., further more preferably 200° C. to 800° C. Duration of drying is preferably 10 minutes to 50 hours, more preferably 1 hour to 30 hours. One example of a method of the drying by heating is a method of drying the inorganic oxide by causing a dry inactive gas (e.g. nitrogen or argon) to flow at a constant flow rate while heating the inorganic oxide. Another method is a method of drying the inorganic oxide by heating under reduced pressure.

The inorganic oxide, which generally has a hydroxy group generated on a surface thereof, may be a modified inorganic oxide obtained by replacing active hydrogen of the surface hydroxy group with a substituent of various kinds. Examples of the modified inorganic oxide encompass trialkylchlorosilane such as trimethylchlorosilane or tert-butyldimethylchlorosilane; triarylchlorosilane such as triphenylchlorosilane; dialkyldichlorosilane such as dimethyldichlorosilane; diaryldichlorosilane such as diphenyldichlorosilane; alkyltrichlorosilane such as methyltrichlorosilane; aryltrichlorosilane such as phenyltrichlorosilane; trialkylalkoxysilane such as trimethylmethoxysilane; triarylalkoxysilane such as triphenylmethoxysilane; dialkyldialkoxysilane such as dimethyldimethoxysilane; diaryldialkoxysilane such as diphenylmethoxysilane; alkyltrialkoxysilane such as methyltrimethoxysilane; aryltrialkoxysilane such as phenyltrimethoxysilane; tetraalkoxysilane such as tetramethoxysilane; alkyldisilazane such as 1,1,1,3,3,3-hexamethyldisilazane; tetrachlorosilane; and inorganic oxides that have been made contact with alcohol such as methanol or ethanol; phenol; dialkylmagnesium such as dibutylmagnesium, butylethylmagnesium, butyloctylmagnesium; or alkyl lithium such as butyl lithium.

Another example of the inorganic oxide is an inorganic oxide that has been made contact with trialkylaluminum and then made contact with dialkylamine such as diethylamine, or diphenylamine; alcohol such as methanol or ethanol; or phenol.

An inorganic oxide is sometimes increased in its strength through hydrogen bond between hydroxy groups. In this case, if all of active hydrogens of a surface hydroxy group are replaced with various kinds of substituents, a decline in particle strength etc. may undesirably occur. It is therefore unnecessary to substitute all of the active hydrogens. A rate of substitution in the surface hydroxy group can be determined as appropriate. The rate of substitution in the surface hydroxy group can be changed, for example, depending on a used amount of compound used for the contact process.

An average particle diameter of the inorganic oxide particles is not limited in particular, but is generally 1 μm to 5000 μm, preferably 5 μm to 1000 μm, more preferably 10 μm to 500 μm, further more preferably 10 μm to 100 μm. A pore volume of the inorganic oxide particles is preferably 0.1 ml/g or more, more preferably 0.3 ml/g to 10 ml/g. A specific surface area of the inorganic oxide particles is preferably 10 $m^2$/g to 1000 $m^2$/g, more preferably 100 $m^2$/g to 500 $m^2$/g.

Examples of the inorganic halide encompass $MgCl_2$, $MgBr_2$, $MnCl_2$, and $MnBr_2$. The inorganic halide may be used as it is or may be used after being crushed by a ball mill or a vibrational mill. Alternatively, the inorganic halide may be one that has been dissolved in a solvent such as alcohol and then separated out in the form of fine particles by a precipitant.

The organic polymer particles may be made of any organic polymer. The organic polymer particles may be made of a mixture of plural kinds of organic polymers. The organic polymer is preferably a polymer that has a functional group having active hydrogen or a non-proton-donating Lewis basic functional group.

The functional group having an active hydrogen is not limited in particular, provided that it has an active hydrogen. Examples of this functional group encompass a primary amino group, a secondary amino group, an imino group, an amide group, a hydrazide group, an amidino group, a hydroxy group, a hydroperoxy group, a carboxyl group, a formyl group, a carbamoyl group, a sulfonic acid group, a sulfinic acid group, a sulfenic acid group, a thiol group, a thioformyl group, a pyrrolyl group, an imidazolyl group, a piperidyl group, an indazolyl group, and a carbazolyl group. The functional group is preferably a primary amino group, a secondary amino group, an imino group, an amide group, an imido group, a hydroxy group, a formyl group, a carboxyl group, a sulfonic acid group, or a thiol group, especially preferably a primary amino group, a secondary amino group, an amide group, or a hydroxy group. These groups may be substituted with a halogen atom or a hydrocarbyl group having 1 to 20 carbon atoms.

The non-proton-donating Lewis basic functional group is not limited in particular, provided that it is a functional group that has no active hydrogen atom and has a Lewis basic part. Examples of this functional group encompass a pyridyl group, an N-substituted imidazolyl group, an N-substituted indazolyl group, a nitrile group, an azido group, an N-substituted imino group, an N,N-substituted amino group, an N,N-substituted aminooxy group, an N,N,N-substituted hydrazino group, a nitroso group, a nitro group, a nitrooxy group, a furyl group, a carbonyl group, a thiocarbonyl group, an alkoxy group, an alkyloxycarbonyl group, an N,N-substituted carbamoyl group, a thioalkoxy group, a substituted sulfinyl group, a substituted sulfonyl group, and a substituted sulfonic acid group. The functional group is preferably a heterocyclic group, further more preferably an aromatic heterocyclic group having an oxygen atom and/or a nitrogen atom in its ring, especially preferably a pyridyl group, an N-substituted imidazolyl group, or an N-substituted indazolyl group, most preferably a pyridyl group. These groups may be substituted with a halogen atom or a hydrocarbyl group having 1 to 20 carbon atoms.

An amount of the functional group having active hydrogen or the non-proton-donating Lewis basic functional group in the organic polymer is not limited in particular, and is preferably 0.01 mmol/g to 50 mmol/g, more preferably 0.1 mmol/g to 20 mmol/g as a molar amount of the functional group per gram of the polymer.

One example of a method for producing an organic polymer that has a functional group having an active hydrogen or a non-proton-donating Lewis basic functional group is a method of homopolymerizing a monomer that has (i) the functional group having an active hydrogen or the non-proton-donating Lewis basic functional group and (ii) one or more polymerizable unsaturated groups. Another example is a method of copolymerizing the monomer and another monomer having a polymerizable unsaturated group. In this case, it is preferable to copolymerize these monomers together with a crosslinking polymerizable monomer having two or more polymerizable unsaturated groups.

Examples of the polymerizable unsaturated group encompass alkenyl groups such as a vinyl group and an allyl group and alkynyl groups such as an ethyne group. Examples of a monomer that has the functional group having active hydrogen and one or more polymerizable unsaturated group encompass a vinyl-group-containing primary amine, a vinyl-group-containing secondary amine, a vinyl-group-containing amide compound, and a vinyl-group-containing hydroxy compound. Specific examples of the monomer encompass N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl)amide, N-methyl-(2-propenyl)amide, vinyl alcohol, 2-propene-1-ol, and 3-butene-1-ol. Examples of the monomer that has the functional group having no active hydrogen atom and having a Lewis basic part and one or more polymerizable unsaturated group encompass vinylpyridine, vinyl (N-substituted) imidazole, and vinyl (N-substituted) indazole.

Examples of the another monomer having a polymerizable unsaturated group encompass ethylene, α-olefin, an aromatic vinyl compound, and a cyclic olefin compound. Specific examples of the monomer encompass ethylene, propylene, 1-butene, 1-hexene, 4-methyl-1-pentene, styrene, norbornene, and dicyclopentadiene. The monomer is preferably ethylene or styrene. These monomers may be used in combination of two or more kinds of them. Examples of the crosslinking polymerizable monomer having two or more polymerizable unsaturated groups encompass divinylbenzene.

An average particle diameter of the organic polymer particles is not limited in particular, but is generally 1 μm to 5000 μm, preferably 5 μm to 1000 μm, more preferably 10 μm to 500 μm. A pore volume of the organic polymer particles is preferably 0.1 ml/g or more, more preferably 0.3 ml/g to 10 ml/g. A specific surface area of the organic polymer particles is preferably 10 $m^2$/g to 1000 $m^2$/g, more preferably 50 $m^2$/g to 500 $m^2$/g.

These organic polymer particles are preferably dried so that moisture is substantially removed. A preferable drying method is drying by heating. A drying temperature is generally 30° C. to 400° C., preferably 50° C. to 200° C., further more preferably 70° C. to 150° C. Duration of heating is preferably 10 minutes to 50 hours, more preferably 1 hour to 30 hours. One example of a method of the drying by heating is a method of drying the organic polymer particles by causing a dry inactive gas (e.g. nitrogen or argon) to flow at a constant flow rate while heating the organic polymer particles. Another method is a method of drying the organic polymer particles by heating under reduced pressure.

The organic polymer particles are, for example, a granular or particulate solid having a particle diameter in a range from 10 μm to 300 μm. Examples of a polymer forming the organic polymer particles encompass (co)polymers containing, as a main component, α-olefin having 2 to 14 carbon atoms such as ethylene, propylene, 1-butene, or 4-methyl-1-pentene; (co)polymers containing, as a main component, vinylcyclohexane or stylene; and modifications thereof.

Organic Compound (E)

In the present invention, the organic compound (E) is used, as needed, for improving polymerization performance and physical properties of a generated polymer. Examples of the organic compound (E) encompass alcohols, phenols, carboxylic acids, amines, phosphorus compounds, and sulfonic acids and salts thereof.

Alcohols and phenols are represented by the general formula $R^{E1}OH$ where $R^{E1}$ represents a hydrocarbyl group having 1 to 20 carbon atoms or a halohydrocarbyl group having 1 to 20 carbon atoms, and is preferably a halohydrocarbyl group having 1 to 10 carbon atoms.

Carboxylic acids are represented by the general formula $R^{E2}COOH$ where $R^{E2}$ represents a hydrocarbyl group having 1 to 20 carbon atoms or a halohydrocarbyl group having 1 to 20 carbon atoms, and is preferably a halohydrocarbyl group having 1 to 10 carbon atoms.

Amines are represented by the general formula $NR^{E3}_3$ where $R^{E3}$ represents a hydrogen atom, a hydrocarbyl group having 1 to 20 carbon atoms or a halohydrocarbyl group having 1 to 20 carbon atoms, and at least one $R^{E3}$ is a hydrocarbyl group or a halohydrocarbyl group, and is preferably a halohydrocarbyl group having 1 to 10 carbon atoms.

Examples of phosphorus compounds encompass phosphines represented by the general formula $PR^{E4}_3$, phosphites represented by the general formula $P(OR^{E4})_3$, phosphine oxides represented by the general formula $O=PR^{E4}_3$, and phosphates represented by the general formula $O=P(OR^{E4})_3$ where $R^{E4}$ represents a hydrogen atom, a hydrocarbyl group having 1 to 20 carbon atoms or a halohydrocarbyl group having 1 to 20 carbon atoms, and at least one $R^{E4}$ is a hydrocarbyl group or a halohydrocarbyl group, and is preferably a halohydrocarbyl group having 1 to 10 carbon atoms.

Sulfonic acids and salts thereof are represented by the general formula $R^{E5}SO_3H$ and $(R^{E6}SO_3)_t M^E_u$, respectively, where $M^E$ is an element of any of Groups 1 to 14 of the periodic table of the elements.

In the general formula, $R^{E5}$ and $R^{E6}$ are each a hydrocarbyl group having 1 to 20 carbon atoms or a halohydrocarbyl group having 1 to 20 carbon atoms.

In the general formula, t and u are each an integer of any of 1 to 4, and satisfy $t=u \times v$ provided that v is valence of $M^E$.

=Formation of Polymerization Catalyst (X)=

A method for forming a polymerization catalyst (X) is not limited in particular, but can be, for example, a method of bringing a transition metal compound (A-X), an activating co-catalyst agent (B), optionally an organometallic compound (C), and optionally a support (D) into contact with each other. This contact is made under the presence or absence of a solvent. These components may be contacted and mixed with each other and then added to a polymerization tank. Alternatively, these components may be separately added to a polymerization tank in any order so as to be contacted with each other in the polymerization tank. Alternatively, these components may be added to a polymerization tank in such a manner that any two of these components which two have been contacted and mixed with each other and the other one are separately added to the polymerization tank.

In formation of the polymerization catalyst (X), a method of adding the components, and an order in which the components are added, and added amounts of the components can be any ones. Examples of such a method encompass the following methods:

(1) Method of adding, to a polymerization tank, the transition metal compound (A-X) and the activating co-catalyst agent (B) that have been contacted and mixed with each other.

(2) Method of adding, to a polymerization tank, the transition metal compound (A-X), the activating co-catalyst agent (B), and the support (D) that have been contacted and mixed with each other.

(3) Method of adding, to a polymerization tank, (i) a catalyst component in which the transition metal compound (A-X) is supported on the support (D) and (ii) the activating co-catalyst agent (B) that have been contacted and mixed with each other.

(4) Method of adding, to a polymerization tank, (i) a catalyst component in which the activating co-catalyst agent (B) is supported on the support (D) and (ii) the transition metal compound (A-X) that have been contacted and mixed with each other.

(5) Method of adding, to a polymerization tank, the transition metal compound (A-X) and the activating co-catalyst agent (B) in any order.

(6) Method of adding, to a polymerization tank, the transition metal compound (A-X), the activating co-catalyst agent (B), and the support (D) in any order.

(7) Method of adding, to a polymerization tank, (i) a catalyst component in which the transition metal compound (A-X) is supported on the support (D) and (ii) the activating co-catalyst agent (B) in any order.

(8) Method of adding, to a polymerization tank, (i) a catalyst component in which the activating co-catalyst agent (B) is supported on the support (D) and (ii) the transition metal compound (A-X) in any order.

(9) Method of adding, to a polymerization tank, a catalyst component in which the transition metal compound (A-X) and the activating co-catalyst agent (B) are supported on the support (D).

In each of the methods (1) through (9), one or more kinds of compounds selected from the organometallic compound (C) can be added, as needed, to the polymerization tank in any order for the purpose being used as a scavenger of a minute amount of water, oxygen, and other components that are catalyst poison in the polymerization tank or as an alkylating agent of the transition metal compound (A-X). The organometallic compound (C) is an optional component in formation of the polymerization catalyst (X), but is an essential component in the production method of the present invention.

In each of the methods (3), (7), and (9) in which the transition metal compound (A-X) is supported, the catalyst component thus supported may be preliminarily polymerized with olefin, and the transition metal compound (A-X) may further be supported on the catalyst component thus preliminarily polymerized. In this case, the transition metal compound (A-X) that is supported on the support (D) and the transition metal compound (A-X) that is not supported on the support (D) may be the same as or different from each other.

In each of the methods (4), (8), and (9) in which the activating co-catalyst agent (B) is supported, the activating co-catalyst agent (B) that is not supported may be added to the polymerization tank as needed in any order. In this case, the activating co-catalyst agent (B) that is supported on the support (D) and the activating co-catalyst agent (B) that is not supported on the support (D) may be the same as or different from each other.

The transition metal compound (A-X) is used in an amount of generally $10^{-12}$ to $10^{-2}$ mol, preferably $10^{-10}$ to $10^{-3}$ mol per liter of a reaction volume.

In a case where the organoaluminumoxy compound (B-1) is used as the activating co-catalyst agent (B), the organoaluminumoxy compound (B-1) is used in such an amount that a molar ratio [Al/(A-X)] of an aluminum atom in the organoaluminumoxy compound (B-1) to the transition metal compound (A-X) is generally 10 to 500,000, preferably 20 to 100,000. In a case where the organoboron compound (B-2) is used, the organoboron compound (B-2) is used in such an amount that a molar ratio [B/(A-X)] of a boron atom in the organoboron compound (B-2) to the transition metal compound (A-X) is generally 1 to 1,000, preferably 1 to 100.

Of the methods (1) through (9), preferable ones are the methods (5), (6), (7), and (8) of adding, to the polymerization tank, the components in any order, and a more preferable one is the method (5).

In the method of the present invention for producing an olefin block polymer, a plurality of polymerization catalysts (X) may be used which are different in at least one kind of the components constituting each of the polymerization catalysts (X), i.e., the transition metal compound (A-X), the activating co-catalyst agent (B), the organometallic compound (C), and the support (D).

=Formation of Polymerization Catalyst (Y)=

A method for forming a polymerization catalyst (Y) is not limited to in particular but can be, for example, a method of bringing the transition metal compound (A-Y), the activating co-catalyst agent (B), optionally the organometallic compound (C), and optionally the support (D) into contact with each other. This contact is made under the presence or absence of a solvent. These components may be contacted and mixed with each other and then added to a polymerization tank. Alternatively, these components may be separately added to a polymerization tank in any order so as to be contacted with each other in the polymerization tank. Alternatively, these components may be added to a polymerization tank in such a manner that any two of these components which two have been contacted and mixed with each other and the other one are separately added to the polymerization tank.

In formation of the polymerization catalyst (Y), a method of adding the components, and an order in which the components are added, and added amounts of the components can be any ones. Examples of such a method encompass the following methods:

(1) Method of adding, to a polymerization tank, the transition metal compound (A-Y) and the activating co-catalyst agent (B) that have been contacted and mixed with each other.

(2) Method of adding, to a polymerization tank, the transition metal compound (A-Y), the activating co-catalyst agent (B), and the support (D) that have been contacted and mixed with each other.

(3) Method of adding, to a polymerization tank, (i) a catalyst component in which the transition metal compound (A-Y) is supported on the support (D) and (ii) the activating co-catalyst agent (B) that have been contacted and mixed with each other.

(4) Method of adding, to a polymerization tank, (i) a catalyst component in which the activating co-catalyst agent (B) is supported on the support (D) and (ii) the transition metal compound (A-Y) that have been contacted and mixed with each other.

(5) Method of adding, to a polymerization tank, the transition metal compound (A-Y) and the activating co-catalyst agent (B) in any order.

(6) Method of adding, to a polymerization tank, the transition metal compound (A-Y), the activating co-catalyst agent (B), and the support (D) in any order.

(7) Method of adding, to a polymerization tank, (i) a catalyst component in which the transition metal compound (A-Y) is supported on the support (D) and (ii) the activating co-catalyst agent (B) in any order.

(8) Method of adding, to a polymerization tank, (i) a catalyst component in which the activating co-catalyst agent (B) is supported on the support (D) and (ii) the transition metal compound (A-Y) in any order.

(9) Method of adding, to a polymerization tank, a catalyst component in which the transition metal compound (A-Y) and the activating co-catalyst agent (B) are supported on the support (D).

In each of the methods (1) through (9), one or more kinds of compounds selected from the organometallic compound (C) can be added, as needed, to the polymerization tank in any order for the purpose being used as a scavenger of a minute amount of water, oxygen, and other components that are catalyst poison in the polymerization tank or as an alkylating agent of the transition metal compound (A-Y). The organometallic compound (C) is an optional component in formation of the polymerization catalyst (Y), but is an essential component in the production method of the present invention.

In each of the methods (3), (7), and (9) in which the transition metal compound (A-Y) is supported, the catalyst component thus supported may be preliminarily polymerized with olefin, and the transition metal compound (A-Y) may further be supported on the catalyst component thus preliminarily polymerized. In this case, the transition metal compound (A-Y) that is supported on the support (D) and the transition metal compound (A-Y) that is not supported on the support (D) may be the same as or different from each other.

In each of the methods (4), (8), and (9) in which the activating co-catalyst agent (B) is supported, the activating co-catalyst agent (B) that is not supported may be added to the polymerization tank as needed in any order. In this case, the activating co-catalyst agent (B) that is supported on the support (D) and the activating co-catalyst agent (B) that is not supported on the support (D) may be the same as or different from each other.

The transition metal compound (A-Y) is used in an amount of generally $10^{-12}$ to $10^{-2}$ mol, preferably $10^{-10}$ to $10^{-3}$ mol per liter of a reaction volume.

In a case where the organoaluminumoxy compound (B-1) is used as the activating co-catalyst agent (B), the organoaluminumoxy compound (B-1) is used in such an amount that a molar ratio [Al/(A-Y)] of an aluminum atom in the organoaluminumoxy compound (B-1) to the transition metal compound (A-Y) is generally 10 to 500,000, preferably 20 to 100,000. In a case where the organoboron compound (B-2) is used, the organoboron compound (B-2) is used in such an amount that a molar ratio [B/(A-Y)] of a boron atom in the organoboron compound (B-2) to the transition metal compound (A-Y) is generally 1 to 1,000, preferably 1 to 100.

Of the methods (1) through (9), preferable ones are the methods (5), (6), (7), and (8) of adding, to the polymerization tank, the components in any order, and a more preferable one is the method (5).

In the method of the present invention for producing an olefin block polymer, a plurality of polymerization catalysts (Y) may be used which are different in at least one kind of the components constituting each of the polymerization catalysts (Y), i.e., the transition metal compound (A-Y), the activating co-catalyst agent (B), the organometallic compound (C), and the support (D).

In the method of the present invention for producing an olefin block polymer, both in a case where the polymerization catalyst (X) and the polymerization catalyst (Y) are simultaneously formed and in a case where the polymerization catalyst (X) and the polymerization catalyst (Y) are sequentially formed, the polymerization catalyst (X) and the polymerization catalyst (Y) may be different or may be identical in components used for formation thereof, i.e., the activating co-catalyst agent (B), the organometallic compound (C) which is an optional component, and the support (D) which is an optional component. In a case where the polymerization catalyst (X) and the polymerization catalyst (Y) are sequentially formed, the activating co-catalyst agent (B), the organometallic compound (C), and the support (D) with which the transition metal compound (A-X) has been contacted in advance may be used as component for formation of the polymerization catalyst (Y) or the support (D) with which the transition metal compound (A-X) has been contacted in advance may be used as a component for formation of the polymerization catalyst (Y). Similarly, the activating co-catalyst agent (B), the organometallic compound (C), and the support (D) with which the transition metal compound (A-Y) has been contacted in advance may be used as component for formation of the polymerization catalyst (X) or the support (D) with which the transition metal compound (A-Y) has been contacted in advance may be used as a component for formation of the polymerization catalyst (X).

Olefin

Olefin used in the present invention is preferably olefin having 2 to 20 carbon atoms, and can be, for example, ethylene, α-olefin, cyclic olefin, an alkenyl alicyclic compound, or polar olefin.

Examples of α-olefin encompass propylene, 1-butene, 1-pentene, 4-methyl-1-pentene, 5-methyl-1-hexene, 1-hexene, 1-heptene, 1-octene, 1-nonene, and 1-decene.

Examples of cyclic olefin encompass cyclobutene, cyclopentene, cyclohexene, cycloheptene, cyclooctene, cyclononene, cyclodecene, norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene, and 8-cyanotetracyclododecene.

Examples of the alkenyl alicyclic compound encompass vinylcyclohexane.

Examples of polar olefin encompass α,β-unsaturated carboxylic acids such as acrylic acid, methacrylic acid, fumaric acid, maleic anhydride, itaconic acid, itaconic acid anhydride, and bicyclo(2,2,1)-5-heptene-2,3-dicarboxylic acid, and metal salts thereof such as sodium, potassium, lithium, zinc, magnesium, and calcium salts thereof; α,β-unsaturated carboxylic acid ester such as methyl acrylate, ethyl acrylate, n-propyl acrylate, isopropyl acrylate, t-butyl acrylate, 2-ethylhexyl acrylate, methyl methacrylate, ethyl methacrylate, n-propyl methacrylate, isopropyl methacrylate, n-butyl methacrylate, and isobutyl methacrylate; unsaturated dicarboxylic acid such as maleic acid and itaconic acid; vinyl ester such as vinyl acetate, vinyl propionate, vinyl caproate, vinyl caprate, vinyl laurate, vinyl stearate, vinyl trifluoroacetate; and unsaturated-carboxylic-acid glycidyl ester such as glycidyl acrylate, glycidyl methacrylate, and itaconic acid mono-glycidyl ester.

The olefin is preferably ethylene, an α-olefin having 3 to 20 carbon atoms, cyclic olefin having 3 to 20 carbon atoms, or an alkenyl alicyclic compound having 5 to 20 carbon atoms, more preferably ethylene or α-olefin having 3 to 20 carbon atoms, further more preferably ethylene or α-olefin having 3 to 10 carbon atoms, most preferably ethylene or propylene.

The olefin may be used alone or in combination of two or more thereof. In a case where two or more kinds of olefins are used, the two or more kinds of olefins may be added simultaneously or may be added sequentially. Moreover, a combination and a used proportion of the two or more kinds of olefins are not limited in particular.

Olefin Polymerization Condition

In the present invention, a method for polymerizing olefin may be a liquid-phase polymerization method such as a solvent polymerization method or a suspension polymerization method or may be a gas-phase polymerization method.

Specific examples of an inactive hydrocarbyl medium used in the liquid-phase polymerization method encompass aliphatic hydrocarbyl such as propane, butane, pentane, hexane, heptane, octane, decane, dodecane and kerosene; alicyclic hydrocarbyl such as cyclopentane, cyclohexane, and methylcyclopentane; aromatic hydrocarbyl such as benzene, toluene, and xylene; halohydrocarbyl such as ethylene chloride, chlorobenzene, and dichloromethane; and mixtures of these. Olefin itself may also be used as a solvent.

The method of the present invention for producing an olefin block polymer is not limited provided that olefin is polymerized with the use of the polymerization catalyst (X), the polymerization catalyst (Y), and the organometallic compound (C), but can be, for example, any of the following methods.

Single-Stage Polymerization Method (1)

One method is a method for producing an olefin block polymer by carrying out single-stage polymerization including just one polymerization step with the use of one or more kinds of polymerization catalysts (X), one or more kinds of polymerization catalysts (Y), one or more kinds of organometallic compounds (C), one or more kinds of olefins, and as needed the organic compound (E).

In the single-stage polymerization method (1), the polymerization catalyst (X) and the polymerization catalyst (Y) are preferably formed almost simultaneously according to the above method for forming a polymerization catalyst.

In the single-stage polymerization method (1), olefin is preferably added to the polymerization tank before the polymerization catalyst (X) or the polymerization catalyst (Y) is formed in the polymerization tank or before the polymerization catalyst (X) or the polymerization catalyst (Y) that has been formed outside the polymerization tank is added to the polymerization tank. The olefin may be successively added to the polymerization tank so that (i) in a case where one kind of olefin is used, an olefin concentration in the polymerization tank may be kept constant during the polymerization and (ii) in a case where two or more kinds of olefins are used, olefin concentrations and a composition ratio of the two or more kinds of olefins may be kept constant during the polymerization.

Multi-Stage Polymerization Method (2)

Another method is a method for producing an olefin block polymer by carrying out multi-stage polymerization including two or more polymerization steps with the use of one or more kinds of polymerization catalysts (X), one or more kinds of polymerization catalysts (Y), one or more kinds of organometallic compounds (C), one or more kinds of olefins, and as needed the organic compound (E), the two or more polymerization steps being same in olefin composition, two adjacent polymerization steps are a polymerization step using the one or more kinds of polymerization catalysts (X) and a polymerization step using the one or more kinds of polymerization catalysts (Y), and in each of the polymerization steps, the olefins are polymerized in the presence of a polymer which has been produced in previous steps.

The multi-stage polymerization method (2) includes at least the step <step 2X> of polymerizing olefin in the presence of a polymerization catalyst (X), and the step <step 2Y> of polymerizing olefin same in composition as that used in the <step 2X> in the presence of a polymerization catalyst (Y). Both of the polymerization catalyst (X) formed in the <step 2X> of the multi-stage polymerization method (2) and the polymerization catalyst (Y) formed in the <step 2Y> of the multi-stage polymerization method (2) may be formed inside the polymerization tank or may be formed outside the polymerization tank and then added to the polymerization tank.

In the multi-stage polymerization method (2), the olefin to be used in the <step 2X> is preferably added to the polymerization tank before the polymerization catalyst (X) is formed in the polymerization tank or before the polymerization catalyst (X) that has been formed outside the polymerization tank is added to the polymerization tank, and the olefin to be used in the <step 2Y> is preferably added to the polymerization tank before the polymerization catalyst (Y) is formed in the polymerization tank or before the polymerization catalyst (Y) that has been formed outside the polymerization tank is added to the polymerization tank. The olefin may be successively added to the polymerization tank so that (i) in a case where one kind of olefin is used, an olefin concentration in the polymerization tank may be kept constant during the polymerization and (ii) in a case where two or more kinds of olefins are used, olefin concentrations and a composition ratio of the two or more kinds of olefins may be kept constant during the polymerization.

The multi-stage polymerization method (2) may further include a step of polymerizing olefin same in composition as those used in the <step 2X> or the <step 2Y> in the presence of a polymerization catalyst (X) or a polymerization catalyst (Y) different from those used in the <step 2X> or the <step 2Y>. The multi-stage polymerization method (2) has preferably 2 to 5 polymerization steps, more preferably 2 or 3 polymerization steps, most preferably 2 polymerization steps.

In each polymerization step, olefin is polymerized in the presence of a polymer which has been produced in previous steps. In each of the second and subsequent polymerization steps, olefin is polymerized in the presence of a polymer obtained by the last preceding polymerization step.

Multi-Stage Polymerization Method (3)

Still another method is a method for producing an olefin block polymer by carrying out multi-stage polymerization including two or more polymerization steps with the use of one or more kinds of polymerization catalysts (X), one or more kinds of polymerization catalysts (Y), one or more kinds of organometallic compounds (C), one or more kinds of olefins, and as needed the organic compound (E), wherein any two adjacent polymerization steps differ in olefin composition, the two adjacent polymerization steps being a polymerization step using the one or more kinds of polymerization catalysts (X) and a polymerization step using the one or more kinds of polymerization catalysts (Y), and in each of the polymerization steps, the olefins are polymerized in the presence of a polymer which has been produced in previous steps.

The multi-stage polymerization method (3) includes at least the step <step 3X> of polymerizing olefin [X] in the presence of one or more kinds of polymerization catalysts (X), and the step <step 3Y> of polymerizing olefin [Y] different in composition from that used in the <step 3X> in the presence of a polymerization catalyst (Y).

Both of the polymerization catalyst (X) formed in the <step 3X> of the multi-stage polymerization method (3) and the polymerization catalyst (Y) formed in the <step 3Y> of the multi-stage polymerization method (3) may be formed inside the polymerization tank or may be formed outside the polymerization tank and then added to the polymerization tank.

In the multi-stage polymerization method (3), the olefin [X] to be used in the <step 3X> is preferably added to the polymerization tank before the polymerization catalyst (X) is formed in the polymerization tank or before the polymerization catalyst (X) that has been formed outside the polymerization tank is added to the polymerization tank, and the olefin [Y] to be used in the <step 3Y> is preferably added to the polymerization tank before the polymerization catalyst (Y) is formed in the polymerization tank or before the polymerization catalyst (Y) that has been formed outside the polymerization tank is added to the polymerization tank. The olefin may be successively added to the polymerization tank so that (i) in a case where one kind of olefin is used, an olefin concentration in the polymerization tank may be kept constant during the polymerization and (ii) in a case where two or more kinds of olefins are used, olefin concentrations and a composition ratio of the two or more kinds of olefins may be kept constant during the polymerization.

The multi-stage polymerization method (3) may further include a step of polymerizing olefins different in composition from those used in the <step 3X> or the <step 3Y> in the presence of a polymerization catalyst (X) or a polymerization catalyst (Y) same as or different from those used in the <step 3X> or the <step 3Y>. The multi-stage polymerization method (3) has preferably 2 to 5 polymerization steps, more preferably 2 or 3 polymerization steps, most preferably 2 polymerization steps.

In each of the polymerization steps, olefin is polymerized in the presence of a polymer which has been produced in previous steps. In each of the second and subsequent polymerization steps, olefin is polymerized in the presence of a polymer obtained by the last preceding polymerization step.

In any of the single-stage polymerization method (1), the multi-stage polymerization method (2), and the multi-stage polymerization method (3), the organometallic compound (C) can be added to the polymerization tank at any point of time in reaction operation, but is preferably added to the polymerization tank before start of the polymerization, i.e., before formation of the polymerization catalyst (X) or the polymerization catalyst (Y). A preferable method for adding the organometallic compound (C) is, for example, a method of adding the organometallic compound (C) to the polymerization tank by a specific method under stirring. In this case, the organometallic compound (C) may be directly added to the polymerization tank or may be dissolved in an organic solvent such as n-hexane and then added to the polymerization tank. Further, the organometallic compound (C) may be, as needed, divided into parts, which are separately added.

The organometallic compound (C) is used in such an amount that a molar ratio [(C)/(A)] of the organometallic compound (C) to the transition metal compound (A) is generally 1 to 100000, preferably 10 to 10000, more preferably 20 to 5000.

In a case where the organic compound (E) is used, the organic compound (E) can be added, alone or after being brought into contact with and mixed with the organometallic compound (C), to the polymerization tank at any point of time in reaction operation, but is preferably added to the polymerization tank before start of the polymerization, i.e., before formation of the polymerization catalyst (X) or the polymerization catalyst (Y). A preferable method for adding the organic compound (E) is, for example, a method of adding the organic compound (E) to the polymerization tank by a specific method under stirring. In this case, the organometallic compound (C) may be directly added to the polymerization tank or may be dissolved in an organic solvent such as n-hexane and then added to the polymerization tank. Further, the organometallic compound (C) may be, as needed, divided into parts, which are separately added.

In a case where the organic compound (E) is used, the organic compound (E) is used in an amount such that a molar ratio [(E)/(C)] of the organic compound (E) to the organometallic compound (C) is generally 0.001 to 10, preferably 0.005 to 2.

In the polymerization methods (1) through (3), for example, it is preferred to select a polymerization catalyst (X) and a polymerization catalyst (Y) differing in polymerization performance such as stereoregularity, branch structure introduction ratio, and copolymerization property and to further select the kind and the composition of olefin so that two or more kinds of segments differing in chemical or physical property may be formed by the polymerization catalyst (X) and the polymerization catalyst (Y).

In the multi-stage polymerization methods (2) and (3), it is preferable to select a polymerization catalyst (X) and a polymerization catalyst (Y) to be used in the steps so that segments formed in two adjacent polymerization steps differ in chemical or physical property.

Especially in the multi-stage polymerization method (3), it is preferable to select a combination of a polymerization catalyst (X), a polymerization catalyst (Y) and olefin to be used in the steps so that segments formed in two adjacent polymerization steps differ in chemical or physical property.

Each of the single-stage polymerization method (1), the multi-stage polymerization method (2), and the multi-stage polymerization method (3) may be continuous polymerization or may be batch polymerization, but is preferably batch polymerization. The multi-stage polymerization methods (2) and (3) may be carried out such that each polymerization step is carried out in the same reaction vessel or the same reaction zone in the presence of a polymer which has been produced in previous steps or may be carried out such that each polymerization step is carried out in a different reaction vessel or a different reaction zone to which a polymer which has been produced in previous steps has been transferred. Preferably, the multi-stage polymerizations (2) and (3) are carried out such that each polymerization step is carried out in the same reaction vessel or the same reaction zone in the presence of a polymer which has been produced in previous steps.

Among the single-stage polymerization method (1), the multi-stage polymerization method (2), and the multi-stage polymerization method (3), the method of the present invention for producing an olefin block polymer is preferably the single-stage polymerization method (1) or the multi-stage polymerization method (3), more preferably the single-stage polymerization method (1).

The single-stage polymerization method (1) is preferably homopolymerization of one kind of olefin with the use of a polymerization catalyst (X) and a polymerization catalyst (Y) differing in stereoregularity or branch structure introduction ratio or copolymerization of two or more kinds of olefins with the use of a polymerization catalyst (X) and a polymerization catalyst (Y) differing in copolymerization property, more preferably homopolymerization of one kind of olefin with the use of a polymerization catalyst (X) and a polymerization catalyst (Y) differing in branch structure introduction ratio or copolymerization of two or more kinds of olefins with the use of a polymerization catalyst (X) and a polymerization catalyst (Y) differing in copolymerization property, further more preferably copolymerization of two or more kinds of olefins with the use of a polymerization catalyst (X) and a polymerization catalyst (Y) differing in copolymerization property, most preferably ethylene/propylene copolymerization with the use of a polymerization catalyst (X) and a polymerization catalyst (Y) differing in copolymerization property.

The multi-stage polymerization method (3) is preferably two-stage polymerization in which the former stage and the latter stage are different from each other in olefin composition, more preferably two-stage polymerization including copolymerization of two or more kinds of olefins and homopolymerization of one kind of olefin (there is no restriction on how the copolymerization and the homopolymerization are associated with the former stage and the latter stage), further more preferably two-stage polymerization made up of ethylene/propylene copolymerization and propylene homopolymerization (there is no restriction on how the copolymerization and the homopolymerization are associated with the former stage and the latter stage).

The following describes the single-stage polymerization method (1) in more detail.

In the single-stage polymerization method (1), olefin is polymerized in the presence of the polymerization catalyst (X) and the polymerization catalyst (Y).

The organometallic compound (C) is used in such an amount that a molar ratio [(C)/(A-X)] of the organometallic compound (C) to the transition metal compound (A-X) and a molar ratio [(C)/(A-Y)] of the organometallic compound (C) to the transition metal compound (A-Y) are generally 1 to 100000, preferably 10 to 10000, more preferably 20 to 5000. In a case where the organic compound (E) is further used, the organic compound (E) is used in such an amount that a molar ratio [(E)/(C)] of the organic compound (E) to the organometallic compound (C) is generally 0.001 to 10, preferably 0.005 to 2.

The olefin to be polymerized in the single-stage polymerization method (1) is one or more kinds of olefins selected from olefins having 2 to 20 carbon atoms. The member(s) of olefin to be used or an amount ratio in a case where two or more kinds of olefins are used are not limited in particular. The olefin to be used is preferably one or more kinds of olefins selected from among ethylene, α-olefins having 3 to 20 carbon atoms, cyclic olefins having 3 to 20 carbon atoms, and alkenyl alicyclic compounds having 5 to 20 carbon atoms, more preferably one or more kinds of olefins selected from among ethylene and α-olefins having 3 to 20 carbon atoms, further more preferably one or more kinds of olefins selected from among ethylene and α-olefins having 3 to 10 carbon atoms, most preferably one or more kinds of olefins selected from ethylene and propylene.

In the single-stage polymerization method (1), an olefin polymerization reaction temperature is generally −40° C. to 200° C., preferably 0° C. to 150° C., further more preferably 40° C. to 130° C., a reaction pressure is generally ordinary pressure to 10 MPa, preferably ordinary pressure to 5 MPa, and a reaction time is generally 5 minutes to 48 hours, preferably 5 minutes to 12 hours.

The following describes in more detail two-stage polymerization including the <step 2X> (former step) and the <step 2Y> (latter step) although the multi-stage polymerization method (2) may start from the <step 2X> or may start from the <step 2Y>.

<Step 2X>

In the <step 2X>, olefin is polymerized in the presence of the polymerization catalyst (X).

In a case where the organometallic compound (C) is used in the <step 2X>, the organometallic compound (C) is used in such an amount that a molar ratio [(C)/(A-X)] of the organometallic compound (C) to the transition metal compound (A-X) is generally 1 to 100000, preferably 10 to 10000, more preferably 20 to 5000. In a case where the organic compound (E) is further used, the organic compound (E) is used in such an amount that a molar ratio [(E)/(C)] of the organic compound (E) to the organometallic compound (C) is generally 0.001 to 10, preferably 0.005 to 2.

The olefin to be polymerized in the <step 2X> is one or more kinds of olefins selected from olefins having 2 to 20 carbon atoms. The member(s) of olefin to be used or an amount ratio in a case where two or more kinds of olefins are used are not limited in particular. The olefin to be used is preferably one or more kinds of olefins selected from among ethylene, α-olefins having 3 to 20 carbon atoms, cyclic olefins having 3 to 20 carbon atoms, and alkenyl alicyclic compounds having 5 to 20 carbon atoms, more preferably one or more kinds of olefins selected from among ethylene and α-olefins having 3 to 20 carbon atoms, further more preferably one or more kinds of olefins selected from among ethylene and α-olefins having 3 to 10 carbon atoms, most preferably one or more kinds of olefins selected from ethylene and propylene.

In the olefin polymerization in the <step 2X>, a polymerization reaction temperature is generally −40° C. to 200° C., preferably 0° C. to 150° C., further more preferably 40° C. to 130° C., a reaction pressure is generally ordinary pressure to 10 MPa, preferably ordinary pressure to 5 MPa, and a reaction time is generally 5 minutes to 48 hours, preferably 5 minutes to 12 hours.

<Step 2Y>

In the <step 2Y> following the <step 2X>, olefin same in composition as that used in the <step 2X> is polymerized in the presence of the polymerization catalyst (Y).

In a case where the organometallic compound (C) is used in the <step 2Y>, the organometallic compound (C) is used in such an amount that a molar ratio [(C)/(A-Y)] of the organometallic compound (C) to the transition metal compound (A-Y) is generally 1 to 100000, preferably 10 to 10000, more preferably 20 to 5000. In a case where the organic compound (E) is further used, the organic compound (E) is used in such an amount that a molar ratio [(E)/(C)] of the organic compound (E) to the organometallic compound (C) is generally 0.001 to 10, preferably 0.005 to 2.

The olefin to be polymerized in the <step 2Y> is identical in composition to that used in the <step 2X>.

In the olefin polymerization in the <step 2Y>, a polymerization reaction temperature is generally −40° C. to 200° C., preferably 0° C. to 150° C., further more preferably 40° C. to 130° C., a reaction pressure is generally ordinary pressure to 10 MPa, preferably ordinary pressure to 5 MPa, and a reaction time is generally 5 minutes to 48 hours, preferably 5 minutes to 12 hours.

The following describes, in more details, two-stage polymerization including the <step 3X> (former stage) and the <step 3Y> (latter stage) of the multi-stage polymerization method (3) although the multi-stage polymerization method (3) may start from the <step 3X> or may start from the <step 3Y>.

<Step 3X>

In the <step 3X>, olefin [X] is polymerized in the presence of one or more polymerization catalysts (X).

In a case where the organometallic compound (C) is used in the <step 3X>, the organometallic compound (C) is used in such an amount that a molar ratio [(C)/(A-X)] of the organometallic compound (C) to the transition metal compound (A-X) is generally 1 to 100000, preferably 10 to 10000, more preferably 20 to 5000. In a case where the organic compound (E) is further used, the organic compound (E) is used in such an amount that a molar ratio [(E)/(C)] of the organic compound (E) to the organometallic compound (C) is generally 0.001 to 10, preferably 0.005 to 2.

The olefin to be polymerized in the <step 3X> is one or more kinds of olefins selected from olefins having 2 to 20 carbon atoms. The member(s) of olefin to be used or an amount ratio in a case where two or more kinds of olefins are used are not limited in particular. The olefin to be used is preferably one or more kinds of olefins selected from among ethylene, α-olefins having 3 to 20 carbon atoms, cyclic olefins having 3 to 20 carbon atoms, and alkenyl alicyclic compounds having 5 to 20 carbon atoms, more preferably one or more kinds of olefins selected from among ethylene and α-olefins having 3 to 20 carbon atoms, further more preferably one or more kinds of olefins selected from among ethylene and α-olefins having 3 to 10 carbon atoms, most preferably one or more kinds of olefins selected from ethylene and propylene.

In the olefin polymerization in the <step 3X>, a polymerization reaction temperature is generally −40° C. to 200° C., preferably 0° C. to 150° C., further more preferably 40° C. to 130° C., a reaction pressure is generally ordinary pressure to 10 MPa, preferably ordinary pressure to 5 MPa, and a reaction time is generally 5 minutes to 48 hours, preferably 5 minutes to 12 hours.

<Step 3Y>

In the <step 3Y> following the <step 3X>, olefin [Y] different in composition from that used in the <step 3X> is polymerized in the presence of a polymerization catalyst (Y).

In a case where the organometallic compound (C) is used in the <step 3Y>, the organometallic compound (C) is used in such an amount that a molar ratio [(C)/(A-Y)] of the organometallic compound (C) to the transition metal compound (A-Y) is generally 1 to 100000, preferably 10 to 10000, more preferably 20 to 5000. In a case where the organic compound (E) is further used, the organic compound (E) is used in such an amount that a molar ratio [(E)/(C)] of the organic compound (E) to the organometallic compound (C) is generally 0.001 to 10, preferably 0.005 to 2.

The olefin to be polymerized in the <step 3Y> is one or more kinds of olefins selected from olefins having 2 to 20 carbon atoms. The member(s) of olefin to be used or an amount ratio in a case where two or more kinds of olefins are used are not limited in particular, as long as the <step 3X> and the <step 3Y> differ in composition of the olefin used. The olefin to be used is preferably one or more kinds of olefins selected from among ethylene, α-olefins having 3 to 20 carbon atoms, cyclic olefins having 3 to 20 carbon atoms, and alkenyl alicyclic compounds having 5 to 20 carbon atoms, more preferably one or more kinds of olefins selected from among ethylene and α-olefins having 3 to 20 carbon atoms, further more preferably one or more kinds of olefins selected from among ethylene and α-olefins having 3 to 10 carbon atoms, most preferably one or more kinds of olefins selected from ethylene and propylene.

In the olefin polymerization in the <step 3Y>, a polymerization reaction temperature is generally −40° C. to 200° C., preferably 0° C. to 150° C., further more preferably 40° C. to 130° C., a reaction pressure is generally ordinary pressure to 10 MPa, preferably ordinary pressure to 5 MPa, and a reaction time is generally 5 minutes to 48 hours, preferably 5 minutes to 12 hours.

In the two-stage polymerization including the <step 3X> and the <step 3Y>, it is more preferable that copolymerization of two or more kinds of olefins be carried out in one of the <step 3X> and the <step 3Y> and homopolymerization of one kind of olefin be carried out in the other one of the <step 3X> and the <step 3Y>. It is further more preferable that ethylene/propylene copolymerization be carried out in one of the <step 3X> and the <step 3Y> and homopolymerization of propylene be carried out in the other one of the <step 3X> and the <step 3Y>.

By stopping polymerization reaction after completion of all the polymerization steps, an olefin block polymer is obtained.

A method of stopping polymerization reaction is (1) a method of adding a specific substance for reducing activity of the polymerization catalyst (X) and the polymerization catalyst (Y), (2) heating treatment, or (3) removal of olefin, and is preferably the method (1).

The substance for reducing activity of the polymerization catalyst (X) and the polymerization catalyst (Y) is, for example, carbon monoxide, water, or alcohol, and is preferably water or alcohol.

Olefin Block Polymer

An olefin block polymer produced by the method of the present invention is an olefin block polymer including (X) one or more polymer segments formed by polymerizing one or more kinds of olefins selected from olefins having 2 to 20 carbon atoms with the use of the polymerization catalyst (X) and (Y) one or more polymer segments formed by polymerizing one or more kinds of olefins selected from olefins having 2 to 20 carbon atoms with the use of the polymerization catalyst (Y), the one or more kinds of polymer segments (Y) being different in chemical or physical property from the one or more kinds of polymer segments (X).

The olefin block polymer may further include, in addition to the one or more polymer segments (X) and the one or more polymer segments (Y), one or more polymer segments (Z) different in chemical or physical property from both of the polymer segment (X) and the polymer segment (Y).

The total number of polymer segments in the olefin block polymer is 2 or more. The average number of polymer segments in the olefin block polymer obtained by the single-stage polymerization method (1) is preferably 3 or more, more preferably 5 or more, further more preferably 7 or more, most preferably 10 or more. The number of polymer segments in the olefin block polymer obtained by the multi-stage polymerization method (2) or (3) coincides with or smaller than the number of polymerization steps included in multi-stage polymerization that is carried out, but is preferably 2 to 5, more preferably 2 to 4, further more preferably 2 or 3, most preferably 2.

Each of the polymer segments may be a homopolymer segment obtained from one kind of olefin selected from olefins having 2 to 20 carbon atoms or may be a copolymer segment obtained from two or more kinds of olefins selected from olefins having 2 to 20 carbon atoms.

In a case where each of the polymer segments is a copolymer segment obtained from two or more kinds of olefins, the copolymer segment may be a random copolymer segment in which an olefin composition has a constant ratio, a tapered polymer segment in which an olefin composition successively changes, or an alternating copolymer segment in which two kinds of olefins are polymerized alternately.

A homopolymer segment serving as each of the polymer segments (X), (Y), and (Z) is preferably a homopolymer segment of ethylene, α-olefin having 3 to 20 carbon atoms, cyclic olefin having 3 to 20 carbon atoms, or alkenyl alicyclic compound having 5 to 20 carbon atoms, more preferably a homopolymer segment of ethylene or α-olefin having 3 to 20 carbon atoms, further more preferably a homopolymer segment of ethylene or α-olefin having 3 to 10 carbon atoms, most preferably a homopolymer segment of ethylene or propylene.

The homopolymer segment of ethylene may be a linear polyethylene segment, a short-chain branched polyethylene segment, a long-chain branched polyethylene segment, or a hyper branched polyethylene segment, but is preferably a linear polyethylene segment or a hyper branched polyethylene segment.

The homopolymer segment of propylene may be an isotactic polypropylene segment, an atactic polypropylene segment, or a syndiotactic polypropylene segment, but is preferably an isotactic polypropylene segment or an atactic polypropylene segment.

Meanwhile, examples of a preferable copolymer segment encompass a copolymer segment of ethylene with α-olefin having 3 to 20 carbon atoms, specifically a copolymer segment of ethylene with propylene, 1-butene, 1-pentene, 1-hexene, 1-octene, 1-decene or the like; a copolymer segment of propylene with α-olefin having 4 to 20 carbon atoms, specifically a copolymer segment of propylene with 1-butene, 1-pentene, 1-hexene, 1-octene, 1-decene or the like; a copolymer segment of ethylene or propylene with cyclic olefin having 5 to 20 carbon atoms, specifically a copolymer segment with tetracyclododecene, norbornene, methyl norbornene or the like; and a copolymer segment of ethylene or propylene with an alkenyl alicyclic compound having 8 to 20 carbon atoms, specifically a copolymer segment with vinylcyclohexane or the like.

Among these polymer segments, a polyethylene segment, a polypropylene segment, a polybutene segment, a polyhexene segment, a polyoctene segment, an ethylene/propylene copolymer segment, an ethylene/butene copolymer segment, an ethylene/hexene copolymer segment, an ethylene/octene copolymer segment, a propylene/butene copolymer segment, a propylene/hexene copolymer segment, and a propylene/octene copolymer segment are more preferable, and a polyethylene segment, a polypropylene segment, and an ethylene/propylene copolymer segment are further more preferable.

The olefin block polymer produced by the method of the present invention is preferably a block polymer having a linear polyethylene segment and a branched polyethylene segment, a block polymer having a polyethylene segment and a polypropylene segment, a block polymer having a polyethylene segment and a polybutene segment, a block polymer having a polyethylene segment and a polyhexene segment, a block polymer having a polyethylene segment and a polyoctene segment, a block polymer having an isotactic polypropylene segment and a syndiotactic polypropylene segment, a block polymer having an isotactic polypropylene segment and an atactic polypropylene segment, a block polymer having an atactic polypropylene segment and a syndiotactic polypropylene segment, a block polymer having a polypropylene segment and a polybutene segment, a block polymer having a polypropylene segment and a polyhexene segment, a block polymer having a polypropylene segment and a polyoctene segment, a block polymer having a polyethylene segment and an ethylene/propylene copolymer segment, a block polymer having a polyethylene segment and an ethylene/butene copolymer segment, a block polymer having a polyethylene segment and an ethylene/hexene copolymer segment, a block polymer having a polyethylene segment and an ethylene/octene copolymer segment, a block polymer having a polypropylene segment and an ethylene/propylene copolymer segment, a block polymer having a polypropylene segment and a propylene/butene copolymer segment, a block polymer having a polypropylene segment and a propylene/hexene copolymer segment, or a block polymer having a polypropylene segment and a propylene/octene copolymer segment; more preferably a block polymer having a polyethylene segment and a polypropylene segment, a block polymer having a polyethylene segment and an ethylene/propylene copolymer segment, or a block polymer having a polypropylene segment and an ethylene/propylene copolymer segment; further more preferably a block polymer having a polyethylene segment and an ethylene/propylene copolymer segment or a block polymer having a polypropylene segment and an ethylene/propylene copolymer segment.

Olefin Block Copolymer Composition

An olefin block copolymer composition obtained in accordance with the production method of the present invention includes, in addition to an olefin block polymer formed by chemical binding between the polymer segment (X) and the polymer segment (Y), a polymer (X) which does not form any block and has a structure equivalent to that of the polymer segment (X) and/or a polymer (Y) which does not form any block and has a structure equivalent to that of the polymer segment (Y).

The olefin block polymer formed by chemical binding between the polymer segment (X) and the polymer segment (Y) is generally different, in extracted component amount or residual component amount in solvent extraction, from a simple blended polymer of the polymer (X) and the polymer (Y). By utilizing this property, a generation amount of the olefin block polymer in the olefin block copolymer composition can be evaluated.

For example, a mixture of two kinds of ethylene/propylene copolymers differing in ethylene content can be fractionated into a soluble component and an insoluble component by appropriately selecting a solvent fractionation condition. As two kinds of ethylene/α-olefin copolymers with a low ethylene content and a high ethylene content that modetely have a composition distribution, Sumitomo Noblen S131 (Sumitomo Chemical Co., Ltd.) and Sumikathene-LFS150 (Sumitomo Chemical Co., Ltd.) are subjected to TREF fractionation, and ethylene contents in components fractionated at each temperature are calculated. From the TREF fractionation and an NMR analysis result, a range of an ethylene content of an ethylene/propylene copolymer which becomes a soluble component and a range of an ethylene content of an ethylene/propylene copolymer which becomes an insoluble component at a certain solvent fractionation temperature can be estimated (see also FIG. 1).

According to this, in a case where ethylene/propylene copolymers are subjected to solvent fractionation using boiling hexane extraction at a solvent fractionation temperature of 68° C., an ethylene/propylene copolymer whose ethylene composition is 9.3 mol % or less or 94.6 mol % or more remains as a boiling hexane insoluble (hereinafter referred to as BHIS) component, and an ethylene/propylene copolymer whose ethylene composition is more than 9.3 mol % and less than 94.6 mol % is fractionated into a boiling hexane soluble (hereinafter referred to as BHS) component.

Therefore, in the boiling hexane extraction, a low-ethylene-content ethylene/propylene copolymer (hereinafter referred to as $^L$EP) segment whose ethylene content is 0.1 mol % or more and 9.0 mol % or less is fractionated into a BHIS component, and a high-ethylene-content ethylene/propylene copolymer (hereinafter referred to as $^H$EP) segment whose ethylene content is 80.0 mol % or more and 94.5 mol % or less is fractionated into a BHS component. Meanwhile, in a case where an ethylene/propylene block copolymer composition including $^L$EP, $^H$EP, and a block polymer (hereinafter referred to as $^L$EP-b-$^H$EP) formed through chemical binding between $^L$EP and $^H$EP is subjected to the boiling hexane extraction, $^L$EP and part of $^L$EP-b-$^H$EP are present in a BHIS component due to a property of the $^L$EP segment.

The following describes methods for calculating an $^H$EP content in the BHIS component (hereinafter referred to as $^H$EP$_{BHIS}$), an ethylene content in the $^H$EP component in the BHIS component ($^HC_2'_{BHIS}$), an $^L$EP content in the BHIS component (hereinafter referred to as $^L$EP$_{BHIS}$), and an ethylene content in the $^L$EP component in the BHIS component ($^LC_2'_{BHIS}$). First, ratios of triads PPP, PPE, EPE, PEP, PEE and EEE to all the triad, which are obtained from $^{13}$CNMR, are calculated for the BHIS component. The BHIS component contains both an $^H$EP segment and an $^L$EP segment, but ratios of triads EEE, EEP, and EPE derived from the $^L$EP segment are negligibly small because of a low ethylene content (0.1 mol % or more and 9.0 mol % or less) in the $^L$EP segment, and ratios of triads PPP, PPE, and PEP derived from the $^H$EP segment are negligibly small because of a high ethylene content (80.0 mol % or more and 94.5 mol % or less) in the $^H$EP segment. Accordingly, $^H$EP$_{BHIS}$, $^H C_2'_{BHIS}$, $^L EP^{BHIS}$, and $^L C_2'_{BHIS}$ can be calculated according to the following formula:

$$^H EP_{BHIS} = (EEE+EEP+EPE)/(PPP+PPE+PEP+EPE+EEP+EEE) \times 100$$

$$^H C_2'_{BHIS} = (EEE+EEP)/(EEE+EEP+EPE) \times 100$$

$$^L EP_{BHIS} = (PPP+PPE+PEP)/(PPP+PPE+PEP+EPE+EEP+EEE) \times 100$$

$$^L C_2'_{BHIS} = PEP/(PPP+PPE+PEP) \times 100$$

Similarly, methods of calculating an $^H EP$ content in the BHS component (hereinafter referred to as $^H EP_{BHS}$), an ethylene content in the $^H EP$ component in the BHS component ($^H C_2'_{BHS}$), an $^L EP$ content in the BHS component (hereinafter referred to as $^L EP_{BHS}$), and an ethylene content in the $^L EP$ component in the BHS component ($^L C_2'_{BHS}$) can be obtained.

Polypropylene, which has high stereoregularity, has a higher melting point than polyethylene and is therefore excellent in heat resistance, but the melting point of polypropylene declines as a comonomer composition becomes higher and as the stereoregularity declines.

Similarly, the melting point of the $^L EP$ segment in the ethylene/propylene block copolymer composition of the present invention also depends on stereoregularity of propylene chains in $^L C_2'$ and $^L EP$ segment, and they depend on a reactivity ratio of ethylene and propylene of a catalyst to be used and stereoregularity in propylene polymerization.

The ethylene/propylene block copolymer composition of the present invention preferably has a high melting point from the perspective of heat resistance and mechanical property, and has, for achievement of higher heat resistance than polyethylene, preferably one or more melting point of 130° C. or more, more preferably one or more melting point of 135° C. or more, further more preferably one or more melting point of 140° C. or more, especially preferably one or more melting point of 145° C. or more.

The value of $^H EP_{BHS}$ of the ethylene/propylene block copolymer composition of the present invention is preferably 2.0 wt % or more, more preferably 3.0 wt % or more, further more preferably 4.0 wt % or more, especially preferably 5.0 wt % or more, most preferably 6.0 wt % or more.

The value of $^H C_2'_{BHS}$ of the ethylene/propylene block copolymer composition of the present invention is preferably 80.0 mol % or more and 94.5 mol % or less, more preferably 80.0 mol % or more and 94.0 mol % or less, further more preferably 80.0 mol % or more and 93.5 mol % or less, especially preferably 80.0 mol % or more and 93.0 mol % or less, most preferably 80.0 mol % or more and 92.8 mol % or less.

The value of $^L C_2'_{BHS}$ of the ethylene/propylene block copolymer composition of the present invention is preferably 0.1 mol % or more and 9.0 mol % or less, more preferably 0.1 mol % or more and 6.0 mol % or less, further more preferably 0.1 mol % or more and 4.0 mol % or less, especially preferably 0.1 mol % or more and 3.0 mol % or less, most preferably 0.1 mol % or more and 2.0 mol % or less.

The absolute value ($|^H C_2'_{BHS} - ^H C_2'_{BHS}|$) of a difference between $^H C_2'_{BHIS}$ and $^H C_2'_{BHS}$ of the ethylene/propylene block copolymer composition of the present invention is preferably 5.0 mol % or less, more preferably 4.0 mol % or less, further more preferably 3.0 mol % or less, especially preferably 2.5 mol % or less, most preferably 2.3 mol % or less.

The value of the weight percent of the BHIS component of the ethylene/propylene block copolymer composition of the present invention to the composition is preferably 10.0 wt % or more, more preferably 20.0 wt % or more, further more preferably 30.0 wt % or more, especially preferably 40.0 wt % or more, most preferably 50.0 wt % or more.

The BHS component of the ethylene/propylene block copolymer composition of the present invention preferably has one or more melting points of 5.0° C. or more and 150.0° C. or less, and further more preferably these melting points exhibit an amount of heat of fusion of 5.0 J/g or more and 200.0 J/g or less.

The value of the weight-average molecular chain length Aw [unit: Å] of the ethylene/propylene block copolymer composition of the present invention is preferably 100 or more and 50,000 or less, more preferably 500 or more and 25,000 or less, further more preferably 2,500 or more and 25,000 or less, especially preferably 2,500 or more and 10,000 or less, most preferably 5,000 or more and 10,000 or less.

The value of Aw/An of the ethylene/propylene block copolymer composition of the present invention is preferably 1.7 or more and 15.0 or less, more preferably 1.7 or more and 10.0 or less, further more preferably 1.8 or more and 5.0 or less, especially preferably 1.8 or more and 4.0 or less, most preferably 1.9 or more and 3.0 or less. Note that An represents the number average molecular chain length [unit: Å] of the ethylene/propylene block copolymer composition of the present invention.

In the ethylene/propylene block copolymer composition of the present invention, it is preferable that a PPP chain in the BHIS component of the composition is 29% or more and an EEE chain in the BHIS component of the composition is 1.5% or more, it is more preferable that the PPP chain in the BHIS component of the composition is 50% or more and the EEE chain in the BHIS component of the composition is 2.5% or more, it is further more preferable that the PPP chain in the BHIS component of the composition is 60% or more and the EEE chain in the BHIS component of the composition is 3.5% or more, it is especially preferable that the PPP chain in the BHIS component of the composition is 65% or more and the EEE chain in the BHIS component of the composition is 4.5% or more.

From the viewpoint of balance between rigidity and impact resistance, the ethylene/propylene block copolymer composition of the present invention satisfies preferably the following formula (M-1), more preferably the following formula (M-2), further more preferably the following formula (M-3), especially preferably the following formula (M-4), most preferably the following formula (M-5):

$$12000 \leq \text{Young's modulus (MPa)} \times \text{tensile impact (kJ/m}^2\text{)} \quad \text{(M-1)}$$

$$17000 \leq \text{Young's modulus (MPa)} \times \text{tensile impact (kJ/m}^2\text{)} \quad \text{(M-2)}$$

$$25000 \leq \text{Young's modulus (MPa)} \times \text{tensile impact (kJ/m}^2\text{)} \quad \text{(M-3)}$$

$$33000 \leq \text{Young's modulus (MPa)} \times \text{tensile impact (kJ/m}^2\text{)} \quad \text{(M-4)}$$

$$42000 \leq \text{Young's modulus (MPa)} \times \text{tensile impact (kJ/m}^2\text{)} \quad \text{(M-5)}$$

From the viewpoint of transparency, a haze value of the ethylene/propylene block copolymer composition of the present invention is preferably 18% or less, more preferably 15% or less, further more preferably 13% or less.

A preferable embodiment of the ethylene/propylene block copolymer composition of the present invention satisfies all of the following conditions (1) through (5):
(1) to have one or more melting points having 130° C. or more;
(2) to have 2.0 or more wt % of $^{H}EP_{BHIS}$ content;
(3) to have 80.0 mol % or more but 94.5 mol % or less of $^{H}C_{2'BHIS}$;
(4) to have 0.1 mol % or more but 9.0 mol % or less of $^{L}C_{2'BHIS}$; and
(5) to have 5.0 mol % or less of an absolute value of a difference between the $^{H}C_{2'BHIS}$ and the $^{H}C_{2'BHS}$ A more preferable embodiment of the ethylene/propylene block copolymer composition of the present invention satisfies all of the above conditions (1) through (5) and the following condition (6):
(6) to satisfy 12000≤Young's modulus (MPa)×tensile impact (kJ/m$^2$)

A further more preferable embodiment of the ethylene/propylene block copolymer composition of the present invention satisfies all of the above conditions (1) through (6) and the following condition (7):
(7) to have 18% or less of haze value.

The ethylene/propylene block copolymer composition of the present invention has high heat resistance and is excellent in balance between rigidity and impact resistance and in transparency.

EXAMPLES

The present invention is described below with Examples and Comparative Examples, but is not limited to these Examples.
(1) Synthesis of Transition Metal Compound (A-X)

(Reference Example 1): Synthesis of trans-1,2-bis(3-(1-adamantyl)-5-methyl-2-hydroxybenzylsulfanyl)cyclooctane (i) Synthesis of 6-(1-adamantyl)-2-hydroxymethyl-p-cresol In a 1-L four-neck flask in which air had been replaced by nitrogen, 20.9 g (86.1 mmol) of 2-(1-adamantyl)-p-cresol, 16.4 g (172 mmol) of magnesium chloride, 13.0 g (433 mmol) of paraformaldehyde, and 400 mL of tetrahydrofuran were added. To a resultant mixture, 24 mL (172 mmol) of triethylamine was added, and heated to reflux for 2.5 hours. After a reaction solution thus obtained was cooled to room temperature, an insoluble component was filtered out. A volatile component was distilled off from a resultant filtrate under reduced pressure. Then, to a residue thus obtained, ethyl acetate was added, and washed with 1M HCl and saturated saline in this order. After an organic layer was dried over anhydrous magnesium sulfate, a solvent was distilled off under reduced pressure. As a result, 19.2 g of a mixture containing 2-(1-adamantyl)-5-methylsalicylaldehyde was obtained.

$^1$H-NMR (400 MHz, δ, ppm, CDCl$_3$) 1.78-2.25 (15H), 2.32 (s, 3H), 6.98 (d, J=2 Hz, 1H), 7.27 (d, J=2 Hz, 1H), 9.82 (s, 1H), 11.64 (s, 1H).

In a 500-mL four-neck flask in which air had been replaced by nitrogen, 19.2 g of the above mixture, 135 mL of tetrahydrofuran, and 80 mL of methanol were added, and ice-chilled. To a resultant solution, 1.60 g (42.5 mmol) of sodium borohydride was slowly added, heated to room temperature, and then stirred for 14.5 hours. A volatile component was distilled off under reduced pressure. Then, to a residue thus obtained, ethyl acetate was added, and was washed with 1 M HCl and saturated saline in this order. After the organic layer was dried over anhydrous magnesium sulfate, a solvent was distilled off under reduced pressure. A residue thus obtained was purified by silica-gel column chromatography (with a developing solvent consisting of chloroform and hexane in a ratio ranging from 1:3 to 1:0). As a result, 8.80 g (yield: 38%) of 6-(1-adamantyl)-2-hydroxymethyl-p-cresol was obtained as a white solid.

$^1$H-NMR (400 MHz, δ, ppm, CDCl$_3$) 1.78 (m, 6H), 2.01 (br, 1H), 2.07 (m, 3H), 2.15 (m, 6H), 2.25 (s, 3H), 4.81 (d, J=4 Hz, 2H), 6.70 (d, J=2 Hz, 1H), 6.99 (d, J=2 Hz, 1H), 7.50 (s, 1H).

(ii) Synthesis of 3-(1-adamantyl)-5-methyl-2-hydroxybenzyl Bromide

In a 200-mL four-neck flask in which air had been replaced by nitrogen, 8.80 g (32.3 mmol) of 6-(1-adamantyl)-2-hydroxymethyl-p-cresol and 132 mL of dichloromethane were added. To a resultant mixture, 15 mL (18.5 mmol) of phosphorus tribromide (1.23 M dichloromethane solution) was added, and stirred for 3.5 hours at room temperature. To a reaction solution thus obtained, iced water was added. An organic layer was washed with water and saturated saline. After the organic layer was dried over anhydrous magnesium sulfate, a volatile component was distilled off under reduced pressure. As a result, 11.1 g (crude yield: 103%) of 3-(1-adamantyl)-5-methyl-2-hydroxybenzyl bromide was obtained as a slightly yellow solid.

$^1$H-NMR (400 MHz, δ, ppm, CDCl$_3$) 1.78 (m, 6H), 2.09 (m, 3H), 2.12 (m, 6H), 2.26 (s, 3H), 4.54 (s, 2H), 6.92 (d, J=2 Hz, 1H), 7.04 (d, J=2 Hz, 1H).

(iii) Synthesis of trans-1,2-bis(3-(1-adamantyl)-5-methyl-2-hydroxybenzylsulfanyl)cyclooctane In a 200-mL four-neck flask in which air had been replaced by nitrogen, 7.04 g (21.0 mmol) of 3-(1-adamantyl)-5-methyl-2-hydroxybenzyl bromide, 1.83 g (10.4 mmol) of trans-cyclooctane-1,2-dithiol, and 100 mL of tetrahydrofuran were added. To a resultant mixture, 4.3 mL (31 mmol) of triethylamine was added, and stirred for 21.5 hours at room temperature. A reaction solution thus obtained was filtered, and a volatile component was distilled off from a resultant filtrate under reduced pressure. To a residue thus obtained, ethyl acetate and an aqueous solution of ammonium chloride were added. An organic layer was washed with an aqueous solution of ammonium chloride and saturated saline in this order, and then was dried over anhydrous magnesium sulfate. After a solvent was distilled off under reduced pressure, a residue was purified by silica-gel column chromatography (with a developing solvent consisting of ethyl acetate and hexane in a ratio of 20:1). As a result, 6.61 g of 6.1 mixture of trans-1,2-bis(3-(1-adamantyl)-5-methyl-2-hydroxybenzylsulfanyl)cyclooctane and trans-1-(3-(1-adamantyl)-5-methyl-2-hydroxybenzylsulfanyl)-2-sulfanyl-cyclooctane was obtained. In 100 mL of tetrahydrofuran, the above mixture and 1.36 g (3.98 mmol) of 3-(1-adamantyl)-5-methyl-2-hydroxybenzyl bromide were dissolved, and ice-chilled. To a resultant solution, 0.74 mL (5.31 mmol) of triethylamine was added, and stirred for 15.5 hours. A reaction solution thus obtained was filtered, and a volatile component was distilled off from a resultant filtrate under reduced pressure. To a residue thus obtained, ethyl acetate and an aqueous solution of ammonium chloride were added. An organic layer was further washed with an aqueous solution of ammonium chloride and saturated saline in this order. After the organic layer was dried over anhydrous magnesium sulfate, a solvent was distilled off under reduced pressure. A residue thus obtained was purified by silica-gel column chromatography (with a developing solvent consisting of ethyl acetate and hexane in a ratio of 20:1), and a solid thus obtained was further repulp-washed with hexane at room temperature. As a result, 6.08 g (yield: 85%) of trans-1,2-bis(3-(1-adamantyl)-5-methyl-2-hydroxybenzyl-sulfanyl)cyclooctane was obtained as a white solid.

$^1$H-NMR (400 MHz, δ, ppm, CDCl$_3$) 1.2-2.0 (m, 12H), 1.77 (m, 12H), 2.05 (m, 6H), 2.13 (12H), 2.24 (s, 6H), 2.67 (m, 2H), 3.73 (d, J=13 Hz, 2H), 3.82 (d, J=13 Hz, 2H), 6.71 (d, J=2 Hz, 2H), 6.83 (s, 2H), 6.97 (d, J=2 Hz, 2H).

(Reference Example 2): Synthesis of [cyclooc-tanediyl-trans-1,2-bis(3-(1-adamantyl)-5-methyl-2-oxoylbenzylsulfanyl)]dibenzylhafnium (A-X1)

In a glove box under nitrogen atmosphere, to a toluene (6 mL) solution of 200 mg (0.29 mmol) of trans-1,2-bis(3-(1-adamantyl)-5-methyl-2-hydroxybenzylsulfanyl)cyclooc-tane, a toluene (6 mL) solution of 159 mg (0.29 mmol) of tetrabenzylhafnium was dropped in a 50-mL Schlenk tube at room temperature. 1.5 hours later, a reaction solution thus obtained was filtered, and a volatile component was distilled off from a resultant filtrate under reduced pressure. A residue thus obtained was washed with pentane, and dried under reduced pressure. As a result, 249 mg (yield: 82%) of [cyclooctanediyl-trans-1,2-bis(3-(1-adamantyl)-5-methyl-2-oxoylbenzylsulfanyl)]dibenzylhafnium was obtained as white powder.

$^1$H-NMR (400 MHz, δ, ppm, toluene-d$_8$) 0.6-1.4 (m, 12H), 1.84 (m, 6H), 2.1-2.2 (16H), 2.17 (s, 6H), 2.41 (m, 12H), 2.66 (d, J=12 Hz, 2H), 2.83 (d, J=12 Hz, 2H), 3.11 (d, J=14 Hz, 2H), 3.51 (d, J=14 Hz, 2H), 6.27 (s, 2H), 6.78 (t, J=7 Hz, 2H), 7.1-7.2 (10H).

(Reference Example 3): Synthesis of trans-1,2-bis [5-tert-butyl-3-(3,5-dimethyl-1-adamantyl)-2-hy-droxybenzylsulfanyl]cyclooctane (i) Synthesis of 4-tert-butyl-2-(3,5-dimethyl-1-ada-mantyl)phenol In a 50-mL Schlenk flask in which air had been replaced by nitrogen, 3.3 g (22 mmol) of 4-tert-butylphenol, 4.0 g (22 mmol) of 3,5-dimethyl-1-adamantanol, and 20 mL of dichloromethane were added, and cooled to a temperature of 0° C. in an ice bath. To a resultant mixture, 1.2 mL (22 mmol) of sulfuric acid was added, and stirred for 1 hour at room temperature. A reaction solution thus obtained was poured into a sodium hydrogen carbonate solution. After an organic layer was dried over anhydrous magnesium sulfate, a volatile component was distilled off under reduced pressure. A white solid thus obtained was purified by silica-gel column chromatography (with a developing solvent consisting of ethyl acetate and hexane in a ratio of 1:10). As a result, 4.0 g (yield: 59%) of 4-tert-butyl-2-(3,5-dimethyl-1-ada-mantyl)phenol was obtained as a white solid.

$^1$H-NMR (400 MHz, δ, ppm, CDCl$_3$) 0.874 (s, 6H), 1.20 (s, 2H), 1.29 (s, 9H), 1.35-1.45 (m, 4H), 1.70-1.78 (m, 4H), 1.95 (m, 2H), 2.17 (m, 1H), 4.56 (s, 1H), 6.56 (d, J=8 Hz, 1H), 7.06 (dd, J=2 Hz, 8 Hz, 1H), 7.2-7.3 (5H), 7.24 (d, J=2 Hz, 1H).

(ii) Synthesis of 4-tert-butyl-6-(3,5-dimethyl-1-ada-mantyl)-2-hydroxymethylphenol In a 100-mL two-neck flask in which air had been replaced by nitrogen, 4.0 g (13 mmol) of 4-tert-butyl-2-(3,5-dimethyl-1-adamantyl)phenol, 4.8 g (50 mmol) of magnesium chloride, 2.1 g (70 mmol) of paraformaldehyde, and 50 mL of tetrahydrofuran were added. To a resultant mixture, 6.7 mL (48 mmol) of triethylamine was added, and heated to reflux for 3 hours. After a reaction solution thus obtained was cooled to room temperature, an insoluble component was filtered out. After a volatile component was distilled off from a resultant filtrate under reduced pressure, a residue thus obtained was mixed with ethyl acetate and water. An organic layer was washed with 1 M HCl, a saturated sodium bicarbonate solution, and saturated saline in this order, and was dried over anhydrous magnesium sulfate. A solvent was distilled off under reduced pressure. As a result, 4.2 g (yield: 96%) of mixture containing 5-tert-butyl-3-(3,5-dimethyl-1-adamantyl)salicylaldehyde was obtained.

$^1$H-NMR (400 MHz, δ, ppm, CDCl$_3$) 0.874 (s, 6H), 1.2-2.2 (m, 22H), 7.32 (d, J=2 Hz, 1H), 7.53 (d, J=2 Hz, 1H), 9.85 (s, 1H), 11.7 (s, 1H).

In a 100-mL flask in which air had been replaced by nitrogen, 4.2 g of the above mixture, 20 mL of tetrahydrofuran, and 20 mL of methanol were added, and ice-chilled. To a resultant mixture, 490 mg (13 mmol) of sodium borohydride was slowly added, heated to room temperature, and then stirred for 1 hour. After a volatile component was distilled off from a resultant reaction solution under reduced pressure, the reaction solution was mixed with water and ethyl acetate. The organic layer was washed with 1 M HCl, a saturated sodium bicarbonate solution, and saturated saline in this order, and was dried over anhydrous magnesium sulfate. After a solvent was distilled off under reduced pressure, colorless oil thus obtained was purified by silica-gel column chromatography (with a developing solvent consisting of ethyl acetate and hexane in a ratio ranging from 1:10 to 1:5). As a result, 3.4 g (yield: 81%) of 4-tert-butyl-6-(3,5-dimethyl-1-adamantyl)-2-hydroxymethylphenol was obtained as a white solid.

$^1$H-NMR (400 MHz, δ, ppm, CDCl$_3$) 0.875 (s, 6H), 1.2 to 2.2 (m, 23H), 4.85 (d, J=5 Hz, 2H), 6.88 (d, J=2 Hz, 1H), 7.22 (d, J=2 Hz, 1H), 7.55 (s, 1H).

(iii) Synthesis of 5-tert-butyl-3-(3,5-dimethyl-1-adamantyl)-2-hydroxybenzyl bromide In a 200-mL flask in which air had been replaced by nitrogen, 3.4 g (9.9 mmol) of 4-tert-butyl-6-(3,5-dimethyl-1-adamantyl)-2-hydroxymethylphenol and 20 mL of dichloromethane were added. To a resultant mixture, 6.6 mL (6.6 mmol) of phosphorus tribromide (1.0 M dichloromethane solution) was added, and stirred for 1 hour at room temperature. A reaction solution thus obtained was mixed with water, and an organic layer was washed with water twice and further with saturated saline. After the organic layer was dried over anhydrous magnesium sulfate, a volatile component was distilled off under reduced pressure. As a result, 3.95 g (yield: 98%) of 5-tert-butyl-3-(3,5-dimethyl-1-adamantyl)-2-hydroxybenzyl bromide was obtained as a white solid.

$^1$H-NMR (400 MHz, δ, ppm, CDCl$_3$) 0.882 (s, 6H), 1.22 (s, 2H), 1.28 (s, 9H), 1.35 to 1.45 (m, 4H), 1.70-1.78 (m, 4H), 1.96 (m, 2H), 2.19 (m, 1H), 4.57 (s, 1H), 7.08 (d, J=2 Hz, 1H), 7.27 (d, J=2 Hz, 1H).

(iv) Synthesis of trans-1,2-bis[5-tert-butyl-3-(3,5-dimethyl-1-adamantyl)-2-hydroxybenzylsulfanyl]cyclooctane In a 50-mL Schlenk flask in which air had been replaced by nitrogen, 1.0 g (2.5 mmol) of 5-tert-butyl-3-(3,5-dimethyl-1-adamantyl)-2-hydroxybenzyl bromide, 0.18 g (1.0 mmol) of trans-cyclooctane-1,2-dithiol, and 7 mL of tetrahydrofuran were added, and ice-chilled. To a resultant mixture, 0.7 mL of triethylamine (5.0 mmol) was added, stirred for 1 hour at a temperature of 0° C., and then stirred for 2 hours at room temperature. To the mixture, 0.05 g (0.013 mmol) of 5-tert-butyl-3-(3,5-dimethyl-1-adamantyl)-2-hydroxybenzyl bromide was further added, and stirred for 1 hour at room temperature. After a volatile component was distilled off from a resultant reaction solution under reduced pressure, the reaction solution was mixed with ethyl acetate and an aqueous solution of ammonium chloride. An organic layer was washed with water and saturated saline in this order, and then was dried over anhydrous magnesium sulfate. After a solvent was distilled off under reduced pressure, a residue was purified by silica-gel column chromatography (with a developing solvent consisting of ethyl acetate and hexane in a ratio of 1:10). As a result, 1.0 g (yield: >99%) of trans-1,2-bis[5-tert-butyl-3-(3,5-dimethyl-1-adamantyl)-2-hydroxybenzylsulfanyl]cyclooctane was obtained as a white solid.

$^1$H-NMR (400 MHz, δ, ppm, CDCl$_3$) 0.88 (s, 12H), 1.2-2.2 (m, 56H), 2.59 (m, 2H), 3.77 (d, J=14 Hz, 2H), 3.87 (d, J=14 Hz, 2H), 6.89 (d, J=2 Hz, 2H), 7.19 (d, J=2 Hz, 2H).

(Reference Example 4): Synthesis of {cyclooctanediyl-trans-1,2-bis[5-tert-butyl-3-(3,5-dimethyl-1-adamantyl)-2-oxoylbenzylsulfanyl]}dichlorohafnium (A-X2)

In a glove box under nitrogen atmosphere, to a toluene (1 mL) solution of 83 mg (0.10 mmol) of trans-1,2-bis[5-tert-butyl-3-(3,5-dimethyl-1-adamantyl)-2-hydroxybenzylsulfanyl]cyclooctane, a toluene (1 mL) solution of 51 mg (0.10 mmol) of dichloro{1,1'-oxybis[ethane][bis(phenylmethyl)hafnium]} was dropped in a 50-mL Schlenk tube at room temperature. 1.5 hours later, a volatile component was distilled off under reduced pressure. A residue thus obtained was washed with pentane, and dried under reduced pressure. As a result, 55 mg (yield: 51%) of {cyclooctanediyl-trans-1,2-bis[5-tert-butyl-3-(3,5-dimethyl-1-adamantyl)-2-oxoylbenzylsulfanyl]} dichlorohafnium was obtained as white powder.

$^1$H-NMR (400 MHz, δ, ppm, CDCl$_3$) 0.901 (s, 12H), 1.0-2.4 (m, 56H), 2.58 (brs, 2H), 3.88 (d, J=14 Hz, 2H), 4.54 (d, J=14 Hz, 2H), 6.85 (d, J=2 Hz, 2H), 7.37 (d, J=2 Hz, 2H).

(2) Synthesis of Transition Metal Compound (A-Y)

Reference Example 5

The transition metal compound (A-Y1) shown below was synthesized by a method disclosed in U.S. Patent Application Publication No. 2005/090427, specification.

[Chem. 60]

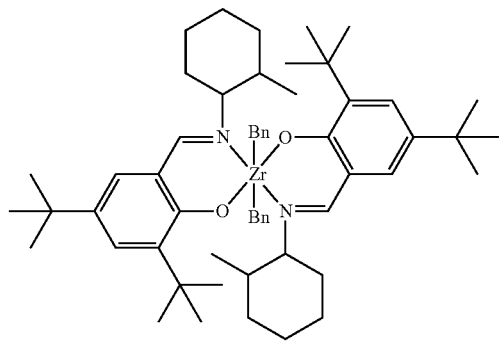

Reference Example 6

The transition metal compound (A-Y2) shown below was synthesized by a method disclosed in Small, B. L.; Brookhart, M.; Bennett, A. M. A. J. Am. Chem. Soc. 1998, 120, 4049-4050.

[Chem. 61]

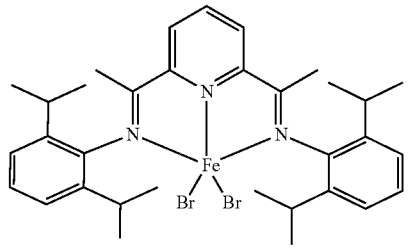

Reference Example 7

The transition metal compound (A-Y3) shown below was synthesized by a method disclosed in International Publication No. WO 1996/023010, specification.

[Chem. 62]

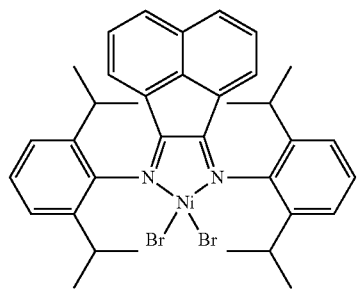

Reference Example 8

The transition metal compound (A-Y4) shown below was synthesized by a method disclosed in U.S. Patent Application Publication No. 2004/0220050, specification.

[Chem. 63]

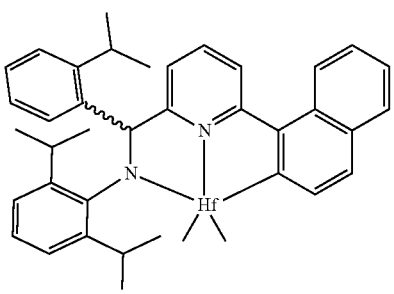

Reference Example 9

The transition metal compound (A-Y5) shown below, which was used in Comparative Examples, was synthesized by a method disclosed in the Reference: U.S. Patent Application Publication No. 2006/0205588, specification.

[Chem. 64]

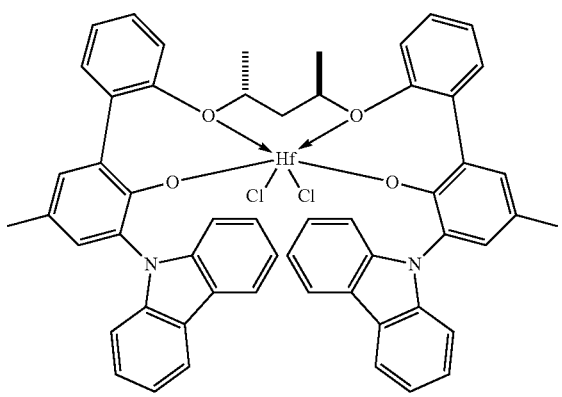

(3) Synthesis of Organoaluminumoxy Compound (B-1)

Reference Example 10

Synthesis of d-MAO

Air in a 200-mL two-neck flask, which contained a stirring bar and to which a three-way cock was attached, was replaced by nitrogen gas, and 100 mL of a PMAO-S toluene solution (aluminum content: 6.1 wt %) manufactured by Tosoh Finechem Corporation was measured off with use of a syringe and was supplied to the flask. This solution was decompressed and a volatile component was removed. A white solid thus obtained was redissolved in 100 mL of dehydrated toluene, and, after that, the volatile component was removed under reduced pressure. This operation was further carried out twice. As a result, 14.1 g of white powder was obtained.

Values of physical properties shown in this example were calculated by the following methods.

(1) Intrinsic viscosity ($\eta$) [unit: dl/g]

Reduced viscosities at three concentrations of 0.1, 0.2, and 0.5 g/dl were measured under the condition of a tetralin solvent and a temperature of 135° C. with use of a Ubbelohde viscometer. Next, intrinsic viscosity was calculated by an extrapolation method in which the reduced viscosities were plotted with respect to the concentrations and the concentrations were extrapolated to zero in accordance with a calculation method described on page 491 of Reference: "Polymer solution (Polymer science experiment study 11" (published in 1982 by Kyoritsu Shuppan Co., Ltd.).

(2) Average Molecular Chain Length (Aw, an) [Unit: A] and Aw/an

Measurement was carried out by gel permeation chromatography (GPC) under the conditions below. A calibration curve was prepared with use of standard polystyrene.
Model: 150C type manufactured by MILLIPORE-WATERS ASSOCIATES, INC.
Column: two columns of TSK-GEL GMH-HT 7.5×600
Measurement temperature: 140° C., 152° C.
Solvent: Orthodichlorobenzene
Measurement concentration: 5 mg/5 mL (3) Glass Transition Temperature ($T_g$), Crystallization Temperature ($T_c$), Melting Temperature ($T_m$) [Unit: ° C.], and Amount of Heat of Fusion ($\Delta H$) [Unit: J/g]

DSC measurement condition (1): Measurement was carried out with use of a thermal-analysis equipment, a differential scanning calorimeter (Q100 manufactured by TA Instruments), by methods below.
1) Isothermal holding 220° C., 5 minutes
2) Measurement 220° C.--90° C. (10° C./min) . . . ($T_c$)
3) Measurement −90° C.-220° C. (10° C./min) . . . ($T_m$), ($\Delta H$)
4) Cooling 220° C.--90° C. (10° C./min)
5) Isothermal holding −90° C., 5 minutes
6) Measurement −90° C.-60° C. (2° C./min) . . . ($T_g$)
(Modulation Amplitude ±0.16° C., Modulation Cycle 30 Seconds)

DSC measurement condition (2): Measurement was carried out with use of a thermal-analysis equipment, a differential scanning calorimeter (Diamond DSC manufactured by Perkin Elmer Company), by methods below.
1) Isothermal holding 220° C., 5 minutes
2) Measurement 220° C.-20° C. (5° C./min) . . . ($T_c$)
3) Isothermal holding 20° C., 2 minutes
4) Measurement 20° C.-220° C. (5° C./min) . . . ($T_m$), ($\Delta H$)

(4) Ethylene Content ($C_2'$) and EP Content [unit: wt %] in Polymer

Measurement was carried out with use of a nuclear magnetic resonance spectrometer (NMR) by using the result of the $^{13}$C-NMR spectrum of a polymer measured as follows in conformity to a method described in the report (Reference: Macromolecules, 1982, No. 15, pp. 1150-1152) by Kakugo et al. Moreover, the EP content was calculated by the above-mentioned calculation method.
Device: AVANCE600 10 mm cryoprobe manufactured by Bruker Corporation
Measurement solvent: Mixed solution of 1,2-dichlorobenzene/1,2-dichlorobenzene-$d_4$=75/25 (volume ratio)
Measurement temperature: 130° C.
Measuring method: Proton decoupling method
Pulse width: 45°
Pulse repetition time: 4 seconds
Chemical-shift value basis: Tetramethylsilane (5) TREF Fractionation of Ethylene/Propylene Block Copolymer Composition TREF fractionation was carried out as follows:
Device: PREPmc2 manufactured by Polymer Char
Solvent: 1,2dichlorobenzene
Solvent amount: 100 ml for dissolving each fraction
Polymer amount: 500 mg
TREF fractionation condition (1)
Dissolving step: 130° C., 90 minutes Stabilization temperature: 120° C., 45 minutes
Crystallization temperature: Cooled to 40° C. at a temperature-fall speed of 0.2° C./min
Fractionation temperature: 50° C., 60° C., 70° C., 80° C., 90° C., 100° C., 110° C., and 130° C., i.e., 8 fractions
TREF fractionation condition (2)
Dissolving step: 130° C., 90 minutes
Stabilization temperature: 120° C., 45 minutes
Crystallization temperature: Cooled to 40° C. at a temperature-fall speed of 0.2° C./min
Fractionation temperature: 30° C., 40° C., 50° C., 60° C., 70° C., 80° C., 90° C., 100° C., 110° C., 120° C., and 130° C., i.e., 11 fractions To each of polymer solutions obtained by the TREF fractionations, 1 liter of acetone was added so as to precipitate a polymer, and then the polymers were collected by filtration under reduced pressure. The polymers thus collected were subjected to vacuum drying at 70° C. for 12 hours or longer. As a result, analytical samples were prepared.

(6) Preparation of 0.3 Mmt Press Sheet of Ethylene/Propylene Block Copolymer Composition Obtained polymer powder was preheated by a hot pressing device at 230° C. for 5 minutes while being sandwiched between aluminum plates and further between steel flat plates, then pressed for 5 minutes with pressure sufficient to fuse polymer particles, then cooled down by a cold pressing device at 30° C., and then subjected to measurement. In this case, a press sheet having an intended thickness was prepared by use of a steel spacer.

(7) Preparation of 0.1 Mmt Press Sheet of Ethylene/Propylene Block Copolymer Composition Obtained polymer powder was preheated by a hot pressing device at 190° C. for 5 minutes while being sandwiched between aluminum plates and further between steel flat plates, then pressed for 5 minutes with pressure sufficient to fuse polymer particles, then cooled down by a cold pressing device at 30° C., and then subjected to measurement. In this case, a press sheet having an intended thickness was prepared by use of a steel spacer.

(8) Transparency Measurement of Ethylene/Propylene Block Copolymer Composition (Haze [%])
Haze was measured by a method in conformity to JIS K7136. A press sheet having a thickness of 0.1 millimeter was prepared by the above described method and measured with use of a haze meter (NDH2000 manufactured by NIPPON DENSHOKU INDUSTRIES Co., LTD).

(9) Mechanical Strength Measurement of Ethylene/Propylene Block Copolymer Composition (Tensile Impact [kJ/m$^2$], Young's Modulus [MPa], Yield Strength [MPa], Tensile Strength [MPa], Elongation [%])

A test piece (JIS K6251-7) was prepared from the 0.3 mmt press sheet and tensile impact (tensile impact strength) was measured with use of a tensile impact tester (CIT-150T-20 manufactured by ORIENTEC Co., LTD). A swing-up angle of a hammer was set to 110°, and a distance between chucks was set to 20 mm.

A Young's modulus (rigidity) was calculated by preparing a test piece (JIS K6251-7) from the 0.3 mmt press sheet, subjecting the test piece to a tensile test with use of a tensile tester (STA-1225 manufactured by ORIENTEC Co., LTD) at a speed of 5.0 mm/min, and calculating an initial elastic modulus from a gradient of a tangent at a zero point of a tensile-stress curve. Yield strength, tensile strength, and elongation were measured by methods in conformity to JIS K6251. Specifically, a test piece (JIS K6251-7) was prepared from the 0.3 mmt press sheet and the properties were measured with a tension speed of 50 mm/min with use of a tensile tester (STA-1225 manufactured by ORIENTEC Co., LTD).

Example 1

(1) Single-stage polymerization of ethylene/propylene copolymerization An autoclave having an inner volume of 0.4 liter and provided with a stirrer was sufficiently dried. After that, 40 mL of toluene and 80 g of propylene were added, a temperature was increased to 50° C., and 0.05 MPa (partial pressure) of ethylene was further added. Then, a mixed solution of 0.50 mmol of triisobutylaluminum (organometallic compound (C)) and 0.05 mmol of diethylzinc (organometallic compound (C)), a mixed solution of 2.00 mL (1.0 mM, 2.0 μmol) of a toluene solution of the transition metal compound (A-X2) and 2.00 mL (0.40 mM, 0.80 μmol) of a toluene solution of the transition metal compound (A-Y1), and 1.25 mL (4.0 mM, 5.0 μmol) of a toluene solution of trityl tetrakis(pentafluorophenyl)borate (activating co-catalyst agent (B)) were added in this order to the autoclave from a pressurization injection machine, and polymerization was performed at 50° C. for 30 minutes. A small amount of ethanol was added to terminate the reaction, and an unreacted monomer was purged. Then, the autoclave was opened, and 500 mL of ethanol and 5 mL of a 1N hydrochloric acid aqueous solution were added. The mixture was stirred at room temperature for 30 minutes, and a polymer thus deposited was suction filtered. After that, the polymer was sufficiently dried under reduced pressure by a vacuum dryer, and thus 8.5 g of a single-stage polymerization polymer was obtained.

(2) Solvent Fractionation of Single-stage Polymerization Polymer

To an eggplant flask having an inner volume of 300 mL, 250 mL of hexane was added. An extraction thimble (R86 manufactured by ADVANTECH) filled with 2.00 g of the single-stage polymerization polymer synthesized in Example 1(1) was placed in a Soxhlet extractor, and a reflux condenser was attached. Then, hexane was heated to reflux for 5 hours so as to be fractionated as an insoluble component (BHIS) on the extraction thimble and a soluble component (BHS) in a flask located at a lower part. The solvent was sufficiently distilled off from each fraction by drying under reduced pressure, and consequently 0.89 g of the BHIS component and 1.11 g of the BHS component were obtained.

Example 2

(1) Single-Stage Polymerization of Ethylene/Propylene Copolymerization

An autoclave having an inner volume of 1 liter and provided with a stirrer was sufficiently dried. After that, 100 mL of toluene and 200 g of propylene were added, a temperature was increased to 50° C., and 0.05 MPa (partial pressure) of ethylene was further added. Then, a mixed solution of 0.50 mmol of triisobutylaluminum (organometallic compound (C)) and 0.05 mmol of diethylzinc (organometallic compound (C)), a mixed solution of 2.00 mL (2.0 mM, 4.0 μmol) of a toluene solution of the transition metal compound (A-X2) and 2.00 mL (1.0 mM, 2.0 μmol) of a toluene solution of the transition metal compound (A-Y1), and 2.50 mL (4.0 mM, 10.0 μmol) of a toluene solution of trityl tetrakis(pentafluorophenyl)borate (activating co-catalyst agent (B)) were added in this order to the autoclave from a pressurization injection machine, and polymerization was performed at 50° C. for 30 minutes. A small amount of ethanol was added to terminate the reaction, and an unreacted monomer was purged. Then, the autoclave was opened, and 500 mL of ethanol and 5 mL of a 1N hydrochloric acid aqueous solution were added. The mixture was stirred at room temperature for 30 minutes, and a polymer thus deposited was suction filtered. After that, the polymer was sufficiently dried under reduced pressure by a vacuum dryer, and thus 21.0 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 2(1) was herein used. As a result, 1.13 g of the BHIS component and 0.87 g of the BHS component were obtained.

Example 3

(1) Single-Stage Polymerization of Ethylene/Propylene Copolymerization

This single-stage copolymerization was carried out in accordance with the method described in Example 2(1) except that a mixed solution of 1.00 mL (2.0 mM, 2.0 µmol) of a toluene solution of the transition metal compound (A-X2) and 2.00 mL (2.0 mM, 4.0 µmol) of a toluene solution of the transition metal compound (A-Y1) was used instead of the mixed solution of 2.00 mL (2.0 mM, 4.0 µmol) of a toluene solution of the transition metal compound (A-X2) and 2.00 mL (1.0 mM, 2.0 µmol) of a toluene solution of the transition metal compound (A-Y1). As a result, 22.1 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 3(1) was herein used. As a result, 0.81 g of a BHIS component and 1.19 g of a BHS component were obtained.

Example 4

(1) Single-Stage Polymerization of Ethylene/Propylene Copolymerization

This single-stage copolymerization was carried out in accordance with the method described in Example 2(1) except that a mixed solution of 3.00 mL (1.0 mM, 3.0 µmol) of a toluene solution of the transition metal compound (A-X2) and 3.00 mL (1.0 mM, 3.0 µmol) of a toluene solution of the transition metal compound (A-Y1) was used instead of the mixed solution of 2.00 mL (2.0 mM, 4.0 µmol) of a toluene solution of the transition metal compound (A-X2) and 2.00 mL (1.0 mM, 2.0 µmol) of a toluene solution of the transition metal compound (A-Y1), and an added amount of the toluene solution of trityl tetrakis(pentafluorophenyl)borate (activating co-catalyst agent (B)) was changed from 2.50 mL (4.0 mM, 10.0 µmol) to 3.75 mL (4.0 mM, 15.0 µmol). As a result, 22.6 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 4(1) was herein used. As a result, 1.10 g of a BHIS component and 0.90 g of a BHS component were obtained.

Example 5

(1) Single-Stage Polymerization of Ethylene/Propylene Copolymerization

This single-stage copolymerization was carried out in accordance with the method described in Example 2(1) except that a mixed solution of 1.00 mL (5.0 mM, 5.0 µmol) of a toluene solution of the transition metal compound (A-X2) and 1.00 mL (5.0 mM, 5.0 µmol) of a toluene solution of the transition metal compound (A-Y1) was used instead of the mixed solution of 2.00 mL (2.0 mM, 4.0 µmol) of a toluene solution of the transition metal compound (A-X2) and 2.00 mL (1.0 mM, 2.0 µmol) of a toluene solution of the transition metal compound (A-Y1), and an added amount of the toluene solution of trityl tetrakis(pentafluorophenyl)borate (activating co-catalyst agent (B)) was changed from 2.50 mL (4.0 mM, 10.0 µmol) to 5.00 mL (4.0 mM, 20.0 µmol). As a result, 29.8 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 5(1) was herein used. As a result, 1.24 g of a BHIS component and 0.76 g of a BHS component were obtained.

Example 6

(1) Single-Stage Polymerization of Ethylene/Propylene Copolymerization

This single-stage copolymerization was carried out in accordance with the method described in Example 2(1) except that an amount of diethylzinc (organometallic compound (C)) was changed from 0.05 mmol to 0.10 mmol, a mixed solution of 3.00 mL (1.0 mM, 3.0 µmol) of a toluene solution of the transition metal compound (A-X2) and 3.00 mL (1.0 mM, 3.0 µmol) of a toluene solution of the transition metal compound (A-Y1) was used instead of the mixed solution of 2.00 mL (2.0 mM, 4.0 µmol) of a toluene solution of the transition metal compound (A-X2) and 2.00 mL (1.0 mM, 2.0 µmol) of a toluene solution of the transition metal compound (A-Y1), and an added amount of the toluene solution of trityl tetrakis(pentafluorophenyl)borate (activating co-catalyst agent (B)) was changed from 2.50 mL (4.0 mM, 10.0 µmol) to 3.75 mL (4.0 mM, 15.0 µmol). As a result, 29.2 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 6(1) was herein used. As a result, 0.79 g of a BHIS component and 1.21 g of a BHS component were obtained.

Example 7

(1) Single-Stage Polymerization of Ethylene/Propylene Copolymerization

This single-stage copolymerization was carried out in accordance with the method described in Example 2(1) except that a polymerization temperature was changed to 40° C., a mixed solution of 3.00 mL (1.0 mM, 3.0 µmol) of a toluene solution of the transition metal compound (A-X2) and 3.00 mL (1.0 mM, 3.0 µmol) of a toluene solution of the transition metal compound (A-Y1) was used instead of the mixed solution of 2.00 mL (2.0 mM, 4.0 µmol) of a toluene solution of the transition metal compound (A-X2) and 2.00 mL (1.0 mM, 2.0 µmol) of a toluene solution of the transition metal compound (A-Y1), and an added amount of the toluene solution of trityl tetrakis(pentafluorophenyl)borate (activating co-catalyst agent (B)) was changed from 2.50 mL (4.0 mM, 10.0 µmol) to 3.75 mL (4.0 mM, 15.0 µmol). As a result, 29.2 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 7(1) was herein used. As a result, 0.89 g of a BHIS component and 1.11 g of a BHS component were obtained.

Example 8

(1) Single-Stage Polymerization of Ethylene/Propylene Copolymerization

This single-stage copolymerization was carried out in accordance with the method described in Example 2(1) except that an amount of triisobutylaluminum (organometallic compound (C)) was changed from 0.50 mmol to 0.25 mmol, a mixed solution of 3.00 mL (1.0 mM, 3.0 µmol) of a toluene solution of the transition metal compound (A-X2) and 3.00 mL (1.0 mM, 3.0 µmol) of a toluene solution of the transition metal compound (A-Y1) was used instead of the mixed solution of 2.00 mL (2.0 mM, 4.0 µmol) of a toluene solution of the transition metal compound (A-X2) and 2.00 mL (1.0 mM, 2.0 µmol) of a toluene solution of the transition metal compound (A-Y1), and an added amount of the toluene solution of trityl tetrakis(pentafluorophenyl)borate (activating co-catalyst agent (B)) was changed from 2.50 mL (4.0 mM, 10.0 µmol) to 3.75 mL (4.0 mM, 15.0 µmol). As a result, 41.0 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 8(1) was herein used. As a result, 0.88 g of a BHIS component and 1.12 g of a BHS component were obtained.

Comparative Example 1

(1) Single-Stage Polymerization of Ethylene/Propylene Copolymerization

This single-stage copolymerization was carried out in accordance with the method described in Example 2(1) except that a mixed solution of 0.10 mL (0.20 mM, 0.020 µmol) of a toluene solution of the transition metal compound (A-Y5) and 1.00 mL (1.0 mM, 1.0 µmol) of a toluene solution of the transition metal compound (A-Y1) was used instead of the mixed solution of 2.00 mL (2.0 mM, 4.0 µmol) of a toluene solution of the transition metal compound (A-X2) and 2.00 mL (1.0 mM, 2.0 µmol) of a toluene solution of the transition metal compound (A-Y1). As a result, 14.0 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Comparative Example 1(1) was herein used. As a result, 1.00 g of a BHIS component and 1.00 g of a BHS component were obtained.

Comparative Example 2

(1) Single-Stage Polymerization of Ethylene/Propylene Copolymerization

This single-stage copolymerization was carried out in accordance with the method described in Example 2(1) except that a mixed solution of 0.10 mL (0.20 mM, 0.020 µmol) of a toluene solution of the transition metal compound (A-Y5) and 2.00 mL (1.0 mM, 2.0 µmol) of a toluene solution of the transition metal compound (A-Y1) was used instead of the mixed solution of 2.00 mL (2.0 mM, 4.0 µmol) of a toluene solution of the transition metal compound (A-X2) and 2.00 mL (1.0 mM, 2.0 µmol) of a toluene solution of the transition metal compound (A-Y1). As a result, 13.7 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Comparative Example 2(1) was herein used. As a result, 0.05 g of a BHIS component and 1.95 g of a BHS component were obtained.

Example 9

(1) Single-Stage Polymerization of Ethylene/Propylene Copolymerization

An autoclave having an inner volume of 0.4 liter and provided with a stirrer was sufficiently dried. After that, 40 mL of toluene and 80 g of propylene were added, a temperature was increased to 40° C., and 0.05 MPa (partial pressure) of ethylene was further added. Then, a mixed solution of 2.0 mmol of MMAO-3A (organometallic compound (C)) and 0.05 mmol of diethylzinc (organometallic compound (C)) and a mixed solution of 0.40 mL (1.0 mM, 0.40 µmol) of a toluene solution of the transition metal compound (A-X2) and 0.20 mL (0.50 mM, 0.10 µmol) of a toluene solution of the transition metal compound (A-Y1) were added in this order to the autoclave from a pressurization injection machine, and polymerization was performed at 40° C. for 30 minutes. A small amount of ethanol was added to terminate the reaction, and an unreacted monomer was purged. Then, the autoclave was opened, and 500 mL of ethanol and 5 mL of a 1N hydrochloric acid aqueous solution were added. The mixture was stirred at room temperature for 30 minutes, and a polymer thus deposited was suction filtered. After that, the polymer was sufficiently dried under reduced pressure by a vacuum dryer, and thus 9.4 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 9(1) was herein used. As a result, 1.62 g of the BHIS component and 0.38 g of the BHS component were obtained.

Example 10

(1) Single-Stage Polymerization of Ethylene/Propylene Copolymerization

An autoclave having an inner volume of 1 liter and provided with a stirrer was sufficiently dried. After that, 100 mL of toluene and 200 g of propylene were added, a temperature was increased to 40° C., and 0.05 MPa (partial pressure) of ethylene was further added. Then, 2.0 mmol of MMAO-3A (organometallic compound (C)), 0.05 mmol of diethylzinc (organometallic compound (C)), and a mixed solution of 2.00 mL (1.0 mM, 2.0 µmol) of a toluene solution of the transition metal compound (A-X2) and 0.20 mL (1.0 mM, 0.20 µmol) of a toluene solution of the transition metal compound (A-Y1) were added in this order to the autoclave from a pressurization injection machine, and polymerization was performed at 40° C. for 30 minutes. A small amount of ethanol was added to terminate the reaction, and an unreacted monomer was purged. Then, the autoclave was opened, and 500 mL of ethanol and 5 mL of a 1N hydrochloric acid aqueous solution were added. The mixture was stirred at room temperature for 30 minutes, and a polymer thus deposited was suction filtered. After that, the polymer was sufficiently dried under reduced pressure by a vacuum dryer, and thus 14.0 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 10(1) was herein used. As a result, 1.22 g of a BHIS component and 0.78 g of a BHS component were obtained.

Example 11

(1) Single-Stage Polymerization of Ethylene/Propylene Copolymerization

This single-stage copolymerization was carried out in accordance with the method described in Example 10(1) except that a mixed solution of 1.00 mL (1.0 mM, 1.0 µmol) of a toluene solution of the transition metal compound (A-X2) and 0.20 mL (1.0 mM, 0.20 µmol) of a toluene solution of the transition metal compound (A-Y1) was used instead of the mixed solution of 2.00 mL (1.0 mM, 2.0 µmol) of a toluene solution of the transition metal compound (A-X2) and 0.20 mL (1.0 mM, 0.2 µmol) of a toluene solution of the transition metal compound (A-Y1). As a result, 8.2 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 11(1) was herein used. As a result, 1.48 g of a BHIS component and 0.52 g of a BHS component were obtained.

Example 12

(1) Single-Stage Polymerization of Ethylene/Propylene Copolymerization

This single-stage copolymerization was carried out in accordance with the method described in Example 10(1) except that an amount of toluene was changed from 100 mL to 300 mL, an amount of propylene was changed from 200 g to 100 g, and a mixed solution of 1.00 mL (1.0 mM, 1.0 µmol) of a toluene solution of the transition metal compound (A-X2) and 0.20 mL (1.0 mM, 0.20 µmol) of a toluene solution of the transition metal compound (A-Y1) was used instead of the mixed solution of 2.00 mL (1.0 mM, 2.0 µmol) of a toluene solution of the transition metal compound (A-X2) and 0.20 mL (1.0 mM, 0.2 µmol) of a toluene solution of the transition metal compound (A-Y1). As a result, 4.8 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 12(1) was herein used. As a result, 1.77 g of the BHIS component and 0.23 g of the BHS component were obtained.

Example 13

(1) Single-Stage Polymerization of Ethylene/Propylene Copolymerization

This single-stage copolymerization was carried out in accordance with the method described in Example 10(1) except that an amount of diethylzinc (organometallic compound (C)) was changed from 0.05 mmol to 0.10 mmol, a mixed solution of 1.00 mL (1.0 mM, 1.0 µmol) of a toluene solution of the transition metal compound (A-X2) and 0.20 mL (1.0 mM, 0.20 µmol) of a toluene solution of the transition metal compound (A-Y1) was used instead of the mixed solution of 2.00 mL (1.0 mM, 2.0 µmol) of a toluene solution of the transition metal compound (A-X2) and 0.20 mL (1.0 mM, 0.2 µmol) of a toluene solution of the transition metal compound (A-Y1). As a result, 8.0 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 13(1) was herein used. As a result, 1.10 g of a BHIS component and 0.90 g of a BHS component were obtained.

Example 14

(1) Single-Stage Polymerization of Ethylene/Propylene Copolymerization

This single-stage copolymerization was carried out in accordance with the method described in Example 10(1) except that an amount of diethylzinc (organometallic compound (C)) was changed from 0.05 mmol to 0.30 mmol and a mixed solution of 1.00 mL (1.0 mM, 1.0 µmol) of a toluene solution of the transition metal compound (A-X2) and 0.20 mL (1.0 mM, 0.20 µmol) of a toluene solution of the transition metal compound (A-Y1) was used instead of the mixed solution of 2.00 mL (1.0 mM, 2.0 µmol) of a toluene solution of the transition metal compound (A-X2) and 0.20 mL (1.0 mM, 0.2 µmol) of a toluene solution of the transition metal compound (A-Y1). As a result, 14.3 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 14(1) was herein used. As a result, 0.79 g of a BHIS component and 1.21 g of a BHS component were obtained.

Example 15

(1) Single-Stage Polymerization of Ethylene/Propylene Copolymerization

This single-stage copolymerization was carried out in accordance with the method described in Example 10(1) except that an amount of diethylzinc (organometallic compound (C)) was changed from 0.05 mmol to 0.02 mmol. As a result, 16.5 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 15(1) was herein used. As a result, 1.05 g of a BHIS component and 0.95 g of a BHS component were obtained.

Example 16

(1) Single-Stage Polymerization of Ethylene/Propylene Copolymerization

This single-stage copolymerization was carried out in accordance with the method described in Example 10(1) except that an amount of diethylzinc (organometallic compound (C)) was changed from 0.05 mmol to 0.01 mmol. As a result, 14.7 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Example 16(1) was herein used. As a result, 1.04 g of a BHIS component and 0.96 g of a BHS component were obtained.

Comparative Example 3

(1) Single-Stage Polymerization of Ethylene/Propylene Copolymerization

This single-stage copolymerization was carried out in accordance with the method described in Example 10(1) except that a mixed solution of 0.10 mL (0.060 mM, 0.0060 µmol) of a toluene solution of the transition metal compound (A-Y5) and 0.20 mL (1.0 mM, 0.20 µmol) of a toluene solution of the transition metal compound (A-Y1) was used instead of the mixed solution of 2.00 mL (1.0 mM, 2.0 µmol) of a toluene solution of the transition metal compound (A-X2) and 0.20 mL (1.0 mM, 0.2 µmol) of a toluene solution of the transition metal compound (A-Y1). As a result, 7.0 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Comparative Example 3(1) was herein used. As a result, 1.13 g of a BHIS component and 0.87 g of a BHS component were obtained.

Comparative Example 4

(1) Single-Stage Polymerization of Ethylene/Propylene Copolymerization

This single-stage copolymerization was carried out in accordance with the method described in Example 10(1) except that a mixed solution of 0.10 mL (0.060 mM, 0.0060 µmol) of a toluene solution of the transition metal compound (A-Y5) and 0.40 mL (1.0 mM, 0.40 µmol) of a toluene solution of the transition metal compound (A-Y1) was used instead of the mixed solution of 2.00 mL (1.0 mM, 2.0 µmol) of a toluene solution of the transition metal compound (A-X2) and 0.20 mL (1.0 mM, 0.2 µmol) of a toluene solution of the transition metal compound (A-Y1). As a result, 7.9 g of a single-stage polymerization polymer was obtained.

(2) Solvent Fractionation of Single-Stage Polymerization Polymer

This solvent fractionation was carried out in accordance with the method described in Example 1(2) except that the two-stage polymerization polymer synthesized in Comparative Example 4(1) was herein used. As a result, 0.45 g of a BHIS component and 1.55 g of a BHS component were obtained.

Table 1 below collectively shows a BHIS ratio, Tm1, Tm2, ΔH, Aw, and Aw/An of each of the single-stage polymerization polymers (Whole) obtained in respective Examples 1(1) through 16(1) and Comparative Examples 1(1) through 4(1).

TABLE 1

| | Whole polymer | | | | | |
|---|---|---|---|---|---|---|
| | BHIS ratio wt % | Tm1 °C. | Tm2 °C. | ΔH J/g | Molecular Chain Length Aw | Aw/An |
| Example 1 | 44.7 | 146.1 | 136.6 | 72.7 | 760 | 2.0 |
| Example 2 | 56.7 | 131.7 | 76.9 | 71.6 | 2650 | 2.1 |
| Example 3 | 40.5 | 148.3 | — | 27.7 | 2490 | 2.5 |
| Example 4 | 55.2 | 148.2 | — | 41.6 | 2340 | 2.4 |
| Example 5 | 62.0 | 153.4 | — | 51.9 | 5700 | 4.9 |
| Example 6 | 39.7 | 143.5 | — | 24.6 | 2200 | 2.2 |
| Example 7 | 44.4 | 151.6 | — | 32.1 | 3000 | 3.4 |
| Example 8 | 43.8 | 136.0 | 60.3 | 40.1 | 2900 | 1.9 |
| Co. Ex. 1 | 49.8 | 129.7 | 100.2 | 52.4 | 70700 | 83.0 |
| Co. Ex. 2 | 2.3 | 97.5 | 89.4 | 87.7 | 1200 | 1.4 |
| Example 9 | 81.1 | 137.7 | 100.1 | 81.5 | 4700 | 2.7 |
| Example 10 | 60.8 | 143.8 | 94.9 | 61.4 | 5200 | 2.3 |
| Example 11 | 73.8 | 143.8 | 88.6 | 73.6 | 4600 | 2.1 |
| Example 12 | 88.6 | 133.5 | 101.9 | 82.0 | 3700 | 2.1 |
| Example 13 | 55.2 | 144.5 | 75.7 | 78.2 | 2500 | 2.1 |
| Example 14 | 39.5 | 142.6 | 77.3 | 73.7 | 1800 | 2.6 |
| Example 15 | 52.6 | 147.6 | 65.5 | 59.2 | 7000 | 2.3 |
| Example 16 | 51.8 | 144.4 | 92.5 | 60.2 | 6300 | 2.5 |
| Co. Ex. 3 | 56.7 | 124.3 | 92.3 | 30.3 | 74500 | 21.5 |
| Co. Ex. 4 | 22.7 | 92.7 | — | 47.2 | 3600 | 2.3 |

* Co. Ex. stands for "Compartive Example"
* DSC was measured under the DSC measurement condition (2)

Table 2 below collectively shows $^{L}C_{2'BHIS}$, $^{H}C_{2'BHIS}$, $^{H}C_{2'BHS}$, $C_{2'BHIS}$, $C_{2'BHS}$, $^{H}EP_{BHIS}$, PPP, EEE, Tm1, Tm2, ΔH, and $|^{H}C_{2'BHIS} - ^{H}C_{2'BHS}|$ for a BHS component (BHS) and a BHIS component (BHIS) of each of the single-stage polymerization polymers obtained in respective Examples 1(2) through 16(2) and Comparative Examples 1(2) through 4(2).

TABLE 2

| | Fractionated polymer BHIS | | | | | | | | | |
|---|---|---|---|---|---|---|---|---|---|---|
| | $^{L}C_{2'BHIS}$ mol % | $^{H}C_{2'BHIS}$ mol % | $C_{2'}$ mol % | $^{H}E\text{-}P_{BHIS}$ wt % | PPP % | EEE % | Tm1 °C. | Tm2 °C. | ΔH J/g |
| Example 1 | 3.1 | 90.1 | 21.6 | 21.2 | 71.6 | 14.7 | 141.0 | 57.3 | 75.2 |
| Example 2 | 4.1 | 89.3 | 12.0 | 9.4 | 90.0 | 6.3 | 133.2 | — | 73.0 |
| Example 3 | 2.8 | 81.5 | 19.0 | 20.6 | 71.4 | 9.5 | 149.4 | — | 72.4 |
| Example 4 | 2.4 | 82.4 | 14.5 | 15.1 | 79.7 | 7.3 | 148.8 | — | 77.4 |
| Example 5 | 1.3 | 81.0 | 6.6 | 6.7 | 90.3 | 3.0 | 154.0 | — | 86.0 |
| Example 6 | 3.1 | 85.6 | 25.5 | 27.1 | 66.9 | 15.1 | 144.3 | — | 62.9 |
| Example 7 | 1.4 | 83.5 | 8.5 | 8.6 | 87.9 | 4.2 | 152.5 | — | 85.9 |
| Example 8 | 5.9 | 88.0 | 59.4 | 65.1 | 30.0 | 41.2 | 136.6 | 59.7 | 54.0 |
| Co. Ex. 1 | 5.3 | 93.1 | 26.0 | 23.6 | 64.5 | 18.2 | 121.1 | 103.7 | 53.3 |
| Co. Ex. 2 | — | — | — | — | — | — | — | — | — |
| Example 9 | 3.8 | 93.9 | 61.6 | 18.5 | 32.1 | 52.1 | 137.8 | 100.4 | 80.4 |
| Example 10 | 2.3 | 93.1 | 10.4 | 8.9 | 84.8 | 6.9 | 143.4 | 98.9 | 72.9 |
| Example 11 | 2.2 | 92.7 | 5.8 | 4.0 | 89.7 | 3.0 | 143.5 | — | 74.4 |
| Example 12 | 4.4 | 94.2 | 63.4 | 65.7 | 29.9 | 53.9 | 133.9 | 102.0 | 71.7 |
| Example 13 | 2.1 | 91.4 | 6.6 | 5.0 | 89.3 | 3.6 | 144.7 | — | 80.8 |
| Example 14 | 2.2 | 91.1 | 14.1 | 13.5 | 81.1 | 9.5 | 143.7 | — | 77.5 |
| Example 15 | 1.9 | 92.8 | 7.4 | 6.0 | 88.8 | 4.6 | 145.8 | 97.2 | 71.0 |
| Example 16 | 1.5 | 90.6 | 3.8 | 2.6 | 93.1 | 1.7 | 147.9 | — | 75.0 |
| Co. Ex. 3 | 3.6 | 92.6 | 20.7 | 19.2 | 72.1 | 14.5 | 125.5 | 99.9 | 43.9 |
| Co. Ex. 4 | 12.9 | 91.3 | 84.3 | 91.1 | 6.1 | 66.3 | 96.1 | — | 46.6 |

| | Fractionated polymer | | | | | | | |
|---|---|---|---|---|---|---|---|---|
| | BHS | | | | | | | $|^{H}C_{2'BHIS}-$ |
| | $^{H}C_{2'BHIS}$ mol % | $C_{2'}$ mol % | PPP % | EEE % | Tm1 °C. | Tm2 °C. | ΔH J/g | $^{H}C_{2'BHS}|$ mol % |
| Example 1 | 90.7 | 71.5 | 18.9 | 55.1 | 121.4 | 92.1 | 62.5 | 0.6 |
| Example 2 | 90.6 | 62.2 | 28.0 | 47.4 | 126.3 | 78.1 | 74.6 | 1.3 |
| Example 3 | 81.4 | 78.3 | 0.7 | 42.1 | 6.7$^a$ | — | 33.1$^a$ | 0.1 |
| Example 4 | 82.1 | 78.6 | 1.3 | 43.6 | 52.3$^a$ | 10.6$^a$ | 38.0$^a$ | 0.3 |
| Example 5 | 78.8 | 73.1 | 1.7 | 34.0 | 71.3$^a$ | 42.3$^a$ | 11.0$^a$ | 2.2 |
| Example 6 | 85.7 | 81.5 | 2.9 | 52.1 | 132.8 | 78.8 | 23.7 | 0.1 |
| Example 7 | 82.7 | 70.9 | 0.6 | 44.2 | 42.1 | 22.9 | 8.2 | 0.8 |
| Example 8 | 87.9 | 85.1 | 1.7 | 59.9 | 68.4 | — | 35.3 | 0.1 |
| Co. Ex. 1 | 90.7 | 89.0 | 0.9 | 69.0 | 91.5 | 75.6 | 76.1 | 2.4 |
| Co. Ex. 2 | 91.9 | 91.0 | 0.3 | 73.8 | 93.6 | 77.1 | 90.2 | — |
| Example 9 | 92.7 | 81.9 | 10.3 | 67.4 | 129.6 | 95.6 | 76.1 | 1.2 |
| Example 10 | 91.6 | 90.8 | 0.2 | 73.0 | 90.9 | 77.5 | 70.1 | 1.5 |
| Example 11 | 91.9 | 90.9 | 0.5 | 73.9 | 89.8 | 80.5 | 74.1 | 0.8 |
| Example 12 | 92.3 | 67.0 | 24.8 | 53.8 | 127.4 | 94.7 | 64.2 | 1.9 |
| Example 13 | 91.2 | 89.5 | 1.1 | 70.7 | 86.5 | 74.6 | 68.7 | 0.2 |
| Example 14 | 91.0 | 87.6 | 2.8 | 68.6 | 89.2 | 76.6 | 66.3 | 0.1 |
| Example 15 | 90.5 | 89.7 | 0.1 | 69.0 | 87.1 | 69.0 | 55.1 | 2.3 |
| Example 16 | 89.1 | 88.0 | 0.0 | 64.3 | 79.0 | 63.7 | 39.6 | 1.5 |
| Co. Ex. 3 | 89.6 | 87.5 | 0.6 | 65.0 | 92.9 | 75.5 | 56.9 | 3.0 |
| Co. Ex. 4 | 90.0 | 88.5 | 0.3 | 66.6 | 90.4 | 75.2 | 56.0 | 1.3 |

\* Co. Ex. stands for "Compartive Example"
$^a$DSC of BHS component of each Examples 3, 4, and 5 was measured under the DSC measurement condition (1), and the others were all measured under the the DSC measurement condition (2).

In each of Examples 1 through 16 in which the ethylene/propylene copolymerization was carried out with the use of the polymerization catalysts (X) and (Y) in accordance with the single-stage polymerization method (1), a composition $^{H}$EP, which is to normally exist in a BHS component, exists in the BHIS component. This shows that an olefin block polymer is generated. Moreover, the ethylene/propylene block copolymer compositions were obtained each of which has a higher melting point and is more excellent in heat resistance, as compared with Comparative Examples 3 and 4 in each of which the ethylene/propylene copolymerization was carried out with the use of the different two polymerization catalysts (Y).

The following shows results of NMR analysis on TREF fractionation and the fractional components in (i) Example 4 in which the ethylene/propylene copolymerization was carried out with the use of the polymerization catalysts (X) and (Y) in accordance with the single-stage polymerization method (1) and in (ii) Reference Example 11 in which the ethylene/propylene copolymerization was carried out with the use of only a polymerization catalyst (Y) under the same polymerization condition (see Table 3, Table 4, and FIG. 2).

Reference Example 11

(1) Single-Stage Polymerization of Ethylene/Propylene Copolymerization (Synthesis of $^{H}$EP)

This single-stage copolymerization was carried out in accordance with the method described in Example 4(1) except that 3.00 mL (1.0 mM, 3.0 μmol) of a toluene solution of the transition metal compound (A-Y1) was used instead of the mixed solution of 3.00 mL (1.0 mM, 3.0 μmol) of a toluene solution of the transition metal compound (A-X2) and 3.00 mL (1.0 mM, 3.0 μmol) of a toluene solution of the transition metal compound (A-Y1). As a result, 19.0 g of a single-stage polymerization polymer was obtained.

TABLE 3

| | Whole polymer | | | | |
|---|---|---|---|---|---|
| | Tm1 °C. | Tm2 °C. | ΔH J/g | Molecular Chain Length Aw | Aw/An |
| Example 4 | 148.2 | — | 41.6 | 2340 | 2.4 |
| Re. Ex. 11 | 72.7 | 43.0 | 50.4 | 1127 | 1.4 |

* Re. Ex. stands for "Reference Example"
* DSC was measured under the DSC measurement condition (2)

TABLE 4

| | Example 4 | | | Reference Example 11 |
|---|---|---|---|---|
| | $C_2'$ mol % | $^HEP$ wt % | $^HC_2'$ mol % | $C_2'$ mol % |
| Whole | 45.7 | 51.8 | 82.5 | 85.2 |
| 50° C. soluble component | 79.1 | 90.7 | 82.8 | 86.0 |
| 90° C. soluble component | 21.0 | 23.0 | 82.5 | — |
| 100° C. soluble component | 11.9 | 12.1 | 82.9 | — |
| 110° C. soluble component | 9.8 | 9.7 | 82.9 | — |

It was demonstrated that an ethylene/propylene block copolymer composition of Reference Example 11, in which only the polymerization catalyst (Y) was used, was made up of only $^HEP$ components and was eluted by the TREF fractionation at a temperature equal to or lower than 50° C. On the other hand, it was confirmed that an ethylene/propylene block copolymer composition of Example 4, in which the polymerization catalysts (X) and (Y) were used, contained an $^HEP$ component and an $^LEP$ component. The ethylene/propylene block copolymer composition of Example 4 had (i) a component which was eluted at a temperature equal to or lower than 50° C. and (ii) a component which was eluted at a temperature between 90° C. and 110° C.

From a result of NMR analysis on the component which was eluted at the temperature between 90° C. and 110° C., 9.7% to 23.0% of the $^HEP$ component was observed. The observed $^HEP$ component had a composition substantially identical with that of Reference Example 11 and is to accordingly be eluted at the temperature equal to or lower than 50° C. However, the observed $^HEP$ component existed in the component eluted at the temperature between 90° C. and 110° C. This shows that the $^HEP$ component, which is to be eluted at 50° C. or lower if it exists solely, was eluted at the temperature between 90° C. and 110° C. due to a property of the $^LEP$ component which was chemically linked to the $^HEP$ component. As such, the result strongly suggests that an olefin block polymer exists in the ethylene/propylene block copolymer composition obtained in Example 4.

Various mechanical strengths and transparency of ethylene/propylene block copolymer compositions were measured which were obtained (i) in Examples 9, 10, 11, and 15 in each of which the ethylene/propylene copolymerization was carried out with the use of the polymerization catalysts (X) and (Y) in accordance with the single-stage polymerization method (1) and (ii) in Comparative Examples 3 and 4 in each of which the ethylene/propylene copolymerization was carried out with the use of different two polymerization catalysts (Y).

Further, the various mechanical strengths and transparency were similarly measured as to blend polymers of $^HEP$ and $^LEP$ components which did not contain block polymers and were obtained in respective Reference Examples 14 through 16 in which such two components were subjected to solvent blend at three kinds of mixing ratios. The $^HEP$ component were obtained in Reference Example 12 in which ethylene/propylene copolymerization was carried out with the use of only a polymerization catalyst (Y) under a polymerization condition identical with that of Example 10 and the $^LEP$ component were obtained in Reference Example 13 in which ethylene/propylene copolymerization was carried out with the use of only a polymerization catalyst (X) under a polymerization condition identical with that of Example 10. Results are shown in Table 5, Table 6, and FIG. 3.

Reference Example 12

(1) Single-Stage Polymerization of Ethylene/Propylene Copolymerization (Synthesis of $^HEP$)

This single-stage copolymerization was carried out in accordance with the method described in Example 10(1) except that 0.20 mL (1.0 mM, 0.20 µmol) of a toluene solution of the transition metal compound (A-Y1) was used instead of the mixed solution of 2.00 mL (1.0 mM, 2.0 µmol) of a toluene solution of the transition metal compound (A-X2) and 0.20 mL (1.0 mM, 0.2 µmol) of a toluene solution of the transition metal compound (A-Y1). As a result, 5.7 g of a single-stage polymerization polymer was obtained.

Reference Example 13

(1) Single-Stage Polymerization of Ethylene/Propylene Copolymerization (Synthesis of $^LEP$)

This single-stage copolymerization was carried out in accordance with the method described in Example 10(1) except that 1.00 mL (1.0 mM, 1.0 µmol) of a toluene solution of the transition metal compound (A-X2) was used instead of the mixed solution of 2.00 mL (1.0 mM, 2.0 µmol) of a toluene solution of the transition metal compound (A-X2) and 0.20 mL (1.0 mM, 0.2 µmol) of a toluene solution of the transition metal compound (A-Y1). As a result, 12.5 g of a single-stage polymerization polymer was obtained.

Reference Example 14

(1) Solvent Blend of $^LEP$ and $^HEP$

In an eggplant flask having an inner volume of 1 L, 1.0 g of the single-stage polymerization polymer synthesized in Reference Example 12 (1), 4.0 g of the single-stage polymerization polymer synthesized in Reference Example 13(1), and 500 mL of xylene were added, a reflux condenser was attached, and then the mixture was heated to reflux for 1 hour. The obtained uniform solution was added at a time to 2000 mL of ice-chilled ethanol while being stirred, and was then further stirred for 15 minutes. Next, the deposited substance was filtered and then dried under reduced pressure. As a result, 5.0 g of a solvent blend polymer was obtained.

Reference Example 15

(1) Solvent Blend of $^LEP$ and $^HEP$

This solvent blending was carried out in accordance with the method described in Reference Example 14(1) except that 2.5 g of the single-stage polymerization polymer synthesized in Reference Example 12(1) and 2.5 g of the single-stage polymerization polymer synthesized in Reference Example 13(1) were used instead of 1.0 g of the single-stage polymerization polymer synthesized in Reference Example 12(1) and 4.0 g of the single-stage polymerization polymer synthesized in Reference Example 13(1). As a result, 5.0 g of a solvent blend polymer was obtained.

Reference Example 16

(1) Solvent Blend of $^L$EP and $^H$EP

This solvent blending was carried out in accordance with the method described in Reference Example 15(1) except that 4.0 g of the single-stage polymerization polymer synthesized in Reference Example 12(1) and 1.0 g of the single-stage polymerization polymer synthesized in Reference Example 13(1) were used instead of 1.0 g of the single-stage polymerization polymer synthesized in Reference Example 12(1) and 4.0 g of the single-stage polymerization polymer synthesized in Reference Example 13(1). As a result, 5.0 g of a solvent blend polymer was obtained.

TABLE 5

| | Solvent blend polymer | | | | | |
|---|---|---|---|---|---|---|
| | Mixing ratio $^L$EP:$^H$EP | Tm1 ° C. | Tm2 ° C. | ΔH J/g | Molecular Chain Length Aw | Aw/An |
| Reference Example 14 | 4:1 | 135.6 | 85.9 | 61.7 | 5100 | 2.4 |
| Reference Example 15 | 1:1 | 136.3 | 87.2 | 61.5 | 4300 | 2.6 |
| Reference Example 16 | 1:4 | 135.1 | 87.2 | 65.3 | 3100 | 2.4 |

* DSC was measured under the DSC measurement condition (2)

TABLE 6

| | Young's modulus MPa | Tensile impact kJ/m² | Haze % | Yield strength MPa | Tensile strength MPa | Elongation % |
|---|---|---|---|---|---|---|
| Example 9 | 380 | 37 | 15.8 | 12.6 | 18.8 | 1024 |
| Example 10 | 561 | 32 | 14.0 | 16.1 | 19.8 | 385 |
| Example 11 | 799 | 26 | 17.3 | 21.0 | 25.3 | 420 |
| Example 15 | 433 | 100 | 12.2 | 12.7 | 15.2 | 318 |
| Co. Ex. 3 | 101 | 6 | 16.5 | 4.5 | 3.9 | 5 |
| Co. Ex. 4 | 58 | 37 | 11.2 | 3.7 | 3.8 | 181 |
| Re. Ex. 14 | 766 | 14 | 18.9 | 22.0 | 24.0 | 380 |
| Re. Ex. 15 | 331 | 6 | 29.6 | 8.4 | 8.4 | 4 |
| Re. Ex. 16 | 139 | 21 | 21.9 | 5.9 | 5.8 | 16 |

* Co. Ex. stands for "Compartive Example"
* Re. Ex. stands for "Reference Example"

In Examples 9, 10, 11, and 15 in each of which the ethylene/propylene copolymerization was carried out with the use of the polymerization catalysts (X) and (Y) in accordance with the single-stage polymerization method (1), a product of a Young's modulus and tensile impact is larger and has an excellent balance of rigidity and impact resistance, as compared with each of Comparative Examples 3 and 4, in which the ethylene/propylene copolymerization was carried out with the use of the two different polymerization catalysts (Y), and Reference Examples 14 through 16 in which the blend polymers of $^H$EP and $^L$EP were obtained. Moreover, each of Examples 9, 10, 11, and 15 exhibited smaller haze and higher transparency, as compared with Reference Examples 14 through 16. Furthermore, each of Examples 9, 10, 11, and 15 exhibited higher yield strength, higher tensile strength, and higher elongation, i.e., is excellent in mechanical properties, as compared with Comparative Examples 3 and 4.

Example 17

(1) Single-Stage Polymerization of Ethylene/Propylene Copolymerization

An autoclave having an inner volume of 0.4 liter and provided with a stirrer was sufficiently dried. After that, 100 mL of toluene and 50 g of propylene were added, a temperature was increased to 70° C., and 0.6 MPa (partial pressure) of ethylene was further added. Then, 0.50 mmol of triisobutylaluminum (organometallic compound (C)), 0.05 mmol of diethylzinc (organometallic compound (C)), a mixed solution of 1.00 mL (1.0 mM, 1.0 µmol) of a toluene solution of the transition metal compound (A-X1) and 0.10 mL (1.0 mM, 0.1 µmol) of a toluene solution of the transition metal compound (A-Y1), and 1.00 mL (4.0 mM, 4.0 µmol) of a toluene solution of trityl tetrakis(pentafluorophenyl) borate (activating co-catalyst agent (B)) were added in this order to the autoclave from a pressurization injection machine, and polymerization was performed at 70° C. for 30 minutes. A small amount of ethanol was added to terminate the reaction, and an unreacted monomer was purged. Then, the autoclave was opened, and 500 mL of ethanol and 5 mL of a 1N hydrochloric acid aqueous solution were added. The mixture was stirred at room temperature for 30 minutes, and a polymer thus deposited was suction filtered. After that, the polymer was sufficiently dried under reduced pressure by a vacuum dryer, and thus 13.5 g of a single-stage polymerization polymer was obtained.

(2) Solvent Fractionation of Single-Stage Polymerization Polymer

In an eggplant flask having an inner volume of 1 liter, 2.00 g of the single-stage polymerization polymer synthesized in Example 17(1) and 1.00 L of xylene were added, a reflux condenser was attached, and then the mixture was stirred for 3 hours at 140° C. in an oil bath. The obtained uniform solution was ice-chilled and then stirred at room temperature for 2 hours. Next, the deposited substance was filtered, the filtrate was concentrated, dried, and solidified, and then the deposited substance and the filtrate were dried under reduced pressure. As a result, 1.05 g of a CXIS component and 0.95 g of a CXS component were obtained.

Example 18

(1) Single-Stage Polymerization of Ethylene/Propylene Copolymerization

This single-stage copolymerization was carried out in accordance with the method described in Example 17(1) except that 1.00 mL (1.0 mM, 1.0 µmol) of a toluene solution of the transition metal compound (A-X2) was added instead of the transition metal compound (A-X1) and the polymerization was carried out for 15 minutes. As a result, 7.8 g of a single-stage polymerization polymer was obtained.

(2) Solvent Fractionation of Single-Stage Polymerization Polymer

This solvent fractionation was carried out in accordance with the method described in Example 17(2) except that the single-stage polymerization polymer obtained in Example 18(1) was used. As a result, 1.55 g of a CXIS component and 0.45 g of a CXS component were obtained.

Comparative Example 5

(1) Single-Stage Polymerization of Ethylene/Propylene Copolymerization

This single-stage copolymerization was carried out in accordance with the method described in Example 17(1) except that the transition metal compound (A-X1) was not added. As a result, 10.0 g of the single-stage polymerization polymer was obtained.

(2) Solvent Fractionation of Single-Stage Polymerization Polymer

This solvent fractionation was carried out in accordance with the method described in Example 17(2) except that the single-stage polymerization polymer obtained in Comparative Example 5(1) was used. As a result, 2.00 g of a CXIS component was obtained.

Example 19

(1) Single-Stage Polymerization of Ethylene/Propylene Copolymerization

This single-stage copolymerization was carried out in accordance with the method described in Example 17(1) except that 1.00 mL (1.0 mM, 1.0 µmol) of a toluene solution of the transition metal compound (A-X2) was added instead of the transition metal compound (A-X1), 31.0 mg of d-MAO (activating co-catalyst agent (B)) was added instead of the trityl tetrakis(pentafluorophenyl)borate, and the tri-isobutylaluminum was not added. As a result, 15.1 g of the single-stage polymerization polymer was obtained.

(2) Solvent Fractionation of Single-Stage Polymerization Polymer

This solvent fractionation was carried out in accordance with the method described in Example 17(2) except that the single-stage polymerization polymer obtained in Example 19(1) was used. As a result, 0.87 g of a CXIS component and 1.13 g of a CXS component were obtained.

Comparative Example 6

(1) Single-Stage Polymerization of Ethylene/Propylene Copolymerization

This single-stage copolymerization was carried out in accordance with the method described in Example 19(1) except that the transition metal compound (A-X2) was not added. As a result, 9.4 g of the single-stage polymerization polymer was obtained.

(2) Solvent Fractionation of Single-Stage Polymerization Polymer

This solvent fractionation was carried out in accordance with the method described in Example 17(2) except that the single-stage polymerization polymer obtained in Comparative Example 6(1) was used. As a result, 2.00 g of a CXIS component was obtained.

Example 20

(1) Single-Stage Polymerization of Ethylene/Propylene Copolymerization

This single-stage copolymerization was carried out in accordance with the method described in Example 17(1) except that 0.50 mL (1.0 mM, 0.5 µmol) of a toluene solution of the transition metal compound (A-Y2) was added instead of the transition metal compound (A-Y1). As a result, 8.9 g of the single-stage polymerization polymer was obtained.

(2) Solvent Fractionation of Single-Stage Polymerization Polymer

This solvent fractionation was carried out in accordance with the method described in Example 17(2) except that the single-stage polymerization polymer obtained in Example 20(1) was used. As a result, 0.47 g of a CXIS component and 1.53 g of a CXS component were obtained.

Example 21

(1) Single-Stage Polymerization of Ethylene/Propylene Copolymerization

This single-stage copolymerization was carried out in accordance with the method described in Example 20(1) except that 1.00 mL (1.0 mM, 1.0 µmol) of a toluene solution of the transition metal compound (A-X2) was added instead of the transition metal compound (A-X1) and the polymerization was carried out for 15 minutes. As a result, 4.5 g of a single-stage polymerization polymer was obtained.

(2) Solvent Fractionation of Single-Stage Polymerization Polymer

This solvent fractionation was carried out in accordance with the method described in Example 17(2) except that the single-stage polymerization polymer obtained in Example 21(1) was used. As a result, 1.19 g of a CXIS component and 0.81 g of a CXS component were obtained.

Comparative Example 7

(1) Single-Stage Polymerization of Ethylene/Propylene Copolymerization

This single-stage copolymerization was carried out in accordance with the method described in Example 20(1) except that the transition metal compound (A-X1) was not added. As a result, 2.5 g of the single-stage polymerization polymer was obtained.

(2) Solvent Fractionation of Single-Stage Polymerization Polymer

This solvent fractionation was carried out in accordance with the method described in Example 17(2) except that the single-stage polymerization polymer obtained in Comparative Example 7(1) was used. As a result, 2.00 g of a CXIS component was obtained.

The single-stage polymerization polymers (Whole), the CXS components (CXS) and the CXIS components (CXIS) of the single-stage polymerization polymers, which were obtained from Examples 17(1) and 17(2) through 21(1) and 21(2) and Comparative Examples 5(1) and 5(2) through 7(1) and 7(2), were analyzed in terms of intrinsic viscosity [η], $A_n$, $A_w$, $A_w/A_n$, Tm, Tc, Tg, ΔH, and ethylene content. The analysis is shown in Table 7.

TABLE 7

|  |  | Solvent fractionation ratio (wt %) | [η] (dl/g) | GPC $A_w$ | GPC $A_n$ | GPC $A_w/A_n$ | DSC Tm (° C.) | DSC Tc (° C.) | DSC Tg (° C.) | DSC ΔH (J/g) | NMR $C_2'$ (wt %) |
|---|---|---|---|---|---|---|---|---|---|---|---|
| Example 17 | Whole | — | 0.91 | 2680 | 873 | 3.1 | 120.71 | 107.21 | −59.00 | 101.7 | — |
| (A-X1) | CXS | 47.3 | 0.66 | 2180 | 467 | 4.7 | 119.29 | 104.81 | −58.22 | 55.64 | 62.5 |
| (A-Y1) | CXIS | 52.5 | 1.17 | 3389 | 1165 | 2.9 | 120.99 | 107.65 | −55.30 | 120.99 | 87.8 |

TABLE 7-continued

| | Solvent fractionation ratio (wt %) | [η] (dl/g) | GPC $A_w$ | $A_n$ | $A_w/A_n$ | DSC Tm (° C.) | Tc (° C.) | Tg (° C.) | ΔH (J/g) | NMR $C_2'$ (wt %) |
|---|---|---|---|---|---|---|---|---|---|---|
| Example 18 Whole (A-X2) | — | 0.44 | 1081 | 512 | 2.1 | 116.63 | 106.72 (63.72) | −39.14 | 137.0 | — |
| (A-Y1) CXS | 22.5 | 0.21 | 565 | 261 | 2.2 | 72.70 (103.5) | 62.42 106.50 | −38.99 | 11.14 | 24.5 |
| CXIS | 77.5 | 0.54 | 1180 | 670 | 1.8 | 117.25 | (64.44) | 39.81 | 165.0 | 85.6 |
| Co. Ex. 5 Whole | — | 0.95 | 2406 | 1041 | 2.3 | 121.58 | 108.57 | n.d. | 187.3 | — |
| (A-Y1) CXS | 0 | — | — | — | — | — | — | — | — | — |
| CXIS | 100 | 0.92 | 2215 | 935 | 2.4 | 121.74 | 108.29 | n.d | 193.1 | 97.1 |
| Example 19 Whole (A-X2) | — | 0.98 | 3410 | 1306 | 2.6 | 116.72 (61.94) | 102.09 (75.00) | −30.96 | 76.05 | — |
| (A-Y1) CXS | 56.5 | 0.58 | 2083 | 1037 | 2.0 | 53.39 | 1.00 | −31.11 | 13.11 | 21.7 |
| CXIS | 43.5 | 1.16 | 4421 | 2116 | 2.1 | 117.83 | 105.01 | −31.79 | 132.1 | 88.5 |
| Co. Ex. 6 Whole | — | 1.00 | 2657 | 1485 | 1.8 | 114.4 | 99.94 | n.d | 155.4 | — |
| (A-Y1) CXS | 0 | — | — | — | — | — | — | — | — | — |
| CXIS | 100 | 1.01 | 2660 | 1490 | 1.8 | 114.4 | 99.65 | n.d. | 146.9 | 94.2 |
| Example 20 Whole | — | 0.33 | 801 | 405 | 2.0 | 127.6 | 117.96 | −57.51 | 72.29 | — |
| (A-X1) CXS | 76.7 | 0.27 | 801 | 394 | 2.0 | — | — | — | — | 56.9 |
| (A-Y2) CXIS | 23.3 | 0.36 | 782 | 400 | 2.0 | 129.31 | 118.42 | −54.46 | 211.4 | 92.5 |
| Example 21 Whole | — | 0.27 | 599 | 294 | 2.0 | 128.70 | 118.5 | −40.33 | 171.7 | — |
| (A-X2) CXS | 40.3 | 0.25 | 595 | 221 | 2.7 | — | — | — | — | 24.41 |
| (A-Y2) CXIS | 59.7 | 0.31 | 578 | 304 | 1.9 | 129.02 | 118.47 | −38.99 | 251.1 | 93.22 |
| Co. Ex. 7 Whole | — | 0.26 | 220 | 183 | 2.2 | 129.23 | 117.17 | n.d. | 269.3 | — |
| (A-Y2) CXS | 0 | — | — | — | — | — | — | - | — | — |
| CXIS | 100 | 0.26 | 243 | 459 | 1.9 | 129.64 | 117.46 | n.d. | 252.8 | 99.9 |

\* Co. Ex. stands for "Compartive Example"
\* DSC was measured under the DSC measurement condition (1)

NMR and DSC of each of the Whole, CXIS, and CXS components were measured which were obtained in Examples 17 through 21 in which the ethylene/propylene copolymerization was carried out with the use of the polymerization catalysts (X) and (Y) in accordance with the single-stage polymerization method (1). As a result, Tg was observed in the CXIS component of each of Examples 17 through 21, and the ethylene content of the CXIS component was smaller than that of corresponding Comparative Examples 5 through 7 in which only the polymerization catalyst (Y) was used.

This indicates that amorphous ethylene/propylene copolymer segments (X) derived from the polymerization catalyst (X) exist in the CXIS component. However, the segments (X) have compositions which are normally all fractionated as CXS components based on their Tg values. Therefore, this indicates that the amorphous ethylene/propylene copolymer segment (X), which is to be fractionated as the CXS component if it exists solely, exists as an insoluble component in the CXIS component due to properties of a crystalline ethylene/propylene copolymer segment (Y) which is chemically linked to the segment (X). From this, it is suggested that an olefin block polymer is generated in the single-stage polymerization polymer obtained in each of Examples 17 through 21.

Example 22

(1) Single-Stage Polymerization of Ethylene

An autoclave having an inner volume of 0.4 liter and provided with a stirrer was sufficiently dried. After that, 200 mL of toluene was added, a temperature was increased to 40° C., and 0.6 MPa (partial pressure) of ethylene was further added. Then, 0.25 mmol of triisobutylaluminum (organometallic compound (C)), a mixed solution of 1.00 mL (1.0 mM, 1.0 µmol) of a toluene solution of the transition metal compound (A-X1) and 1.00 mL (1.0 mM, 1.0 µmol) of a toluene solution of the transition metal compound (A-Y3), and 1.00 mL (4.0 mM, 4.0 µmol) of a toluene solution of trityl tetrakis(pentafluorophenyl)borate (activating co-catalyst agent (B)) were added in this order to the autoclave from a pressurization injection machine, and polymerization was performed at 40° C. for 30 minutes. A small amount of ethanol was added to terminate the reaction, and an unreacted monomer was purged. Then, the autoclave was opened, and 500 mL of ethanol and 5 mL of a 1N hydrochloric acid aqueous solution were added. The mixture was stirred at room temperature for 30 minutes, and a polymer thus deposited was suction filtered. After that, the polymer was sufficiently dried under reduced pressure by a vacuum dryer, and thus 4.4 g of a single-stage polymerization polymer was obtained.

Comparative Example 8

(1) Single-Stage Polymerization of Ethylene

This single-stage polymerization was carried out in accordance with the method described in Example 22(1) except that the transition metal compound (A-X1) was not added. As a result, 1.2 g of a single-stage polymerization polymer was obtained.

The single-stage polymerization polymers (Whole), which were obtained from Example 22 and Comparative Example 8(1), were analyzed in terms of intrinsic viscosity [η], An, Aw, Aw/An, Tm, Tc, Tg, and ΔH. The analysis is shown in Table 8.

TABLE 8

| | | [η] | GPC | | | DSC | | | |
| | | | | | | Tm | Tc | Tg | ΔH |
| | | (dl/g) | $A_n$ | $A_w$ | $A_w/A_n$ | (° C.) | (° C.) | (° C.) | (J/g) |
|---|---|---|---|---|---|---|---|---|---|
| Example 22 (A-X1) (A-Y3) | Whole | 3.12 | 548 | 13503 | 24.6 | 118.3 58.4 | 102.5 49.0 | −41.4 | 36.7 |
| Co. Ex. 8 (A-Y3) | Whole | 4.14 | 7645 | 17696 | 2.3 | 65.4 | 54.6 | −41.0 | 61.0 |

* Co. Ex. stands for "Compartive Example"
* DSC was measured under the DSC measurement condition (1)

Example 23

(1) Two-Stage Polymerization of Ethylene/Propylene Copolymerization (Former Stage), and Propylene Homopolymerization (Latter Stage)

Former stage: inside of a 0.4-L autoclave with a stirrer was sufficiently dried. After 160 mL of toluene and 20 g of propylene were added, a temperature was increased to 50° C., and 0.4 MPa (partial pressure) of ethylene was further added. Thereafter, 31.8 mg of d-MAO (activating co-catalyst agent (B)), 0.05 mmol of diethylzinc anometallic compound (C)), and 0.10 mL (1.0 mM, 0.1 µmol) of the toluene solution of a transition metal compound (A-Y4) were added in this order to the autoclave from a pressurization injection machine, and polymerization was performed at 50° C. for 30 minutes. After polymerization reaction, an unreacted monomer was purged. Then, 2.0 MPa of argon was added, and purging was carried out again. This operation was repeated twice.

Latter stage: the inside of the autoclave was cooled to a room temperature while being kept in an argon atmosphere, and 20 g of propylene was added again. Then the temperature was increased to 50° C. Subsequently, 4.00 mL (1.0 mM, 4.0 µmol) of the toluene solution of the transition metal compound (A-X1) was added to the autoclave from the pressurization injection machine, and polymerization was performed at 50° C. for 60 minutes. A small amount of ethanol was added to terminate the reaction, and an unreacted monomer was purged. Then, the autoclave was opened, and 500 mL of ethanol and 5 mL of a 1N hydrochloric acid aqueous solution were added. The mixture was stirred at a room temperature for 30 minutes, and a polymer thus deposited was suction filtered. After that, the polymer was sufficiently dried under reduced pressure by the vacuum dryer. Thus, 4.3 g of two-stage polymerization polymer was obtained.

(2) Solvent Fractionation of Two-Stage Polymerization Polymer

This solvent fractionation was carried out in accordance with the method described in Example 17(2) except that the two-stage polymerization polymer obtained in Example 23(1) was used. As a result, 1.19 g of the CXIS component and 0.81 g of the CXS component were obtained.

Example 24

(1) Two-Stage Polymerization of Ethylene/Propylene Copolymerization (Former Stage), and Propylene Homopolymerization (Latter Stage)

Former stage: inside of a 0.4-L autoclave with a stirrer was sufficiently dried. After 160 mL of toluene and 20 g of propylene were added, a temperature was increased to 50° C., and 0.2 MPa (partial pressure) of ethylene was further added. Thereafter, 0.50 mmol of triisobutylaluminum (organometallic compound (C)), 0.05 mmol of diethylzinc (organometallic compound (C)), 0.20 mL (1.0 mM, 0.2 µmol) of a toluene solution of the transition metal compound (A-Y4), and 1.00 mL (4.0 mM, 4.0 µmol) of a toluene solution of trityl tetrakis(pentafluorophenyl)borate (activating co-catalyst agent (B)) were added in this order to the autoclave from a pressurization injection machine, and polymerization was performed at 50° C. for 15 minutes. After polymerization reaction, an unreacted monomer was purged. Then, 2.0 MPa of argon was added, and purging was carried out again. This operation was repeated twice.

Latter stage: the inside of the autoclave was cooled to a room temperature while being kept in an argon atmosphere, and 20 g of propylene was added again. Then the temperature was increased to 50° C. Subsequently, 4.00 mL (1.0 mM, 4.0 µmol) of the toluene solution of the transition metal compound (A-X1) and 1.00 mL (4.0 mM, 4.0 µmol) of the toluene solution of trityl tetrakis(pentafluorophenyl)borate (activating co-catalyst agent (B)) were added in this order to the autoclave from the pressurization injection machine, and polymerization was performed at 50° C. for 120 minutes. A small amount of ethanol was added to terminate the reaction, and an unreacted monomer was purged. Then, the autoclave was opened, and 500 mL of ethanol and 5 mL of 1N hydrochloric acid aqueous solution were added. The mixture was stirred at a room temperature for 30 minutes, and a polymer thus deposited was suction filtered. After that, sufficient drying was carried out under reduced pressure with use of a vacuum dryer. Thus, 16.7 g of two-stage polymerization polymer was obtained.

(2) Solvent Fractionation of Two-Stage Polymerization Polymer

This solvent fractionation was carried out in accordance with the method described in Example 17(2) except that the two-stage polymerization polymer obtained in Example 24(1) was used. As a result, 0.91 g of the CXIS component and 1.09 g of the CXS component were obtained.

Example 25

(1) Two-Stage Polymerization of Ethylene/Propylene Copolymerization (Former Stage), and Propylene Homopolymerization (Latter Stage)

Former stage: inside of a 0.4-L autoclave with a stirrer was sufficiently dried. After 160 mL of toluene and 20 g of propylene were added, a temperature was increased to 50° C., and 0.2 MPa (partial pressure) of ethylene was further added. Thereafter, 0.50 mmol of triisobutylaluminum (organometallic compound (C)), 0.01 mmol of diethylzinc (organometallic compound (C)), 0.10 mL (1.0 mM, 0.1 µmol) of a toluene solution of the transition metal compound (A-Y4), and 1.00 mL (4.0 mM, 4.0 μmol) of a toluene solution of trityl tetrakis(pentafluorophenyl)borate (activating co-catalyst agent (B)) were added in this order to the autoclave from a pressurization injection machine, and polymerization was performed at 50° C. for 15 minutes. After polymerization reaction, an unreacted monomer was purged. Then, 2.0 MPa of argon was added, and purging was carried out again. This operation was repeated twice.

Latter stage: the inside of the autoclave was cooled to a room temperature while being kept in an argon atmosphere, and 20 g of propylene was added again. Then the temperature was increased to 50° C. Subsequently, 4.00 mL (1.0 mM, 4.0 μmol) of the toluene solution of the transition metal compound (A-X2) and 1.00 mL (4.0 mM, 4.0 μmol) of the toluene solution of trityl tetrakis(pentafluorophenyl)borate (activating co-catalyst agent (B)) were added in this order to the autoclave from the pressurization injection machine, and polymerization was performed at 50° C. for 60 minutes. A small amount of ethanol was added to terminate the reaction, and an unreacted monomer was purged. Then, the autoclave was opened, and 500 mL of ethanol and 5 mL of 1N hydrochloric acid aqueous solution were added. The mixture was stirred at a room temperature for 30 minutes, and a polymer thus deposited was suction filtered. After that, sufficient drying was carried out under reduced pressure with use of a vacuum dryer. Thus, 15.3 g of two-stage polymerization polymer was obtained.

(2) Solvent Fractionation of Two-Stage Polymerization Polymer

This solvent fractionation was carried out in accordance with the method described in Example 17(2) except that the two-stage polymerization polymer obtained in Example 25(1) was used. As a result, 1.09 g of the CXIS component and 0.91 g of the CXS component were obtained.

Comparative Example 9

(1) Two-Stage Polymerization of Ethylene/Propylene Copolymerization (Former Stage), and Propylene Homopolymerization (Latter Stage)

Former stage: inside of a 3-L autoclave with a stirrer was sufficiently dried. After 800 mL of toluene and 100 g of propylene were added, a temperature was increased to 50° C., and 0.2 MPa (partial pressure) of ethylene was further added. Thereafter, 1.00 mmol of triisobutylaluminum (organometallic compound (C)), 0.15 mmol of diethylzinc (organometallic compound (C)), 0.80 mL (1.0 mM, 0.8 μmol) of a toluene solution of the transition metal compound (A-Y4), and 1.00 mL (4.0 mM, 4.0 μmol) of a toluene solution of trityl tetrakis(pentafluorophenyl)borate (activating co-catalyst agent (B)) were added in this order to the autoclave from a pressurization injection machine, and polymerization was performed at 50° C. for 30 minutes. After polymerization reaction, an unreacted monomer was purged. Then, 2.0 MPa of argon was added, and purging was carried out again. This operation was repeated twice.

Latter stage: the inside of the autoclave was cooled to a room temperature while being kept in an argon atmosphere, and 100 g of propylene was added again. Then the temperature was increased to 80° C. Subsequently, 2.00 mL (1.0 mM, 2.0 μmol) of the toluene solution of the transition metal compound (A-Y4) and 1.00 mL (4.0 mM, 4.0 μmol) of the toluene solution of trityl tetrakis(pentafluorophenyl)borate (activating co-catalyst agent (B)) were added to in this order the autoclave from the pressurization injection machine, and polymerization was performed at 80° C. for 30 minutes. A small amount of ethanol was added to terminate the reaction, and an unreacted monomer was purged. Then, the autoclave was opened, and 2000 mL of ethanol and 20 mL of 1N hydrochloric acid aqueous solution were added. The mixture was stirred at a room temperature for 30 minutes, and a polymer thus deposited was suction filtered. After that, sufficient drying was carried out under reduced pressure with use of a vacuum dryer. Thus, 53.8 g of two-stage polymerization polymer was obtained.

(2) Solvent Fractionation of Two-Stage Polymerization Polymer

This solvent fractionation was carried out in accordance with the method described in Example 17(2) except that the two-stage polymerization polymer obtained in Comparative Example 9(1) was used. As a result, 1.40 g of the CXIS component and 0.60 g of the CXS component were obtained.

The two-stage polymerization polymers (Whole), the CXS components (CXS) and the CXIS components (CXIS) of the two-stage polymerization polymers, which were obtained from Examples 23 to 25 and Comparative Examples 9(1), (2), were analyzed in terms of intrinsic viscosity [η], An, Aw, Aw/An, Tm, Tc, Tg, ΔH, ethylene content, and EP content. The analysis is shown in Table 9.

TABLE 9

| | | Solvent fractionation ratio (wt %) | (η) (dl/g) | GPC | | | DSC | | | | NMR | |
|---|---|---|---|---|---|---|---|---|---|---|---|---|
| | | | | $A_w$ | $A_n$ | $A_w/A_n$ | Tm (° C.) | Tc (° C.) | Tg (° C.) | ΔH (J/g) | $C_2'$ (wt %) | EP (wt %) |
| Example 23 | Whole | — | 0.52 | 1596 | 561 | 2.8 | 147.6 | 109.0 | −61.5 | 34.0 | — | — |
| (A-X1) | CXS | 40.5 | 0.62 | 1781 | 571 | 3.1 | 149.7 | 75.4 | −61.3 | 2.5 | 52.2 | 100.0 |
| (A-Y4) | CXIS | 59.5 | 0.36 | 954 | 436 | 2.2 | 149.2 | 119.1 | −62.9 | 104.6 | 7.6 | 14.6 |
| Example 24 | Whole | — | 0.88 | 4654 | 508 | 9.2 | 150.6 | 110.1 | −49.5 | 41.7 | 21.3 | 63.7 |
| (A-X1) | CXS | 54.6 | 0.82 | 2834 | 635 | 4.1 | 86.9 | 47.8 | −49.3 | 4.2 | 33.4 | 100.0 |
| (A-Y4) | CXIS | 45.4 | 1.15 | 4763 | 429 | 11.1 | 149.4 | 112.7 | −51.2 | 73.0 | 11.4 | 34.3 |
| Example 25 | Whole | — | 1.19 | 4879 | 520 | 9.4 | 151.9 | 110.2 | −51.5 | 56.1 | 19.4 | 54.9 |
| (A-X2) | CXS | 45.5 | 0.94 | 6371 | 528 | 12.1 | 94.5 | 55.9 | −51.0 | 2.5 | 35.3 | 100.0 |
| (A-Y4) | CXIS | 54.5 | 1.59 | 2823 | 432 | 6.5 | 153.7 | 116.9 | −54.7 | 102.7 | 6.5 | 18.5 |
| Co. EX. 9 | Whole | — | 1.58 | 6284 | 2408 | 2.6 | 151.8 | 110.2 | −63.2 | 67.3 | — | — |
| (A-Y4) | CXS | 30.0 | 1.79 | 6180 | 2450 | 2.5 | — | — | — | — | 47.6 | 100.0 |
| (A-Y4) | CXIS | 70.0 | 1.36 | 5970 | 2200 | 2.7 | 152.8 | 113.0 | n.d | 99.0 | 2.0 | 4.2 |

* Co. Ex. stands for "Compartive Example"
* DSC measurement was performed in accordance with the above DSC measurement condition (1)

NMR and DSC were conducted with respect to the Whole, CXIS, and CXS components of Examples 23 to 25 in each of which the two-stage polymerization in which ethylene/propylene was copolymerized at the former stage with use of a polymerization catalyst (Y) and the propylene homopolymerization was carried out at the latter stage with use of the polymerization catalyst (X) was carried out in accordance with a multi-stage polymerization method (3). As a result, Tg and an NMR sequence derived from ethylene/propylene copolymer were observed in the CXIS component of each of Examples.

This indicates that, ethylene/propylene copolymer segments (Y) derived from the polymerization catalyst (Y) exist in the CXIS component. However, the segments (Y) have compositions normally all fractionated as CXS components based on their Tg values. This indicates that amorphous ethylene/propylene copolymer segment (Y), which is to be fractionated as the CXS component if it exists solely, exists in the CXIS component as an insoluble component because of properties of a crystalline propylene homopolymer segment (X) chemically linked to the segment (Y), and suggests that olefin block polymers are generated in the two-stage polymerization polymers in Examples 23 to 25.

Further, in comparison with Comparative Example 9 with use of the polymerization catalyst (Y) only, the value of the EP content in the CXIS component in each of Examples 23 to 25 above is higher, and a generation efficiency of the olefin block polymer is higher.

INDUSTRIAL APPLICABILITY

According to a method of the present invention for producing an olefin block polymer, it is possible to manufacture the olefin block polymer with a high productivity, and therefore the method is industrially highly valuable.

The invention claimed is:
1. An ethylene/propylene block copolymer composition satisfying all of the following conditions (1) to (5):
   (1) to have one or more melting points having 130° C. or more;
   (2) to have 2.0 or more wt % of $^{H}EP_{BHIS}$ content;
   (3) to have 80.0 mol % or more but 94.5 mol % or less of $^{H}C_2'_{BHIS}$;
   (4) to have 0.1 mol % or more but 9.0 mol % or less of $^{L}C_2'_{BHIS}$; and
   (5) to have 5.0 mol % or less of an absolute value of a difference between the $^{H}C_2'_{BHIS}$ and the $^{H}C_2'_{BHS}$;
   wherein $^{H}EP_{BHIS}$ represents a high-ethylene-content ethylene/propylene copolymer content in the boiling hexane insoluble component; wherein $^{H}C_2'_{BHIS}$ represents an ethylene content in the high-ethylene-content ethylene/propylene copolymer component in the boiling hexane insoluble component; wherein $^{L}C_2'_{BHIS}$ represents an ethylene content in the low-ethylene-content ethylene/propylene copolymer component in the boiling hexane insoluble component; and wherein $^{H}C_2'_{BHS}$ represents an ethylene content in the high-ethylene-content ethylene/propylene copolymer component in the boiling hexane soluble component.

2. The ethylene/propylene block copolymer composition as set forth in claim 1 satisfying the following condition (6):
   (6) to satisfy 12000≤Young's modulus (MPa)×tensile impact (kJ/m2).

3. The ethylene/propylene block copolymer composition as set forth in claim 2 satisfying the following condition (7):
   (7) to have 18% or less of haze value.

* * * * *